United States Patent [19]
Hashimoto et al.

[11] Patent Number: 5,632,002
[45] Date of Patent: May 20, 1997

[54] SPEECH RECOGNITION INTERFACE SYSTEM SUITABLE FOR WINDOW SYSTEMS AND SPEECH MAIL SYSTEMS

[75] Inventors: Hideki Hashimoto; Yoshifumi Nagata; Shigenobu Seto; Yoichi Takebayashi; Hideaki Shinchi, all of Kanagawa-ken; Koji Yamaguchi, Chiba-ken, all of Japan

[73] Assignee: Kabushiki Kaisha Toshiba, Kawasaki-ken, Japan

[21] Appl. No.: 178,731

[22] Filed: Dec. 28, 1993

[30] Foreign Application Priority Data

Dec. 28, 1992 [JP] Japan ................................. 4-358597
Mar. 12, 1993 [JP] Japan ................................. 5-078920
Sep. 20, 1993 [JP] Japan ................................. 5-256405

[51] Int. Cl.$^6$ ......................................................... G10L 5/06
[52] U.S. Cl. ............................................. 395/2.4; 395/2.67
[58] Field of Search .......................... 395/12, 2.4, 2.84, 395/2.79, 2.67; 364/419.08

[56] References Cited

U.S. PATENT DOCUMENTS

| | | | |
|---|---|---|---|
| 4,931,950 | 6/1990 | Isle et al. | 395/12 |
| 5,131,045 | 7/1992 | Roth | 381/43 |
| 5,163,111 | 11/1992 | Baji et al. | 395/22 |
| 5,278,980 | 1/1994 | Pedersen et al. | 395/600 |
| 5,329,579 | 7/1994 | Brunson | 379/88 |
| 5,351,276 | 9/1994 | Doll, Jr. et al. | 379/67 |
| 5,465,378 | 11/1995 | Duensing et al. | 395/800 |

FOREIGN PATENT DOCUMENTS

| | | | |
|---|---|---|---|
| 0405029 | 1/1991 | European Pat. Off. | H04M 1/64 |
| 0472125A2 | 8/1991 | European Pat. Off. | G06F 3/16 |
| 0472125 | 2/1992 | European Pat. Off. | G06F 3/16 |

OTHER PUBLICATIONS

C. Schmandt et al., "Augmenting a Window System with Speech Input", Computer, Aug. 1990, pp. 50–56.

A. Rudnicky et al., "Spoken Language Recognition in an Office Management Domain", Proc. ICASSP, 1991, pp. 829–832.

Y. Takebayashi, "Speech Recognition Based on the Subspace Method: AI Class-Description Learning Viewpoint", J. Acoust. Soc. Jpn. (E)13, 6, 1992, pp. 429–439.

D. Klatt, "Review of Text-to-Speech Conversion for English", J. Acoust. Soc. Am., 82(3), Sep. 1987, pp. 737–793.

L. Lamel et al., "An Improved Endpoint Detector for Isolated Word Recognition", IEEE Transactions on Acoustics, Speech and Signal Processing, vol. ASSP-29, No. 4, Aug. 1981, pp. 777–785.

(List continued on next page.)

Primary Examiner—Allen R. MacDonald
Assistant Examiner—Richemond Dorvil
Attorney, Agent, or Firm—Foley & Lardner

[57] ABSTRACT

A speech recognition interface system capable of handling a plurality of application programs simultaneously, and realizing convenient speech input and output modes which are suitable for the applications in the window systems and the speech mail systems. The system includes a speech recognition unit for carrying out a speech recognition processing for a speech input made by a user to obtain a recognition result; a program management table for managing program management data indicating a speech recognition interface function required by each application program; and a message processing unit for exchanging messages with the plurality of application programs in order to specify an appropriate recognition vocabulary to be used in the speech recognition processing of the speech input to the speech recognition unit, and to transmit the recognition result for the speech input obtained by the speech recognition unit by using the appropriate recognition vocabulary to appropriate ones of the plurality of application programs, according to the program management data managed by the program management table.

56 Claims, 80 Drawing Sheets

OTHER PUBLICATIONS

Y. Takebayashi et al., "Keyword–Spotting in Noisy Continuous Speech Using Word Pattern Vector Subabstraction and Noise Immunity Learning", Proceedings of International Conference on Acoustins, Speech, and Signal Processing, 1992, pp. II–85–88.

K. Sumita et al., "Document Structure Extraction for Interactive Document Retrieval Systems", Proceedings of Special Interest Gropu on Documentation, 1993, pp. 301–310.

P. Jacobs, "To Parse or Not to Parse: Relation–Driven Text Skimming", Artificial Intelligence Program, GE Research and Development Center, pp. 194–198.

An Automatic Speech Recognition System for Bedside Data Entry in an Intensive Care Unit; Roger et al.; Proceedings of the 33rd Midwest Symposium on Circuits and Systems, pp. 791–794, vol. 2 Aug. 1990.

The 840AV and 660AV: giant steps for Mac–Kind; MacWeek, pp. 63(5), v7 Aug. 1993.

Noncommand user interfaces; Communications of the ACM, pp82 (18) v36 Apr. 1993.

FIG.13

|  | SENDER | RECEIVER | MESSAGE |
|---|---|---|---|
| (a) | AP | MPU | M1: COMMUNICATION PATH CONNECT/DISCONNECT REQUEST<br>M2: RECOGNITION DICTIONARY LOAD/RELEASE REQUEST<br>M3: RECOGNITION VOCABULARY SET UP REQUEST<br>M4: INPUT TASK SET UP REQUEST<br>M5: INPUT MASK SET UP REQUEST<br>M6: RECOGNITION START/END REQUEST |
| (b) | MPU | AP | M7: RECOGNITION RESULT<br>M8: INPUT TASK CHANGE NOTICE<br>M9: COMMUNICATION PATH CONNECT/DISCONNECT NOTICE<br>M10: RECOGNITION VOCABULARY CHANGE NOTICE<br>M11: RECOGNITION DICTIONARY LOAD/RELEASE NOTICE |
| (c) | SRU | MPU | M12: RECOGNITION VOCABULARY QUERY REQUEST<br>M13: RECOGNITION RESULT<br>M14: RECOGNITION DICTIONARY LOAD/RELEASE NOTICE |
| (d) | MPU | SRU | M15: RECOGNITION DICTIONARY LOAD/RELEASE REQUEST<br>M16: RECOGNITION VOCABULARY DATA |

FIG.14

RECOGNITION RESULT NOTICE MASK
RECOGNITION VOCABULARY CHANGE MASK
INPUT TASK CHANGE MASK
COMMUNICATION PATH STATE NOTICE MASK
RECOGNITION DICTIONARY STATE NOTICE MASK

FIG.16A

| PROGRAM ID | INPUT MASK | SPEECH INPUT FLAG | RECOGNITION VOCABULARY LIST |
|---|---|---|---|
| 0 (SHELL TOOL) | RECOGNITION RESULT NOTICE MASK INPUT TASK CHANGE MASK | 1 | HISTORY, PROCESS, LIST, HOME, FINISH |
| 1 (TEXT EDITOR) | RECOGNITION RESULT NOTICE MASK | 0 | CUT, COPY, PASTE, CANCEL, FINISH |

FIG.16B

| PROGRAM ID | INPUT MASK | SPEECH INPUT FLAG | RECOGNITION VOCABULARY LIST |
|---|---|---|---|
| 0 (SHELL TOOL) | RECOGNITION RESULT NOTICE MASK INPUT TASK CHANGE MASK | 0 | HISTORY, PROCESS, LIST, HOME, FINISH |
| 1 (TEXT EDITOR) | RECOGNITION RESULT NOTICE MASK | 0 | CUT, COPY, PASTE, CANCEL, FINISH |
| 2 (MAIL TOOL) | RECOGNITION RESULT NOTICE MASK | 1 | FIRST, LAST, PREVIOUS NEXT, SEND, FINISH |

FIG.19

| APPLICATION PROGRAM NAME | RECOGNITION VOCABULARY |
|---|---|
| SHELL TOOL | HISTORY<br>PROCESS<br>LIST<br>HOME<br>FINISH |
| TEXT EDITOR | CUT<br>COPY<br>PASTE<br>CANCEL<br>FINISH |
| MAIL TOOL | FIRST<br>LAST<br>PREVIOUS<br>NEXT<br>SEND<br>FINISH |

FIG.23

| APPLICATION PROGRAM NAME | RECOGNITION VOCABULARY | |
|---|---|---|
| | LOCAL | GLOBAL |
| SHELL TOOL | HISTORY HOME PROCESS FINISH LIST | SHELL TOOL |
| TEXT EDITOR | CUT CANCEL COPY FINISH PASTE | TEXT EDITOR |
| MAIL TOOL | FIRST NEXT LAST SEND PREVIOUS FINISH | MAIL TOOL |

FIG.24

| PROGRAM ID | INPUT MASK | SPEECH INPUT FLAG | RECOGNITION VOCABULARY LIST | LOCAL | GLOBAL |
|---|---|---|---|---|---|
| 0 (SHELL TOOL) | RECOGNITION RESULT NOTICE MASK INPUT TASK CHANGE MASK | 0 | HISTORY PROCESS LIST HOME FINISH SHELL TOOL | ○ ○ ○ ○ ○ × | × × × × × ○ |
| 1 (TEXT EDITOR) | RECOGNITION RESULT NOTICE MASK | 0 | CUT COPY PASTE CANCEL FINISH TEXT EDITOR | ○ ○ ○ ○ ○ × | × × × × × ○ |
| 2 (MAIL TOOL) | RECOGNITION RESULT NOTICE MASK | 1 | FIRST LAST PREVIOUS NEXT SEND FINISH MAIL TOOL | ○ ○ ○ ○ ○ ○ × | × × × × × × ○ |

| PROGRAM ID | INPUT MASK | SPEECH INPUT FLAG | RECOGNITION VOCABULARY LIST |
|---|---|---|---|
| 0 (SHELL TOOL) | RECOGNITION RESULT NOTICE MASK INPUT TASK CHANGE MASK | 1 | HISTORY PROCESS LIST HOME FINISH |
| 1 (TEXT EDITOR) | RECOGNITION RESULT NOTICE MASK | 0 | CUT COPY PASTE CANCEL FINISH |
| 2 (MAIL TOOL) | RECOGNITION RESULT NOTICE MASK | 1 | FIRST LAST PREVIOUS NEXT SEND FINISH |

FIG.32

| RECOGNITION VOCABULARY ||
|---|---|
| MAIL TOOL | SHELL TOOL |
| FIRST<br>LAST<br>PREVIOUS<br>NEXT<br>FINISH<br>RESPONSE | LS<br>CLEAR<br>HOME<br>HISTORY<br>PROCESS<br>FINISH |

FIG.33

| TASK MANAGEMENT |||
|---|---|---|
| MAIL TOOL | SHELL TOOL | TEXT EDITOR |
| FIRST<br>LAST<br>PREVIOUS<br>NEXT<br>FINISH<br>RESPONSE | LS<br>CLEAR<br>HOME<br>HISTORY<br>PROCESS<br>FINISH | CUT<br>COPY<br>PASTE<br>CANCEL<br>FINISH |

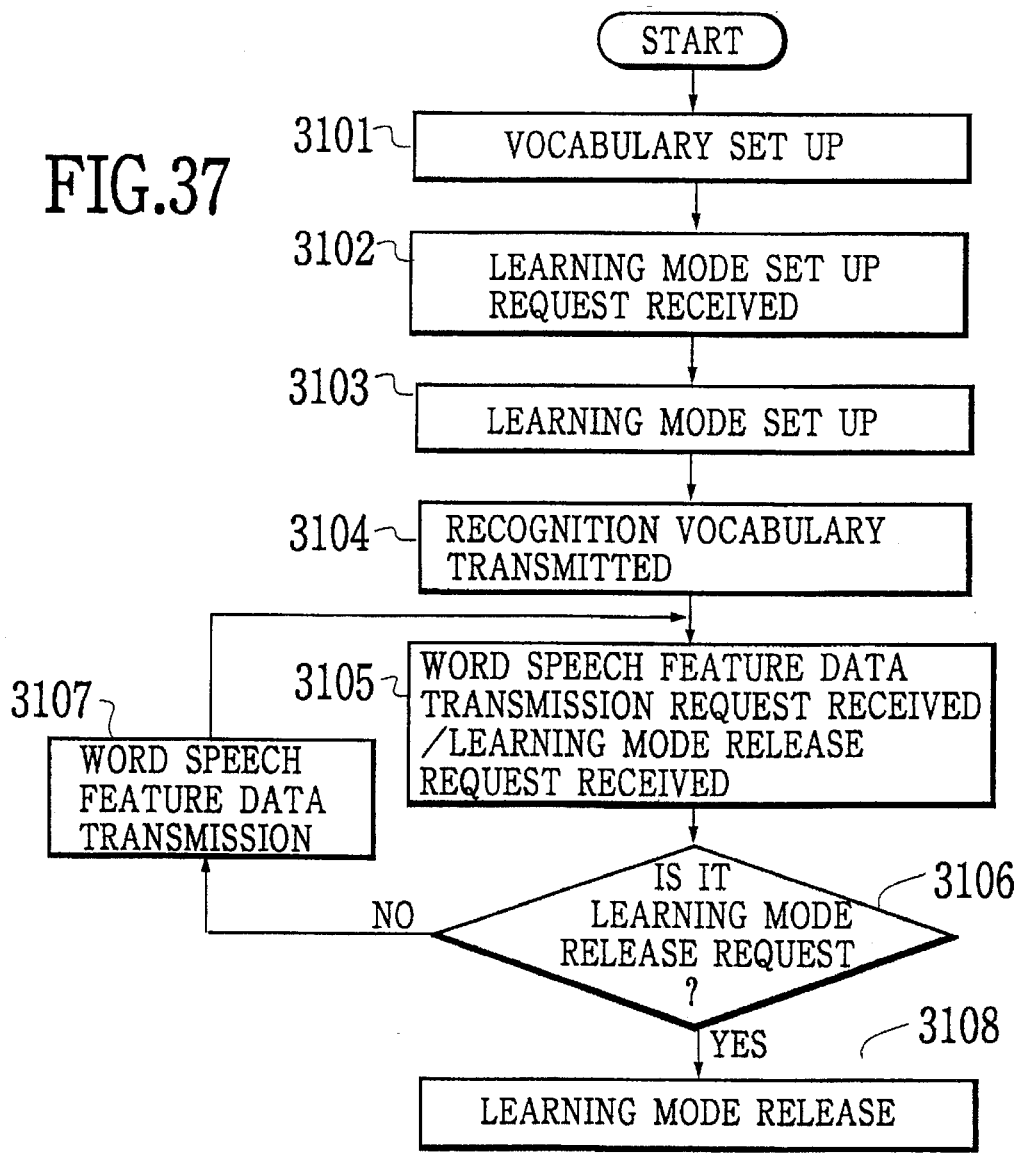

FIG.42

DICTIONARY PRODUCTION REQUEST → DICTIONARY PRODUCTION MANAGEMENT UNIT (91) → DICTIONARY PRODUCTION CONTROL UNIT (92)

DICTIONARY PRODUCTION MANAGEMENT UNIT (91) → DICTIONARY PRODUCTION COMPLETION NOTICE

80 → DATA INPUT UNIT (93) → DICTIONARY PRODUCTION OPERATION UNIT (94) → FILE OUTPUT UNIT (95) → 97

FIG.43

| REQUESTED DATE & TIME | VOCABULARY |
|---|---|
| 92.9.1.11.3 | COPY |
| 92.9.1.11.5 | PASTE |
| 92.9.2.22.10 | CUT |
| | . . . |

→ PRODUCTION IN PROGRESS

← NEW REQUEST FOR "CUT"

FIG.44

| REQUESTED DATE & TIME | VOCABULARY | USER NAME |
|---|---|---|
| 92.9.1.11.2 | RIGHT | A |
| 92.9.1.11.3 | LEFT | B |
| 92.9.2.22.3 | RIGHT | B |
| | . . . | . . . |

| REQUESTED DATE & TIME | VOCABULARY | USER NAME | SPECIFIED DATE |
|---|---|---|---|
| 92.9.1.11.4 | UP | A | AFTER 92.1.20 |
| 92.9.1.11.23 | DOWN | A | AFTER 92.1.20 |
| 92.9.3.13.55 | DELETE | A | AFTER 90.11.1 |
|  |  |  |  |

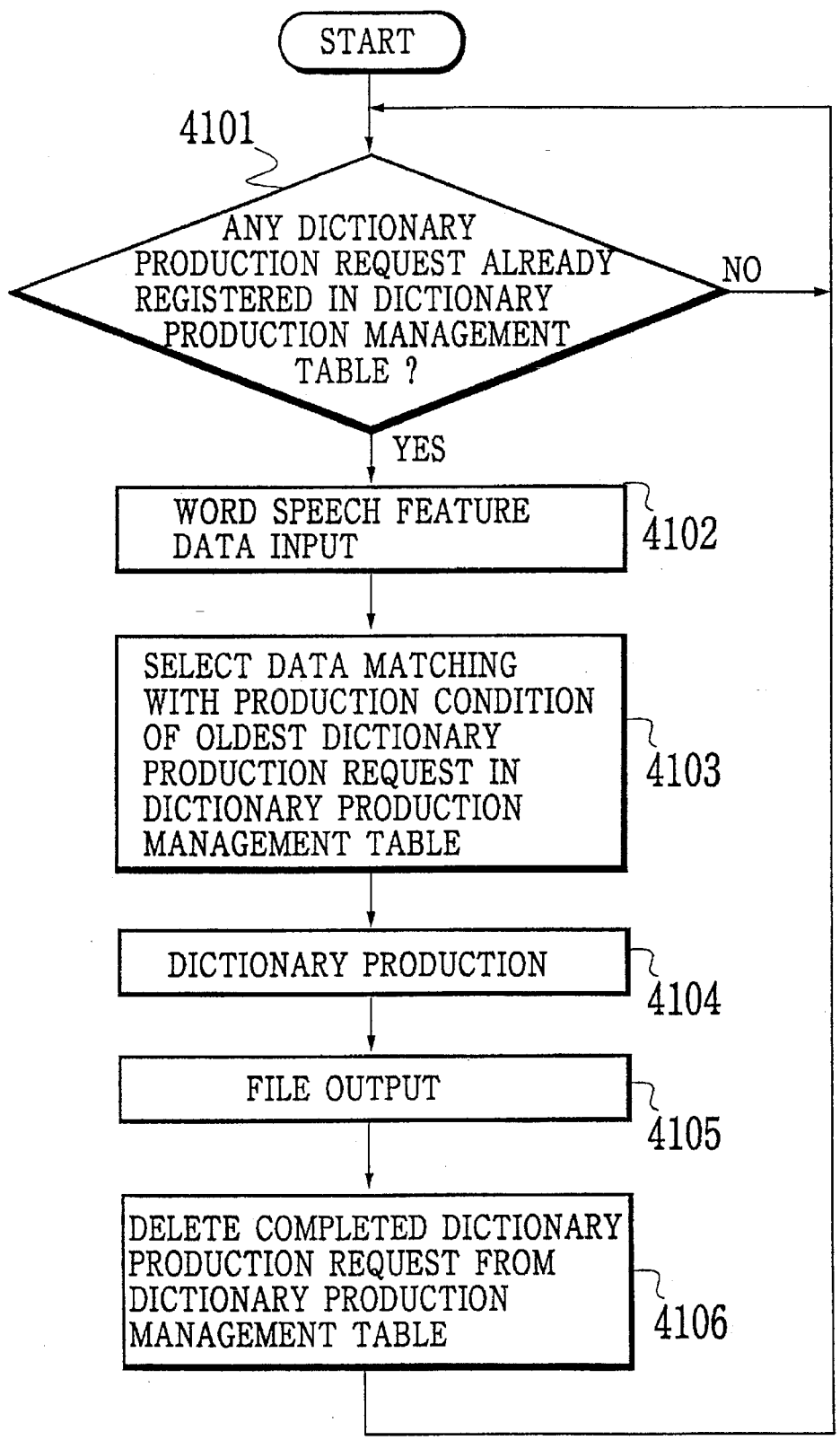

FIG.50A
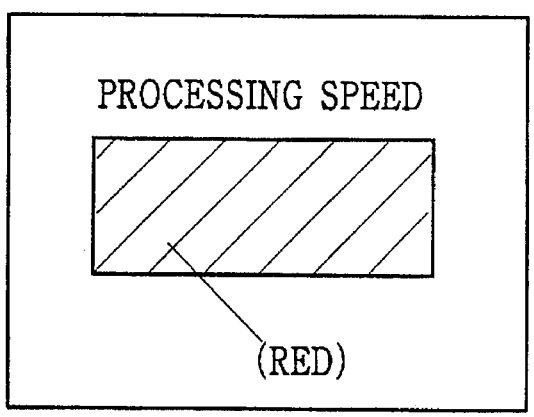
FIG.50B
| SPEED | COLOR |
|---|---|
| FAST | BLUE |
| MIDDLE | GREEN |
| SLOW | YELLOW |
| STOP | RED |
FIG.51
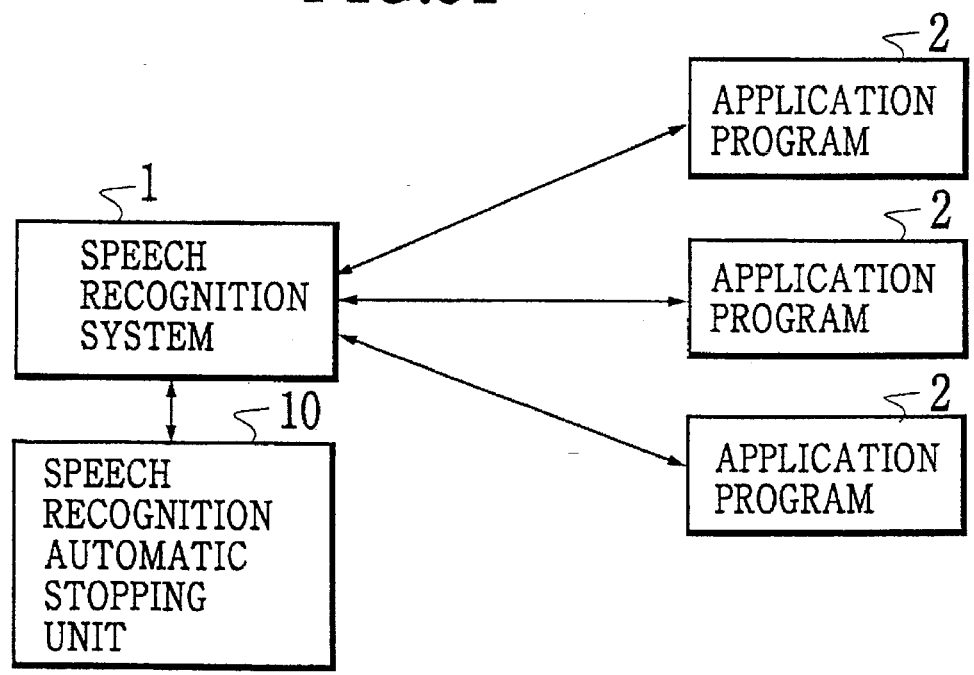

FIG.54

| FILE | MAIL | EDIT | LIST | DISPLAY |

HIERARCHY : SUPERIOR 6 sawada Thu Sep 17 18:20 13/249 thanks for your trouble 10 sawada Sat Sep 19 19:30 10/173 report (emergency)

— 53A

From sawada Sat Sep 19 19:30:49 1992
To : tamura
Subject : report (emergency)
Status : 0

Mr. Tamura

Submit the last week's
business trip report immediately.

Sawada

— 53B

To : sawada
Subject : Re : report (emergency)

Mr. Sawada

>>Mr. Tamura
>>
>>Submit the last week's business trip report immediately.
>>
>>                      Sawada I apologize for being late.
I will submit it today.

| DATA ID | DATA TYPE | REQUEST ADMISSION TIME | SYNTHESIZED SPEECH TEXT | PROCESSING STATE | OUTPUT PRESENT/ABSENT |
|---|---|---|---|---|---|
| #0 | WAVEFORM | 5:13:14 | — | FINISHED | PRESENT |
| #1 | TEXT | 5:14:00 | "HELLO" | FINISHED | ABSENT |
| #2 | TEXT | 5:14:02 | "EMERGENCY" | FINISHED | PRESENT |
| #3 | TEXT | 5:14:03 | "MAIL HAS ARRIVED" | PROCESSING | PRESENT |
| #4 | WAVEFORM | 5:14:04 | — | UNPROCESSED | PRESENT |

FIG.58B

| DATA ID | VOLUME (0~10) | OUTPUT INTERRUPTION | SYNTHESIS PROCESSING PRIORITY (0~10) | EXCLUSIVE PROCESSING FACTOR |
|---|---|---|---|---|
| #0 | 3 | ABSENT | — | — |
| #1 | — | — | — | — |
| #2 | 10 | PRESENT | 10 | 0.2 |
| #3 | 7 | ABSENT | 5 | — |
| #4 | 3 | ABSENT | — | — |

FIG.59

| PROGRAM ID | INPUT MASK | SPEECH INPUT FLAG | RECOGNITION VOCABULARY LIST | SPEECH OUTPUT PRIORITY |||
|---|---|---|---|---|---|---|
| | | | | SPEECH OUTPUT LEVEL (1~10) | SPEECH SYNTHESIS PROCESSING (1~10) | INTERRUPT PROCESSING (0/1) |
| 0 (SHELL TOOL) | RECOGNITION RESULT NOTICE MASK INPUT TASK CHANGE MASK | 0 | HISTORY, PROCESS LIST, HOME, FINISH | 5 | 5 | 0 |
| 1 (TEXT EDITOR) | RECOGNITION RESULT NOTICE MASK | 0 | CUT, COPY, PASTE CANCEL, FINISH | 2 | 5 | 0 |
| 2 (MAIL TOOL) | RECOGNITION RESULT NOTICE MASK | 1 | FIRST, LAST, PREVIOUS, NEXT, SEND, FINISH | 10 | 8 | 0 |

FIG.60

| SENDER | RECEIVER | MESSAGE |
|---|---|---|
| (a) AP | MPU | M31 : SPEECH SYNTHESIS REQUEST (TEXT→WAVEFORM)<br>M32 : WAVEFORM REPRODUCTION REQUEST<br>M33 : SPEECH SYNTHESIS REPRODUCTION REQUEST<br>M34 : PRIORY SET UP REQUEST (SPEECH LEVEL/TIME)<br>M35 : SPEECH OUTPUT STATE NOTICE REQUEST<br>M36 : SYNTHESIS PARAMETER SET UP REQUEST<br>M37 : SPEECH WAVEFORM DATA REQUEST |
| (b) MPU | AP | M38 : SYNTHESIZED SPEECH WAVEFORM DATA<br>M39 : SPEECH OUTPUT STATE NOTICE<br>M40 : PRIORITY SET UP NOTICE |
| (c) SSU | MPU | M41 : SPEECH OUTPUT STATE NOTICE<br>M42 : PRIORITY SET UP NOTICE<br>M43 : SYNTHESIZED SPEECH WAVEFORM DATA |
| (d) MPU | SSU | M44 : SPEECH SYNTHESIS REQUEST (INCLUDING TEXT DATA)<br>M45 : WAVEFORM REPRODUCTION REQUEST<br>M46 : SPEECH SYNTHESIS REPRODUCTION REQUEST<br>M47 : PRIORITY SET UP REQUEST (SPEECH LEVEL/TIME)<br>M48 : SPEECH OUTPUT STATE NOTICE REQUEST<br>M49 : SPEECH WAVEFORM DATA REQUEST |

- SPEECH OUTPUT COMPLETION NOTICE MASK
- PRIORITY SET UP NOTICE MASK
- SYNTHESIZED SPEECH DATA NOTICE MASK

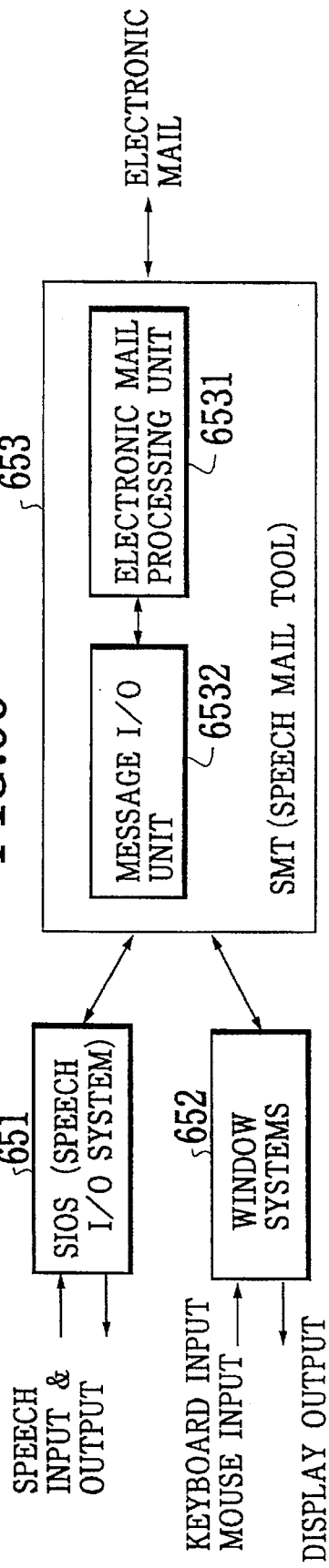

FIG.72

| FILE | MAIL | EDIT | LIST | DISPLAY | READ OUT | WHOLE TEXT |

HIERARCHY : SUPERIOR 6 sawada Thu Sep 17 18:20 13/249 thanks for your trouble

☆10 sawada Sat Sep 19 19:30 10/173 report (emergency)

From sawada Sat Sep 19 19:30:49 1992
To : tamura
Subject : report (emergency)
Status : 0

Mr. Tamura

Submit the last week's
business trip report immediately.
                Sawada

[REPRODUCE]
[STOP]

To : sawada
subject : Re : report (emergency)

Mr. Sawada

>>Mr. Tamura
>>
>>Submit the last week's business trip report immediately.
>>
>>                Sawada I apologize for being late.
I will submit it today.

🔊 OK

[RECORD]
[REPRODUCE]
[STOP]
[NEW] : OK
[DELETE]

FIG.73

| SENDER'S MALE ADDRESS | SEX | PITCH (1~10) | SPEED (1~10) | VOLUME (1~10) |
|---|---|---|---|---|
| tamua @ abc. def. co. jp | MALE | 2 | 4 | 5 |
| nakayama @ ghi. jkl. co. jp | FEMALE | 6 | 8 | 5 |
| * | MALE | 5 | 5 | 5 |

FIG.74

- NEXT MAIL
- PREVIOUS MALL
- NEXT PARAGRAPH
- PREVIOUS PARAGRAPH
- NEXT SENTENCE
- PREVIOUS SENTENCE
- STOP
- ONCE AGAIN
- NEXT
- PREVIOUS
- CONTINUE
- FAST
- SLOW
- HIGH
- LOW
- MALE
- FEMALE

FIG.77

| SENDER | RECEIVER | MESSAGE |
|---|---|---|
| MS | SIOS | M61 : TASK PRIORITY SET UP REQUEST<br>M62 : TASK PRIORITY GAIN REQUEST |
| SIOS | MS | M63 : TASK PRIORITY CHANGE NOTICE |

FIG.78

| APPLICATION PROGRAM | TASK PRIORITY | SPEECH FOCUS |
|---|---|---|
| SHELL TOOL | 2 | 1 |
| DTP SYSTEM | 5 | 0 |
| MAIL SYSTEM | 10 | 0 |

FIG.81

| APPLICATION PROGRAM | TASK PRIORITY | SPEECH FOCUS |
|---|---|---|
| SHELL TOOL | 2 | 0 |
| DTP SYSTEM | 5 | 1 |
| MAIL SYSTEM | 10 | 0 |

FIG.82

Subject : Conference notice

This week's meeting is changed to 8 : 30, Wednesday. There is an important speech, so please @<male, 5, 5, 9 make sure not to be late. > end

FIG.86

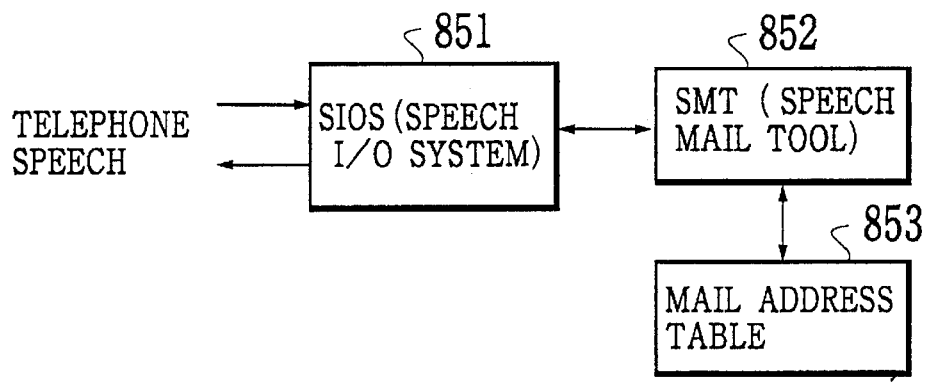

TELEPHONE SPEECH → SIOS (SPEECH I/O SYSTEM) [851] ↔ SMT (SPEECH MAIL TOOL) [852] ↔ MAIL ADDRESS TABLE [853]

FIG.87

(1) USER "Recording start"

(2) USER "This is ○○. Regarding ××, I'm sorry I can't go there due to the inconvenience. Please give best regards to everybody."
"Stop. Stop."

(3) USER "Content check"

(4) SYSTEM "This is ○○. Regarding ×× · · ·"

(5) USER "Send"

(6) SYSTEM "The forwarding of the mail to Mr. △△ has been completed."

| SENDER | RECEIVER | MESSAGE |
|--------|----------|---------|
| SMS | SIOS | M71: SPEECH SECTION DETECTION REQUEST |
| SIOS | SMS | M72: RECORDED DATA |

(1) USER "Subject"

(2) USER "Conference notice"

(3) SYSTEM "The subject of the mail is a conference notice."

Subject: Thanks for your trouble
  $ Mr. {receiver}, thanks for your trouble.
  I rely on you for further kindness.

$ {sender}

FIG.92

| MAIL ADDRESS BOOK | | |
|---|---|---|
| (REGISTER)　(DELETE)　(CHANGE) | | |
| Ichiro Suzuki | suzuki@aaa, bbb, ccc, co. jp | ○ |
| Taro Tanaka | tanaka@ddd, eee, fff, ac. jp | — |
| | ⋮ | |

FIG.93

MAIL ADDRESS REGISTRATION

NAME : Ichiro Suzuki
ADDRESS : @aaa, bbb, ccc, co. jp
OF UTTERANCES : 2

(OK)　(CANCEL)

FIG.94

(1) USER "Destination"

(2) MAIL SYSTEM "There are five mail addresses that can be specified by speech."

(3) USER "Suzuki"

(4) MAIL SYSTEM "Destination is Suzuki, suzuki @ aaa, bbb, ccc, co, jp, right ?"

(5) USER "Yes"

FIG.95

SYSTEM "A node jp has two nodes."

SYSTEM "They are 1 : aaa and 2 : bbb."

USER "1"

SYSTEM "A node aaa has three nodes."

| PROGRAM NAME | APPLICATION PROGRAM | DUMMY SPEECH FOCUS | COMMAND NAME | COMMAND |
|---|---|---|---|---|
| SHELL TOOL (1) | SHELL TOOL | ○ | LS (0) | key ("ℓs\n") |
| | | | PROCESS (0) | key ("ps\n") |
| EDITOR (1) | EDITOR | × | CUT (0) | key ("∧X") |
| | | | COPY (0) | key ("∧C") |
| | | | PASTE (0) | key ("∧P") |
| MAIL TOOL (1) | MAIL TOOL | × | FINISH (1) | press ("QUIT") |
| SYSTEM (1) | SIM | × | FINISH (0) | press ("QUIT") |

$\begin{cases} 0: \text{LOCAL} \\ 1: \text{GLOBAL} \end{cases}$

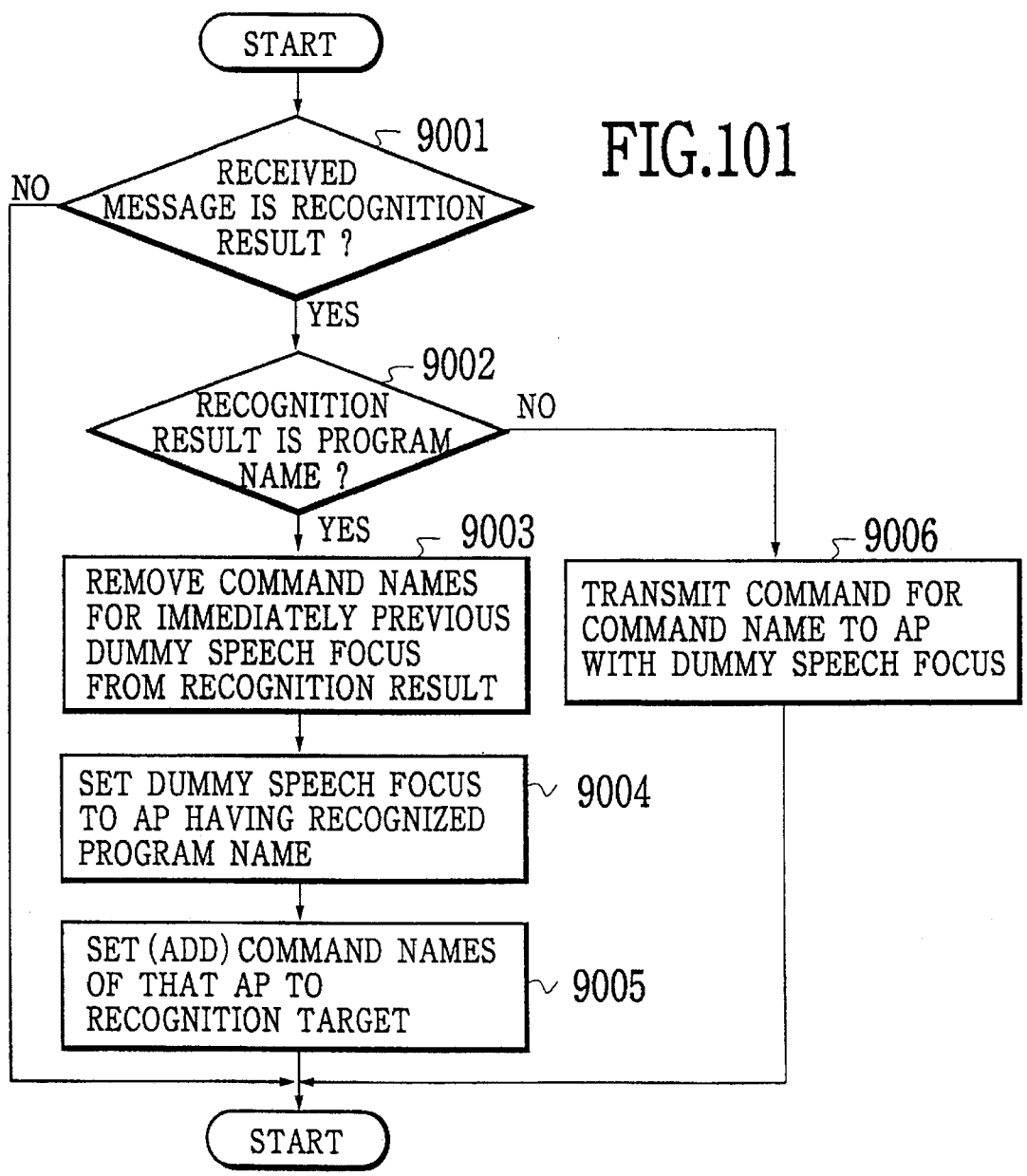

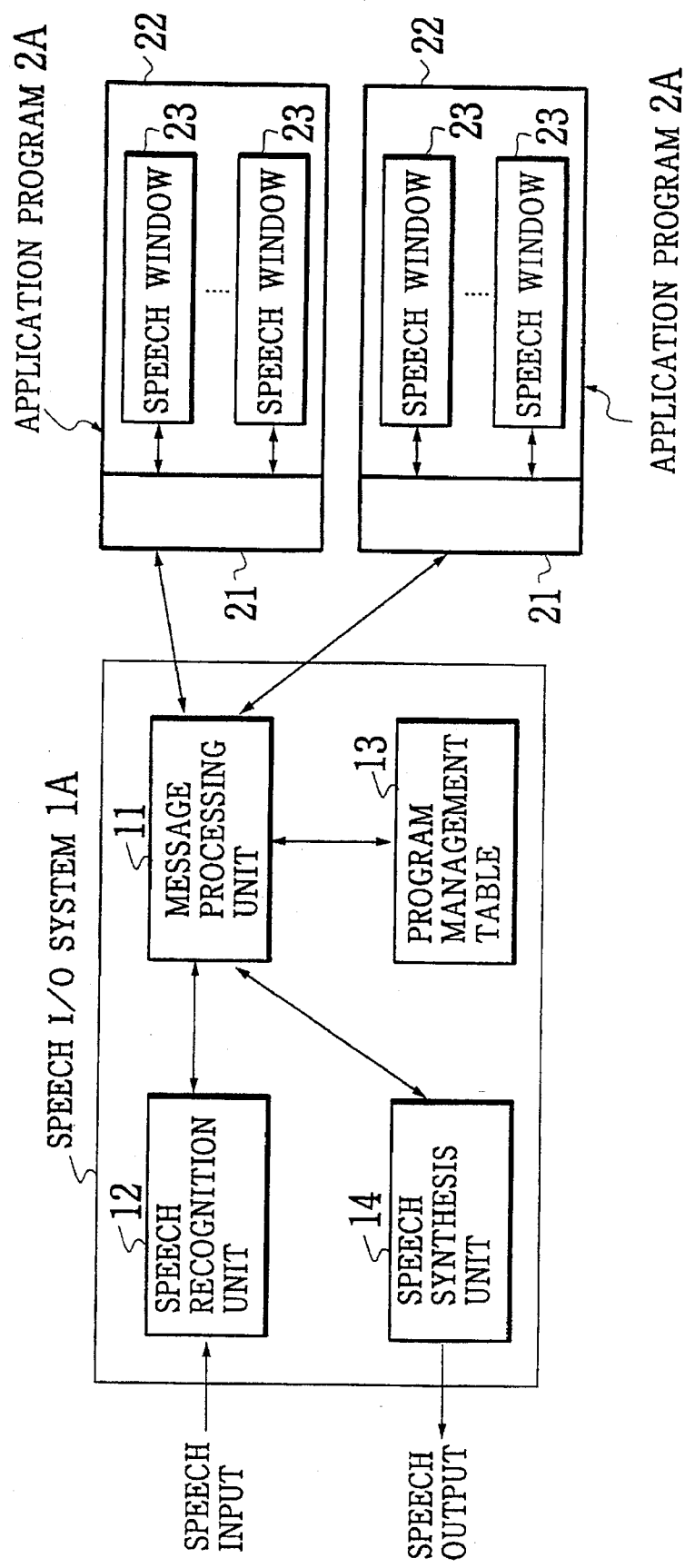

FIG.105

| APPLICATION PROGRAM | WINDOW ID | SPEECH WINDOW ID | WINDOW NAME | DUMMY SPEECH FOCUS | COMMAND NAME | COMMAND |
|---|---|---|---|---|---|---|
| SHELL TOOL | 101 | 1 | SHELL TOOL (2) | ○ | LS (0) | key ("%s\n") |
|  |  |  |  |  | PROCESS (0) | key ("%s\n") |
| EDITOR | 102 | 2 | SETTING (1) | × | OK (0) | press ("OK") |
|  |  |  |  |  | CANCEL (0) | press ("CANCEL") |
|  | 103 | 3 | EDITOR (2) | × | CUT (0) | key ("^X") |
|  |  |  |  |  | COPY (0) | key ("^C") |
|  |  |  |  |  | PASTE (0) | key ("^P") |
|  | 104 | 4 | SETTING (1) | × | OK (0) | press ("OK") |
|  |  |  |  |  | CANCEL (0) | press ("CANCEL") |
| SIM | 100 | 0 | SYSTEM (2) | × | FINISH (0) | press ("QUIT") |
| MAIL TOOL | 105 | 5 | MAIL TOOL (2) | × | FINISH (2) | press ("QUIT") |

{ 0 : LOCAL
 1 : WINDOW
 2 : GLOBAL

FIG.108

| APPLICATION PROGRAM ID | SPEECH WINDOW ID | WINDOW NAME (ATTRIBUTE) | INPUT MASK | SPEECH INPUT FLAG | RECOGNITION VOCABULARY LIST | GROUP WINDOW ID | PARENT/ CHILD ATTRIBUTE |
|---|---|---|---|---|---|---|---|
| 0 (SIM) | 0 | SYSTEM (2) | RECOGNITION RESULT NOTICE MASK | 0 | FINISH (0) | — | |
| | 1 | SHELL TOOL (2) | RECOGNITION RESULT NOTICE MASK | 1 | LS (0) PROCESS (0) | 3 | |
| | 2 | SETTING (1) | RECOGNITION RESULT NOTICE MASK | 0 | OK (0) CANCEL (0) | — | 1 |
| | 3 | EDITOR (2) | RECOGNITION RESULT NOTICE MASK | 0 | CUT (0) COPY (0) PASTE (0) | — | |
| | 4 | SETTING (1) | RECOGNITION RESULT NOTICE MASK | 0 | OK (0) CANCEL (0) | — | |
| 1 (MAIL TOOL) | 5 | MAIL TOOL (2) | RECOGNITION RESULT NOTICE MASK | 0 | PREVIOUS (0) NEXT (0) FIRST (0) LAST (0) FINISH (2) | — | |

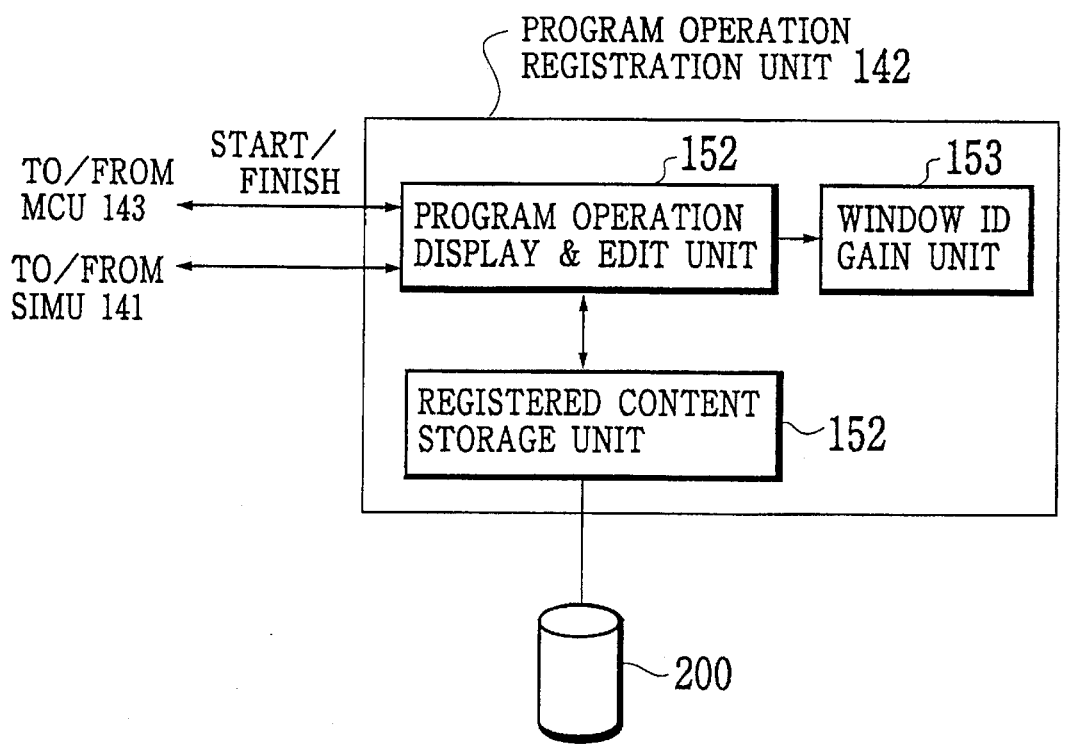

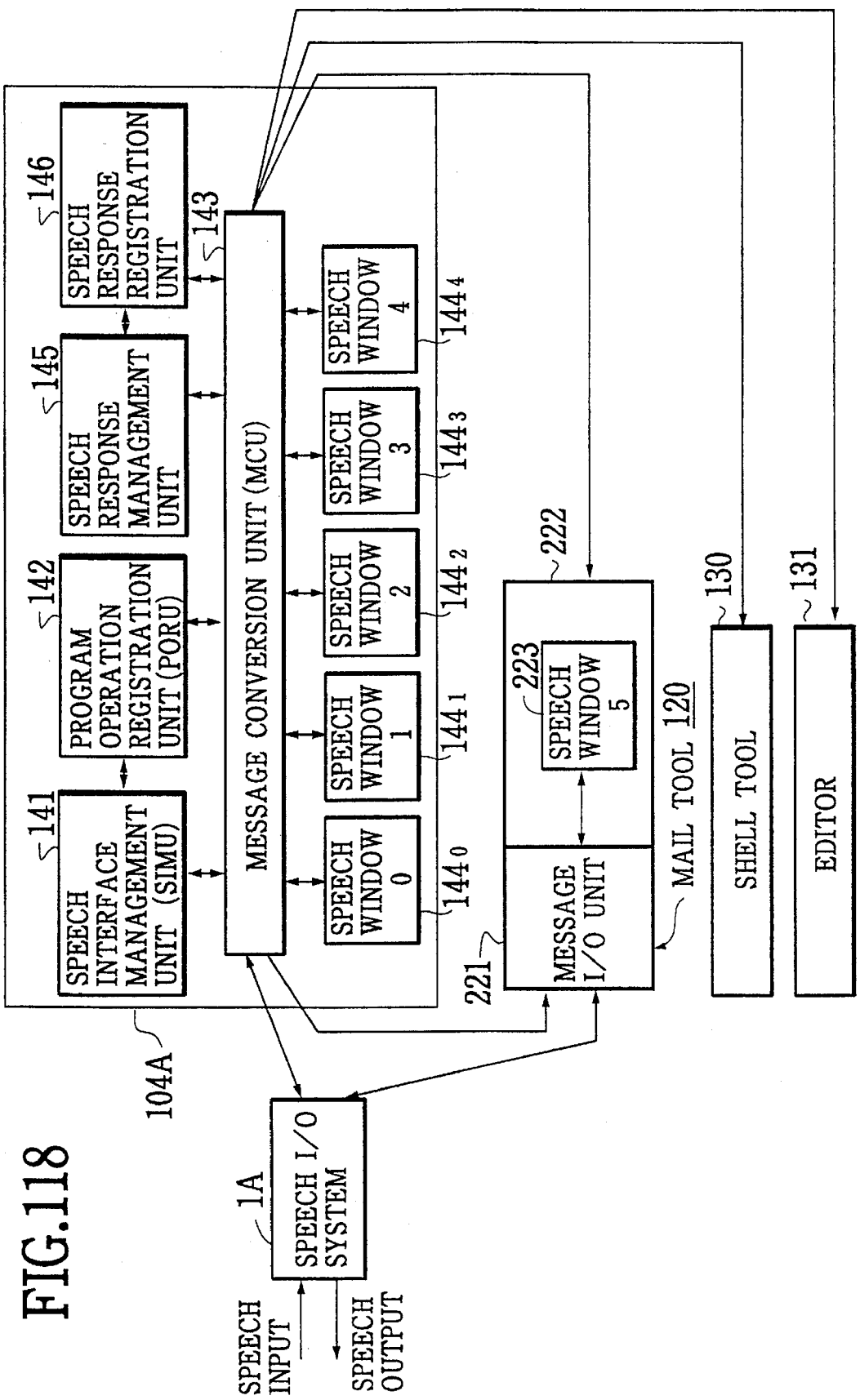

FIG.119

| APPLICA-BILITY | OPERATION | RESPONSE |
|---|---|---|
| × | RECOGNITION SUCCESS | synth ( $ <cat>) |
| ○ | RECOGNITION FAILURE | play ("huh, snd") |
| ○ | AP NAME RECOGNIZED | synth ("yet, it is $ <cat>") |
| ○ | RECOGNITION START | synth ("recognition is started") |
| ○ | RECOGNITION STOP | synth ("recognition is stopped") |
| × | AP START | play ("app-start, snd") |
| × | AP END | play ("app-end, snd") |
| ○ | ICONIFYING | play ("iconify, snd") |
| × | DEICONIFYING | play ("deiconify, snd") |

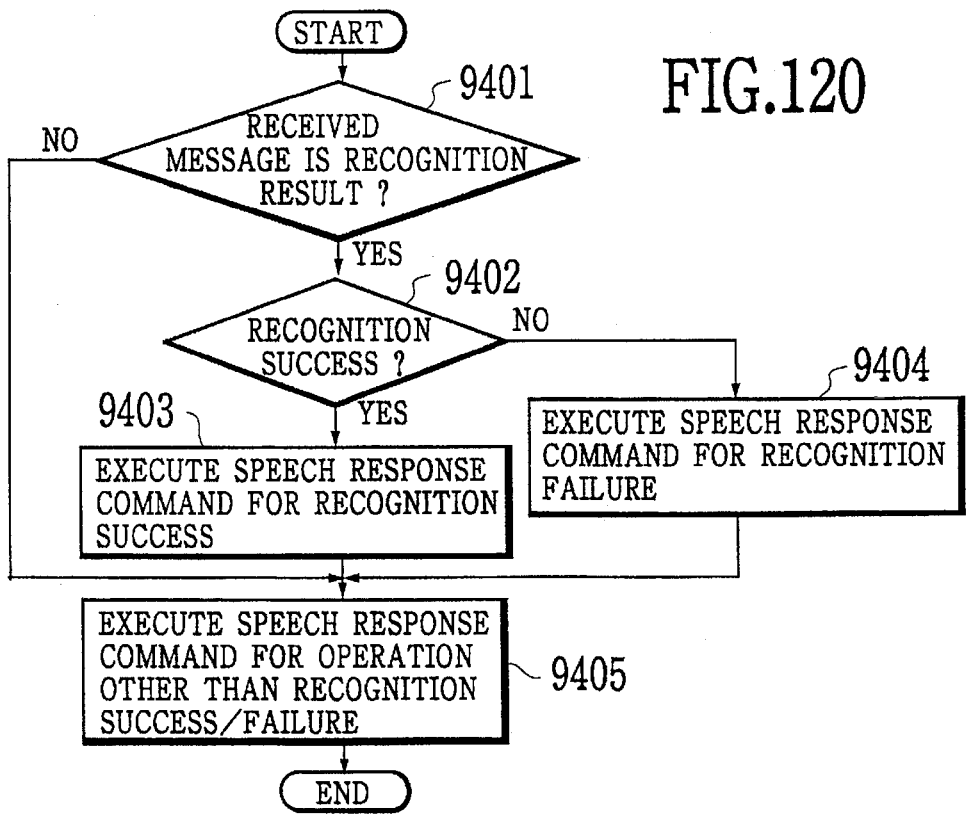

| SPEECH RESPONSE REGISTRATION UNIT | | |
|---|---|---|
| ☐ | RECOGNITION SUCCESS | synth ( $ \<cat\> ) |
| ☑ | RECOGNITION FAILURE | play ("huh, snd") |
| ☑ | AP NAME RECOGNIZED | synth ("yet, it is $ \<cat\>") |
| ☑ | RECOGNITION START | synth ("recognition is started") |
| ☑ | RECOGNITION STOP | synth ("recognition is stopped") |
| ☐ | AP START | play ("app-start, snd") |
| ☐ | AP END | play ("app-end, snd") |
| ☑ | ICONIFYING | play ("iconify, snd") |
| ☐ | DEICONIFYING | play ("deiconify, snd") |

[OK] [CANCEL]

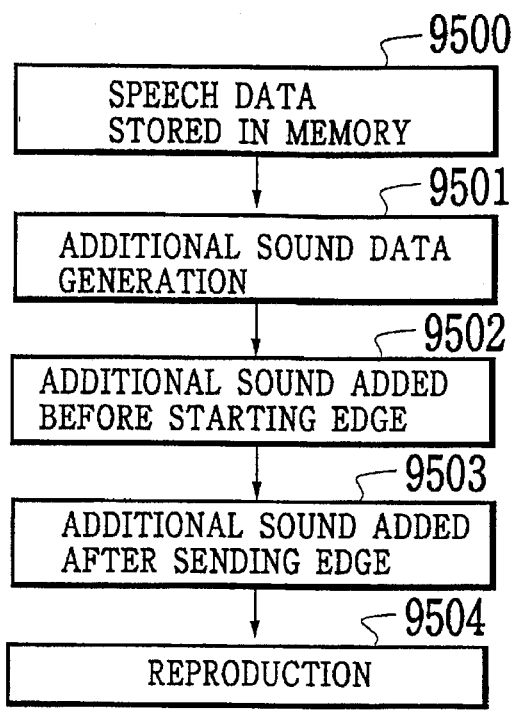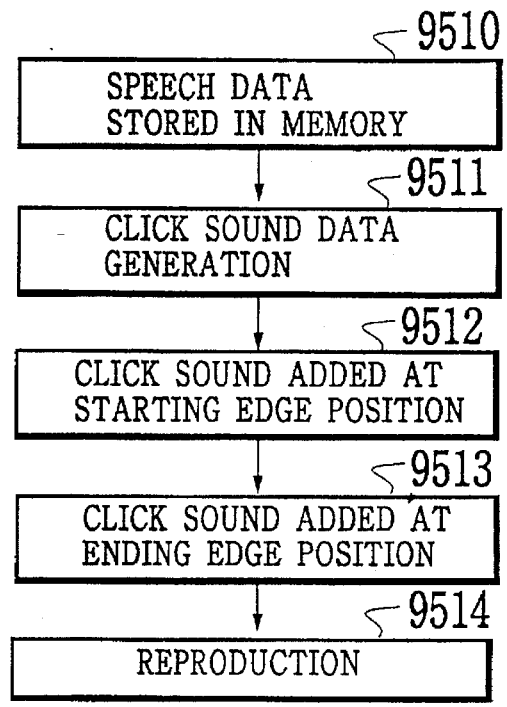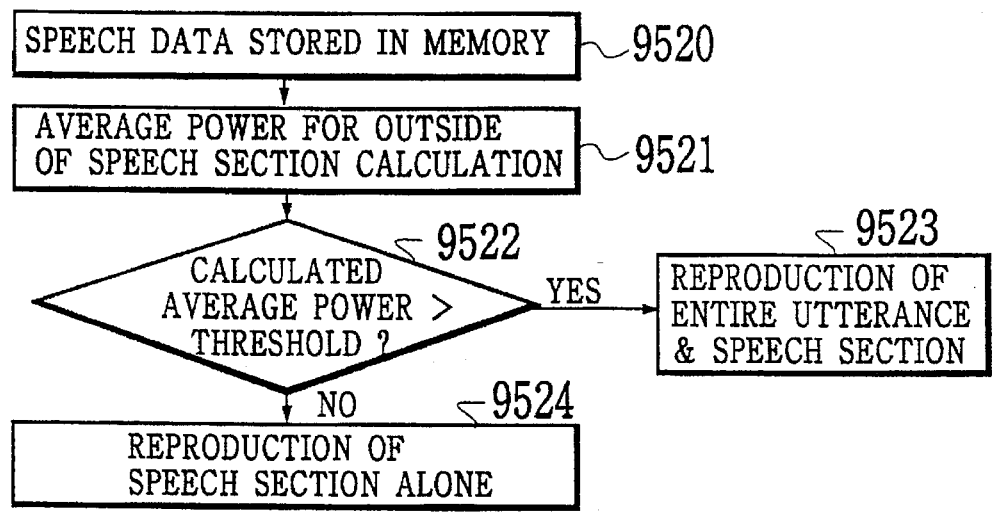

SPEECH RECOGNITION INTERFACE SYSTEM SUITABLE FOR WINDOW SYSTEMS AND SPEECH MAIL SYSTEMS

BACKGROUND OF THE INVENTION

1. Field of the Invention

The present invention relates to a speech recognition interface system to be used as a man-machine interface in the data processing system such as personal computers, workstations, word processors, and speech (or voice) mail systems.

2. Description of the Background Art

In recent years, there has been a development of a computer device equipped with a plurality of input means such as keyboard, mouse, speech input means, and image input means, in order to facilitate a variety of command and data input modes.

Among these various input means, the speech input means has a prospect for facilitating a very natural command and data input mode, but has not been utilized widely because of the difficulties concerning the amount of calculations required for the speech processing and the recognition rate.

As a conventional speech input means, there are several propositions for a speech recognition interface system, as follows.

FIG. 1 shows an exemplary conventional configuration for the speech recognition interface system, which comprises an application program AP into which a speech recognition function SR is incorporated. In such a configuration, the speech recognition function SR cannot be separated from this application program AP, so that it has been difficult to utilize this speech recognition function SR from the program other than this application program AP.

FIG. 2 shows another conventional configuration for the speech recognition interface system, which comprises one speech recognition system SRS and one application program AP, which are connected with each other. In such a configuration, the speech recognition system SRS is exclusively used only by the application program AP to which it is connected, and in order for the program other than this application program AP to utilize this speech recognition system SRS, there arises a need to change the connection of the speech recognition system SRS to that with respect to the program other than this application program AP, which is quite time consuming.

In addition, the data exchanged between the speech recognition system SRS and the application program AP are limited to the recognition results transmitted from the speech recognition system SRS to the application program AP, so that the speech recognition system SRS cannot know the internal state of the application program AP. As a result, it has been impossible to make an automatic speech recognition control such as the recognition vocabulary change according to the internal state of the application program, and it has been necessary for the operator to make the recognition vocabulary change whenever the need arises, so that this speech recognition interface system has been rather tedious and inconvenient one to use.

FIG. 3 shows another conventional configuration for the speech recognition interface system, which comprises one speech recognition system SRS and one application program AP, which are connected with each other bidirectionally, such that various data such as the recognition vocabulary and the recognition results can be exchanged from one to the other in both directions. In such a configuration, the speech recognition system SRS can know the internal state of the application program AP, so that it can make the automatic speech recognition control such as the recognition vocabulary change. However, in this configuration, the speech recognition system SRS is exclusively used only by the application program AP with which it is connected, so that it has been impossible for the other application programs to utilize this speech recognition system SRS at the same time.

FIG. 4 shows another conventional configuration for the speech recognition interface system disclosed by Schmandt et al. in "Augmenting a Window System with Speech Input", COMPUTER, Vol. 23, pp. 50–58, August 1990, which comprises one speech recognition system SRS and a plurality of application programs AP, in which the recognition results are selectively transmitted to one of the application programs AP from the speech recognition system SRS. In this system, the speech input is achieved by translating the speech recognition result into the input from the keyboard or mouse, by utilizing the window system. In such a configuration, a plurality of application programs AP can utilize the same speech recognition system SRS at the same time, but the speech recognition system SRS cannot know the internal state of each application program AP, so that it is impossible to make the automatic speech recognition control according to the internal state of the application programs.

FIG. 5 shows another conventional configuration for the speech recognition interface system disclosed by Rudnicky et al. in "Spoken language recognition in an office management domain", Proc. ICASSP '91, S12.12, pp. 829–832, 1991, which comprises one speech recognition system SRS and a plurality of application programs AP, program AP, where the speech recognition system SRS further comprises a task manager TM connected with each of the application program AP bidirectionally, and a speech recognition unit SR connected with the task manager TM, such that various data such as the recognition vocabulary and the recognition results can be exchanged among the speech recognition system SRS and the application programs AP in both directions. This system has a feature that the continuous speech recognition function provided by the speech recognition system SRS can be shared by a plurality of application programs AP, so that it can be considered as an efficient manner of utilizing an expensive speech recognition device. However, this reference does not provide sufficient considerations for aspects regarding a real time processing and a manner of its utilization suitable for the workstations.

Also, in such a configuration, a plurality of application programs AP can share the same speech recognition system SRS and it is also possible to make the automatic speech recognition control on the speech recognition system SRS side according to the internal state of each application program AP, but this system only accounts for a case of connecting only one of the application programs AP with the speech recognition system SRS at one time, so that it has been impossible to achieve the simultaneous handling of a plurality of programs AP, by taking the full advantages of characteristic of the speech input. Also, in this system, the decision concerning the selection of the application program AP to transmit the obtained recognition result is made at the speech recognition system SRS side, so that the recognition result may not necessarily be obtained at the application program AP side at the desired timing.

Thus, the conventional speech recognition interface systems have been associated with following practical problems.

(1) As the application program AP cannot manage the speech recognition target itself, the application program AP cannot take the initiative in the speech input control, so that there are cases in which, even when the application program AP would like to urge the user to make the speech input, the application program AP must wait until the speech input permission is received from the speech recognition system SRS.

(2) A plurality of application programs AP cannot be controlled simultaneously by one speech input, so that it has been impossible to realize a highly convenient operation mode of finishing a plurality of application programs AP altogether simultaneously by a single speech input of "Finish" alone, for example.

(3) It has been impossible to distribute the speech inputs to a plurality of application programs AP according to the recognition results obtained therefrom, so that there has been a need to specify the input target before the input of the speech.

(4) As only one speech recognition system SRS has been operated with respect to one speech input, so that it has been impossible to simultaneously utilize different types of the speech recognition schemes such as the isolated word speech recognition scheme and the continuous speech recognition scheme.

SUMMARY OF THE INVENTION

It is therefore an object of the present invention to provide a speech recognition interface system capable of handling a plurality of application programs simultaneously, and realizing convenient speech input and output modes which is suitable for the applications in the window systems and the speech mail systems.

According to one aspect of the present invention there is provided a speech recognition interface system for enabling a speech control of a plurality of application programs executed on a computer, comprising: speech recognition means for carrying out a speech recognition processing for a speech input made by a user to obtain a recognition result; program management means for managing program management data indicating a speech recognition interface function required by each application program; and message processing means for exchanging messages with said plurality of application programs in order to specify an appropriate recognition vocabulary to be used in the speech recognition processing of the speech input to the speech recognition means, and to transmit the recognition result for the speech input obtained by the speech recognition means by using the appropriate recognition vocabulary to appropriate ones of said plurality of application programs, according to the program management data managed by the program management means.

According to another aspect of the present invention there is provided a method of speech recognition interface for enabling a speech control of a plurality of application programs executed on a computer, comprising the steps of: (a) managing program management data indicating a speech recognition interface function required by each application program; (b) specifying an appropriate recognition vocabulary to be used in a speech recognition processing of a speech input made by a user according to the program management data managed at the step (a); (c) carrying out the speech recognition processing for the speech input by using the appropriate recognition vocabulary specified at the step (b), to obtain a recognition result; and (d) transmitting the recognition result for the speech input obtained at the step (c) to appropriate ones of said plurality of application programs according to the program management data managed at the step (a).

According to another aspect of the present invention there is provided a speech controllable data processing system, comprising: processing means for carrying out data processing operations, which is controllable by externally supplied control commands; and speech input interface means for inputting speech commands from a user indicating intended operations of the processing means, and transmitting the speech commands inputted by the speech input means to the processing means in forms of the control commands.

Other features and advantages of the present invention will become apparent from the following description taken in conjunction with the accompanying drawings.

BRIEF DESCRIPTION OF THE DRAWINGS

FIG. 13 is a table of messages to be exchanged among elements of the speech recognition interface system of FIG. 6.

FIG. 14 is a table of input masks used in the speech recognition interface system of FIG. 6.

FIGS. 16A and 16B are diagrammatic illustrations of a program management table in the speech recognition interface system of FIG. 6.

FIG. 19 is a table of recognition vocabulary used in the speech recognition interface system of FIG. 17.

FIG. 23 is a table of recognition vocabulary used in a third embodiment of a speech recognition interface system according to the present invention.

FIG. 24 is a diagrammatic illustration of a program management table in the speech recognition interface system of the third embodiment.

FIG. 32 is a table of recognition vocabulary used in a seventh embodiment of a speech recognition interface system according to the present invention.

FIG. 33 is an illustration of a display of recognition vocabulary and a speech focus state used in the speech recognition interface system of the seventh embodiment.

FIG. 36 is a table of messages to be exchanged among elements of the speech recognition interface system of FIG. 34.

FIG. 37 is a flow chart for an operation of a speech recognition system in the speech recognition interface system of FIG. 34, in the learning data acquisition procedure.

FIG. 42 is a schematic block diagram of a tenth embodiment of a speech recognition interface system according to the present invention.

FIG. 43 is a diagrammatic illustration of one form of a dictionary production management table in the speech recognition interface system of FIG. 42.

FIG. 44 is a diagrammatic illustration of another form of a dictionary production management table in the speech recognition interface system of FIG. 42.

FIG. 47 is a flow chart for a procedure of dictionary production operation in the speech recognition interface system of FIG. 42.

FIGS. 50A and 50B are illustrations of another exemplary dictionary production processing speed indication display in the speech recognition interface system of FIG. 42.

FIG. 51 is a schematic block diagram of an eleventh embodiment of a speech recognition interface system according to the present invention.

FIG. 54 is an illustration of an exemplary speech mail tool display in the speech recognition interface system of the twelfth embodiment.

FIGS. 58A and 58B are diagrammatic illustrations of a speech output management table in the speech recognition interface system of FIG. 56.

FIG. 59 is a diagrammatic illustration of a program management table in the speech recognition interface system of FIG. 56.

FIG. 60 is a table of messages to be exchanged among elements of the speech recognition interface system of FIG. 56.

FIG. 66 is a schematic block diagram of a fifteenth embodiment of a speech recognition interface system according to the present invention.

FIG. 67 is a table of messages to be exchanged among elements of the speech recognition interface system of FIG. 66.

FIG. 72 is an illustration of an exemplary speech mail tool display in the speech recognition interface system of FIG. 66.

FIG. 73 is a diagrammatic illustration of a reading manner database in the speech recognition interface system of FIG. 66.

FIG. 74 is a table of speech control commands used the speech recognition interface system of FIG. 66.

FIG. 77 is a table of messages to be exchanged among elements of the speech recognition interface system of FIG. 75.

FIG. 78 is a diagrammatic illustration of a task importance management table in the speech recognition interface system of FIG. 75.

FIG. 81 is a diagrammatic illustration of a task importance management table in the speech recognition interface system of FIG. 75.

FIG. 82 is an illustration of an exemplary mail document handled in the speech recognition interface system of FIG. 66.

FIG. 86 is a schematic block diagram of a seventeenth embodiment of a speech recognition interface system according to the present invention.

FIG. 87 is an illustration of exemplary exchanges between a user and a system for producing the mail document in the speech recognition interface system of FIG. 86.

FIG. 92 is an illustration of an exemplary mail address book used in the speech recognition interface system of FIG. 86.

FIG. 93 is an illustration of an exemplary mail address registration window display used in the speech recognition interface system of FIG. 86.

FIG. 94 is an illustration of exemplary exchanges between a user and a system for specifying a destination mail address in the speech recognition interface system of FIG. 86.

FIG. 95 is an illustration of exemplary exchanges between a user and a system for specifying a mail address in the speech recognition interface system of FIG. 86.

FIG. 100 is a table indicating a correspondence between a dummy speech focus and a speech focus in the speech recognition interface system of FIG. 96.

FIG. 101 is a flow chart for the operation of the message conversion unit in the speech recognition interface system of FIG. 96.

FIG. 102 is a schematic block diagram of a nineteenth embodiment of a speech recognition interface system according to the present invention.

FIG. 105 is a diagrammatic illustration of a speech interface management table in the speech recognition interface system of FIG. 102.

FIG. 108 is a diagrammatic illustration of a program management table in the speech recognition interface system of FIG. 102.

FIG. 110 is a block diagram of a program operation registration unit in a twentieth embodiment of a speech recognition interface system according to the present invention.

FIG. 111 is an illustration of a registration screen display in the speech recognition interface system of the twentieth embodiment.

FIG. 118 is a detailed block diagram of a concrete configuration of a speech interface management system in a twenty-second embodiment of a speech recognition interface system according to the present invention.

FIG. 119 is a diagrammatic illustration of a table in a speech response management unit in the speech recognition interface system of the twenty-second embodiment.

FIG. 120 is a flow chart for the operation of a message conversion unit in the speech recognition interface system of the twenty-second embodiment.

FIG. 121 is an illustration of a speech response registration screen display in the speech recognition interface system of the twenty-second embodiment.

FIG. 122 is a detailed block diagram of a data acquisition unit in a twenty-third embodiment of a speech recognition interface system according to the present invention.

FIG. 123 is a detailed block diagram of a speech data confirmation unit in the speech recognition interface system according to the twenty-third embodiment.

FIG. 124 is a flow chart for the operation of the data acquisition unit of FIG. 122 in the speech recognition interface system of the twenty-third embodiment.

FIGS. 125A, 125B, and 125C are flow charts for the three possible operations of a speech data confirmation unit in the speech recognition interface system of the twenty-third embodiment.

Figure 126A:
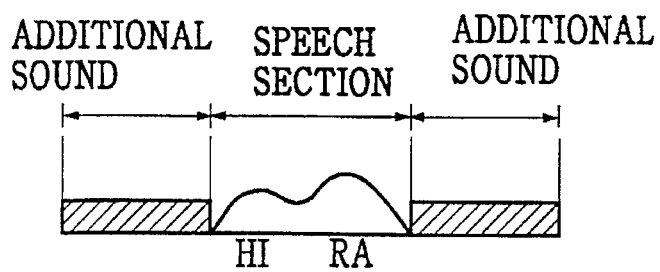
Figure 126B:
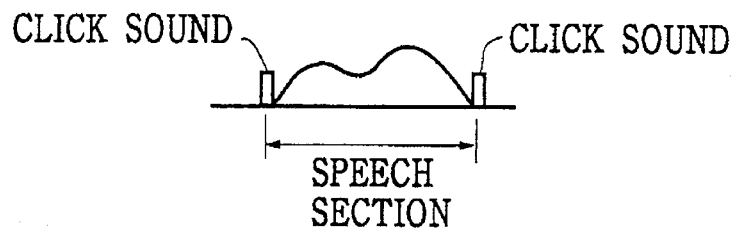
Figure 126C:
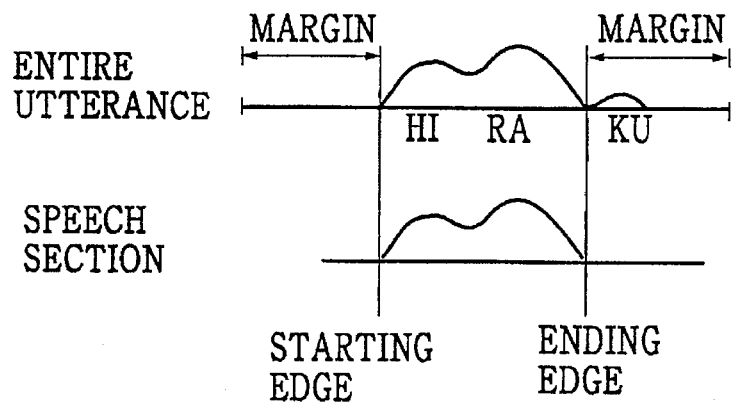

FIGS. 126A, 126B, and 126C are diagrammatic illustrations of the exemplary confirmation speech output waveforms obtained in the operations according to the flow charts of FIGS. 125A, 125B, and 125C.

Figure 126D:
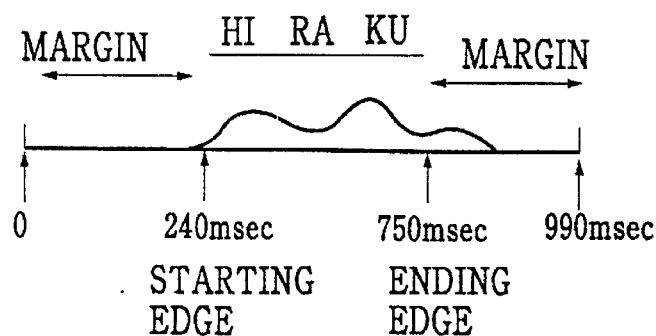

FIG. 126D is a diagrammatic illustration of an exemplary speech data handled in a speech data confirmation unit in the speech recognition interface system of the twenty-third embodiment.

DETAILED DESCRIPTION OF THE PREFERRED EMBODIMENTS

Figure 1:
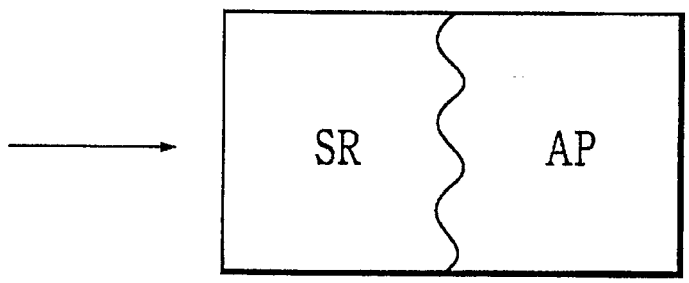
FIG. 1 is a schematic diagram of one conventional speech recognition interface system.
Figure 2:
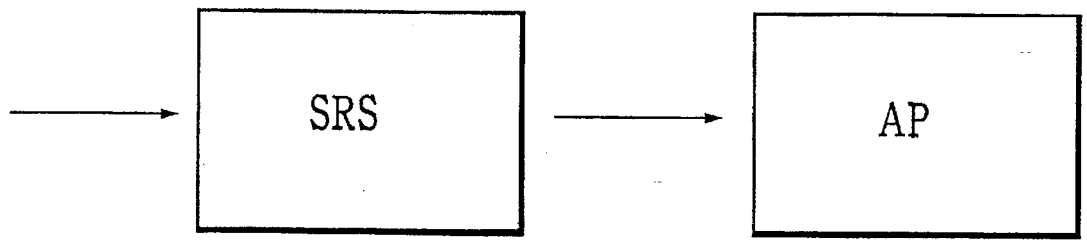
FIG. 2 is a schematic diagram of another conventional speech recognition interface system.
Figure 3:
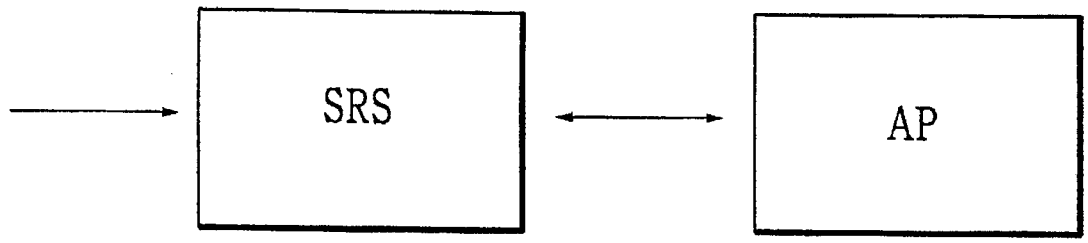
FIG. 3 is a schematic diagram of another conventional speech recognition interface system.
Figure 4:
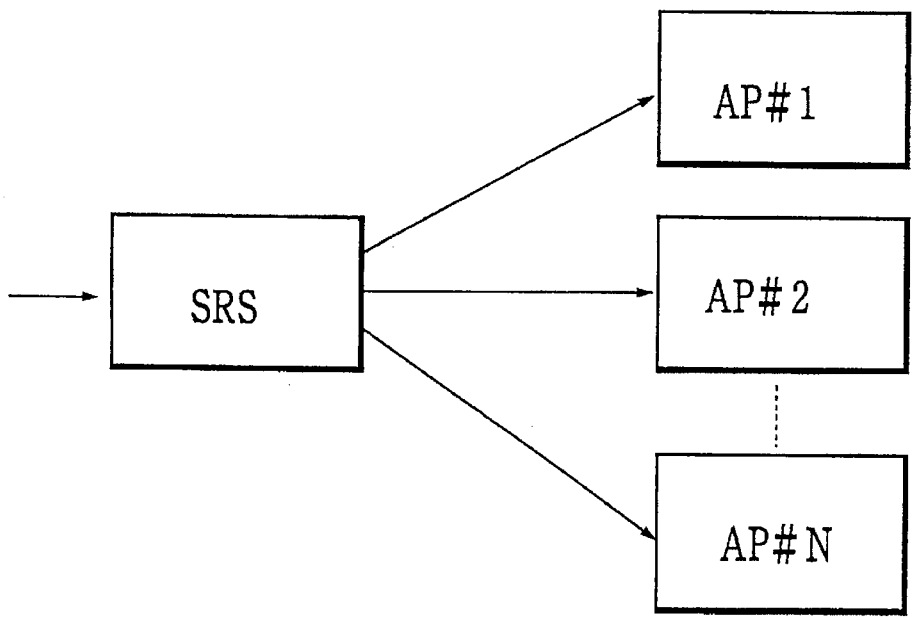
FIG. 4 is a schematic diagram of another conventional speech recognition interface system.
Figure 5:
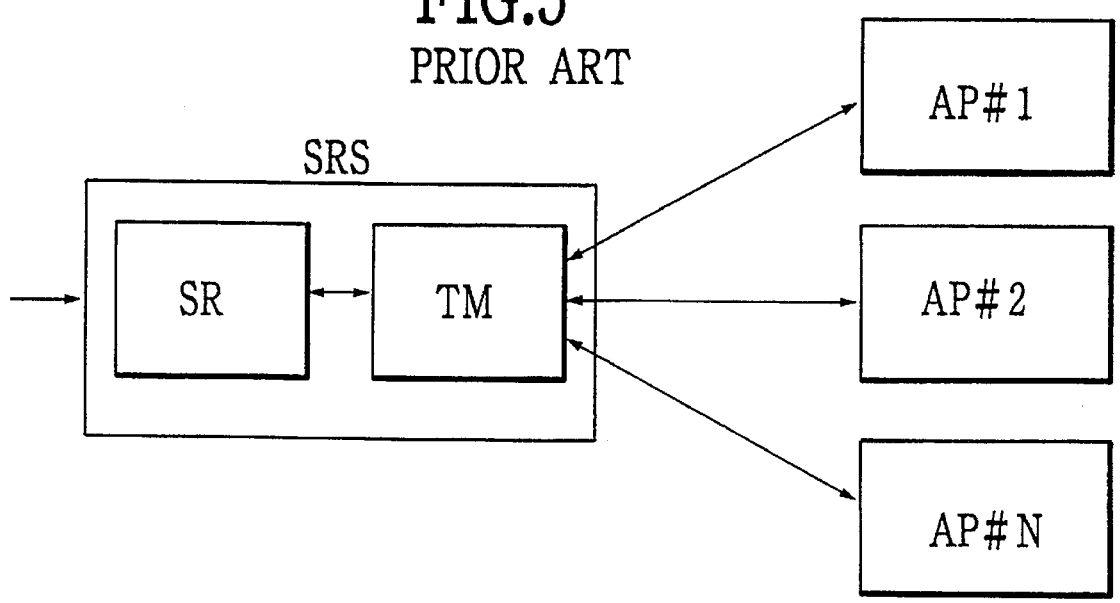
FIG. 5 is a schematic diagram of another conventional speech recognition interface system.
Figure 6:
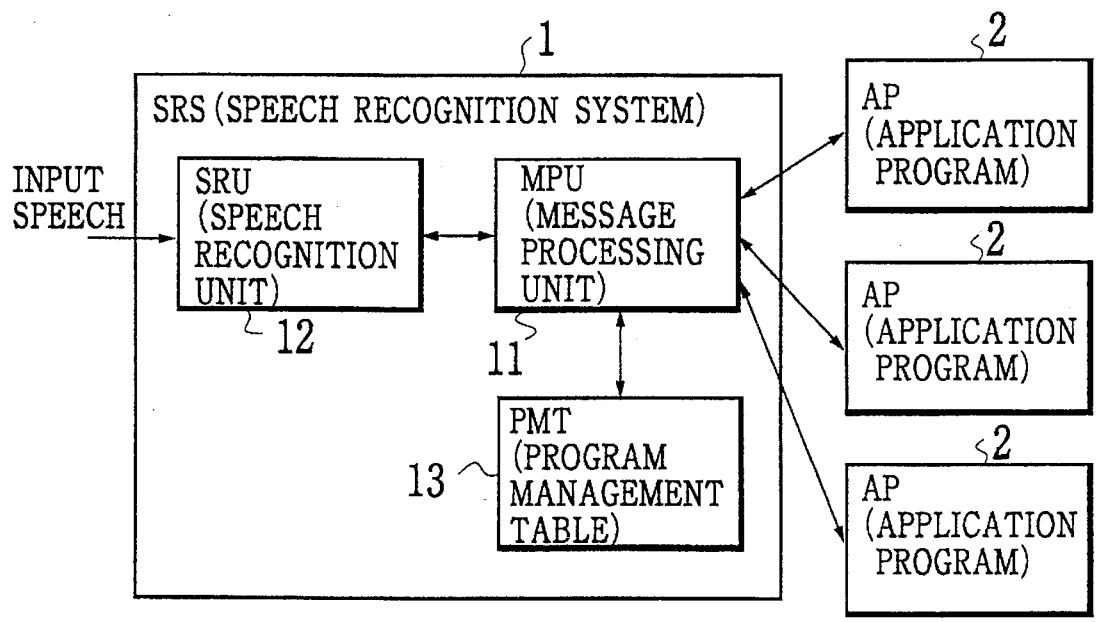
FIG. 6 is a schematic block diagram of a first embodiment of a speech recognition interface system according to the present invention.

Referring now to FIG. 6, the first embodiment of a speech recognition interface system according to the present invention will be described in detail.

In this first embodiment, the speech recognition interface system comprises: a speech recognition system (SRS) 1 connected with a plurality of application programs (AP) 2 bidirectionally, where the speech recognition system 1 further comprises: a speech recognition unit (SRU) 12 for receiving and recognizing an input speech and outputting a recognition result obtained therefrom; a message processing unit (MPU) 11 connected between the speech recognition unit 12 and the application programs 2, for exchanging various messages to be described in detail below with the speech recognition unit 12 and the application programs 2; and a program management table (PMT) 13 connected with the message processing unit 11 for storing various data to be described in detail below concerning each of the application programs 2.

The speech recognition system 1 carries out the speech recognition of the input speech according to the command contained in the message transmitted from the application programs 2, and returns the obtained recognition result as the message to the application programs 2. Each of the application programs 2 then carries out its own processing depending on its application, according to the received recognition result. Here the speech recognition system 1 can exchanges messages for the purpose of transmitting the recognition results with a plurality of the application programs 2 simultaneously.

The message processing unit 11 controls the speech recognition operation by the speech recognition system 1 as a whole by exchanging the messages transmitted from the speech recognition unit 12 and the application programs 2. The speech recognition unit 12 carries out the speech recognition of the input speech according to the information specified from the message processing unit 11 by exchanging messages with the message processing unit 11, and notifies the obtained recognition result to the message processing unit 11.

The program management table 13 is a table storing the information concerning all the application programs 2 which communicate with the speech recognition system 1 in advance. This program management table 13 is utilized by the message processing unit 11 in determining the recognition vocabulary for the entered input speech, and in determining the destination application program for the obtained recognition result, such that the speech recognition system 1 can exchange the messages with a plurality of the application programs 2 simultaneously.

Here, the program management table 13 has entries for the program IDs, the input masks, the recognition vocabulary lists, and the speech input flags. The program ID is an identification number assigned to each of the application programs 2 uniquely by the speech recognition system 1. The input mask is a mask for limiting the type of the message to be transmitted from the speech recognition system 1 to the application programs 2. The recognition vocabulary lists are tables registering the recognition vocabularies that can be requested from the application programs 2 to the speech recognition system 1, one of which is to be selectively specified for each input speech at a time of the speech input. The speech input flag is a flag indicating whether or not the speech focus is focused on a corresponding one of the application programs 2 or not. Here, to say that the speech focus in on a certain application program 2 means this certain application program 2 is the speech input target. In other words, the speech focus specifies the destination application program for the obtained recognition result.

Figure 7:
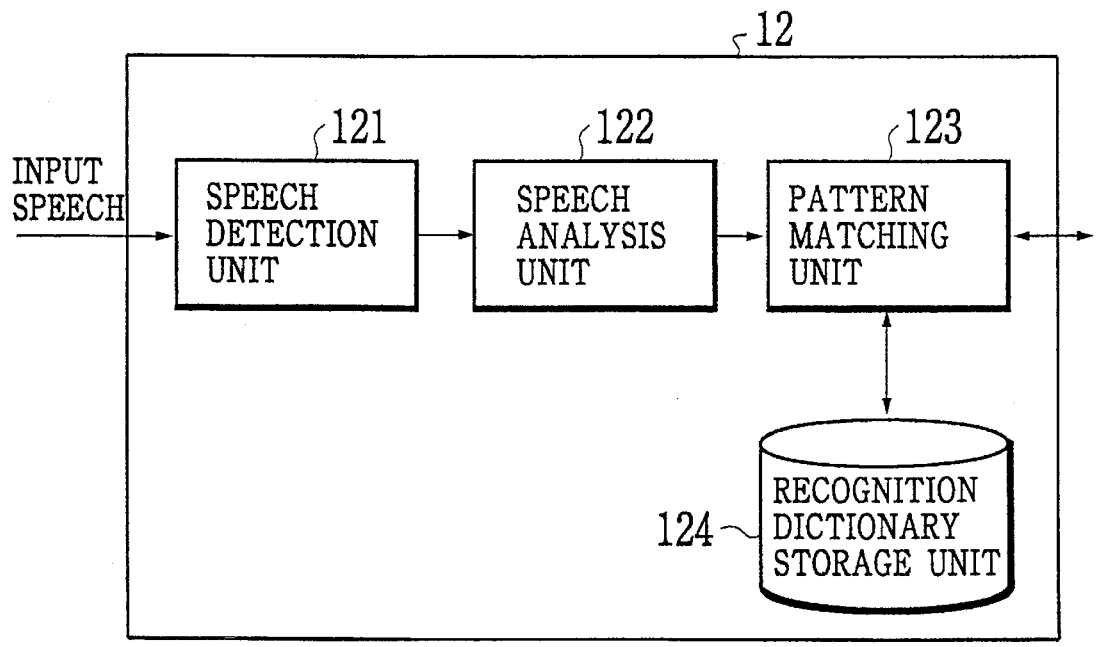
FIG. 7 is a block diagram of one configuration of a speech recognition unit in the speech recognition interface system of FIG. 6.

In further detail, the speech recognition unit 11 has a configuration as shown in FIG. 7, which comprises: a speech detection unit 121 for receiving and detecting the input speech; a speech analysis unit 122 for analyzing the input speech detected by the speech detection unit 121; a pattern matching unit 123 for matching the input speech analyzed by the speech analysis unit 122 with an appropriate recognition vocabulary to obtain the recognition result; and a recognition dictionary storage unit 124 for storing the recognition dictionaries containing all the recognition vocabularies that can be used at the pattern matching unit 123.

The speech detection unit 121 detects the input speech by using the known speech detection method such as that which utilizes the power of the input speech at prescribed intervals, as disclosed by Lamel et al. in "An Improved Endpoint Detector for Isolated Word Recognition", IEEE Transactions on Acoustics, Speech, and Signal Processing, Vol. ASSP-29, No. 4, August 1981.

The speech analysis unit 122 extracts the feature parameters of a single word speech by carrying out the frequency analysis of the speech section detected by the speech detection unit 121 by using the FFT (Fast Fourier Transform) or the band pass filter, for example.

The pattern matching unit 123 makes the matching of the feature parameters of each input speech obtained by the speech analysis unit 122 with the appropriate recognition dictionary stored in the recognition dictionary storage unit 124, by using the known matching method such as the Multiple Similarity method, HMM, and the DP matching, so as to obtain the recognition result as the word with the highest score obtained by the matching method within the selected recognition vocabulary.

Here, before the pattern matching is carried out, the pattern matching unit 123 inquires the message processing unit 11 as to which one of the recognition vocabularies in the recognition dictionary loaded from the recognition dictionary storage unit 124 should be used for the matching, and carries out the pattern matching with only the selected recognition vocabulary specified from the message processing unit 11, so as not to make the wasteful matching processing with respect to the unnecessary recognition vocabularies. The recognition result is transmitted from the pattern matching unit 123 to the message processing unit 11 regardless of whether the recognition has been successfully made or not, and the message processing unit 11 transmits the received recognition result to the application programs 2 according to the information stored in the program management table 13.

Figure 8:
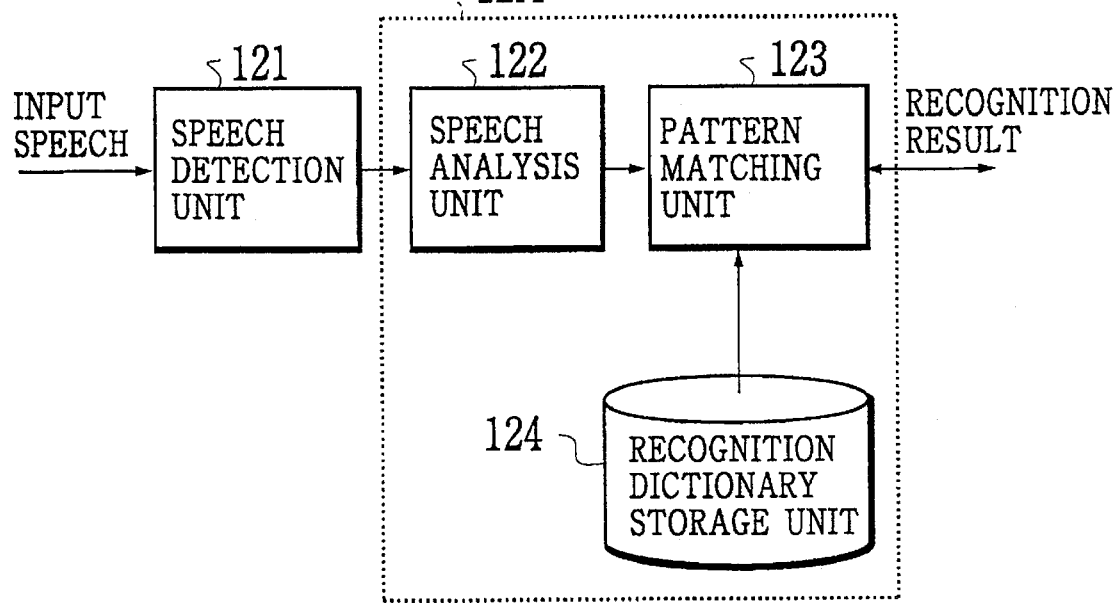
FIG. 8 is a block diagram of another configuration of a speech recognition unit in the speech recognition interface system of FIG. 6.
Figure 9:
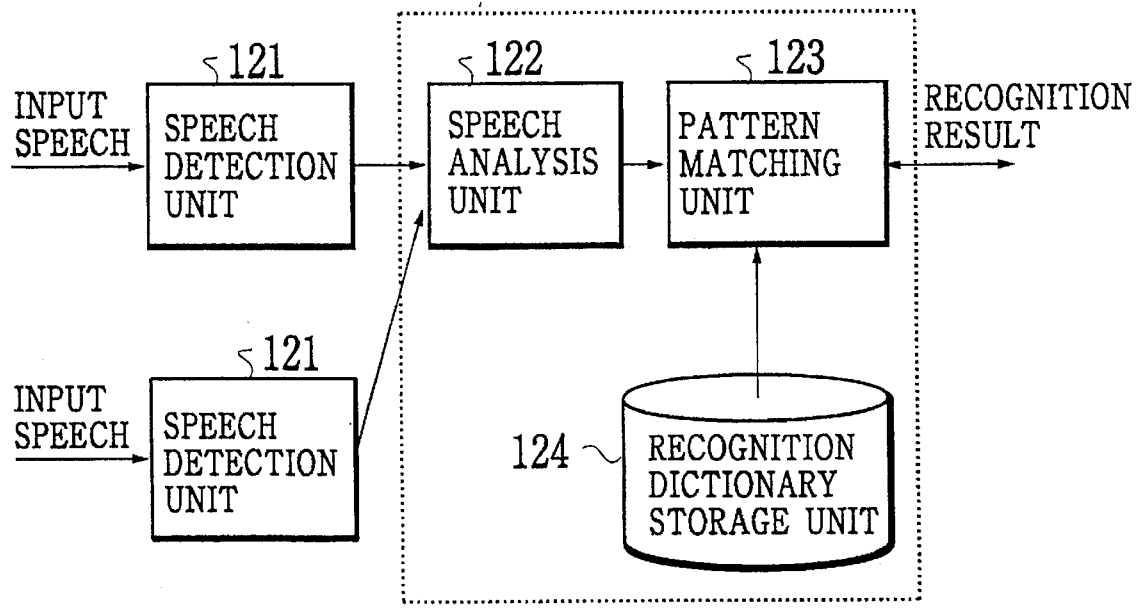
FIG. 9 is a block diagram of another configuration of a speech recognition unit in the speech recognition interface system of FIG. 6.
Figure 10:
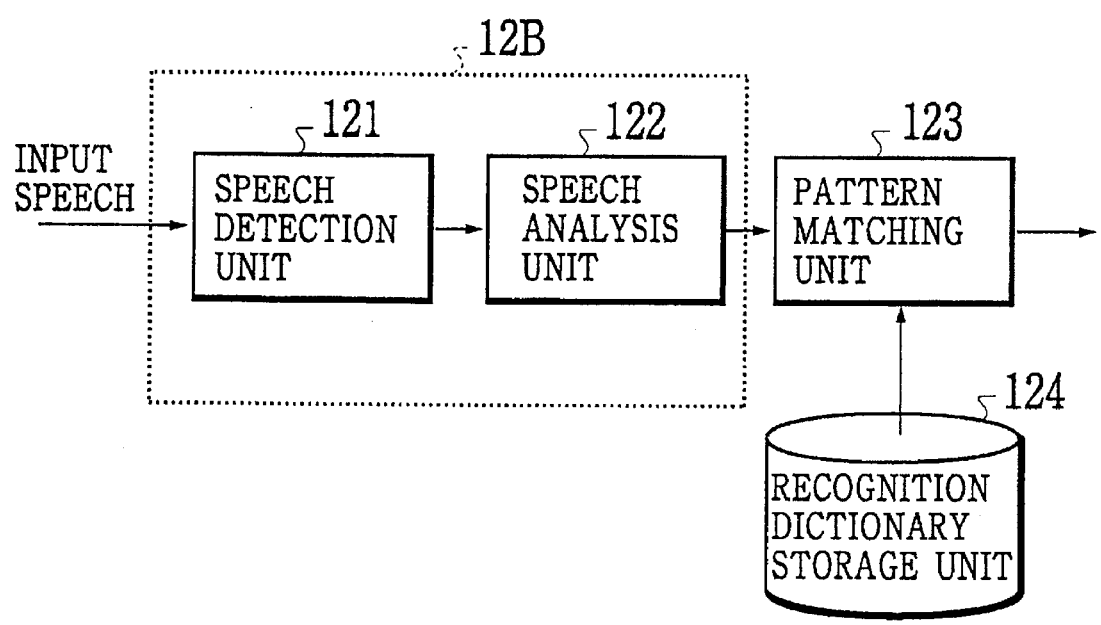
FIG. 10 is a block diagram of another configuration of a speech recognition unit in the speech recognition interface system of FIG. 6.

In the configuration of FIG. 7, the speech recognition unit 12 as a whole is constructed as an integral unit which can be operated as a single process. Alternatively, the speech recognition unit 12 may be constructed as shown in FIG. 8 in which the speech detection unit 121 is separated from the remaining units 12A. Here, by treating the speech detection unit 121 as a separate process from that of the remaining units 12A and realizing the data exchange between these processes in a form of the inter-process communication, the speech detection unit 121 can be treated as an independent entity, such that as shown in FIG. 9, it also becomes possible to provide a plurality of speech detection units 121 for the common remaining units 12A. On the other hand, as shown in FIG. 10, it is also possible to construct the speech detection unit 121 and the speech analysis unit 122 as an integral unit 12B to be used along with the separate pattern matching unit 123 and recognition dictionary storage unit 124, if desired.

Figure 11:
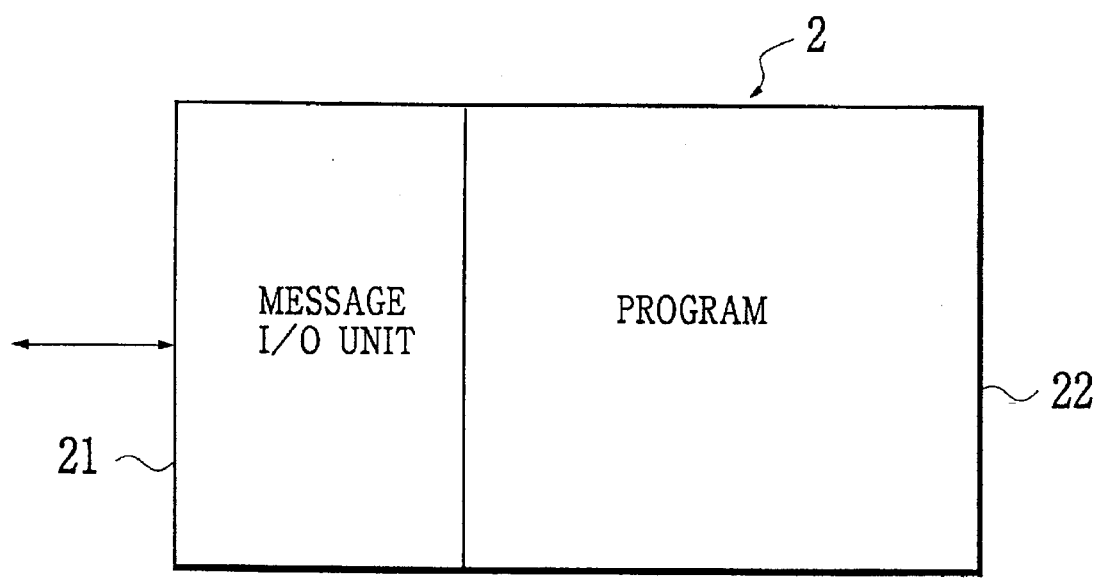
FIG. 11 is a schematic block diagram of an application program used in the speech recognition interface system of FIG. 6.

Each of the application program 2 has a configuration as shown in FIG. 11, which comprises a message I/O (Input/Output) unit 21 and a program 22. The message I/O unit 21 carries out the message exchanges with the speech recognition system 1, separately from the program 22 unique to each application program 2, which is made to be available to a programmer of each application program 2 as a standard speech input means. This message I/O unit 21 is provided in order to conceal the complicated message transmission and reception rules from the programmers of the application programs, such that the same standard speech input means can be used by all the application program programmers. The program 22 is a main body of the application program 2 for executing its own processing depending on its application, which contains the commands with respect to the speech recognition system 1 according to its internal states unique to itself, and the procedure for a processing to be carried out at a time the recognition result is received from the speech recognition system 1.

Figure 12:
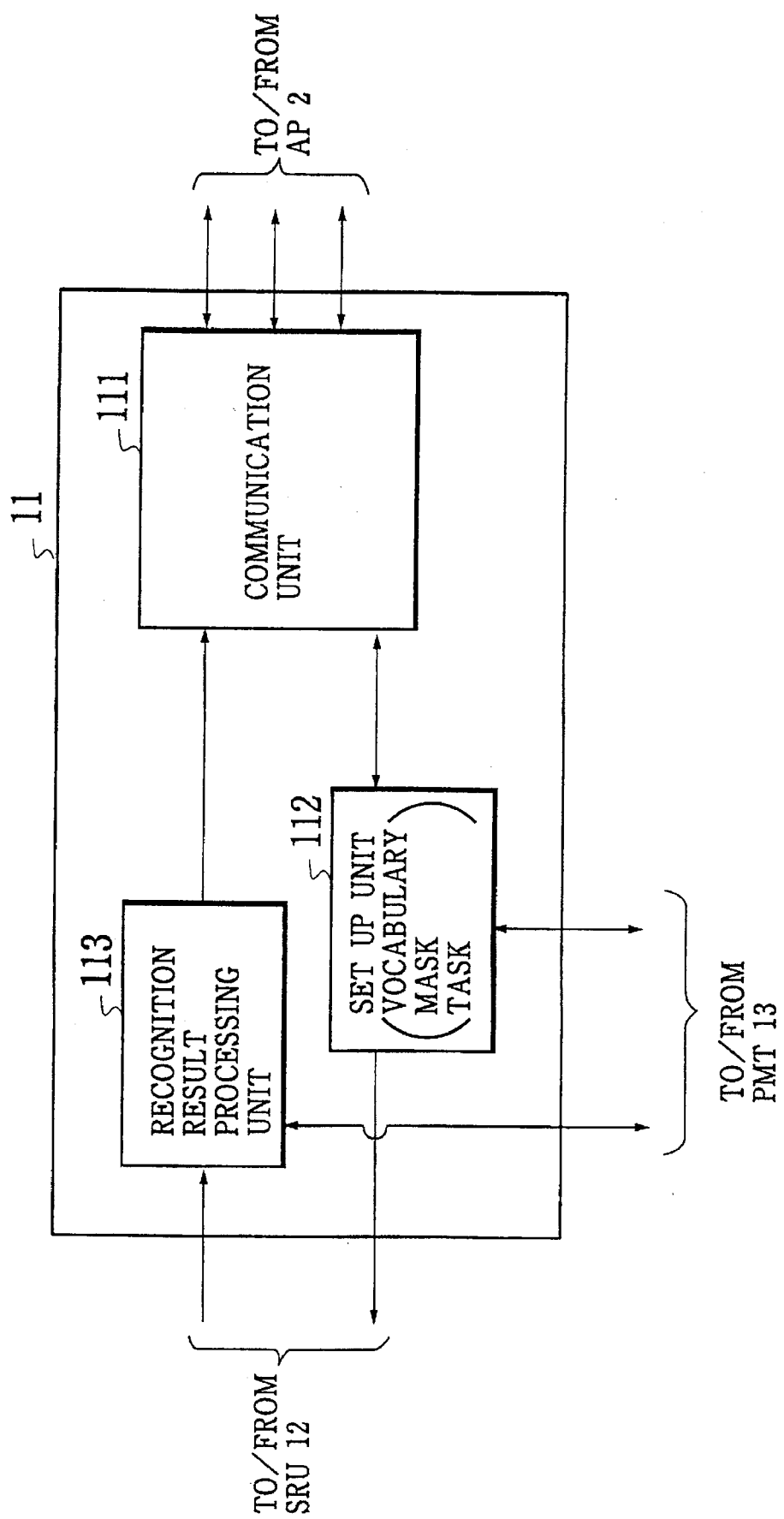
FIG. 12 is a block diagram of a message processing unit in the speech recognition interface system of FIG. 6.

The message processing unit 11 has a configuration as shown in FIG. 12, which comprises: a communication unit for carrying out the message exchanges with the application programs 2; a set up unit 112 for setting up the recognition vocabulary, input mask, and input task appropriate for each input speech, according to the command received from each application program 2, by utilizing the information stored in the program management table 13, and specifying the appropriate recognition vocabulary to be used to the pattern matching unit 123 of the speech recognition unit 12; and a recognition result processing unit 113 for processing the recognition result obtained from the speech recognition unit 12 into a form suitable for the transmission from the communication unit 11 to the application programs 2.

Now, the operation of this speech recognition system 1 will be described in detail.

In this first embodiment, the speech recognition system 1 and the application programs 2 exchange the messages, where the messages includes the commands, the execution results of the commands, and the recognition results.

This message exchange can be realized by setting the speech recognition system 1 as a server and the application programs 2 as clients of the speech recognition system 1, and using the byte stream type protocol such as TPC, DECnet, Stream, etc.

The messages to be exchanged between various elements in the speech recognition interface system of this first embodiment are summarized in the table shown in FIG. 13, each of which will be described in detail below. Here, the processing associated with the message exchange is carried out by the message processing unit 11 for all these messages as follows.

The messages from the application programs 2 to the speech recognition system 1 includes those enumerated in a section (a) of FIG. 13. All these messages are basically the commands from the application programs 2 to the speech recognition system 1.

The communication path connect/disconnect request is a request for connecting or disconnecting a communication path at a time of the message exchange between each application program 2 and the speech recognition system 1. The recognition dictionary load/release request is a request for loading or releasing the recognition dictionary containing a desired recognition vocabulary from each application program 2 to the speech recognition system 1. The recognition vocabulary set up request is a request to specify the appropriate recognition vocabulary in the recognition dictionary to be used in the speech recognition by the speech recognition system 1. The input mask set up request is a request for specifying a desired message type to be transmitted from the speech recognition system 1 to each application program 2. The input task set up request is a request for changing the speech focus to each application program 2 which made this request. The recognition start/end request is a request for starting or ending the speech recognition by the speech recognition system 1.

On the other hand, the messages from the speech recognition system 1 to the application programs 2 includes those enumerated in a section (b) of FIG. 13, which can be classified into two categories. One is a category of the responses with respect to the requests from the application programs, which are provided in correspondences to the above described request messages. The other is a category of the messages generated by the speech recognition system 1 in accordance with the internal state of the speech recognition system 1, such as the recognition result.

Here, the recognition result is a message to notify the result of the speech recognition obtained by using the recognition vocabulary requested by each application program 2. In a case of the successful recognition, this message contain information such as at least one word of the specified recognition vocabulary, the recognition dictionary which contains this word, and the score obtained by the pattern matching in the speech recognition. In a case of the unsuccessful recognition, this message contains information concerning the cause of the recognition failure such as the excessive speech level, the insufficient speech level, etc. The input task change notice is a message transmitted to the application programs 2 when the speech focus is actually changed in response to the input task set up request, which contains a task ID before the change and a task ID after the change. The communication path connect/disconnect notice is a message transmitted to the application programs 2 when the communication path is actually connected or disconnected in response to the communication path connect/disconnect request. This message is also generated when the speech recognition system 1 disconnects the communication path by itself, without the request from the application programs 2. The recognition vocabulary change notice is a message transmitted to the application programs 2 when the recognition vocabulary is changed in response to the recognition vocabulary set up request from each application program 2. The recognition dictionary load/release notice is a message transmitted to the application programs 2 when the recognition dictionary is newly loaded or released in response to the recognition dictionary load/release request.

These messages can be transmitted from the speech recognition system 1 to all of the application programs 2 at times such as when the speech recognition is carried out for the received input speech, the speech focus is changed, the communication path is connected, or the recognition vocabulary is changed, but it is not necessary for every application program 2 to receive all of these messages all the times. The setting as to which application programs 2 are going to receive which messages can be made by specifying the input mask for each message type from each application program 2 to the speech recognition system 1 by using the input mask set up request.

The input masks that can be used in this first embodiment are enumerated in the table shown in FIG. 14. These input masks correspond to the types of the messages that can be received by each application program 2, and any desired number of these input masks can be set up for each application program 2. For example, by setting up the recognition result notice mask, the recognition result can be received whenever the speech recognition system 1 carries out the speech recognition for the input speech, whereas by setting up the input task change mask, the input task change notice can be received whenever the speech focus is changed at the speech recognition system 1. In this manner, each application program 2 can receive only those messages which are needed in each application program 2 from the speech recognition system 1.

In addition to the request messages and the response messages, the messages to be exchanged between the speech recognition system 1 and the application programs 2 may also include the error messages. Here, the error messages include an error message to be generated when a command from the application program 2 which requires no response in a case of the successful execution of the command has failed, and an error message for notifying the occurrence of the critical situation in the speech recognition system 1. Moreover, the messages to be exchanged between the speech recognition system 1 and the application programs 2 may also include various other conceivable messages such as the messages for making access to the internal data of the speech recognition system 1, the message for setting up the speech recognition system i and the manner of speech input and output, such as that which changes the speech input level.

Thus, in this first embodiment, the application programs 2 can receive the messages indicating the change of the internal state of the speech recognition system 1, so that each application program can control the speech recognition system 1 according to its internal state, as well as the other application programs 2, by means of the message exchanges. Consequently, it becomes possible to provide the flexible speech recognition interface system with a high degree of freedom, which can be controlled by the speech inputs.

The message exchanges are also made between the message processing unit 11 and the speech recognition unit 12 in the speech recognition system 1.

The messages from the speech recognition unit 12 to the message processing unit 11 includes those enumerated in a section (c) of FIG. 13. Here, the recognition vocabulary query request is a request for specifying a selection of the recognition vocabulary to be used in the pattern matching for each input speech. The recognition result is a message for notifying the result obtained by the pattern matching for each input speech by using the selected recognition vocabulary. The recognition dictionary load/release notice is a message transmitted to the message processing unit 11 when the recognition dictionary is newly loaded or released in response to the recognition dictionary load/release request described below which is transmitted from the message processing unit 11.

On the other hand, the messages from the the message processing unit 11 to the speech recognition unit 12 includes those enumerated in a section (d) of FIG. 13. Here, the recognition dictionary load/release request is a message identical to the recognition dictionary load/release request transmitted from each application program 2 to the message processing unit 11. The recognition vocabulary data is a response to the recognition vocabulary query request from the speech recognition unit 12, which specifies a selection of the appropriate recognition vocabulary to be used in the pattern matching for each input speech.

Figure 15:
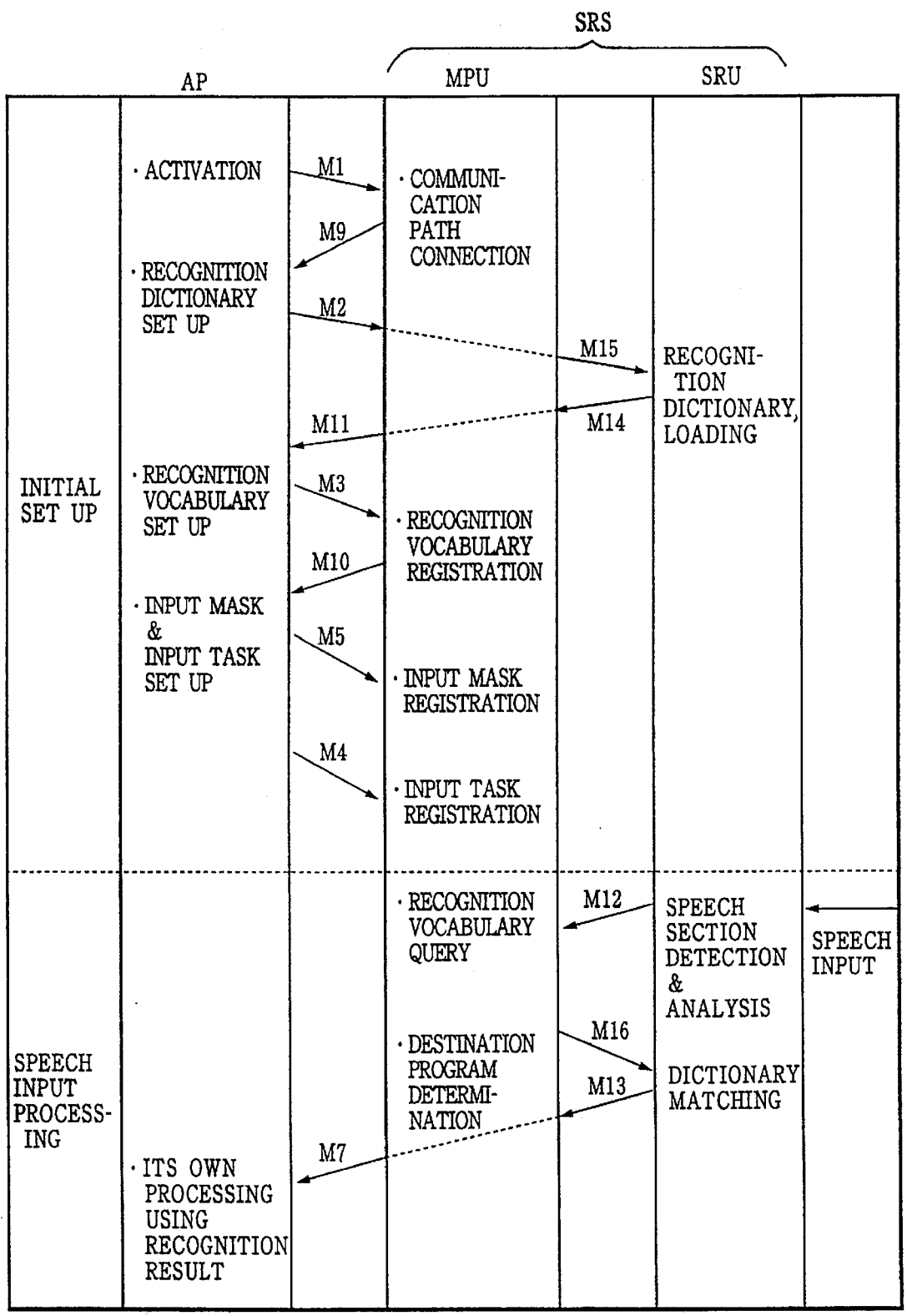
FIG. 15 is a chart showing a procedure of the operation in the speech recognition interface system of FIG. 6.

Referring now to FIG. 15, the actual procedure of the operation in this speech recognition interface system of the first embodiment will be described. FIG. 15 is a flow chart for the operation from the activation of the application program 2 until the recognition result is received at the application program 2.

When the application program 2 is activated, the application program 2 first transmits the communication path connect request M1 to the message processing unit 11, in response to which the message processing unit 11 connects the communication path with respect to this application program 2 and returns the communication path connect notice M9.

Next, the application program 2 transmits the recognition dictionary load request M2 for requesting the loading of the recognition dictionary containing the desired recognition vocabulary to the message processing unit 11. The message processing unit 11 transmits this recognition dictionary load request M2 as it is to the speech recognition unit 12 as the recognition dictionary load request M15, in response to which the appropriate recognition dictionary is loaded from the recognition dictionary storage unit 124 to the pattern matching unit 123 in the speech recognition unit 12. Then, the speech recognition unit 12 returns the recognition dictionary load notice M14 to the message processing unit 11, which in turn returns the recognition dictionary load notice M11 to the application program 2.

Then, the application program 2 transmits the recognition vocabulary set up request M3 for requesting a desired recognition vocabulary in the loaded recognition dictionary to be used in the speech recognition of the input speech to the message processing unit 11. In response, the message processing unit 11 registers the specified recognition vocabulary into the entry in the program management table 13 assigned to this application program 2, and returns the recognition vocabulary change notice M10 indicating the set up of the requested recognition vocabulary.

Next, the application program 2 transmits the input mask set up request M4 and the input task set up request M5 to the message processing unit 11, in response to which the message processing unit 11 carries out the set up of the appropriate input masks and input task by registering the appropriate input masks and input task into the entry in the program management table 13 assigned to this application program 2. This completes the initial set up procedure.

After the initial set up, the application program 2 enters into a state of awaiting a message from the speech recognition system 1, while executing its own program depending on its task. In this state, in accordance with the change of its internal state due to the executed processing, the application program 2 may transmit the any necessary requests such as that for changing the recognition vocabulary or that for changing the input task to itself or the other application programs, to the speech recognition system 1 as the need arises, such that the speech recognition system 1 can be controlled from the application program 2.

When the speech input is made with respect to this application program 2, the following speech input processing procedure is carried out.

First, the detection and the analysis of the input speech is carried out by the speech recognition unit 12. Then, the speech recognition unit 12 transmits the recognition vocabulary query request M12 to the message processing unit 11 in order to ascertain the appropriate recognition vocabulary for this input speech. In response, the message processing unit 11 looks up the appropriate entry in the program management table 13 to select the appropriate recognition vocabulary registered therein, and returns the recognition vocabulary data M16 indicating the selected appropriate recognition vocabulary to the speech recognition unit 12.

Then, the speech recognition unit 12 carries out the pattern matching of the feature parameters of the input speech with the appropriate recognition dictionary specified by the recognition vocabulary data M16, and transmits the recognition result M13 obtained as a result of this pattern matching.

The message processing unit 11 then searches the word with the maximum score indicated by the recognition result M13 in the recognition vocabularies registered in the program management table 13, and only when the application program 2 to whose recognition vocabulary this word belongs has the speech input flag indicating "1" while also the recognition result notice mask is set up as the input mask for this application program 2, the message processing unit 11 transmits the recognition result M7 to this application program 2.

Now, the operation in this speech recognition interface system of the first embodiment described above will be illustrated in further detail by using a concrete example.

Namely, when two application programs 2 of the shell tool and the text editor are already connected with the speech recognition system 1, the content of the program management table 13 becomes as shown in FIG. 16A.

Starting from this state, the operation for newly activating the mail tool as another application program will be described.

First, as the activated mail tool transmits the communication path connect request M1, an entry for this mail tool is produced in the program management table 13 and the unique program ID is assigned to this mail tool. In this example, the program IDs are assigned in an order in which the application programs have been activated, starting from "0", so that the mail tool is assigned with the program ID of "2".

Next, the mail tool transmits the recognition dictionary load request M2. In this case, the appropriate recognition dictionary is assumed to be already loaded, so that the speech recognition system 1 notifies this fact to the mail tool in response. Note here that, in this example, it is assumed that all the application programs 2 uses the same recognition dictionary, so that the content of the program management table 13 contains no data indicating which recognition dictionary contains the desired recognition vocabulary, which will be necessary when a plurality of recognition dictionaries are to be used.

Then, the mail tool transmits the recognition vocabulary set up request M3 indicating "First", "Last", "Previous", "Next", "Send", and "Finish" as the desired recognition vocabulary. Also, the mail tool transmits the input mask set up request M4 requesting the recognition result notice mask, and the input task set up request M5 requesting the cancellation of all the current speech focuses and the set up of the speech focus on the mail tool itself.

As a result, the content of the program management table 13 is changed as shown in FIG. 16B, in which the speech focus originally focused on the shell tool in FIG. 16A is changed to that focused on the newly activated mail tool, such that the speech input for the mail tool becomes possible.

At this point, suppose that the input speech "Next" is entered. This input speech is subjected to the speech section detection and analysis at the speech recognition unit 12, such that the feature parameters of this input speech is obtained. Then, in order to ascertain the recognition vocabulary to make the pattern matching with the obtained feature parameters of the input speech, the speech recognition unit 12 transmits the recognition vocabulary query request M12. In response, the message processing unit 11 looks up the program management table 13 to determine the appropriate recognition vocabulary registered in the entry for which the speech input flag is indicating "1" while also the recognition result notice mask is set up as the input mask. Thus, in this case, the recognition vocabulary for the mail tool containing "First", "Last", "Previous", "Next", "Send", and "Finish" is notified as the appropriate recognition vocabulary that can be entered at that point, by the recognition vocabulary data M16 transmitted from the message processing unit 11 to the speech recognition unit 12. As a result, the speech recognition unit 12 carries out the pattern matching of the feature parameters of the input speech with the dictionary data for the specified recognition vocabulary, and transmits the recognition result M13 obtained by this pattern matching to the message processing unit 11.

When this recognition result M13 is received from the speech recognition unit 12, the message processing unit 11 searches the word with the maximum score indicated by the recognition result M13 in the recognition vocabulary registered in the entry of the program management table 13 for which the speech input flag is indicating "1" and the recognition result notice mask is set up as the input mask. When such an entry is found, the message processing unit transmits the recognition result M7 to the application program 2 to which this entry is assigned.

In this example, the recognition result of obtained for the input speech will be transmitted to the mail tool. The application program 2 of the mail tool which received this recognition result from the speech recognition system 1 at the message I/O unit 21 then carries out its own processing such as the displaying of the next one of the currently displayed mail among the received mails.

It is also to be noted that, in this example of FIGS. 16A and 16B, the shell tool has the input task change notice mask along with the recognition result notice mask, so that every change of the speech focus is notified to the shell tool whenever the speech focus is changed at the speech recognition system 1. Thus, when the above described input task set up request M5 is received by the speech recognition system 1 from the mail tool, and the speech focus is actually changed by the message processing unit 11, the input task change notice M8 is transmitted from the message processing unit 11 to the shell tool. Note here that all the input masks other than the recognition result notice mask are not dependent on the value of the speech input flag, so that as long as the input task change mask is set up for the shell tool, the input task change notice M8 is transmitted to the shell tool, regardless of the value of the speech input flag, whenever the speech focus is changed.

As the application program 2 can learn the change of the internal state of the speech recognition system 1 by such message exchanges, it becomes possible for the application program to respond to the change of the internal state of the speech recognition system 1 flexibly. For example, the shell tool can notify its user about the loss of the speech focus by using its screen display, its synthesized speech output, or the beep sound output.

Thus, in this first embodiment, it becomes possible for the application programs 2 to control the speech recognition system 1 freely by using the messages, so that the flexible speech recognition interface system in which the application programs 2 can take the initiative can be obtained.

In other words, according to this first embodiment, in the multi-task environment in which a plurality of application programs 2 are operated in parallel, each application program 2 can exchange data such as the recognition vocabulary and the recognition result with the speech recognition system 1 by exchanging the messages directly, so that the speech input can be provided as the data input means for all the application programs 2 just as the other data input means such as the keyboard and the mouse. As a result, it becomes possible to provide the speech input as the standard data input means in the multi-task environment such as that occurring in the workstations, and the improvement of the man-machine interface in general can be expected.

It is to be noted that, in the first embodiment described above, the entire operation of the speech recognition system 1 as a whole has been described as that which can be executed as a single process, but it is also possible execute the function of each element of the speech recognition system 1 separately as separate programs, if desired.

It is also to be noted that the first embodiment has been described above for a case of using the isolated word recognition, but it is equally applicable to the other types of the speech recognition schemes such as the continuous word recognition scheme or the continuous speech recognition scheme.

Figure 17:
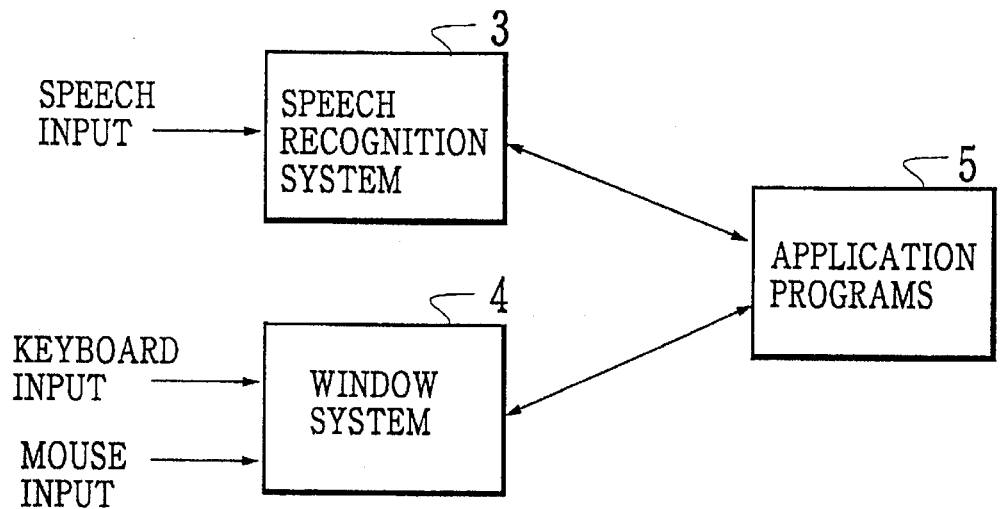
FIG. 17 is a schematic block diagram of a second embodiment of a speech recognition interface system according to the present invention.

Referring now to FIG. 17, the second embodiment of a speech recognition interface system according to the present invention will be described in detail.

This second embodiment incorporates the window system in the multi-task computer environment realized by using the speech recognition interface system of the first embodiment described above, so as to further enhance the user support in the system as a whole.

In this second embodiment, the system has an overall configuration as shown in FIG. 17, which comprises: a speech recognition system 3 similar to that of the first embodiment described above, for handling the speech input; a window system 4 for handling the keyboard input and the mouse input; and a plurality of application programs 5, each of which has communication means for exchanging various messages with the speech recognition system 3 and the window system 4.

In this configuration of FIG. 17, the speech recognition system 3 and the window system 4 are operating independently from each other, and the messages to be exchanged between the window system 4 and the application programs 5 includes those related to the known window system functions such as the window generation in the multi-window environment, the keyboard input, the mouse input, etc.

At this point, the window system for realizing the multi-window function in general will be briefly described. The window system for realizing the multi-window function under the multi-task computer environment such as that realized in the workstations communicates with a plurality of application programs operated under this environment, and each application program is displayed on a screen display called the bit map display. In this window system, one window is normally assigned to each application program.

Figure 18:
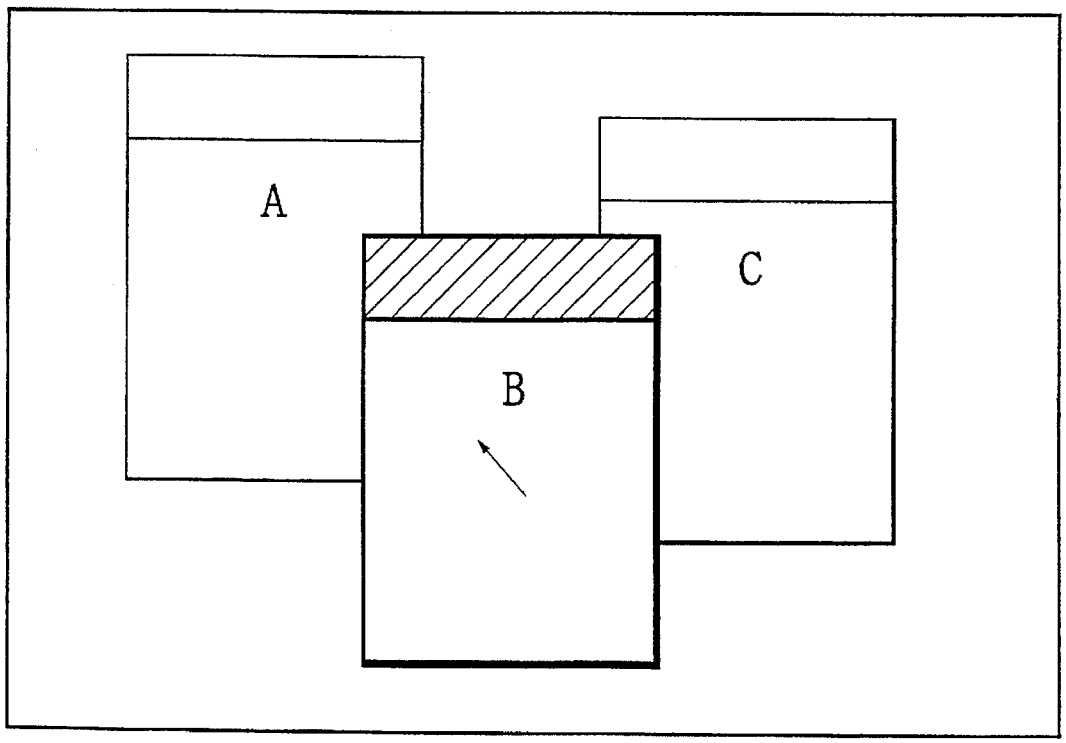
FIG. 18 is an illustration of an exemplary screen display in the speech recognition interface system of FIG. 17.

An exemplary screen display in the window system appears as shown in FIG. 18. In this example, three application programs A, B, and C are operated in parallel. The window system manages the input devices such as the keyboard and the mouse such that these input devices can be shared by a plurality of application programs. In the screen display, a mouse pointer is shown in abstraction in a form of an arrow, which can be manipulated for operating the windows and specifying the input targets. It is to be noted here that it is also possible for the window system to utilizes the pointing device other than the mouse described above, such as a pen or a touch panel, and the description related to the mouse equally applies to any other pointing devices employed in the window system.

The target application program for the keyboard input is indicated by the keyboard focus, which is generally specified by the mouse pointer. The application program focused by the keyboard focus is indicated by displaying the window frame of the window assigned to this application program in thicker lines than those of the window frames of the other windows, or by changing a color of the title bar section provided in an upper edge of each window. Thus, FIG. 18 shows a situation in which the keyboard focus is focused on the application program B. In general, the keyboard focus is always focused only to a single window.

Now, in this second embodiment, an exemplary case in which the application programs 5 includes three programs for shell tool, text editor, and mail tool used in the first embodiment described above will be considered. In this case, the window system displays each application program in abstraction in a form of a window. At the same time, each application program 5 also communicates with the speech recognition system 3 and carries out the recognition vocabulary set up for itself, by the procedure described in the first embodiment, at a time of its activation. Here, the recognition vocabularies of the application programs 5 are assumed to be the same as those used in the first embodiment, which are summarized in the table shown in FIG. 19.

In the already existing general window system, the application program can receive the notice for the change of the keyboard focus. Consequently, in order to set the target application program for the keyboard input and the speech input to be the same application program, the application program 5 is required to make the request for focusing the speech focus to itself whenever the keyboard focus is shifted to this application program 5, and the request for removing the speech focus from itself whenever the keyboard focus is removed from itself, by transmitting the appropriate input task change request used in the first embodiment to the speech recognition system 3. In the following, the keyboard focus and the speech focus are assumed to be always coinciding in this manner, and they are referred collectively as an input focus. This input focus is to be controlled by the pointing device such as the mouse, the pen, or the touch panel.

Figure 20A:
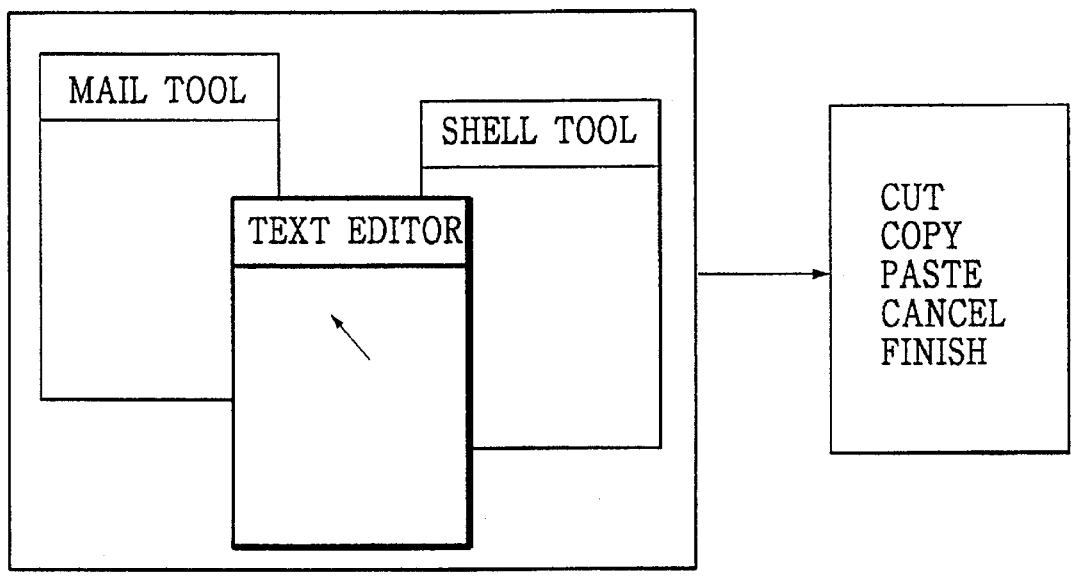
FIGS. 20A and 20B are illustrations of two exemplary screen displays in the speech recognition interface system of FIG. 17.
Figure 20B:
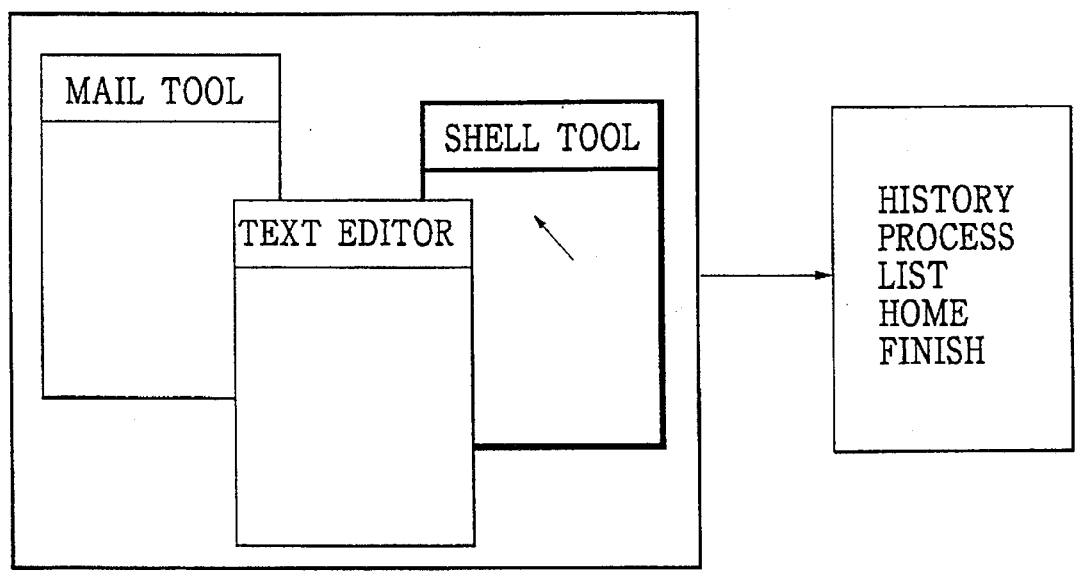

In conjunction with the shifting of the input focus, the recognition vocabulary must be changed as shown FIGS. 20A and 20B, where FIG. 20A shows a state before the shifting of the input focus in which the input focus is on the text editor, and FIG. 20B shows a state after the shifting of the input focus in which the input focus is on the shell tool. Thus, in FIG. 20A, the speech focus is on the text editor, so that the recognition vocabulary includes five words of "Cut", "Copy", "Paste", "Cancel", and "Finish" which form the recognition vocabulary for the text editor. When the user made the speech input by using any one of these five words in this state, the recognition result obtained by the speech recognition system 3 for that speech input will be transmitted to the text editor. Then, when the input focus is shifted to the shell tool by pointing the shell tool by the mouse pointer as shown in FIG. 20B, the speech focus is also shifted to the shell tool, so that the recognition vocabulary is changed to that which includes five words of "History", "Process", "List", "Home", and "Finish" which form the recognition vocabulary for the shell tool.

Here, the user can use any words as the recognition vocabulary words of the desired application program among all the available application programs 5, but it is an excessive burden for the user to memorize all the recognition vocabularies of all the available application programs 5 and to judge which recognition vocabulary corresponds to which application program all by himself. On the other hand, it is also a burden for the programmers of the application programs 5 to provide means for displaying the recognition vocabulary of each application program 5. In addition, the speech input has the ambiguity unlike the other input means such as the keyboard, so that it is important for the user to be able to confirm that the input speech has been recognized correctly.

Figure 21:
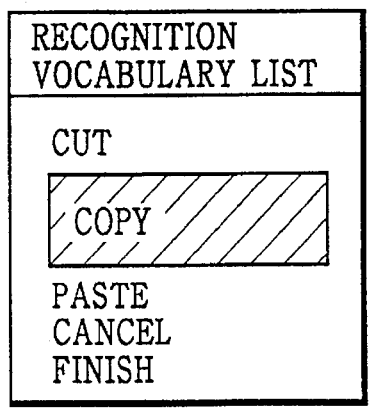
FIG. 21 is an illustration of a current recognizable recognition vocabulary list display used in the speech recognition interface system of FIG. 17.

In order to resolve these issues, a vocabulary display program for displaying the current recognizable recognition vocabulary list in a form shown in FIG. 21 can be provided as a standard application program associated with the speech recognition interface system. Whenever any one of the application programs 5 requested to connect or disconnect the communication path, or to change the recognition vocabulary setting, or to change the speech focus, this vocabulary display program requests that application program 5 to transmit the message generated in response to that request to itself. This can be realized by setting the appropriate input mask for receiving such a message in the speech recognition system 3. In this manner, this vocabulary display program can always display the entire currently recognizable recognition vocabulary list.

Also, in this vocabulary display program, whenever the speech recognition of the input speech is made, this vocabulary display program also receives the recognition result transmitted to the appropriate application program 5, such that the recognized word can be displayed in a color different from the rest as indicated by the shaded region in FIG. 21, in order to facilitate the confirmation of the speech input recognized by the speech recognition system 3.

Alternatively, the speech input recognized by the speech recognition system 3 can be notified to the user as follows. Namely, the recognition result can be displayed at a prescribed portion either on the window assigned to the pertinent application program 5, or on the screen display more generally. This prescribed portion to display the recognition result may be controlled by each application program 5 or the speech recognition system 3. Under the window system environment, a window for displaying the recognition result can be produced and controlled to be displayed at any desired position on the screen display such as a central or a peripheral position on the window assigned to the pertinent application program 5, or in a vicinity of a point pointed by the mouse pointer or the keyboard input cursor.

This recognition result may be displayed until the next speech recognition is made by the speech recognition system 3, or controlled to be such that it is displayed only immediately after the speech recognition is made, and after an elapse of some time, it is not going to be displayed again until the next recognition result is obtained. In particular, in a case of displaying the recognition result in a vicinity of the mouse pointer or the keyboard input cursor, while there is an advantage that: only a light shift of the user's view is required, there is also a disadvantage that it can be an obstacle to the current operation carried out by the user as it is going to be displayed in a vicinity of a region at which the user is carrying out the current operation, especially when it is to be displayed continuously. For this reason, it is an effective manner to display it only immediately after the recognition result is obtained. This manner of displaying the recognition result in a vicinity of a region at which the user is carrying out the current operation, only immediately after the recognition result is obtained, may be employed along with the other manner of displaying the recognition result continuously at some other position.

Thus, by providing this vocabulary display program, it becomes possible to reduce the unnecessary burden on both the user of the system as well as the programmers of the application programs, and it becomes possible to provide the speech input environment which is much easier for the user to use.

Figure 22A:
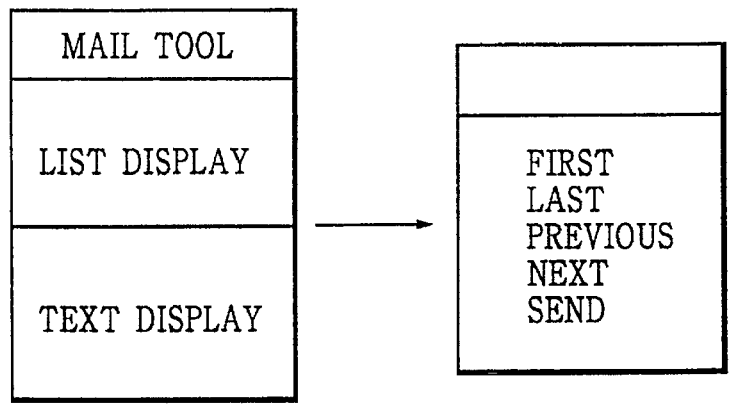
FIGS. 22A and 22B are illustrations of two exemplary window displays in the speech recognition interface system of FIG. 17.
Figure 22B:
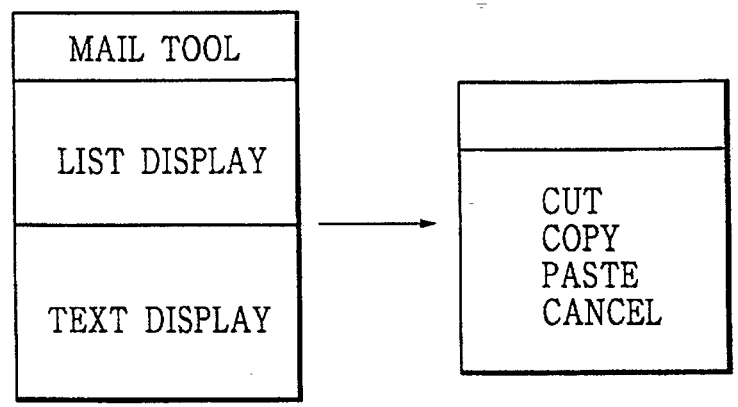

It is also possible to change the recognition vocabulary not just among the application programs 5 but also within each application program 5 depending on the position of the mouse pointer on the screen display, such that the unnecessary recognition processing can be reduced and the accuracy of the speech input can be improved such that the speech recognition error rate can be suppressed. For example, as shown in FIGS. 22A and 22B, the mail tool window can be divided into two sections of the list display and the text display, and depending on which one of these two sections the mouse pointer is positioned, the recognition vocabulary can be changed from that shown in FIG. 22A when the mouse pointer is on the list display section to that shown in FIG. 22B when the mouse pointer is on the text display section, or vice versa.

It is also possible to make it easier for the user to use the system by setting the rule to shift the speech focus whenever there is a change in the state of the window assigned to the application program 5, such as a production or an annihilation of the window, or the change of the window geometry, resulting from the activation or termination of the application program 5, or the input operation using the pointing device such as the mouse or the pen, or the keyboard, or else the processing executed in response to the speech recognition result. For instance, the loss or gain of the speech focus can be controlled within each application program 5, in accordance with the window state change, according to the following rules.

(1) The speech focus is lost when the window is annihilated, iconified, or concealed by the other windows.

(2) The speech focus is gained when the window is produced, changed from a non-displaying state to a displaying state, displayed over the other windows, or enlarged in its size.

Here, instead of managing such a window state change at each application program 5 separately, it is also possible to provide a speech focus management program for handling this function for all the application programs 5. In this case, the speech focus management program can receive a notice of the window state change for each application program 5 from a program managing the window system as a whole such as the window server, and carries out the change of the speech focus according to the prescribed rules such as (1) and (2) described above whenever such a notice is received.

Moreover, by providing such a speech focus management program, it also becomes possible to make it further easier for the user to use the system by setting the rule for an application program 5 to which the speech focus is to be shifted whenever the application program 5 which had the speech focus up until then has lost the speech focus as a result of the termination of the application program 5, the annihilation of the window, etc. For instance, the shift of the speech focus can be controlled by the speech focus management program according to the following rule.

(3) The speech focus management program keeps the past record of the speech focus, and when a certain application program which had the speech focus up until then has lost the speech focus, unless this loss of the speech focus is due to the gain of the speech focus by the other application program, the speech focus is returns to the application program which had the speech focus immediately before this certain application program.

In this manner, it becomes possible to eliminate an is undesirable state in which there is no application program 5 on which the speech focus is focused, i.e., a state in which the output of the speech recognition system 3 cannot be received by any application program 5.

It is to be noted here that, in the second embodiment, the speech recognition system 3 and the window system 4 are described as separate independent entities, but it is also possible to realize the integrated configuration for these two systems.

Next, the third embodiment of a speech recognition interface system according to the present invention will be described in detail.

In the second embodiment described above in which the speech recognition system and the window system are combined, the speech focus and the keyboard focus are assumed to be coinciding all the time, such that they can be collectively referred as the input focus and the recognition vocabulary is changed by specifying this input focus by means of the mouse pointer. However, according to this manner, it is necessary for the user to put his hand off the keyboard in order to manipulate the mouse, whenever the input focus is to be changed.

In view of this inconvenience, in this third embodiment, it is made to be easier for the user to use the system under the multi-window environment by enabling the change of the input focus by means of the speech input such that there is no need for the user to put his hand off the keyboard even when the input focus is to be changed.

In order to facilitate the control of the input focus by the speech input, in this third embodiment, the recognition vocabulary for each application program comes in two types including a local recognition vocabulary and a global recognition vocabulary. Here, the local recognition vocabulary is that which becomes the recognition target only when the input focus is focused on this application program, which is identical to the recognition vocabulary used in the first and second embodiments described above, while the global recognition vocabulary is that which becomes the recognition target all the time, regardless of whether the input focus is focused on this application program or not.

Now, in this third embodiment, an exemplary case in which the application programs includes three programs for shell tool, text editor, and mail tool used in the first embodiment described above will be considered.

In this third embodiment, the recognition vocabularies of these application programs are as summarized in the table shown in FIG. 23. In correspondence to the local recognition vocabulary and the global recognition vocabulary provided for each application program, the recognition vocabulary list registered in the program management table is accompanied by local and global flags in order to indicate whether each word in the recognition vocabulary is the local one or the global one, as shown in FIG. 24. When the speech input is entered, the message processing unit determines the appropriate recognition vocabulary according to this program management table of FIG. 24 as follows.

First, the program management table is looked up to pick up the local recognition vocabulary of the application program on which the input focus is focused. Then, all the global recognition vocabularies of all the application programs are picked up. These picked up vocabularies are going to be the currently recognizable vocabulary at the speech recognition system. For example, when the input focus is focused on the text editor, the currently recognizable vocabulary includes eight words of "Cut", "Copy", "Paste", "Cancel", "Finish", "Shell tool", "Text editor", and "Mail tool". Of these eight words, the recognition result for the speech input of any one of "Cut", "Copy", "Paste", "Cancel", "Finish", and "Text editor" will be transmitted to the text editor, while the recognition result for the speech input of either "Shell tool" or "Mail tool" will be transmitted to the shell tool or the mail tool, respectively. Thus, when the speech input of "Mail tool" is entered in this state, the mail tool makes the request for changing the input focus to itself in response to the recognition result of this speech input, such that the user can realize the change of the input focus without putting his hand off the keyboard.

It is to be noted that the global vocabulary assigned to each application program can be regarded as the name of the window assigned to each application program. By displaying this window name at the title bar section provided near an upper edge of each window, it becomes possible for the user to know the name of each window, i.e., the available global recognition vocabulary.

Thus, in this third embodiment, the attribute of local/global is given to the recognition vocabulary, and the window name is assigned to each window as the global recognition vocabulary, such that the change of the input focus can be made by means of the speech input using the window name, without bothering the user's hand.

Next, the fourth embodiment of a speech recognition interface system according to the present invention will be described in detail.

In the second and third embodiments described above, the speech focus and the keyboard focus are assumed to be coinciding all the time, such that only one window can receive both the speech input and the keyboard input exclusively at any given time. This manner has an advantage that the single application program can handle both of these speech and keyboard inputs together, but there is also a disadvantage that the data input can be made only for one application program at any given time despite of the fact that there are two data input means. In view of this inconvenience, in this fourth embodiment, the speech focus is separated from the keyboard focus, so that the speech focus is no longer controlled by the mouse pointer while the keyboard focus remains to be controlled by the mouse pointer.

Namely, in this fourth embodiment, even when the mouse pointer is moved to a certain window, the application program assigned with that certain window will not make a request to shift the speech focus to itself. On the other hand, the change of the speech focus can be made by means of the speech input as in the third embodiment described above, by giving a name to each window and registering each window name as the global recognition vocabulary.

In such a case of dividing the input focus into the independent speech and keyboard focuses, in order to prevent the user's confusion at a time of the data input, it is necessary to indicate the locations of these speech and keyboard focuses in an easily comprehensible manner. To this end, in this fourth embodiment, the keyboard focus is indicated by displaying the window frame of the keyboard focused window in thicker lines than the other windows, while the speech focus is indicated by changing the color of the title bar of the focused window from that of the other window.

Figure 25A:
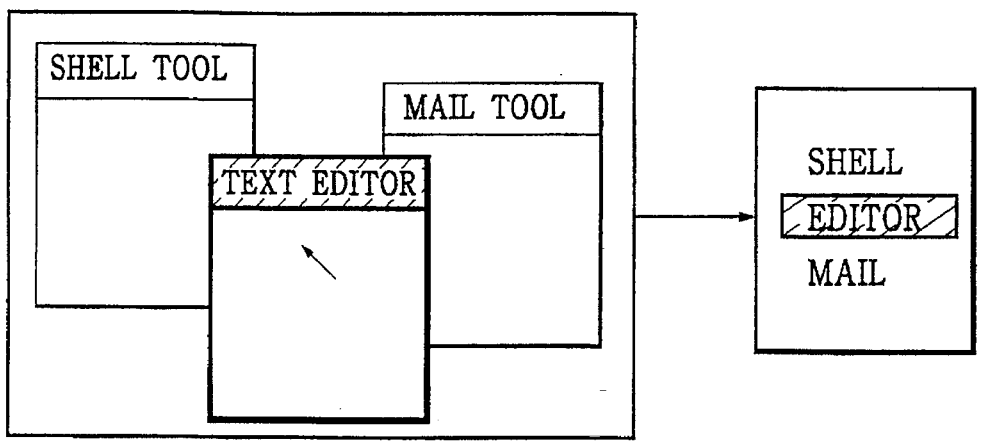
FIGS. 25A, 25B, and 25C are illustrations of three exemplary screen displays in a fourth embodiment of a speech recognition interface system according to the present invention.
Figure 25B:
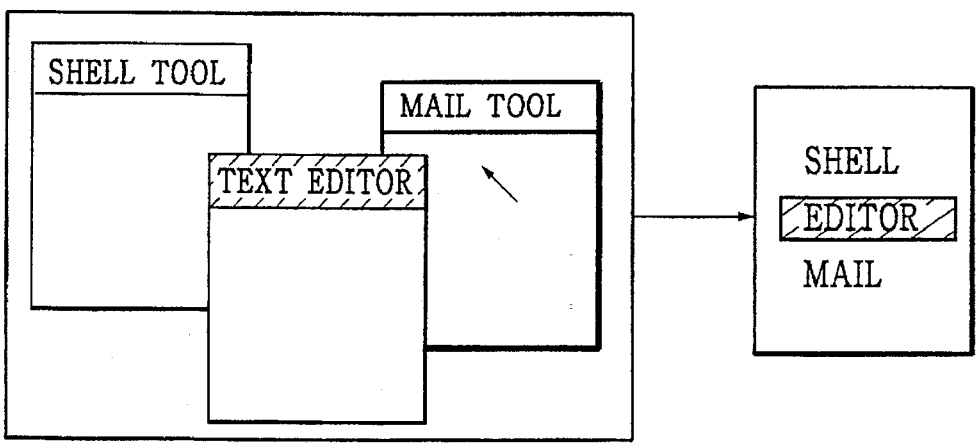
Figure 25C:
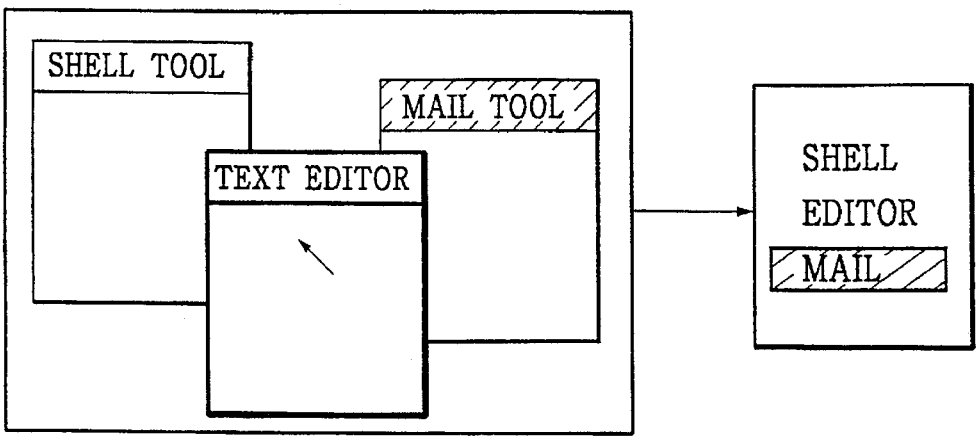

FIGS. 25A, 25B, and 25C show an exemplary case in which the input focus is divided into the independent speech and keyboard focuses, and each of them is shifted independently. In FIG. 25A, both of the speech and keyboard focuses are focused on the text editor. In this state of FIG. 25A, when the mouse pointer is moved to the mail tool window, the keyboard focus is shifted to the mail tool accordingly while the speech focus remained on the text editor, as shown in FIG. 25B. On the other hand, in the state of FIG. 25A, when the speech input of "mail tool" is made, the speech focus is shifted to the mail tool accordingly while the keyboard focus remains on the text editor, as shown in FIG. 25C. In the states of FIG. 25B and 25C, the speech focus and the keyboard focus are focused on different application programs, so that it is possible to control two different application programs simultaneously, by using the respective input means. For example, in the state of FIG. 25C, the user can control the mail tool by using the speech input to read the received electronic mail, while making the text data input by using the keyboard.

In addition, in this fourth embodiment, the application program for controlling the speech focus called the speech focus manager is provided, such that the speech focus can be shifted by means other than the speech input as well. In FIGS. 25A, 25B, and 25C, the small boxes depicted on the right of the window screen display represent this speech focus manager, which communicates with the speech recognition system in order to learn the states of the simultaneously operated application programs, and displays them in a form of a list. For example, the speech focus is indicated by inverting the display of the application program name in the list, and the speech focus can be shifted by specifying a desired application program name in the list by the mouse pointer.

Besides the keyboard and the speech, it is also possible to provide the other input means such as the pen. In such a case of providing a number of input means together, it becomes easier for the user to have the visual information concerning the available input means and the focused application program of each input means. To this end, an icon similar to the speech focus manager described above can be provided for each input means.

Thus, in this fourth embodiment, by dividing the speech input target from the input target of the other input means, it becomes possible to allocate a plurality of input means to a plurality of application programs separately, such that it is possible to support the parallel user operations in a very natural manner.

Figure 26:
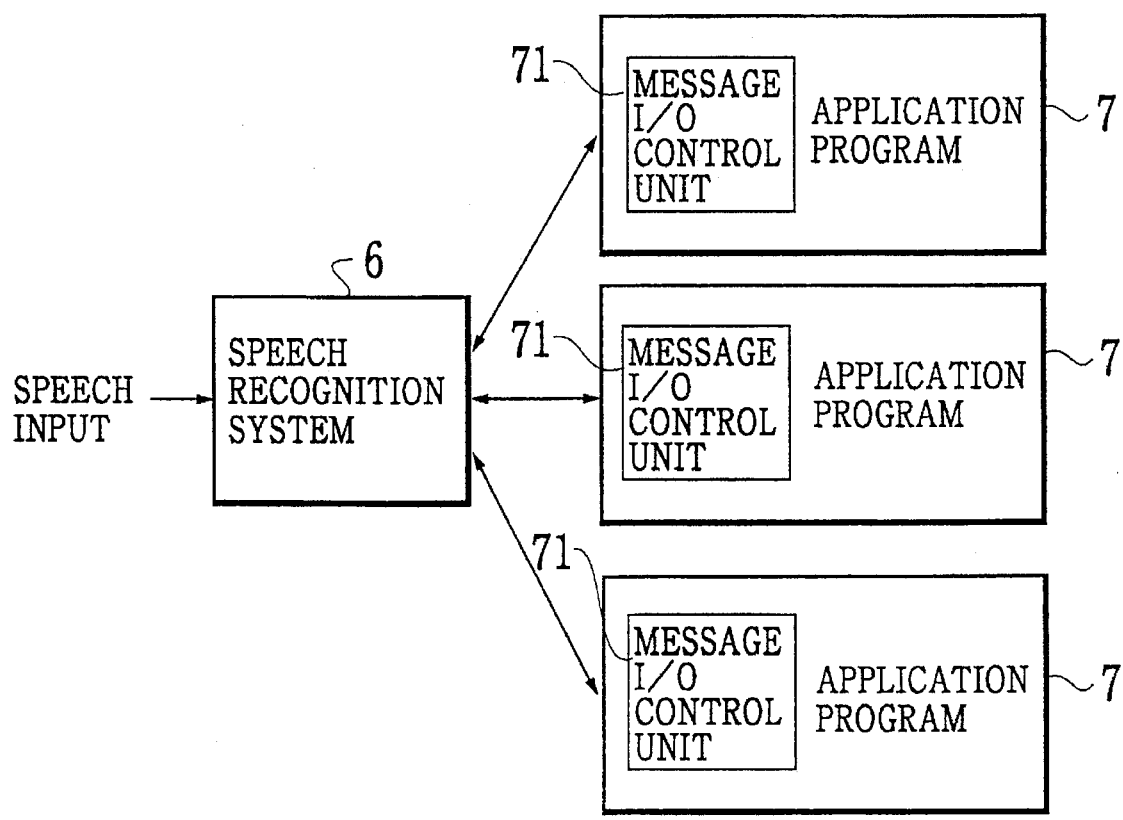
FIG. 26 is a schematic block diagram of a fifth embodiment of a speech recognition interface system according to the present invention.

Referring now to FIG. 26, the fifth embodiment of a speech recognition interface system according to the present invention will be described in detail.

In this fifth embodiment, the system has an overall configuration as shown in FIG. 26, which comprises: a speech recognition system 6 similar to that of the first embodiment described above, for handling the speech input; and a plurality of application programs 7, each of which contains a message I/O (Input/Output) control unit 71.

In this configuration, each application program 7 specifies the recognition vocabulary to the speech recognition system 6, and when the speech input is made, the speech recognition system 6 carries out the speech recognition processing for the input speech by using the specified recognition vocabulary appropriate for the input speech, and transmits the obtained recognition result to the application program 7.

In addition, in this fifth embodiment, the message I/O control unit 71 of each application program 7 determines whether or not to receive the recognition result transmitted from the speech recognition system 6, and makes; the request to the speech recognition system 6 for transmitting the recognition result at a desired timing. Also, the message I/O control unit 71 makes the request to the speech recognition system 6 for executing the speech recognition processing for its application program 7 according to the command from its application program 7, and hands over the received recognition result to its application program 7 or blocks the received recognition result. The message I/O control unit 71 is also capable of changing the recognition vocabulary. Thus, this message I/O control unit 71 differs from the message I/O unit 21 of the application program 2 in the first embodiment in that a part of the functions possessed by the message processing unit 11 of the speech recognition system 1 in the first embodiment is provided in this message I/O control unit 71 on the application program 7 side.

Thus, in this fifth embodiment, as each application program 7 has the message I/O control unit 71 as described above, it becomes possible for each application program 7 to receive or not receive the recognition result for the speech input according to its internal state, without relying on the external control.

For example, in an exemplary case of using this speech recognition interface system of the fifth embodiment in a speech controllable electronic mail system (also referred in short as the speech mail system), when the speech mail system is activated, it is put in a state in which the speech input cannot be made, in order to prevent the erroneous operation due to the speech recognition error. Then, when a new mail is received at the speech mail system, this reception of the new mail is notified to the user by outputting the synthesized speech message of "A new mail is received. Do you want to read it now?", while it requests the speech recognition system 6 to carry out the speech recognition processing by using the recognition vocabulary for confirmation including "Yes" and "No". If the user utters "Yes", according to the recognition result of this input speech, the newly received mail is displayed, or read out in the synthesized speech, whereas if the user utters "No", the speech mail system requests the speech recognition system 6 not to transmit the recognition result to it, and returns to its original state.

Figure 27:
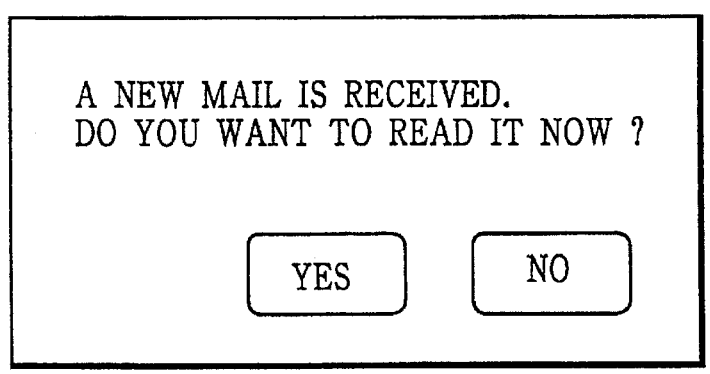
FIG. 27 is an illustration of an exemplary message screen display in the speech recognition interface system of FIG. 26.

Here, instead of using the message in the synthesized speech as described above, the same message can be displayed as shown in FIG. 27, which also contains icon buttons for "Yes" and "No", in order to allow the control operation using the mouse as well.

Also, in the configuration of FIG. 26, the message I/O control unit 71 of one application program 7 may be provided with the function to control the speech input function of the other application programs 7. For example, in the speech mail system, while waiting for the speech input for the confirmation, the speech mail system may temporarily block the speech input to the other application programs 7 capable of handling the speech input, and resumes the speech input to these application programs 7 only after the confirmation for its speech input is obtained.

When the blocking control of the speech input for the other application programs 7 by one application program 7 competes with the similar blocking control by another application program 7, the application program 7 set in the blocking mode at later time can wait for the release of the blocking by the application program 7 set in the blocking mode at earlier time.

In this manner, by providing the task management function in each application program 7 in a form of the message I/O control unit 71 rather than in the speech recognition system 6, it is possible in this fifth embodiment for each application program 7 to utilize the speech input not just in accordance with the control by the speech recognition system 6, but also in accordance with its own internal state.

It is also possible to provide the message I/O control unit 71 having the task management function for all the application programs 7 in only one application program 7, such that whether or not to receive the recognition result at each application program 7, which recognition dictionary is to be used for the speech recognition for each application program, etc. can be controlled from this one application program 7 provided with the message I/O control unit 71.

Figures 28, 29:
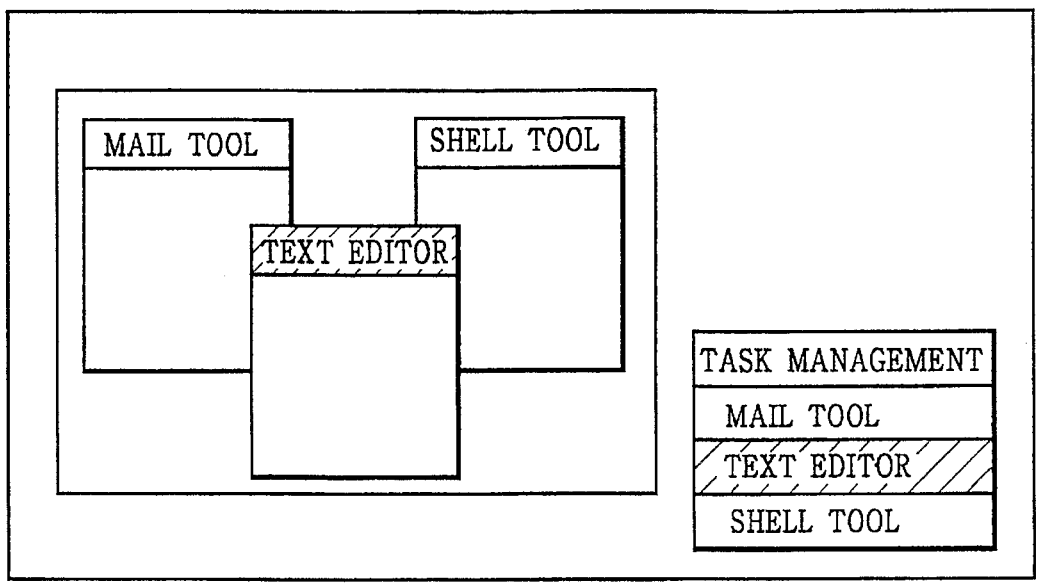
FIG. 28 is an illustration of an exemplary screen display in the speech recognition interface system of FIG. 26.
FIG. 29 is a diagrammatic illustration of a program management table in a sixth embodiment of a speech recognition interface system according to the present invention.

It is also possible to provide the task management program to indicate the current task management state as shown in FIG. 28, which shows an exemplary case of using three application programs of shell tool, text editor, and mail tool under the multi-window environment. In this case, only one of these application programs is capable of utilizing the speech input at any one time. In a case of FIG. 28, the speech input can be utilized by the text editor, and this is indicated by changing the color of the title bar of the window assigned to the text editor, as well as by changing the color of the text editor entry on the displayed window name list in the task management program display. In this task management program, it is also possible to change the speech focus by specifying the desired application program on the task management program display by using the mouse pointer.

Next, the sixth embodiment of a speech recognition interface system according to the present invention will be described in detail.

In the fifth embodiment described above, the speech focus can be focused only on one application program 7 at any one time. In contrast, in this sixth embodiment, it is made possible to set the speech focus on a plurality of application programs 7 simultaneously.

Figure 30:
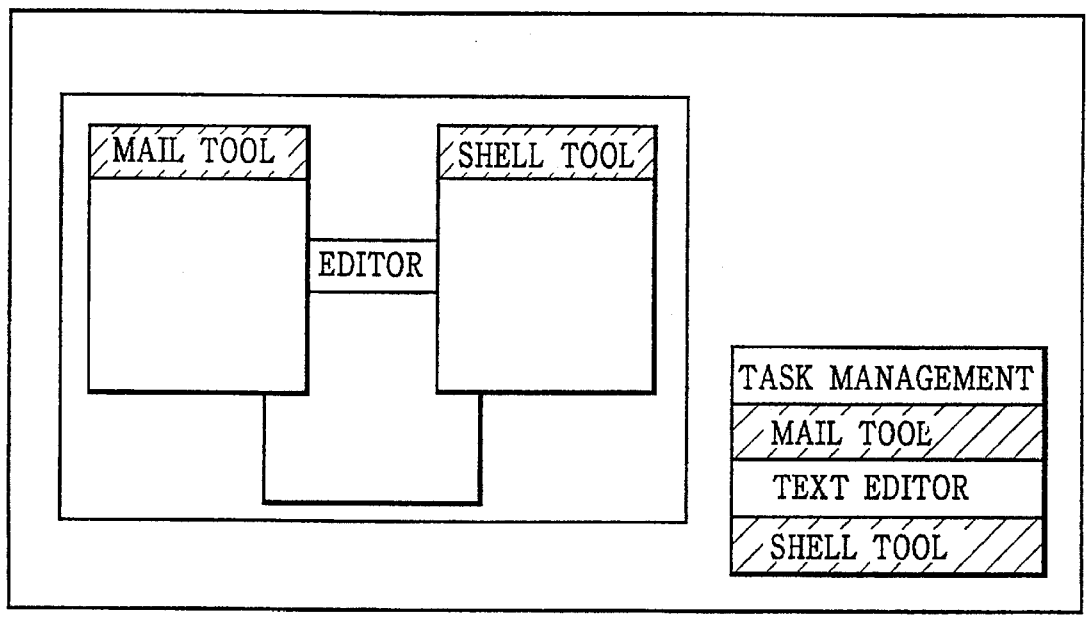
FIG. 30 is an illustration of an exemplary screen display in the speech recognition interface system of the sixth embodiment.

In this sixth embodiment, the speech recognition system 6 has the program management table in a form shown in FIG. 29, which differs from that of the first embodiment shown in FIG. 16B in that more than one speech input flags have the value "1", indicating the presence of the speech focus. The content of this program management table can be changed by the request from the message I/O control unit 71 of each application program 7. In FIG. 29, the speech focus is focused on the shell tool and the mail tool simultaneously. In this state, the screen display appears as shown in FIG. 30.

In this case, the speech recognition system automatically distributes the recognition results according to the recognition vocabulary of each application program registered in the program management table, such that the recognition result for the input speech such as "Process", "Home", etc. is transmitted to the shell tool, while the recognition result for the input speech such as "First", "Next", etc. is transmitted to the mail tool. Also, the recognition result for the input speech "Finish" is transmitted to both of the shell tool and the mail tool, so that both of these application programs can be finished by this single speech input.

Figure 31:
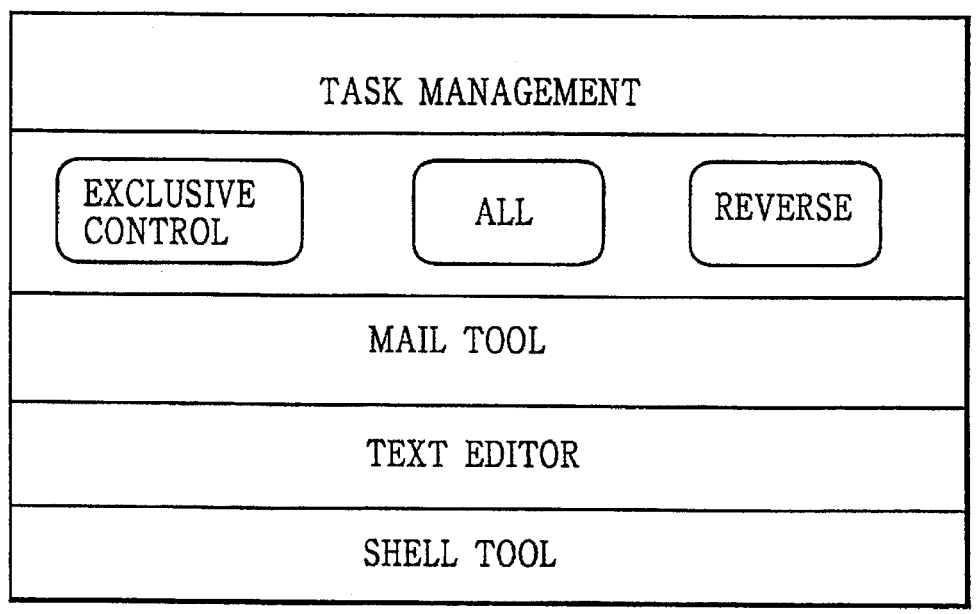
FIG. 31 is an illustration of a task management program display in the speech recognition interface system of the sixth embodiment.

In addition, as the speech focus is focused on a plurality of application programs 7 in this sixth embodiment, the following operation becomes possible. Namely, in this case, the task management program can be extended to provide functions of "Exclusive control", "All", and "Reverse", represented by the icon buttons in the task management program display as shown in FIG. 31. Here, "Exclusive control" is a function to set the speech focus on only one application program 7 at any one time, as in the fifth embodiment, "All" is a function to set the speech focus on all the application programs 7 connected with the speech recognition system 6, and "Reverse" is a function to move the speech focus to the speech unfocused application programs. For example, when this "Reverse" function is executed while the speech focus is focused on the shell tool and the mail tool, the speech focus is shifted to the text editor. When this "Reverse" function is executed again, the speech focus returns to the shell tool and the mail tool. These "Exclusive control", "All", and "Reverse" functions can be controlled by the pointing device such as the mouse, as well by the other input means such as the speech and the keyboard. For instance, the speech input can be made while pressing a particular key on the keyboard.

When the speech input is made while pressing "All" button, all the application programs 7 becomes the speech input target, whereas when the speech input is made while pressing "Reverse" button, the speech input target is moved to the speech unfocused application programs. When the pressed button is released, the original state is restored.

In this sixth embodiment, it is possible to carry out the appropriate processing for the speech input, without specifying a particular speech input target. This is quite desirable in view of the multi-window environment such as that realized in the workstation, in which the human user is basically working with a single computer even when a plurality of speech controllable application programs 7 are operated thereon, so that it is rather natural for the human user to expect the computer to execute the appropriate processing for the speech input automatically without requiring a special operation such as a task switching. Thus, in this sixth embodiment, the property of the speech media can be fully exploited.

Next, the seventh embodiment of a speech recognition interface system according to the present invention will be described in detail.

In the sixth embodiment described above, the recognition vocabulary of each application program 7 is not manifest. In view of this inconvenience, in this seventh embodiment, the recognition vocabulary of each application program 7 is displayed by the task management program or the application program dedicated to this function, in a form shown in FIG. 32 for example. This display of the recognition vocabulary can be realized by requesting the speech recognition system 6 to provide the information registered in the program management table, from the task management program or the dedicated application program.

By automatically displaying the recognition vocabulary of the application program 7 focused by the speech focus, it becomes unnecessary for the user to memorize all the words contained in the recognition vocabulary for each application program 7 that can be used for the speech input, so that the burden on the user can be reduced. In addition, by providing this function in the task management program, it becomes unnecessary for the programmer of each application program 7 to incorporate the function to display its own recognition vocabulary in the application program 7 itself, so that the burden on the programmer of the application program 7 can also be reduced.

Moreover, this display of the recognition vocabulary can be combined with the display of the speech focus state of each application program, in a form shown in FIG. 33, in which the color of the window name and the recognition vocabulary for the speech focused application programs (the mail tool and the shell tool) is changed from that for the speech unfocused application program (the text editor) in the task management program display.

Next, the eighth embodiment of a speech recognition interface system according to the present invention will be described in detail.

In this eighth embodiment, the control of a plurality of application programs 7 is realized without using the screen display and the pointing device used in the above embodiments. For example, in a case the user is controlling a VTR control program capable of making the video recording reservation by the speech, from a telephone, the speech mail program can temporarily interrupt the processing of the VTR control program, and notifies the user about the receiving of an emergency mail by outputting the synthesized speech of "An emergency mail is received. Do you want to check it?". When the user wishes to check this emergency mail, the speech mail program can read out this emergency mail in the synthesized speech.

When this interruption by the speech mail program is over, the processing of the video recording reservation by the VTR control program can be resumed. Here, it is desirable for the VTR control program to provide the function to urge the confirmation of the reservation content made before the interruption, using the synthesized speech output of "Reservation content confirmation" for example.

In addition, in a case of controlling from a telephone, apart from the input by the speech utterances, the supplementary input means such as the push buttons of the telephone can also be utilized. For example, while making the speech input, the push button input can be substituted for the speech input to guarantee the accurate input whenever the surrounding noise temporarily becomes so large as to affect the speech input, without giving up the advantage of the property of the speech input altogether.

Figure 34:
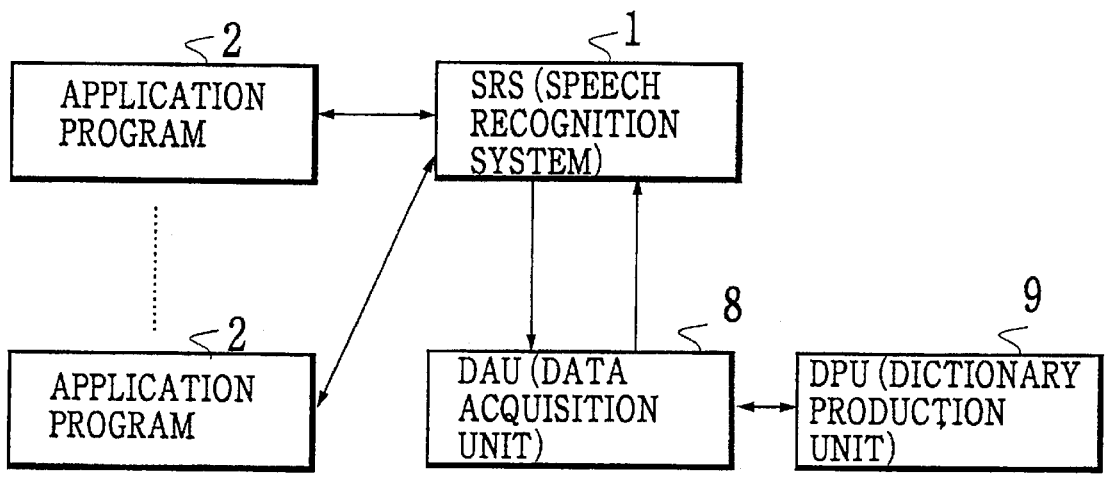
FIG. 34 is a schematic block diagram of a ninth embodiment of a speech recognition interface system according to the present invention.

Referring now to FIG. 34, the ninth embodiment of a speech recognition interface system according to the present invention, which concerns with the learning of the recognition vocabulary, will be described in detail.

Conventionally, the learning of the recognition vocabulary has been carried out as the user selects a desired vocabulary to be leaned from a list of possible learning vocabularies. However, in this scheme, when a large number of vocabularies are involved, it becomes quite time consuming to search out the desired vocabulary from the list, so that it has not been amply convenient to use for the user. For example, in the learning program in the commercially available speech recognition device for the workstation, all the recognition vocabularies that are used in the various application programs are displayed together, so that it has been necessary for the user to select the desired vocabulary to be learned from the list containing several hundreds words.

In view of this conventional situation, in this ninth embodiment, the selection of the desired vocabulary by the user is made easier by utilizing the recognition vocabulary information obtained from each application program in reducing a number of words in the vocabulary list to be presented to the user at a time of leaning. In addition, in this ninth embodiment, it is made possible to carry out the learning even while the application program is in use.

In this ninth embodiment, the system has an overall configuration as shown in FIG. 34, which comprises a speech recognition system (SRS) 1 and a plurality of application programs 2 similar to those used in the first embodiment described above, a data acquisition unit (DAU) 8 connected with the speech recognition system 1, and a dictionary production unit (DPU) 9 connected with the data acquisition unit 8.

The data acquisition unit 8 receives the recognition vocabularies of the application programs 2 by exchanging messages with the speech recognition system 1, and displays the obtained recognition vocabularies such that the user can select the desired recognition vocabulary on the display. In addition, the data acquisition unit 8 requests the setting necessary for the learning such as the output of the learning data to the speech recognition system 1, and stores the received data in forms of files.

The dictionary production unit 9 carries out the production of the recognition dictionary by using the files stored by the data acquisition unit 8 as the input as described below.

Also, in this ninth embodiment, the speech recognition system 1 is capable of operating in two operation modes including: a usual recognition mode in which the speech recognition is carried out and the obtained recognition result is transmitted to the application programs 2; and a learning mode to achieve the learning data acquisition in which the word speech feature data obtained by carrying out the speech analysis on the learning speech inputs are transmitted to the data acquisition unit 8.

Figure 35:
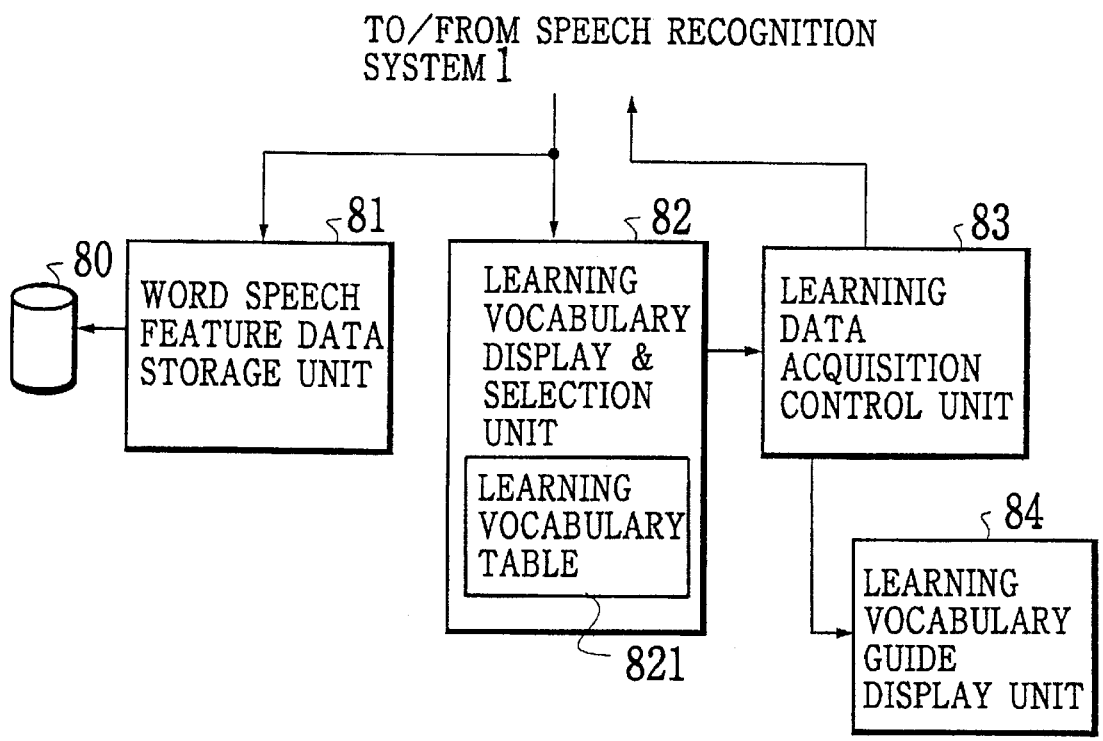
FIG. 35 is a block diagram of a data acquisition unit in the speech recognition interface system of FIG. 34.

In further detail, as shown in FIG. 35, the data acquisition unit 8 further comprises: a word speech feature data storage unit 81 connected with the speech recognition unit 1 and a wordspeech feature data file 80, a learning vocabulary display and selection unit 82 connected with the speech recognition unit 1, a learning data acquisition control unit 83 connected with the speech recognition unit 1 and the learning vocabulary display and selection unit 82, and a learning vocabulary guide display unit 84 connected with the learning data acquisition control unit 83.

The word speech feature data storage unit 81 stores the word speech feature data of the learning speech inputs obtained and transmitted by the speech recognition system 1 in the learning mode, into the word speech feature data file 80 made of a storage medium such as a magnetic disk.

The learning vocabulary display and selection unit 82 displays the vocabulary list to the user and allow the user to make the selection of the desired learning vocabulary, and includes a learning vocabulary table 821 for memorizing the recognition vocabulary of each application program 2 transmitted from the speech recognition system 1. Here, for example, the recognition vocabulary representing the commands used in the text editor can includes words such as "Cancel", "Cut", "Copy", "Paste", and "Font". which are displayed in a form of a list, such that the user can select the desired vocabulary to be learned while using that application program 2 itself. Here, the words to be displayed in the vocabulary list are only those words which are the recognition vocabulary required according to the internal state of the application program itself, so that a number of displayed words is reduced considerably and therefore the selection of the desired vocabulary becomes easier.

The learning data acquisition control unit 83 controls the data acquisition procedure as a whole, and has a data acquisition command flag for indicating a start or an end of the data acquisition.

The messages to be exchanged between the data acquisition unit 8 and the speech recognition system 1 are summarized in the table shown in FIG. 36.

Referring now to the flow charts of FIGS. 37 and 38, the procedure of the learning data acquisition in this ninth embodiment will be described in detail.

Namely, the operation of the speech recognition system 1 in the learning data acquisition procedure is carried out according to the flow chart of FIG. 37, as follows.

First at the step 3101, before the learning is started, the recognition vocabularies of the application programs 2 are set up in the speech recognition system 1 by the appropriate message exchanges.

Then, when the learning mode set up request (M21) is received from the data acquisition unit 8 at the step S3102, the learning mode is set up at the step S3103. At this point, the speech recognition system 1 also carried out the set up operations required for the learning such as the fixing of the speech focus so as to maintain the currently set up recognition vocabulary set during the data acquisition, and the stopping of the transmission of the recognition result to the application programs 2 so as not to change the currently set up recognition vocabulary set during the data acquisition.

Next, a list of the recognition vocabulary is transmitted to the data acquisition unit 8 at the step 3104, and either the word speech feature data transmission request (M23) or the learning mode release request (M22) is received from the data acquisition unit 8 at the step 3105.

When the message received at the step 3105 is the word speech feature data transmission request at the step 3106, next at the step 3107, the word speech feature data obtained by carrying out the speech analysis on the learning speech inputs are transmitted to the data acquisition unit 8, whereas when the message received at the step 3105 is the learning mode release request at the step 3106, next at the step 3108, the learning mode is released such that the operation returns to the usual recognition mode.

On the other hand, the operation of the data acquisition unit 8 in the learning data acquisition procedure is carried out according to the flow chart of FIG. 38 as follows.

First, at the step 3200, the data acquisition command flag is set in an OFF state as an initial setting.

When this data acquisition command flag is turned into an ON state by the user, the learning mode set up request (M21) is transmitted to the speech recognition system 1 at the step 3201. Here, the data acquisition command flag can be turned into the ON state by pressing a data acquisition start/end button on a data acquisition window in a form shown in FIG. 39, for example.

Figure 39:
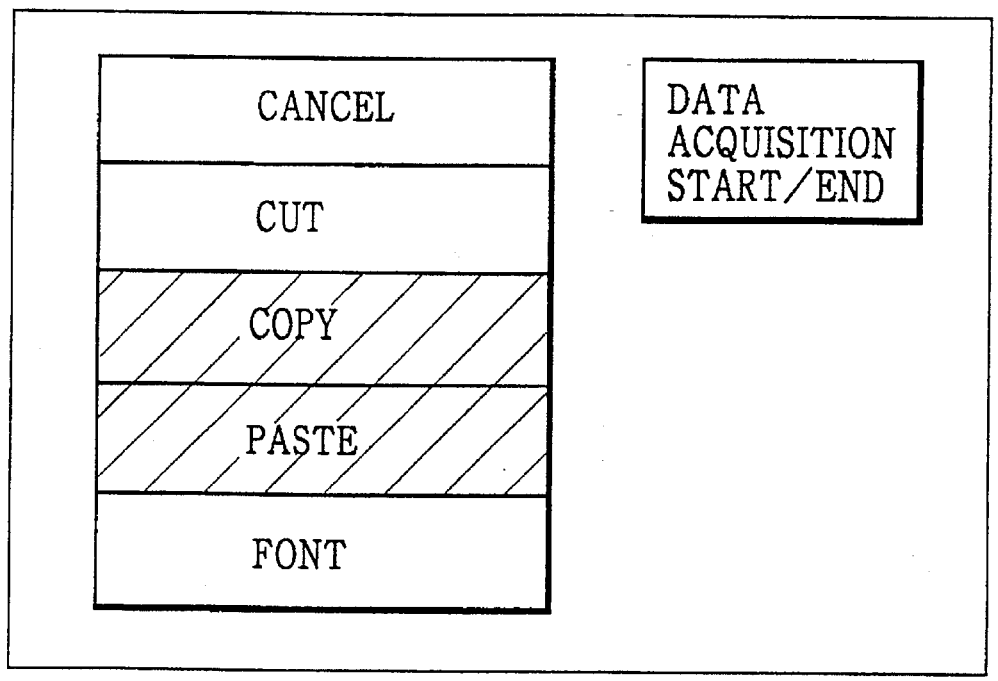
FIG. 39 is an illustration of the learning vocabulary list display in the speech recognition interface system of FIG. 34.

Then, the data acquisition unit 8 requests the currently set up recognition vocabulary to the speech recognition system 1, and the recognition vocabulary received in response is memorized in the learning vocabulary table 821 in the leaning vocabulary display and selection unit 82, such that the recognition vocabulary list in a form of a table shown in FIG. 39 is displayed by the learning vocabulary display and selection unit 82 at the step 3202, and the user makes the selection of the desired vocabulary to be learned by using the mouse on the displayed recognition vocabulary list at the step 3203. Here, the selection can be made for a single word, or a plurality of words, as desired, and the selected words are indicated on the recognition vocabulary list by changing its background color from white to green for example, such that the selected words can be visually recognized easily. FIG. 39 shows a case in which two words of "Copy" and "Paste" are selected as the learning vocabulary.

Figure 40:
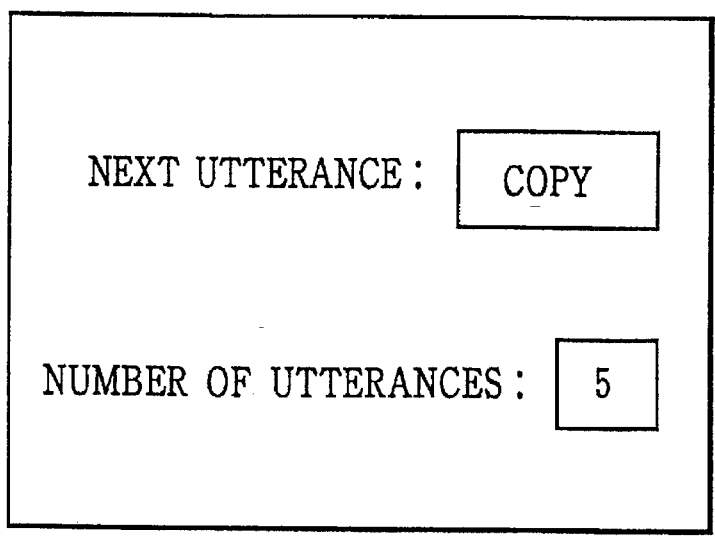
FIG. 40 is an illustration of the learning guide display in the speech recognition interface system of FIG. 34.

Next, the word speech feature data transmission request (M23) is transmitted to the speech recognition system 1 at the step 3204, and the learning guide display in a form shown in FIG. 40 is displayed by the leaning vocabulary guide display unit 84 at the step 3205, so as to urge the user to make the learning speech inputs of a selected word for a required number of times as indicated in the learning guide display. This learning guide display is not absolutely indispensable, so that it may be omitted if desired. Here, in addition to the number of utterances which is displayed as the supplementary information, the selected word to be uttered next may be presented to the user in the synthesized speech. In this manner, the erroneous learning speech input utterance by the user due to the misjudgement of the displayed word in the learning guide display can be reduced.

After the learning speech inputs are uttered by the user, the word speech feature data transmitted from the speech recognition system 1 are outputted to the files at the step 3206, and whether the data acquisition command flag in the learning data acquisition control unit 83 is in the OFF state or not is judged at the step 3207.

When the data acquisition command flag is judged as in the OFF state at the step 3207, next at the step 3208, the learning mode release request (M22) is transmitted to the speech recognition system 1 so as to finish this learning data acquisition procedure. On the other hand, when the data acquisition command flag is judged as in the ON state at the step 3207, the procedure returns to the step 3204 to repeat the operations at the steps 3204 to 3206. Here, the data acquisition command flag can be turned into the OFF state by pressing a data acquisition start/end button on a data acquisition window in a form shown in FIG. 39.

Figure 41:
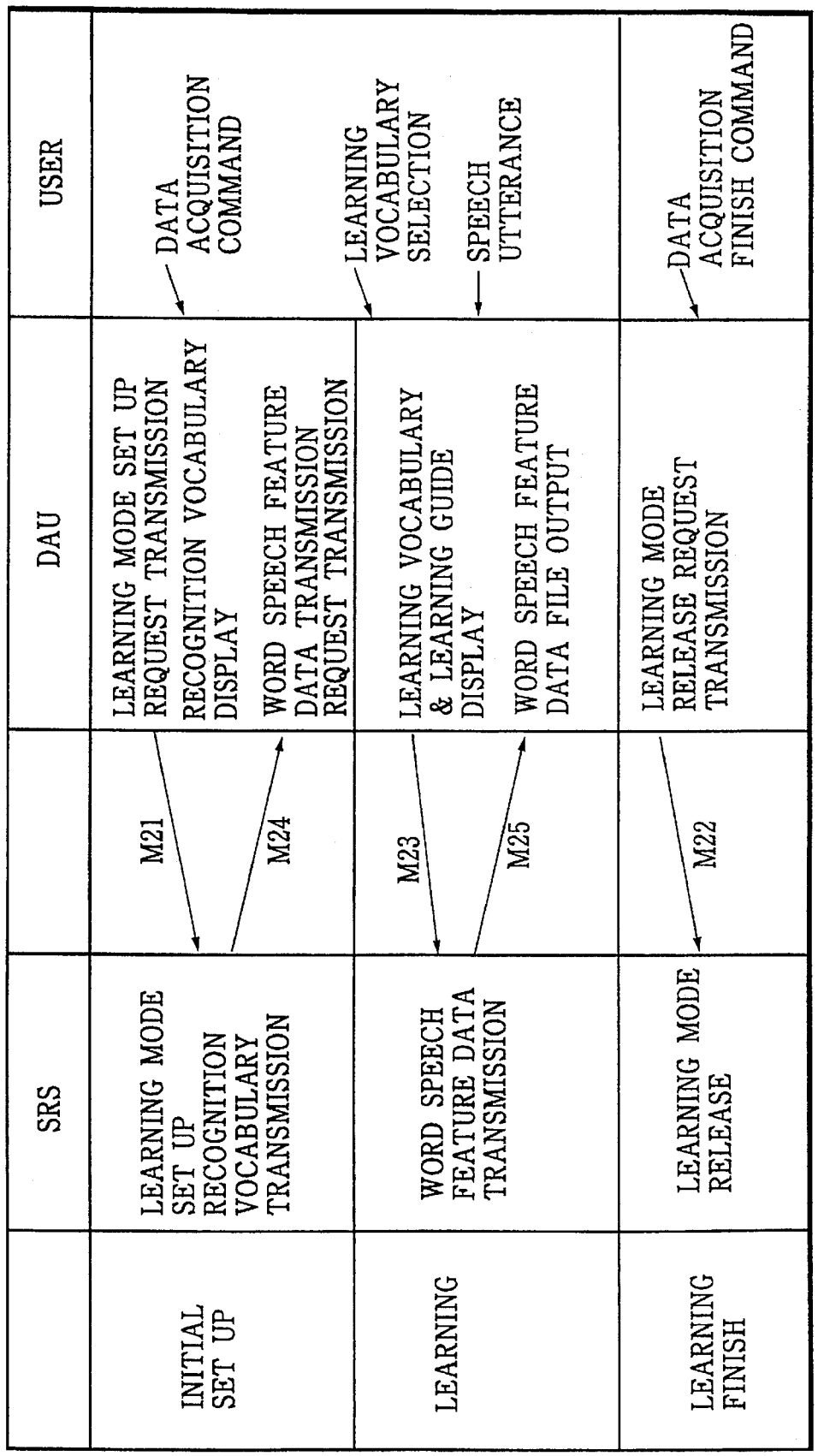
FIG. 41 is a chart showing the operation in the speech recognition interface system of FIG. 34, in the learning data acquisition procedure.

Referring now to FIG. 41, the flow of the operations of this speech recognition interface system of the ninth embodiment as a whole in the learning data acquisition will be described in detail.

First, at the initial set up stage, the data acquisition command is issued by the user, and the learning mode set up request (M21) is transmitted from the data acquisition unit 8 to the speech recognition system 1. In response, the speech recognition system 1 is set into the learning mode and transmits the currently set up recognition vocabulary (M24) to the data acquisition unit 8.

Next, at the learning stage, the data acquisition unit 8 displays the recognition vocabulary list to the user and urges the user to make the selection of the learning vocabulary. When the selection of the learning vocabulary is made by the user, the data acquisition unit 8 transmits the word speech feature data transmission request to the speech recognition system 1, while displaying the selected learning vocabulary and the learning guide display to the user, to urge the user to make the learning speech inputs.

When the learning speech inputs are uttered by the user, the speech recognition system 1 carries out the speech analysis of the uttered learning speech inputs and transmits the obtained word speech feature data (M25) to the data acquisition unit 8. In response, the data acquisition unit 8 outputs the received word speech feature data to the word speech feature data file 80.

Finally, at the learning finish stage, the user issues the data acquisition finish command, in response to which the data acquisition unit transmits the learning mode release request (M22) to the speech recognition system 1, such that the speech recognition system 1 releases the learning mode and the learning data acquisition is finished.

After this learning data acquisition, the user can carry out the recognition dictionary production according to the need. Here, the dictionary production unit 9 carries out the dictionary production by using the data stored in the word speech feature data file 80 in the data acquisition unit 8, and outputs the produced dictionary in a form of a dictionary file.

Thus, in this ninth embodiment, the selection of the learning vocabulary by the user can be made easier, while the learning of the recognition vocabulary can be carried out even while the application program is in use.

Next, the tenth embodiment of a speech recognition interface system according to the present invention, which also concerns with the learning of the recognition vocabulary, will be described in detail.

Conventionally, the pattern matching method utilized in the speech recognition includes the DP matching, HMM, and Multiple Similarity method, all of which carry out the pattern matching by using the recognition dictionary as the reference to be compared. For example, in the Multiple Similarity method requiring the calculations of the eigenvalue and eigenvector for the high precision recognition as disclosed by Y. Takebayashi in "Speech recognition based on the subspace method: AI class-description learning viewpoint", J. Acoust. Soc. Jpn. (E)13, 6, pp. 429–439, 1992, a considerable amount of calculations are required for the dictionary production, and even when the computer with processing power of 20 MIPS which is presently considered as high speed, a considerable amount of time in an order of few seconds to several tens of seconds per word becomes necessary, so that the waiting time due to the dictionary production required in a conventional speech recognition interface system can be a significant inconvenience for the user.

In view of this situation, in this tenth embodiment, the time consuming dictionary production is carried out in the background, during the data acquisition or the execution of the other application program, such that there is no need for the user to wait for the completion of the dictionary production and therefore the system can be a more convenient system to use.

To this end, in this tenth embodiment, the dictionary production unit 9 in the overall configuration shown in FIG. 34 described above has a detail configuration as shown in FIG. 42, which comprises a dictionary production management unit 91 for managing the dictionary production to be carried out in the dictionary production unit 9, a dictionary production control unit 92 for controlling the dictionary production operation in the dictionary production unit 9, a data input unit 93 for inputting data necessary in the dictionary production operation from a word speech feature data file 80 obtained by the data acquisition unit 8 of the ninth embodiment described above, a dictionary production operation unit 94 for carrying out the dictionary production operation, and a file output unit 95 for outputting the dictionary obtained by the dictionary production operation to a dictionary file 97.

The dictionary production management unit 91 receives the message for requesting the dictionary production from the data acquisition unit 8. In response to this message, the dictionary production management unit 91 commands the dictionary production control unit 92 to produce the recognition dictionary for the requested recognition vocabulary, and after the dictionary production is completed, notifies this act to the data acquisition unit 8 by a message indicating the completion of the dictionary production.

Here, the dictionary production management unit 91 has a dictionary production management table as shown in FIG. 43 in which the dictionary production requests are registered in an order of the requested date and time, in order to carry out the dictionary production even in a case there are more than one dictionary production requests. FIG. 43 shows an exemplary content of the dictionary production management table in which the three dictionary production requests for the words "Copy", "Paste", and "Cut" are received in this order. The conditions such as the recognition vocabulary to which each word is to be contained are also registered along with the date and time on this dictionary production management table. The dictionary production is carried out in an order of this order, and those requests for which the requested dictionaries have been produced are deleted from this dictionary production management table.

Here, instead of making the dictionary production request by simply specifying the vocabulary as described above, it is also possible to make the dictionary production request by specifying the other information registered in the word speech feature data as attributes. For example, a request for producing a dictionary for a specific speaker can be made by specifying the name of the speaker (user) as shown in FIG. 44, or a request for producing a dictionary with data obtained after a specified time can be made by specifying the date as shown in FIG. 45.

The dictionary production management unit 91 communicates with the dictionary production control unit 92 by means of the message exchanges.

Referring now to the flow charts of FIGS. 46 and 47, the procedure of the dictionary production in this tenth embodiment will be described in detail.

Figures 45, 46:
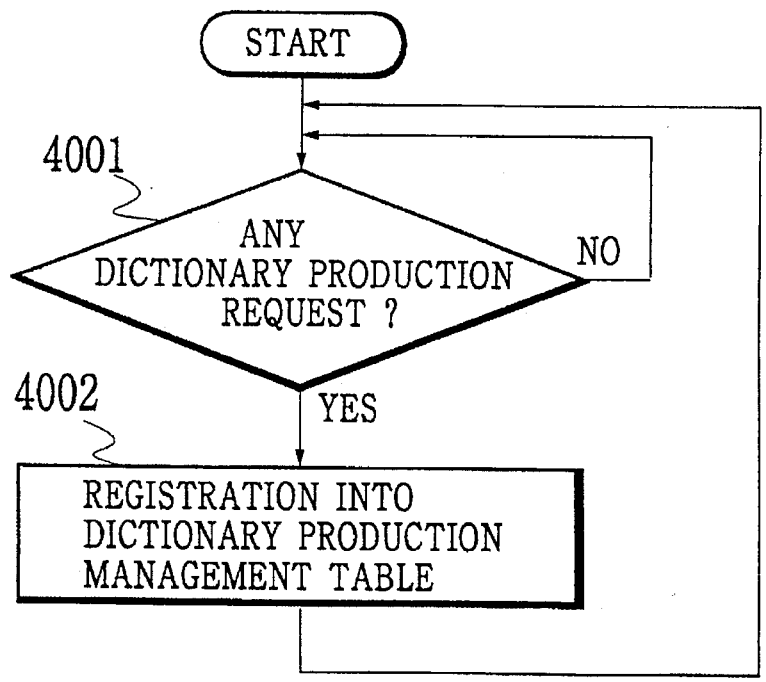
FIG. 45 is a diagrammatic illustration of another form of a dictionary production management table in the speech recognition interface system of FIG. 42.
FIG. 46 is a flow chart for a procedure of dictionary production management table registration in the speech recognition interface system of FIG. 42.

FIG. 46 shows a flow chart for the procedure of the registration into the dictionary production management table.

First, at the step 4001, whether there is any dictionary production request or not is judged. If there is no dictionary production request, this step 4001 is repeated to wait for an arrival of a new dictionary production request.

Otherwise, next at the step 4002, the requested conditions such as the vocabulary, the user name, etc. are registered into the dictionary production management table, and the procedure returns to the step 4001.

On the other hand, FIG. 47 shows a flow chart for the procedure of the dictionary production operation.

First, at the step 4101, the dictionary production requests registered on the dictionary production management table are searched. When there is no registered dictionary production request, this step 4101 is repeated to wait for an arrival of a new dictionary production request.

Otherwise, the word speech feature data are inputted from the word speech feature data file 80 by the data input unit 93 at the step 4102, and then those word speech feature data which match with the production conditions of the oldest dictionary production request registered in the dictionary production management table are selected from the inputted word speech feature data by the dictionary production operation unit 94 at the step 4103.

Then, using only those word speech feature data selected at the step 4103, the dictionary production operations carried out by the dictionary production operation unit 94 at the step 4104, and the dictionary obtained by this dictionary production operation is outputted to the dictionary file 97 from the file output unit 95 at the step 4105.

Finally, the dictionary production request for which the dictionary production has been completed is deleted from the dictionary production management table at the step 4106, and the procedure returns to the step 4101.

Figure 48A:
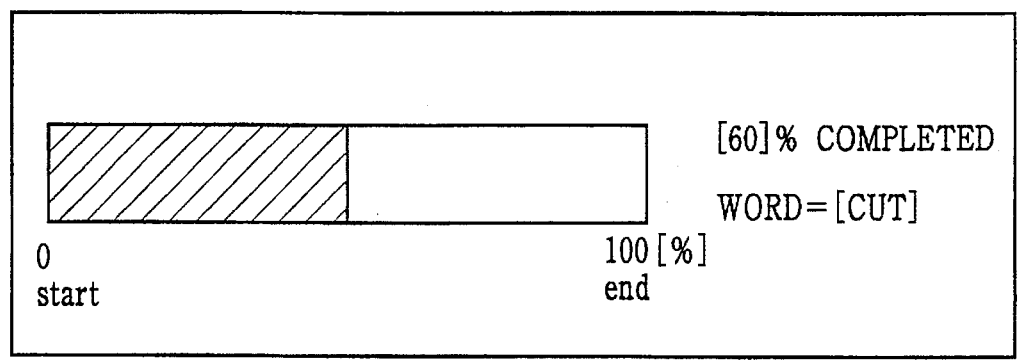
FIGS. 48A and 48B are illustration of two exemplary dictionary production progress indication displays in the speech recognition interface system of FIG. 42.
Figure 48B:
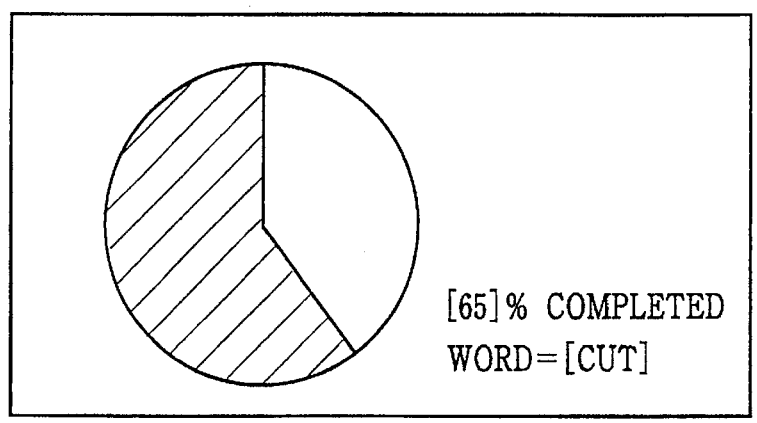
Figure 49:
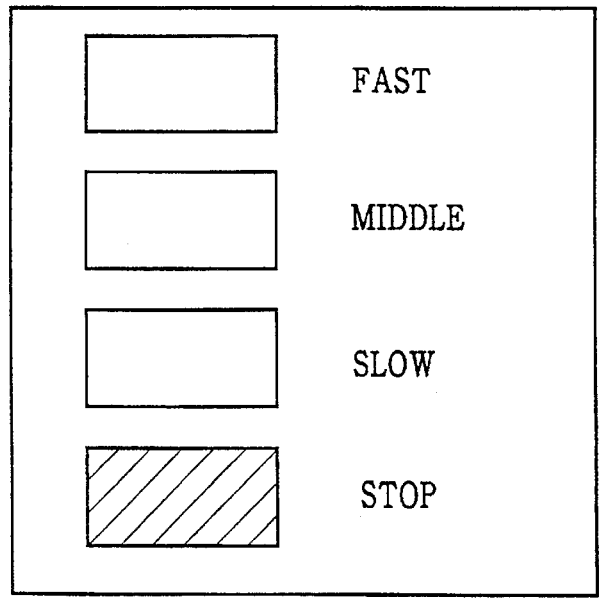
FIG. 49 is an illustration of an exemplary dictionary production processing speed indication display in the speech recognition interface system of FIG. 42.

In this tenth embodiment, the above described dictionary production is carried out at the background of the other operation such as the learning data acquisition, so that it is hard to comprehend the progress of the dictionary production. In this regard, the user's comprehension of the progress of the dictionary production can be assisted by providing an indication of a rate of the completed processing amount with respect to the total processing amount for the dictionary production, in a form such as that shown FIG. 48A or FIG. 48B. Here, at the start and the end of the dictionary production, the user may be notified by the beep sounds. Also, the user's comprehension of the progress of the dictionary production can be further assisted by providing an indication of a speed of the dictionary production processing, in a form shown in FIG. 49 in which the processing speed is indicated as one of four levels, or a form shown in FIGS. 50A and 50B in which the four levels of the processing speed are expressed by different colors as indicated in FIG. 50B and the processing speed is indicated by the color as indicated in FIG. 50A. In such a speed indication, the "stop" indication can indicate the dictionary production processing is in stagnation due to the excessive load on the computer, so as to urge the user to distribute the current load on the computer.

Thus, in this tenth embodiment, the waiting time in the speech recognition interface system can be reduced by carrying out the time consuming dictionary production on the background of the other time consuming operation such as the learning data acquisition, so as to make the system to be more convenient to use.

It is to be noted that the dictionary production described above can be operated as the independent process, and the dictionary production request can be received not only from the data acquisition unit 8 but also from the speech recognition system 1 or the other application programs 2, and the dictionary production can be carried out not just during the learning data acquisition, but also at any desired time during the system operations.

Next, the eleventh embodiment of a speech recognition interface system according to the present invention, which also concerns with the learning of the recognition vocabulary, will be described in detail.

Conventionally, in the speech recognition scheme to carry out the recognition in units of words or sentences, the recognition has been achieved by detecting the word boundary by using the feature parameter such as the speech power change, the speech pitch change, or the zero-crossing number, and making a matching of this speech feature vector with a recognition dictionary for the recognition vocabulary set. However, in the practical working environment, it is not so infrequent to detect the erroneous word boundaries due to the background noise or the careless unintentional utterance (such as the conversation with the other user or the soliloquy) by the user. For this reason, it has been required for the user of the conventional speech recognition interface system to be aware of what is the current recognition vocabulary and to try not to utter the words not belonging to the current recognition vocabulary as much as possible.

On the other hand, in a case of using the speech input as the input means to be utilized along with the usual input means such as the keyboard and mouse, the user is likely to selectively use the appropriate input means according to what is going to be inputted as well as the current operation state.

In view of these considerations, in this eleventh embodiment, the speech recognition interface system of the first embodiment is further equipped with a speech recognition automatic stopping unit 10 connected with the speech recognition system 1, as shown in FIG. 51, and the recognition processing is carried out in two modes of a usual recognition processing mode to carry out the normal recognition processing with all the currently set up recognition vocabulary as the recognition targets, and a special recognition processing mode to carry out the recognition processing with respect to the particular keywords alone.

In this case, the normal recognition processing is carried out for awhile since the start of the recognition processing, and in a case no speech input has been made during a prescribed period of time since the start of the recognition processing, the recognition vocabulary set up until then is stored and it is switched to the special recognition processing mode in which only the particular keywords such as "recognition start" are designated as the recognition vocabulary set. Thereafter, whenever the speech input of one of the keywords is made, the stored recognition vocabulary set is set up again and the usual recognition processing mode is resumed. Here, the switching of the recognition processing mode can also be made by the change of the speech focus or the commands from the other input means, and notified to the user by using the message or icon display, the beep sound, etc.

In this manner, when it enters into a state in which the user does not use the speech input for awhile, the recognition processing mode is automatically switched and the unexpected task switching or the erroneous operation due to the detection error can be prevented by ignoring the speech input other than the particular keywords.

In addition, the user can make the switching of the recognition processing mode consciously by either uttering the keyword or using the input means other than the speech input.

Here, the above described automatic switching of the recognition processing mode can be realized by using an interval timer mechanism for example. This interval timer mechanism can indicate a time from a present time to a time up in seconds, and at a time of the time up, a time up signal for notifying the time up is generated, The switching of the recognition processing mode is made at a timing at which this time up signal is received by the speech recognition system 1.

Figure 52:
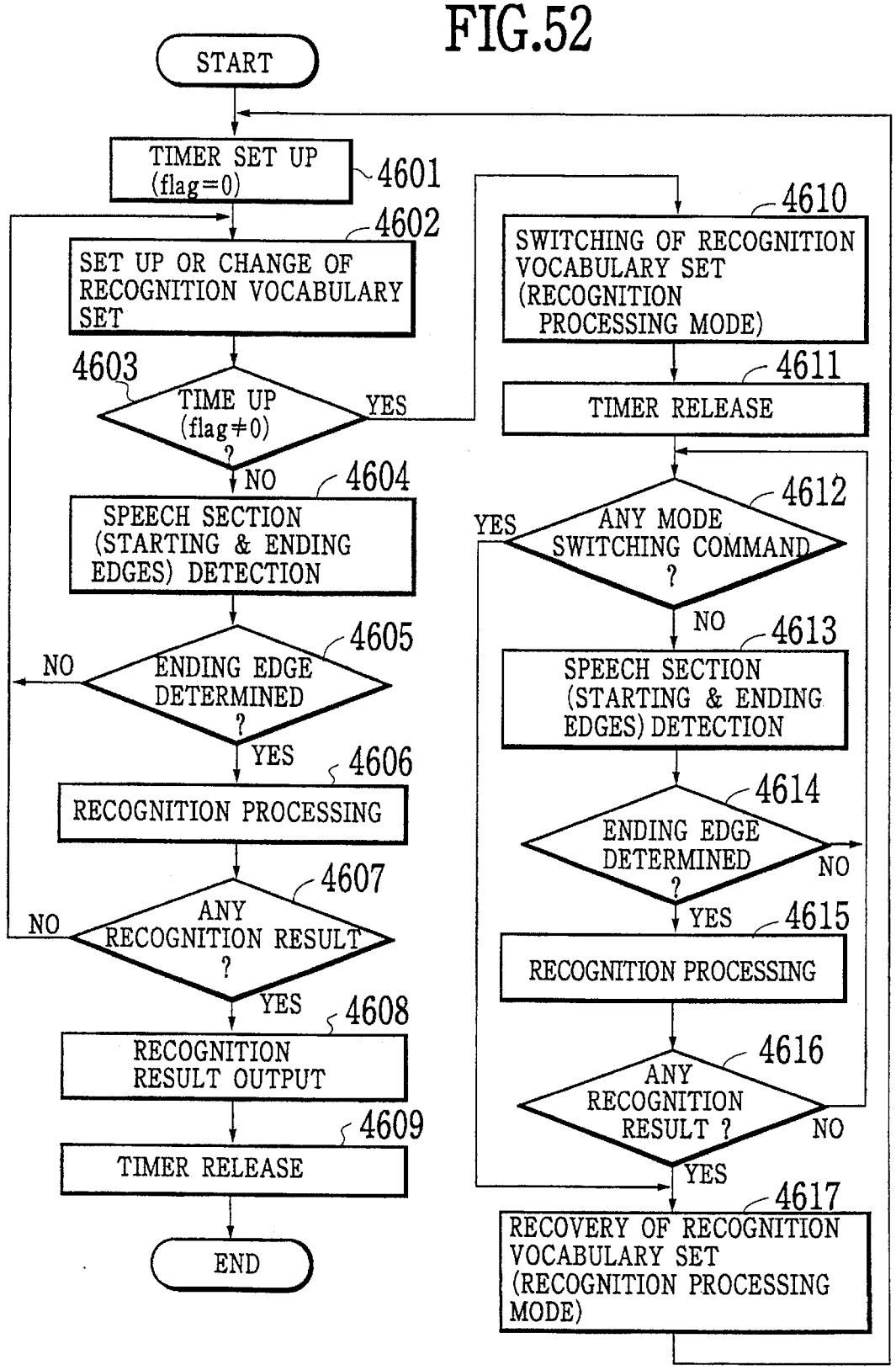
FIG. 52 is a flow chart for a procedure of the operation in the speech recognition interface system of FIG. 51.

Now, the operation in this eleventh embodiment is carried out according to the flow chart of FIG. 52, as follows.

First, a timer provided in the speech recognition automatic stopping unit 10 is set up to indicate the time until the time up in seconds, and a time up flag indicating whether it is the time up or not is set to 0 to indicate that it is not the time up, at the step 4601. This time up flag is going to be set to 1 by a signal handler provided in the speech recognition automatic stopping unit 10 which is called up when the time up signal is received, and its value is checked at a beginning of the recognition processing.

Next, the recognition vocabulary set is set up in the initial stage or changed in the subsequent stage at the step 4602, and whether it is the time up or not is checked at the step 4603 according to whether the time up flag is equal to one or zero.

When it is judged as not the time up at the step 4603, the recognition processing operation for the current recognition vocabulary set is carried out by the following steps 4604 to 4607.

Namely, at the step 4604, the starting and ending edges of the speech section are detected by using the feature parameter such as the speech power change, the speech pitch change, or the zero-crossing number. Then, when the ending edge is judged as determined at the step 4605, the recognition processing is carried out at the step 4606, whereas otherwise the operation returns to the step 4602. At the step 4606, the recognition processing is carried out by extracting the speech feature vector from the speech section determined by the starting and ending edges, making the matching with the recognition dictionary for the current recognition vocabulary set to obtain the similarity of each word in the recognition vocabulary, and determining the word having the maximum similarity which is also greater than a prescribed threshold as the recognition result.

Then, when it is judged at the step 4607 that no recognition result can be obtained by this recognition processing, the operation returns to the step 4602. Otherwise, the obtained recognition result is outputted at the step 4608, and the timer is released at the step 4809 to finish the recognition processing operation.

In a case the operation returns to the step 4802 from either the step 4605 or the step 4607, the recognition vocabulary set can be changed according to the need such as that arising from the occurrence of the speech focus change or the recognition vocabulary change request from the client, and the subsequent steps are carried out for the changed recognition vocabulary set.

On the other hand, when it is judged as the time up at the step 4603, the current recognition vocabulary set is stored and the recognition processing mode is switched to the special recognition processing mode at the next step 4610, and the timer is released once at the step 4611.

Thereafter, whether there is a recognition processing mode switching command from the user is judged at the step 4612, and unless there is a recognition processing mode switching command from the user at the step 4612, the recognition processing operation at the steps 4613 to 4615 is carried out as follows.

Namely, at the step 4613, the starting and ending edges of the speech section are detected by using the feature parameter such as the speech power change, the speech pitch change, or the zero-crossing number. Then, when the ending edge is judged as determined at the step 4614, the recognition processing is carried out at the step 4615, whereas otherwise the operation returns to the step 4612. At the step 4615, the recognition processing is carried out by extracting the speech feature vector from the speech section determined by the starting and ending edges, making the matching with the recognition dictionary for the special recognition vocabulary set to obtain the similarity of each word in the recognition vocabulary, and determining the word having the maximum similarity which is also greater than a prescribed threshold as the recognition result.

Then, when it is judged at the step 4616 that no recognition result can be obtained by this recognition processing, the operation returns to the step 4612.

When there is a recognition processing mode switching command from the user at the step 4612 or it is judged at the step 4616 that one of the keywords in the special recognition processing mode is detected by the recognition processing operation carried out at the steps 4613 to 4615, the recognition vocabulary set stored at the step 4610 is recovered at the step 4617 and the operation returns to the step 4601 to reset the timer.

Thus, in this eleventh embodiment, by means of the speech recognition automatic stopping unit 10, the detection of the erroneous word utterance due to the background noise or the careless unintentional utterance by the user can be prevented, so that the system can be more convenient to use for the user.

In this regard, conventionally, there has been another method for the user to consciously prevent the erroneous operation due to the background noise or the careless unintentional user utterance, by making it possible to make the speech input only while the specific key on the mouse or the keyboard is depressed. However, this conventional method has the drawback that it is quite tedious to operate the mouse or the keyboard every time the speech input is to be made. This method can be modified to avoid such a drawback by making it possible to make the speech input all the time, except when the specific key on the mouse of the keyboard is depressed. This modified method may be incorporated in the eleventh embodiment as described above to improve the operation of the system further.

Figure 53:
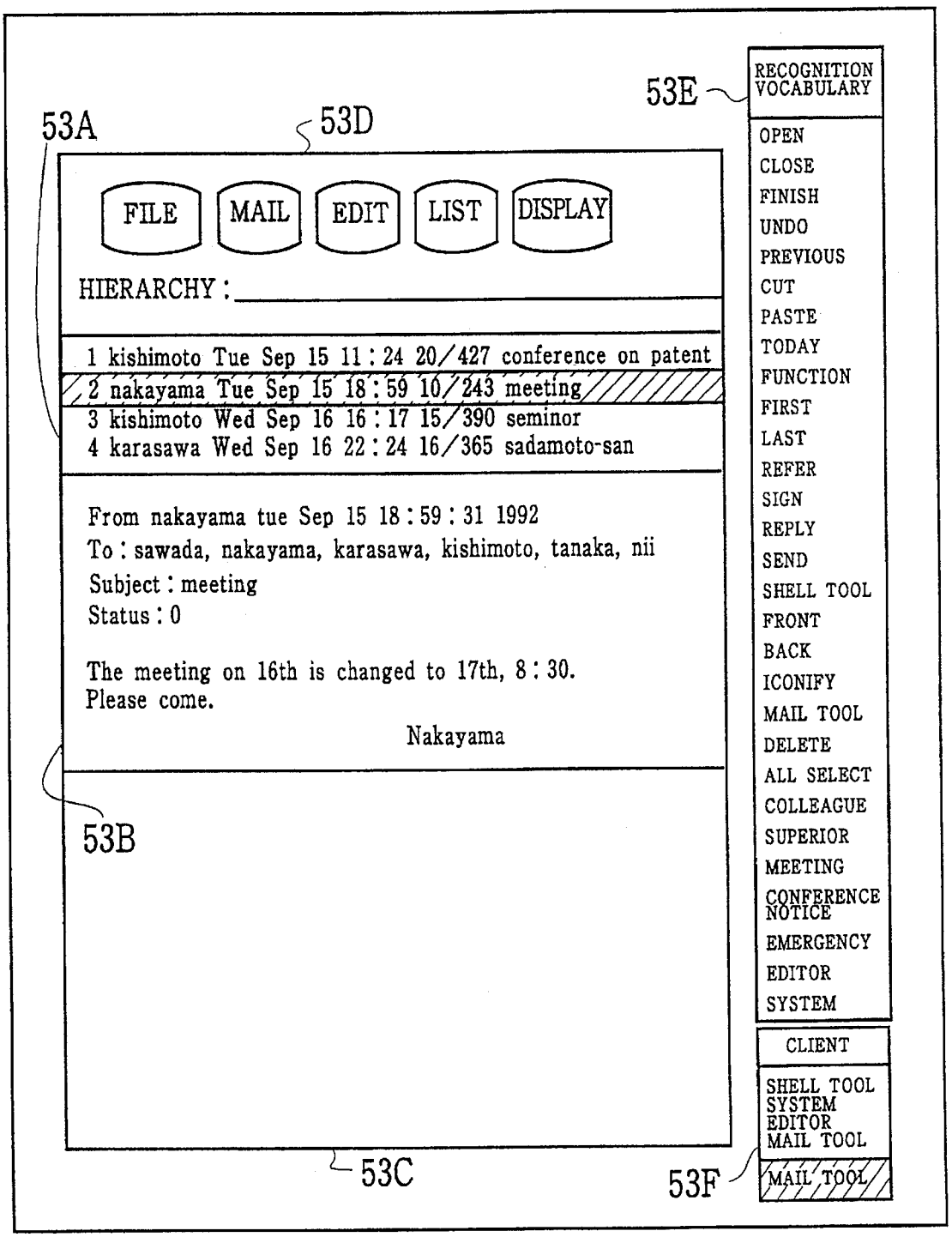
FIG. 53 is an illustration of an exemplary initial speech mail tool display in a twelfth embodiment of a speech recognition interface system according to the present invention.

Referring now to FIG. 53, the twelfth embodiment of a speech recognition interface system according to the present invention, which concerns with the application of the speech recognition interface system to the speech mail tool, will be described in detail.

The speech mail tool is a type of the electronic mail system which is controllable by the speech inputs, such that the list of the received mails can be controlled to check the contents of the received mails or the replies to the received mails can be forwarded, by using the speech input commands.

In this twelfth embodiment, as shown in FIG. 53, the initial display of the speech mail tool includes a list display section 53A, a received mail display section 53B, and a forwarding mail editor section 53C, in which the content of the mail which is displayed in the reversed mode (shaded in FIG. 53) in the list display section 53A is displayed in the received mail display section 53B.

In addition, in the initial display shown in FIG. 53, the display of the speech mail tool further includes a tool status display section 53D for indicating the current status of the speech mail tool, a recognition vocabulary display section 53E for indicating the currently recognizable vocabulary for the speech input, and a speech focus display section 53F for indicating the client to which the speech focus is currently focused, so as to provide as much useful information concerning the current status of the speech mail tool as possible to the user to assist the user's operation of the speech mail tool.

Here, for example, the following control sequence can be realized by using the speech inputs in an exemplary case of forwarding the reply to the emergency mail from the superior.

| SPEECH | ACTION |
| --- | --- |
| "Mail tool" | The entire window of the speech mail tool is displayed over all the other windows. |
| "First" | A list pointer is moved to the first one in the list display section 53A. |
| "Next" | A list pointer is moved to the next one in the list display section 53A. |
| "Last" | A list pointer is moved to the last one in the list display section 53A. |
| "Previous" | A list pointer is moved to the previous one in the list display section 53A. |
| "Superior" | Only those mails received from the superior are selectively shown. |
| "Emergency" | Only those mails designated as the emergency one are selectively shown. |
| "Reply" | A reply to a selected emergency mail from the superior is edited in the forwarding mail editor section 53C. In this case, on the forwarding mail editor section 53C, the following two lines appear automatically. "To : (Superior's name)" "Subject : Re : (Same subject as that of the superior's mail)" |

In this speech mail tool, the list display section 53A cannot display the entire mail list at once, so that in a case of searching the desired mail by using the mouse, it becomes necessary to utilize a scroll bar provided on one side of the list display section 53A for scrolling the displayed mail list. However, when a large number of mails are enlisted on the displayed mail list, this desired mail search can be a quite cumbersome operation to do, so that it cannot be considered as sufficiently convenient for the user. Here, however, by using the speech input for this purpose, the desired mail can be located immediately, so that the considerable improvement in the operation efficient can be achieved.

Thus, in an exemplary case of selecting the emergency mail from the superior, it suffices to utter two speech inputs of "Superior" and "Emergency" in succession. FIG. 54 shows an exemplary display of the speech mail tool when the emergency mail from the superior is selected. In this example of FIG. 54, there are two emergency mails from the superior. In this case, the reply to this superior's mail can be edited in the forwarding mail editor section 53C by the following control sequence.

KEYBOARD
Mr. Sawada (superior's name)

| SPEECH | ACTION |
| --- | --- |
| "Copy" | The message portion of the superior's mail is copied. |
| "Paste" | The copied portion is pasted to the forwarding mail editor section 53C. |
| "Refer" | The reference symbols (>>) are attached to the pasted portion. |

KEYBOARD
Reply message (I apologize for being late. I will submit it today.)
SPEECH
"Sign"   The user's signature is attached at the end.
"Send"   The reply mail is forwarded.

In this twelfth embodiment, the speech inputs such as "Superior" and "Emergency" used in the above example are implemented as the speech macro commands which can narrow down the mail list according to the matching result using the headers or the contents of the mails. Namely, in the electronic mail, the name and affiliation of the sender, the title, the forwarded date, and the message content are written in forms of the text data (character data), so that the speech mail tool understands these text data and carries out the matching of the keyword or the content, in order to facilitate the efficient electronic mail search using the speech inputs and thereby improving the user's convenience considerably.

This function of the speech mail tool can be realized on the workstation by utilizing the available data search technique and context analysis technique such as the full text search, for example.

It is also possible in this speech mail tool to read out any desired part of the text data in the synthesized speech which can be controlled to incorporate the desired emphasis or to change the reading speed.

Figure 55:
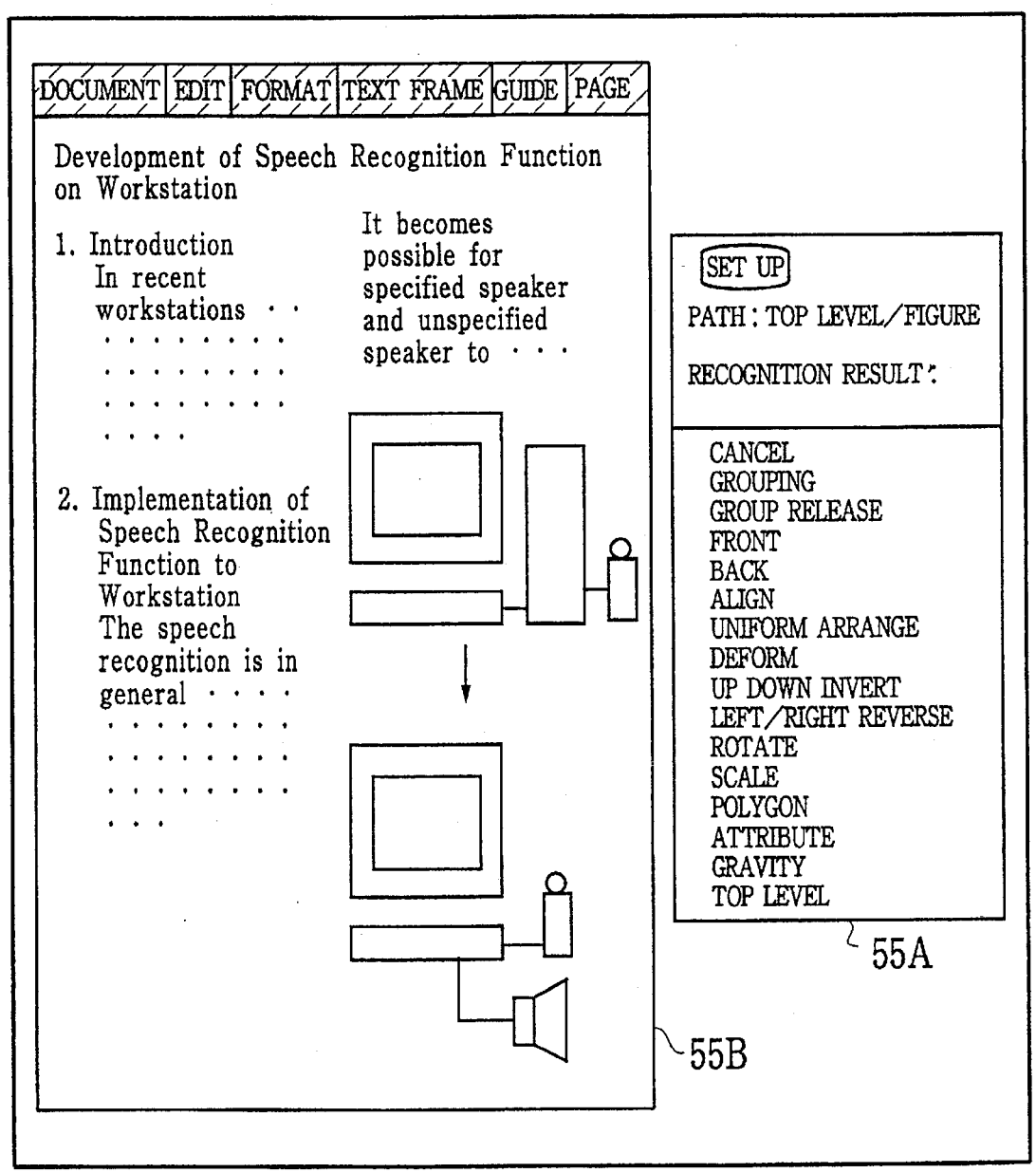
FIG. 55 is an illustration of an exemplary DTP system display in a thirteenth embodiment of a speech recognition interface system according to the present invention.

Referring now to FIG. 55, the thirteenth embodiment of a speech recognition interface system according to the present invention, which concerns with another application of the speech recognition interface system, will be described in detail.

By utilizing the speech recognition interface system according to the present invention as the speech recognition server, it is also possible to realize the control of the other already existing application programs by the speech inputs. This can be achieved by providing the speech macro program as a client of the speech recognition server capable of making the speech inputs in replacement of the keyboard inputs in the already existing application programs. In the following, the speech macro program for speech controlling the DTP (Desk Top Publishing) system as an example of the already existing application programs will be described.

In this case, a speech macro program for the DTP system has recognition vocabularies in menu hierarchy, and narrows down the recognition vocabulary by utilizing the menu hierarchy. Here, the menu is described as follows.

"Figure" Menu
   "Cancel"
   "Grouping"
   "Group release"
   "Front"
   "Back"
   "Up/Down invert"
   "Left/Right reverse"
   "Rotate"
"Top level" Menu
   "Document"
   "Edit"
   "Figure"

Here, the root level of the menu hierarchy is referred as "Top level", and the menu hierarchy can be traced down to execute commands by uttering the appropriate command words, starting from the top level. As the menu hierarchy is descended, the menu items at that menu hierarchy level are presented to the user by displaying them along with the current hierarchy level in the menu hierarchy as the path, in a form of a menu window 55A shown in FIG. 55.

Then, in an exemplary case of handling a plurality of figures present on a document window 55B in FIG. 55, the following control sequence can be carried out.

First, the figure menu is opened from the top level in order to handle the figures, and the following speech command is uttered.

| SPEECH | ACTION |
| --- | --- |
| "Figure" | The menu items are enlisted in the speech commander. |

At this point, a plurality of figures in the document window 55B are selected as the target figures by using the mouse. Then, the following speech commands are uttered.

| SPEECH | ACTION |
| --- | --- |
| "Grouping" | A plurality of figures are grouped in order to treat them together as a single figure. |
| "Up/Down invert" | The grouped figures are inverted up side down. |
| "Rotate" | The grouped figures are rotated. |
| "Group release" | The grouping of a plurality of figures is released. |

Next, one of the grouped figures is selected as a target figure by using the mouse. Then, the following speech commands are uttered.

| SPEECH | ACTION |
| --- | --- |
| "Back" | The selected figure is put at the back of all the other figures. |
| "Cancel" | The action of the previous "Back" command is cancelled. |
| "Front" | The selected figure is put in front of all the other figures. |

Here, in a case of selecting a desired command and executing the selected command by using the mouse, it is necessary for the user to use the following three actions at the very least.

(i) An action to click the mouse button when the mouse pointer is on the menu bar, so as to display the menu.

(ii) An action to pull down the menu and select the desired command item to be executed.

(iii) An action to take the hand off the mouse button in order to execute the command.

Moreover, when the action required for moving the mouse pointer is also taken into consideration, the user is actually required to make a considerably more actions than just these three actions.

In contrast, in a case of doing the same operation by using the speech input, it suffices to make a single action of uttering the word indicating the desired operation, so that the effectiveness of the speech input is quite evident. In particular, in a case of selecting the menu by the mouse, even when the user knows in advance what operation is wished to be done, the above described procedure including at least three actions must be carried out every time. In this regard, the speech input can be used effectively in combination with the other available input means.

It is to be noted here that, when the keyboard macro command is used, the above described operation can also be done in the single action just like the speech input. However, the keyboard macro command is basically defined by a single letter key, so that as a number of keyboard macro commands increases, the user is required to memorize many combinations of the letter keys and the commands whose correspondences become increasingly obscure.

In this regard, according to this thirteenth embodiment, by associating each command with a speech input that can naturally implies the content of the command, it is possible to make each application program to be much more convenient to use for the user.

In addition, at a time of the speech recognition, when there are more than one speech inputs with a partial overlap, such as "Grouping" and "Group release" in the above described "Figure" menu which have the overlapping first half, the recognition precision can be improved by making the recognition processing only for the non-overlapping part, by using the speech recognition method called subabstraction for the overlapping part, as disclosed by Y. Takebayashi, et al. in "Keyword-Spotting in Noisy Continuous Speech using Word Pattern Vector Subabstraction and Noise Immunity Learning", Proceedings of Internaltional Conference on Acoustins, Speech, and Signal Processing (ICASSP) 1992, pp. II-85 to II-88. In short, the recognition precision can be improved by extracting each word pattern from a viewpoint in which the difference between the word patterns become more evident, and making the speech recognition for such an extracted word pattern.

Figure 56:
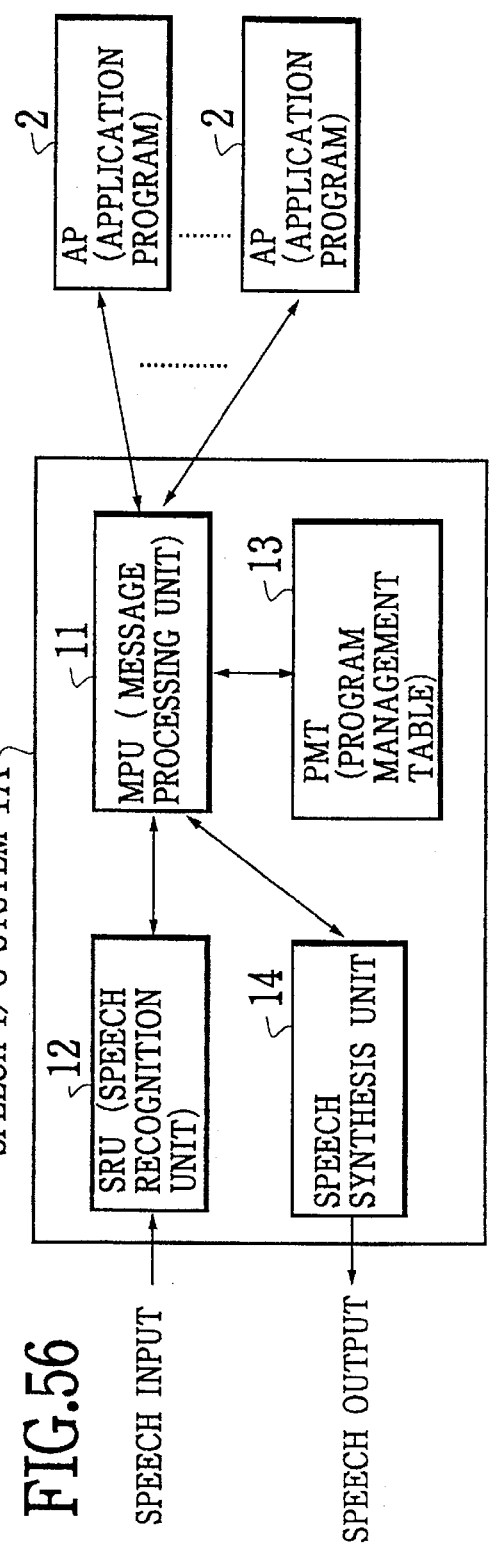
FIG. 56 is a schematic block diagram of a fourteenth embodiment of a speech recognition interface system according to the present invention.

Referring now to FIG. 56, the fourteenth embodiment of a speech recognition interface system which defined a speech input and output interface system according to the present invention will be described in detail.

In the various embodiments of the speech recognition interface system described above, only the speech input aspect of the system has been considered. In this fourteenth embodiment, the system incorporating the speech output function will be described. By means of the speech output function, it becomes possible to realize the speech synthesis from the text data as well as the speech data reproduction, such that the output of the speech messages from the application programs can be provided along with the speech inputs to the application programs and the speech recognition interface system which is easier to handle for the user can be realized.

As shown in FIG. 56, in this fourteenth embodiment, the speech input and output interface system 1A has an overall configuration in which the speech recognition interface system of the first embodiment described above is further equipped with a speech synthesis unit 14 for outputting the speech outputs, which is connected with the message processing unit 11.

Figure 57:
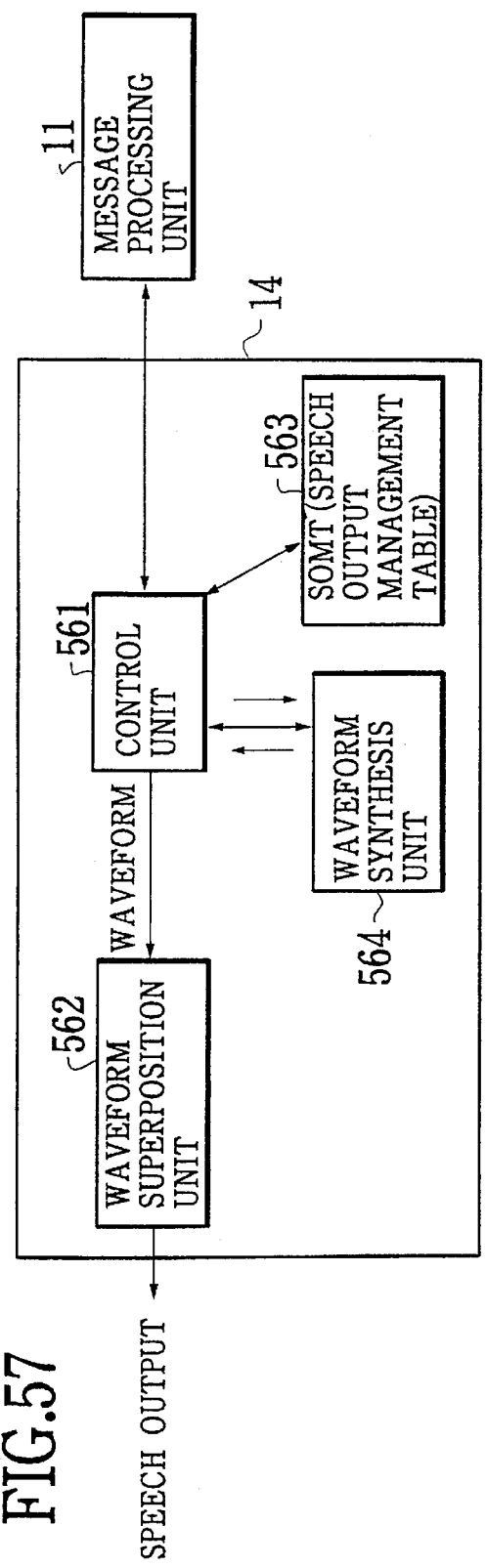
FIG. 57 is a block diagram of a speech synthesis unit in the speech recognition interface system of FIG. 56.

This speech synthesis unit 14 carries out the synthesized speech generation and the speech output for the text data according to the commands from the message processing unit 11, and has a detailed configuration as shown in FIG. 57, which comprises: a control unit 561 for controlling the operation of this speech synthesis unit 14 in accordance with the commands from the message processing unit 11; a waveform superposition unit 562 for obtaining and outputting the speech output; a speech output management table 563 for storing information required in the speech synthesis; and a waveform synthesis unit 564 for carrying out the speech synthesis for the character series specified by the control unit 561.

The control unit 561 receives the speech synthesis request and the character series representing the text data to be outputted in the synthesized speech from the message processing unit 11, transmits the received character series to the waveform synthesis unit 564 to obtain the synthesized speech waveform, and transmits the obtained synthesized speech waveform to the waveform superposition unit 562 to output the speech output for the text data. Here, the speech synthesis unit 14 may also outputs the acoustic signals other than the synthesized speech such as the recorded speech data or non-speech sound data. In a case of using such other acoustic signals, the waveform data received from the message processing unit 11 can be outputted directly, without using the waveform synthesis unit 564.

The waveform synthesis unit 564 carries out the speech synthesis for the character series received from the control unit 561 by using the known speech synthesis method such as that disclosed by D. Klatt in "Review of text-to speech conversion for English", J. Acoust. Soc. Am. 82(3), pp. 737–793, September 1987, or any other known method.

The speech output management table 563 is a table for registering the the speech output requests from the message processing unit 11, where the speech outputs are made in an order in which the corresponding speech output requests are registered in this speech output management table 563, such that a plurality of the speech outputs can be made while maintaining the time-wise coordination.

An example of the speech output management table 563 is shown in FIGS. 58A and 58B, where each entry of this speech output management table 563 corresponding to each speech output request includes a data ID of the data requested to be outputted in speech, a data type indicating whether each data is the text data or the waveform data, a request admission time (registration time) for each request, a synthesized speech text for each text data, a processing state of each request, a presence or an absence of the speech output for each request, a volume of the speech output, a presence or an absence of the output interruption, a synthesis processing priority, and an exclusive processing factor. In this example, the data #1, #2, and #3 are the text data, and the processing has been finished for the data #0 to #2, the data #3 is currently processing, while the data #4 is yet to be processed.

In this fourteenth embodiment, the program management table 13 has a form shown in FIG. 59, which includes the field for the information concerning the speech output for each application program 2 such as the speech output priority, by means of which a plurality of the application programs 2 can control the speech outputs. In this example, the speech output priority field further includes field for a speech output level corresponding to the volume ebtry of FIG. 58B, a speech synthesis processing priority corresponding to the synthesis processing priority entry of FIG. 58B, and a presence or an absence of an interruption processing corresponding to the output interruption entry of FIG. 58B.

The speech synthesis unit 14 can be operated as an independent process, and exchanges data with the message processing unit 11 by the message exchanges using the process communication, just like the message exchanges between the speech recognition system 1 and the application programs 2. Here, the messages to be exchanged among the application programs 2, the message processing unit 11, and the speech synthesis unit 14 are summarized in the table shown in FIG. 60.

The messages from the application programs 2 to the message processing unit 11 include those enumerated in a section (a) of FIG. 60, which are the commands from the application programs 2.

The speech synthesis request is a request for converting the text content into the synthesized speech, which is transmitted along with the text data to be speech synthesized, and in response to which the synthesized speech data are going to be received at the application programs 2.

The waveform reproduction request is a request for straightforwardly reproducing the speech data in a form of the waveform data (i.e., outputting the speech output) that have already been obtained at the application programs 2 by the recording, where this waveform reproduction request is transmitted along with the speech waveform data to be reproduced as the speech output.

The speech synthesis reproduction request is a request for carrying out the speech synthesis and the reproduction altogether, in response to which the synthesized speech data are not going to be received at the application programs 2.

The priority set up request is a request for giving a priority to the speech output for a particular application program 2, where the priority for the speech output can be set according to the speech output level, the speech synthesis processing priority, and the presence or absence of the interruption processing indicated in the program management table 13 shown in FIG. 59. This priority for the speech output can be used effectively by setting it to a higher value in a case of emergency, such that the user's attention can be directed to it immediately.

The speech waveform data request is a request for transmitting the synthesized speech waveform data obtained by the speech synthesis carried out in response the speech synthesis request.

On the other hand, the messages from the message processing unit 11 to the application programs 2 include those enumerated in a section (b) of FIG. 60. The synthesized speech waveform data is the data transmitted to the application programs 2 in response to the speech waveform data request. The speech output state notice is a confirmation message to indicate the processing state of the requested speech output, such as the completion of the speech output. The priority set up notice is a confirmation message to indicate the completion of the set up of the priority for the speech output in response to the priority set up request.

Here, the set up concerning which message is going to be received by each application program 2 can be made by means of the input masks. In this case, as the speech synthesis unit 14 is further incorporated, the input masks to be used are those enumerated in FIG. 61, including the speech output completion notice mask, the priority set up notice mask, and the synthesized speech data notice mask.

The messages from the speech synthesis unit 14 to the message processing unit 11 include those enumerated in a section (c) of FIG. 60, which are similar to the corresponding ones of the messages from the message processing unit 11 to the application programs 2 enumerated in the section (b), while the messages from the message processing unit 11 to the speech synthesis unit 14 include those enumerated in a section (d) of FIG. 60, which are similar to the corresponding ones of the messages from the application programs 2 to the message processing unit 11 enumerated in the section (a).

Also, in addition to those described above, various other messages such as the error messages, the speech output level set up message, or the message to make access to the internal data of the speech synthesis unit 14 can also be provided.

Figures 61, 62:
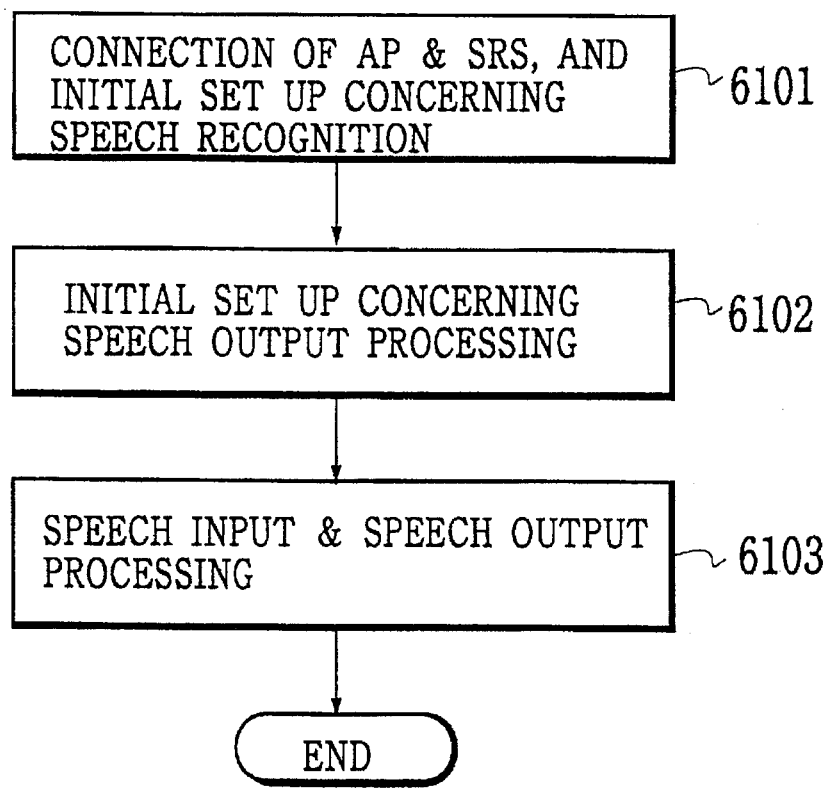
FIG. 61 is a table of input masks used in the speech recognition interface system of FIG. 56.
FIG. 62 is a flow chart for a procedure of the overall operation in the speech recognition interface system of FIG. 56.
Figure 63:
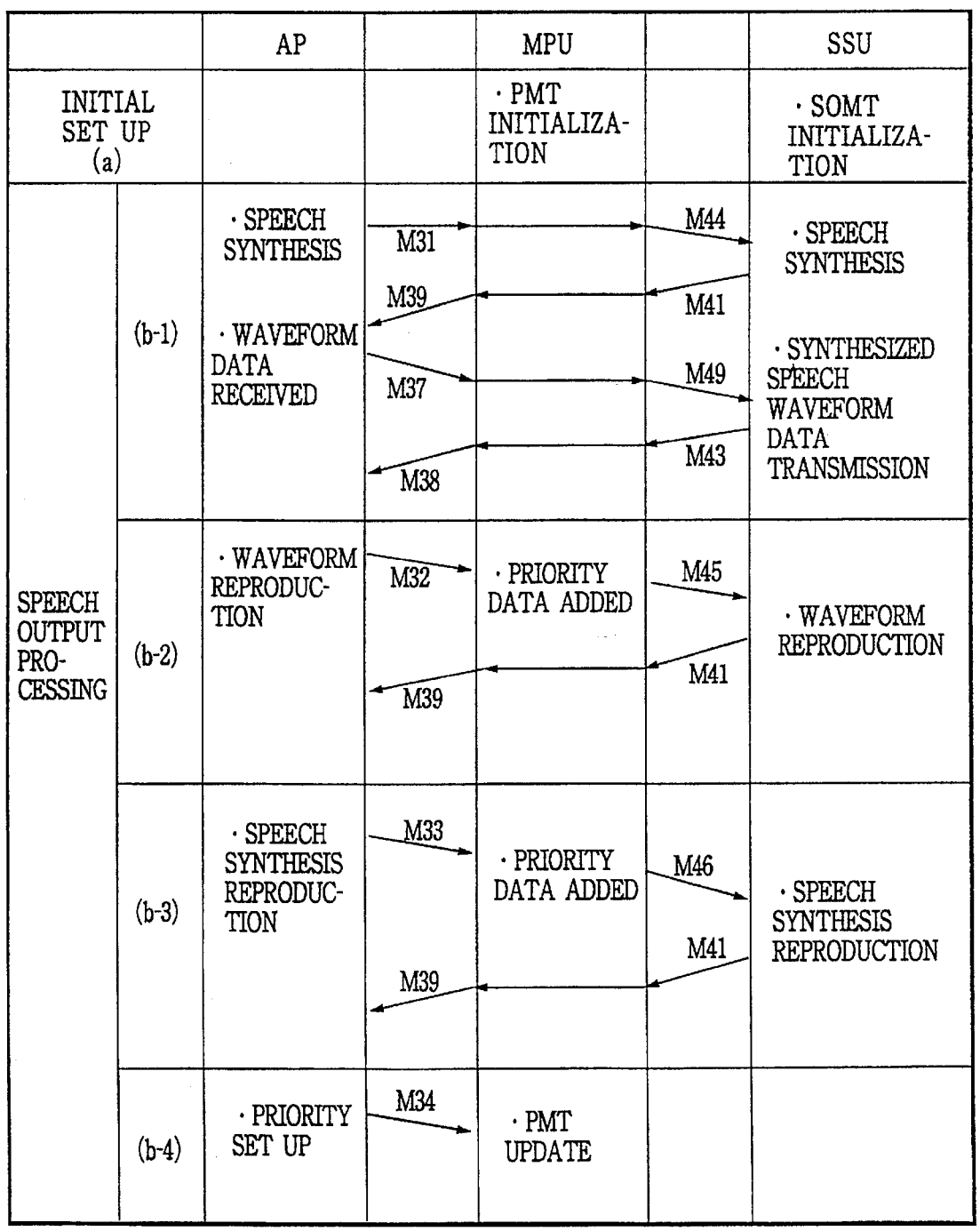
FIG. 63 is a chart showing a procedure of the speech output operation in the speech recognition interface system of FIG. 56.

Referring now to FIGS. 62 and 63, the operation of the speech recognition interface system of this fourteenth embodiment as a whole will be described in detail.

FIG. 62 shows a flow chart for the overall operation in this system, in which the connection of the application programs 2 and the speech recognition system 1 as well as the initial set up concerning the speech recognition are carried out at the step 6101 in the manner similar to that in the first embodiment described above.

Then, at the step 6102, the initial set up concerning the speech output processing is carried out by the application programs 2. Here, the initial set up for the speech output includes the initialization of the speech output management table 563 and the initialization of the speech output priority data in the program management table 13.

Finally, at the step 6103, the speech input and speech out processing are carried out, where the speech input processing is carried out similarly to the first embodiment described above, while the speech output processing is carried out as described in detail below.

In further detail, the speech output processing in response to the requests from the application programs 2 is carried out in the procedure as shown in FIG. 63.

First, at the initial set up stage (a), the initial set up for the speech output including the initialization of the speech output management table 563 and the initialization of the speech output priority data in the program management table 13 is carried out as described above.

Next, in the (b-1) section of the speech output processing stage, when the speech synthesis request (M31) is transmitted from the application program 2, the message processing unit 11 transmits this request as it is to the speech synthesis unit 14 as the speech synthesis request (M44). In response, the speech synthesis unit 14 carries out the registration of the received speech synthesis request into the speech output management table 563 and the requested speech synthesis. Here, this speech synthesis request does not contain the reproduction processing for the waveform data, so that the output present/absent entry in the speech output management table has "absent" registered, as in the entry for the data ID #1 in FIGS. 58A and 58B. In such a case, the speech output priority data n the program management table of FIG. 59 are not going to be used.

Then, the speech synthesis unit 14 notifies the completion of the requested speech synthesis to the message processing unit 11 by means of the speech output state notice (M41), and the message processing unit 11 notifies this message to the application program 2 by means of the speech output state notice (M39).

After receiving this notice, the application program 2 can further transmit the speech waveform data request (M37) and the message processing unit 11 transmits this request as it is to the speech synthesis unit 14 as the speech waveform data request (M49). In response, the speech synthesis unit 14 transmits the synthesized speech waveform data (M43) to the message processing unit 11, and the message processing unit 11 transmits this data as it is to the application program 2 as the synthesized speech waveform data (M38), such that the application program 2 can receive the synthesized speech waveform data for the requested text data.

Next, in the (b-2) section of the speech output processing stage, when the waveform reproduction request (M32) is transmitted from the application program 2, the message processing unit 11 looks up the speech output priority data registered in the program management table of FIG. 59, adds the speech output priority data for the application program 2 which made this request to the received waveform reproduction request, and transmits it as the waveform reproduction request (M45) to the speech synthesis unit 14.

In response, the speech synthesis unit 14 carries out the registration of the received waveform reproduction request into the speech output management table 563 and the requested waveform reproduction for outputting the speech output. In this case, the registered entry appears as that of the data ID #0 or #4 in FIGS. 58A and 58B. After the waveform reproduction is carried out, the speech synthesis unit 14 notifies the completion of the requested waveform reproduction to the message processing unit 11 by means of the speech output state notice (M41), and the message processing unit 11 notifies this message to the application program 2 by means of the speech output state notice (M39).

Similarly, in the (b-3) section of the speech output processing stage, when the speech synthesis reproduction request (M33) is transmitted from the application program 2, the message processing unit 11 looks up the speech output priority data registered in the program management table of FIG. 59, adds the speech output priority data for the application program 2 which made this request to the received waveform reproduction request, and transmits it as the speech synthesis reproduction request (M46) to the speech synthesis unit 14.

In response, the speech synthesis unit 14 carries out the registration of the received speech synthesis reproduction request into the speech output management table 563 and the requested speech synthesis and reproduction for outputting the speech output. Then, after the speech synthesis and reproduction is carried out, the speech synthesis unit 14 notifies the completion of the requested speech synthesis reproduction to the message processing unit 11 by means of the speech output state notice (M41), and the message processing unit 11 notifies this message to the application program 2 by means of the speech output state notice (M39).

Also, in the (b-4) section of the speech output processing stage, when the priority set up request (M34) is transmitted from the application program 2, the message processing unit 11 changes appropriate one of the speech output priority data in the program management table of FIG. 59, such as the speech output level, the speech synthesis processing priority, and the presence or absence of the interruption processing. By setting the speech output level higher, the user's attention can be drawn to that speech data easily. By setting the speech synthesis processing priority higher, the time lag between the speech synthesis and the speech output for that speech data can be reduced. The interruption processing is a processing to output the particular speech output alone by interrupting the other speech outputs. By combining these speech output priority settings, the flexible processing such as that in which the more important speech message is outputted with priority can be realized.

For example, in an example shown in FIGS. 58A and 58B, the waveform reproduction request for data ID #0 has the speech output level (volume) of 3, the interruption processing (output interruption) absent, and the synthesis processing priority unspecified. In this example, the speech output level and the synthesis processing priority are specified in a range of 0 to 10, so that the speech output level of 3 is a relatively low value. Also, in this case, as there is no output interruption, this waveform data will be reproduced in superposition to the other speech outputs. In contrast, the speech synthesis and reproduction request for the data ID #2 has the maximum speech output level of 10. as well as the maximum synthesis processing priority of 10, so that this speech data will be outputted Immediately in a large volume. In addition, as the output interruption is set as present, the other speech outputs will be interrupted while this speech data is outputted, so that the user can listen to this speech data attentively, without being distracted by the other speech outputs.

Figure 64:
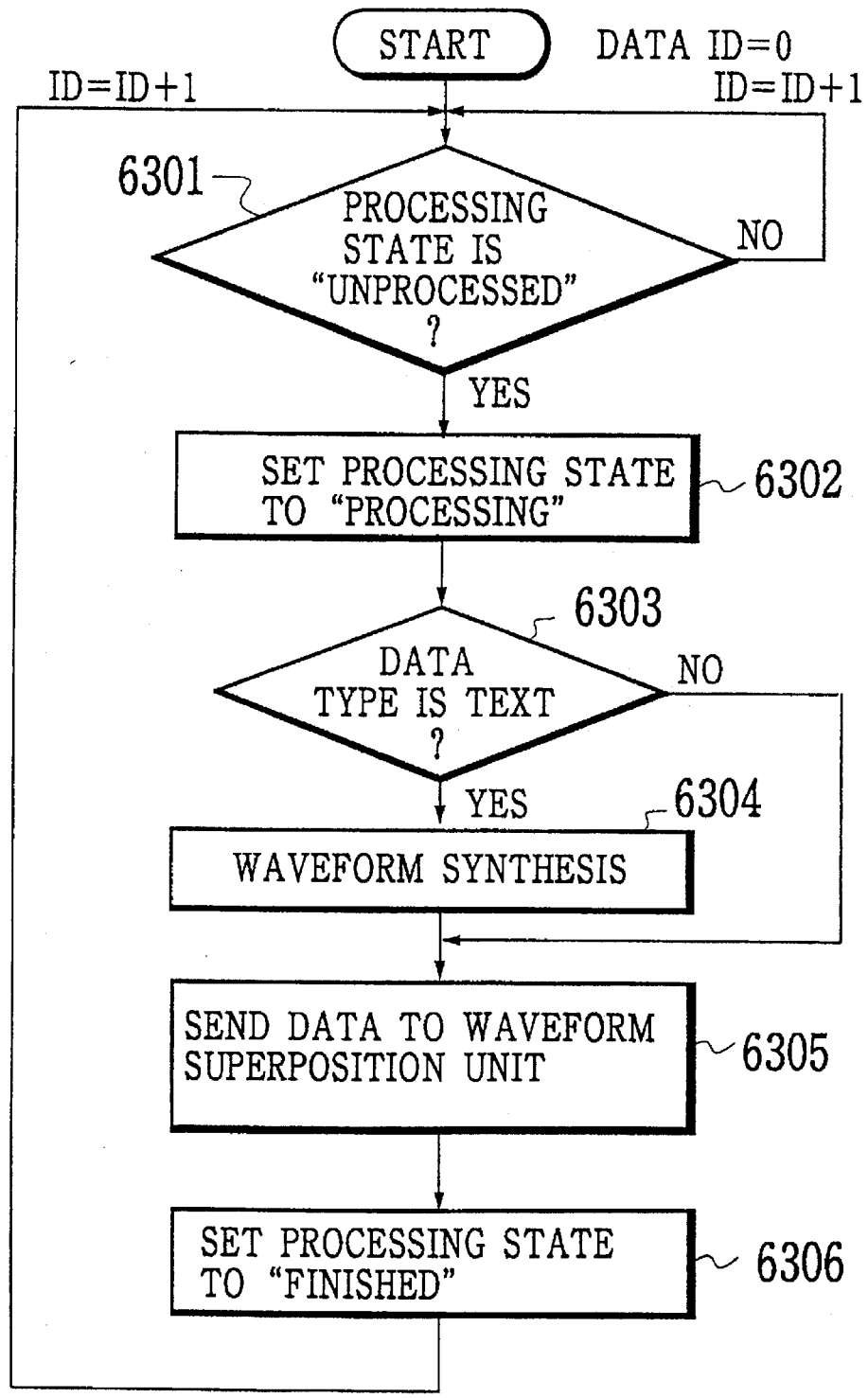
FIG. 64 is a flow chart for a procedure of the speech output operation in the speech recognition interface system of FIG. 56.

In this fourteenth embodiment, a plurality of speech output requests can be handled sequentially according to the flow chart of FIG. 64 by processing a plurality of speech output requests sequentially, according to the speech output management table 563 of the speech synthesis unit 14 as shown in FIGS. 58A and 58B, in which various data for the speech output requests are registered in an order of their admissions, as follows.

First, at the step 6301, starting from the data ID #0, the control unit 561 looks up the processing state entry in the speech output management table 563 for the next data and judges whether it is "unprocessed" or not. If not, this step 6301 is repeated after incrementing the data ID by one.

When the data with the processing state entry "unprocessed" is found at the step 6301, the processing state entry for this data is set to "processing" at the step 6302, and whether the data type of this data is the text or not is judged at the step 6303.

If it is the text data, the waveform synthesis processing to obtain the synthesized speech waveform data for this text data is carried out by the waveform synthesis unit 564 at the step 6304, whereas otherwise it is the waveform data so that this step 6304 is skipped.

Then, at the step 6305, the synthesized speech data obtained at the step 6304 or the data judged as the waveform data at the step 6303 is sent to the waveform superposition unit 562, such that this speech data is superposed with the other speech data to be outputted simultaneously.

Finally, the processing state entry for this data is set to "finished" at the step 6306, and the operation returns to the step 6301 for the data ID incremented by one, to take care of the next "unprocessed" data.

In this case, the waveform synthesis unit 564 carries out the waveform synthesis processing by setting the appropriate priority for the currently processing data according to the synthesis processing priority for this data registered in the speech output management table 563. Here, the setting of the appropriate priority can be made by using the system call in the UNIX which is a typical operating system for the workstations for example, where the allocation time of the calculation device for the synthesis process may be changed, or a plurality of speech synthesizers with different processing amounts may be prepared and selectively used according to the priority setting.

The waveform superposition unit 562 superposes a plurality of the received waveform data according to the information such as the volume, the output interruption presence/absence, and the exclusive processing factor. At a time of superposition, the correspondence between the time and the waveform data is monitored constantly, such that the intervals for the outputs of a plurality of waveform data are made to be as similar as possible to the intervals for the admissions of a plurality of corresponding speech output requests. Also, this superposition processing can be carried out by the block processings with a unit time equal to 10 msec for example.

Figure 65:
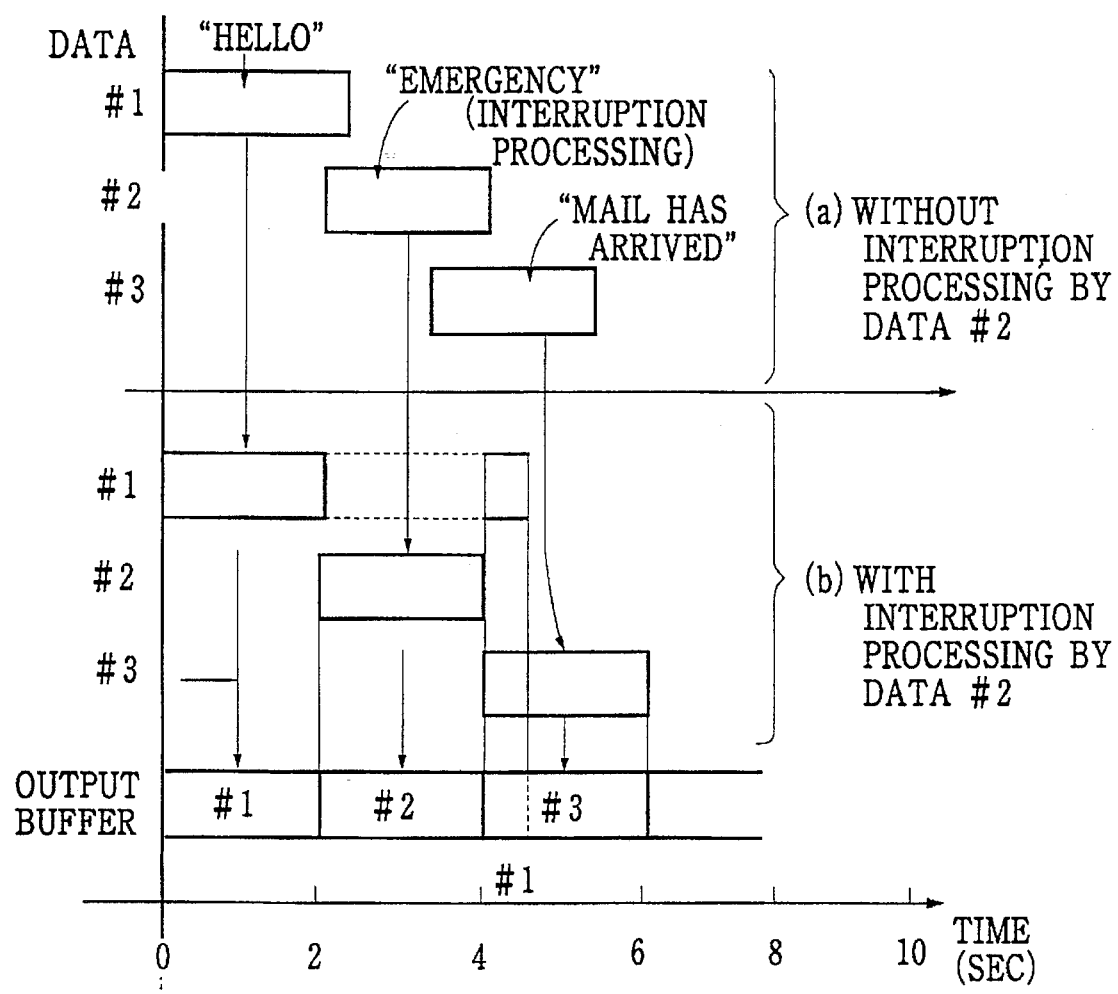
FIG. 65 is a diagram showing an exemplary case of superposing the speech data in the speech recognition interface system of FIG. 56.

Referring now to FIG. 65, an exemplary case of superposing the speech data with the interruption processing will be described. The data used in this case are the data ID #1 to #3 in the speech output management table 563 of FIGS. 58A and 58B, and for the sake of simplicity, the time lag between the registration to the waveform superposition is ignored, although this time lag is caused by the speech synthesis and the data transmission in practice depending on the processing power of the computer used.

In a case of outputting the speech data without any output interruption processing, exactly in an order in which these data are registered in the speech output management table 563, as shown in a part (a) of FIG. 65, the speech data are overlapping in time, such that the data #2 which is an emergency message is going to be outputted with a starting part overlapping with an ending part of the data #1 and the last half overlapping with the first half of the data #3.

In contrast, in a case of carrying out the output interruption processing, as shown in a part (b) of FIG. 65, as soon as the output of the data #2 starts, the output of the data #1 is interrupted, and the remaining part of the data #1 is outputted in superposition to the data #3 only after the output of the data #2 is finished, while the output of the data #3 starts only after the output of the data #2 is finished.

Here, the output of the data #1 which is divided in time by the interruption processing can be treated in any desirable manner. For example, the divided data #1 can be outputted in a divided form as indicated in a part (b) of FIG. 65, or its output can be repeated from the beginning after the interruption. Alternatively, the output of the divided remaining part of the divided data #1 can be abandoned, or can be continued after the interruption with a gradually decreasing volume.

Referring now to FIG. 66, the fifteenth embodiment of a speech recognition interface system which defines a speech mail tool system according to the present invention will be described in detail.

As described in the fourteenth embodiment above, by incorporating the speech synthesis unit 14 in the speech recognition interface system of the first embodiment, and utilizing the speech recognition function as well as the speech synthesis function for a plurality of tasks under the multi-task environment, it is possible to improve the convenience of the user at a time of using the application programs 2. With this fourteenth embodiment in mind, in this fifteenth embodiment, as an example of a specific application of the speech input and output interface system of the fourteenth embodiment, the speech mail tool system incorporating the speech synthesis and speech output functions will be described in detail.

In this fifteenth embodiment, the speech mail tool system has an overall configuration as shown in FIG. 66, which comprises: a speech I/O (Input/Output) system 651 having a speech synthesis function in addition to the speech recognition function, which is substantially similar to that of the fourteenth embodiment described above: a window system 652 for providing the GUI (Graphic User Interface) to present the data concerning the application program (speech mail tool) to the user; and a speech mail tool 653 connected with both the speech I/O system 651 and the window system 652, which includes an electronic mail processing unit 6531 connected to a message I/O unit 6532. By utilizing these speech I/O system 651 and the window system 652, it becomes possible in the speech mail tool 653 to utilize the speech inputs similarly to the mouse and keyboard inputs, while also utilizing the speech synthesis function.

Usually, the data transmitted and received in the speech mail system are the text data, but it is also possible to use the data other than the text data such as the speech data and the image data in the mails. In order to transmit and receive the mail containing the speech data, the speech mail tool system is required to be equipped with a function to record and reproduce the raw speech data.

Figure 68A:
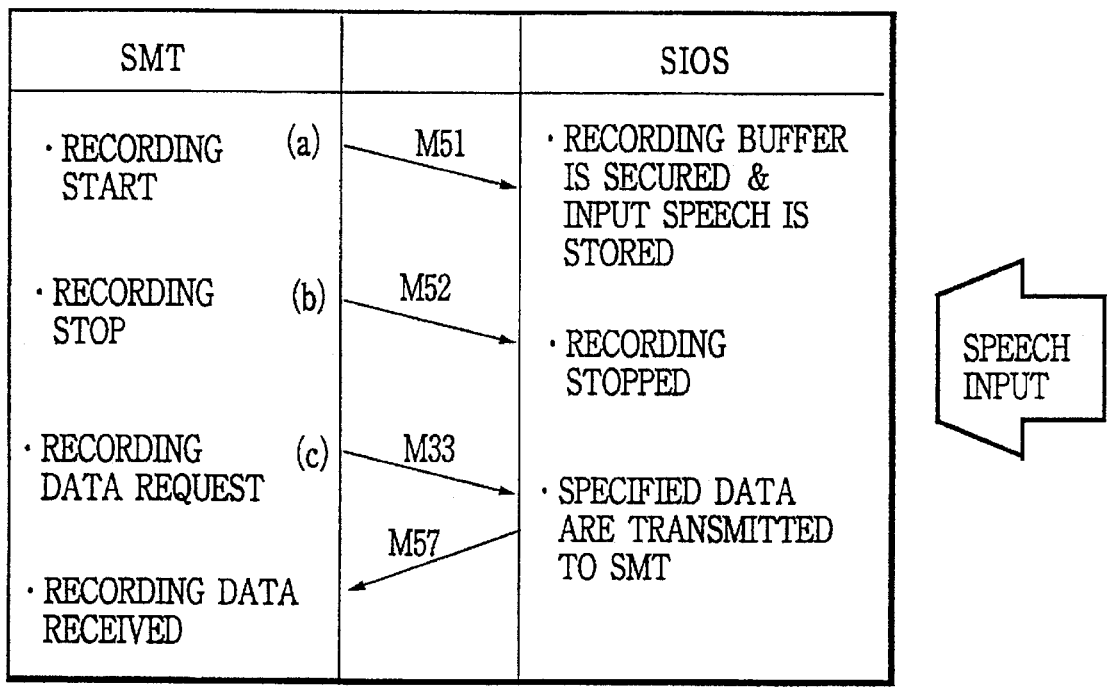
FIGS. 68A and 68B are charts showing a procedure of the speech data recording and reproduction operations in the speech recognition interface system of FIG. 56.
Figure 68B:
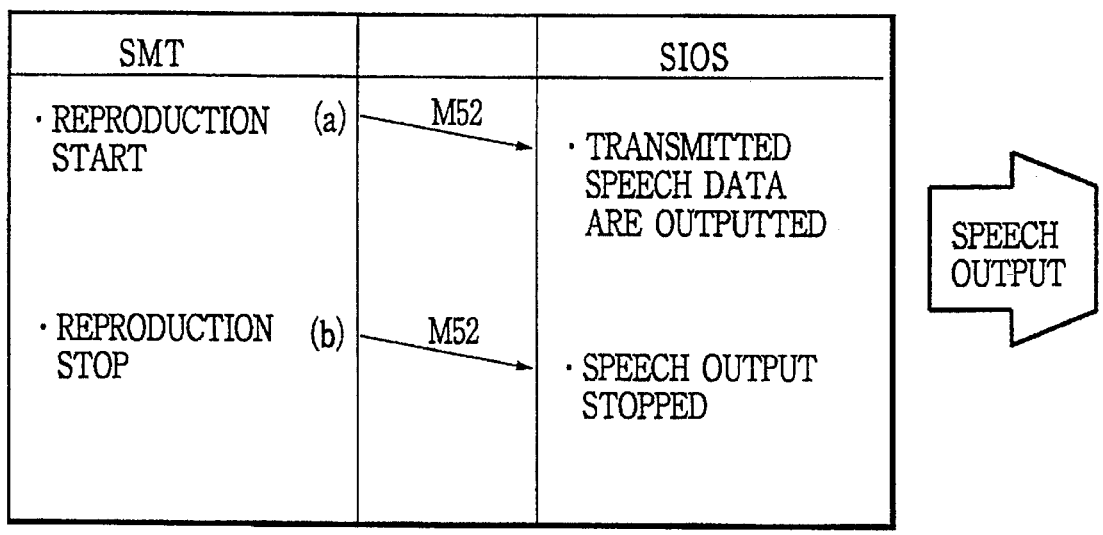

Here, in order to handle the speech data at the application program (the speech mail tool 653), the messages to be exchanged between the speech I/O system 651 and the speech mail tool 653 includes those enumerated in the table shown in FIG. 67 related to the recording and reproduction of the speech data, in addition to those used in the fourteenth embodiment described above. Using these messages, the speech mail tool 653 can record the speech data according to the procedure indicated in FIG. 68A, and reproduce the speech data according to the procedure indicated in FIG. 68B. Namely, in recording the speech data, the speech mail tool 653 transmits the recording start request M51, in response to which the speech I/O system 651 secures a recording buffer and stores the input speech therein. Then the speech mail tool 653 transmits the recording stop request M51 to stop the recording at the speech I/O system. Next, the speech mail tool 653 transmits the speech data request M53, in response to which the speech I/O system 651 transmits a data specified by the request as the speech data M57 to the speech mail tool 653. On the other hand, in reproducing the speech data, the speech mail tool 653 transmits the reproduction start request M52, in response to which the speech I/O system 651 makes the speech output of the speech data specified by the request. Then, the speech mail tool transmits the reproduction stop request M52 to stop the speech output at the speech I/O system 651.

Figure 69:
FIG. 69 is an illustration of an exemplary speech mail tool display in the speech recognition interface system of FIG. 66.

In this fifteenth embodiment, the speech mail tool 653 provides the screen display as depicted in FIG. 69, which is basically similar to that of FIG. 54 for the twelfth embodiment described above, except that it further incorporates the function to read out the mail as described below. In this FIG. 69, the mail having a star mark in the list display section is the mail document containing the speech data, and the mail shown in the received mail display section is an example of the mail document containing the speech data. Here, the speech data within the mail document is indicated in a form of an icon button such as that labelled "emergency" in FIG. 69. By specifying this icon button with the mouse pointer, the speech data can be reproduced according to the control commands entered as the mouse or keyboard inputs, or the speech inputs. The icon buttons for the speech data can be provided in any desired number at any desired positions, and arranged in any desired manner, within the text of the mail.

Figure 70:
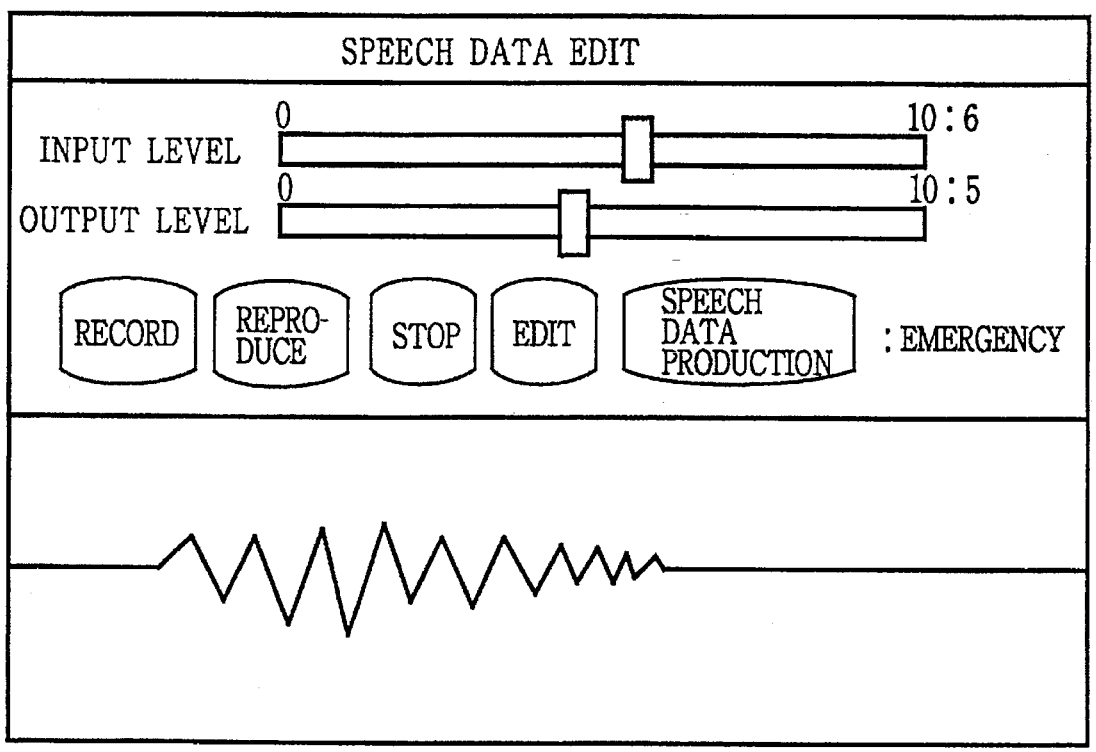
FIG. 70 is an illustration of an exemplary speech data edit sub-window display in the speech recognition interface system of FIG. 66.

Here, in order to record, reproduce, and edit the speech data within the mail, the speech data edit sub-window is also provided as shown in FIG. 70. This speech data edit sub-window of FIG. 70 contains in its upper half two sliders for setting the input and output levels (volumes) for the speech data, and buttons for various edit functions such as recording and reproduction of the speech data, stopping of the recording or the reproduction, editing of the speech data, and production of the speech data to be added to the mail. Under the edit button, the editing sub-menu for carrying out various editing commands such as cut, copy, and paste is also provided. The "emergency" on the right of these buttons is an indication that the user can use as a label for the speech data icon button when the speech data is produced. In addition, this speech data edit sub-window of FIG. 70 contains in its lower half a speech waveform data edit section, in which the desired data can be selected by using the mouse, and the cut, copy, and paste functions can be made on the waveform data o the speech input, or the acoustic effects such as the echo and the pitch change can be added on the speech data.

These editing of the speech data and the addition of the acoustic effects to the speech data may be carried out by the specialized speech data edit tool separated from the speech mail tool 653 if desired. In such a case of using the separate specialized speech data edit tool, there arises a need to exchange the speech data between the speech mail tool 653 and the specialized speech data edit tool, and it is possible in this regard to make it easier to carry out the editing operation for the speech data by achieving this speech data exchange by means of the cut and paste functions operated by the speech inputs. It is also possible to use these cut and paste functions operated by the speech inputs to the various data other than the speech data such as the text data and the graphic data as well, in the data exchange with respect to the speech mail tool 653.

Now, by using the various functions described above, it becomes possible to forward the reply to the received mail without hardly touching the keyboard, by using the speech input "reply", in response to which the reply mail is automatically produced and forwarded by copying a part or a whole of the received mail, attaching the reference symbols to the copied portion, and adding the sender's signature and the recorded reply message. Here, the recorded reply message can be the pre-recorded message. Alternatively, in response to the speech input "reply", the speech mail tool 653 can be set into the recording mode automatically to record the reply message given by the subsequently uttered speech input, and the recorded speech data are added automatically to the reply mail in response to the subsequent speech input "send".

Figure 71:
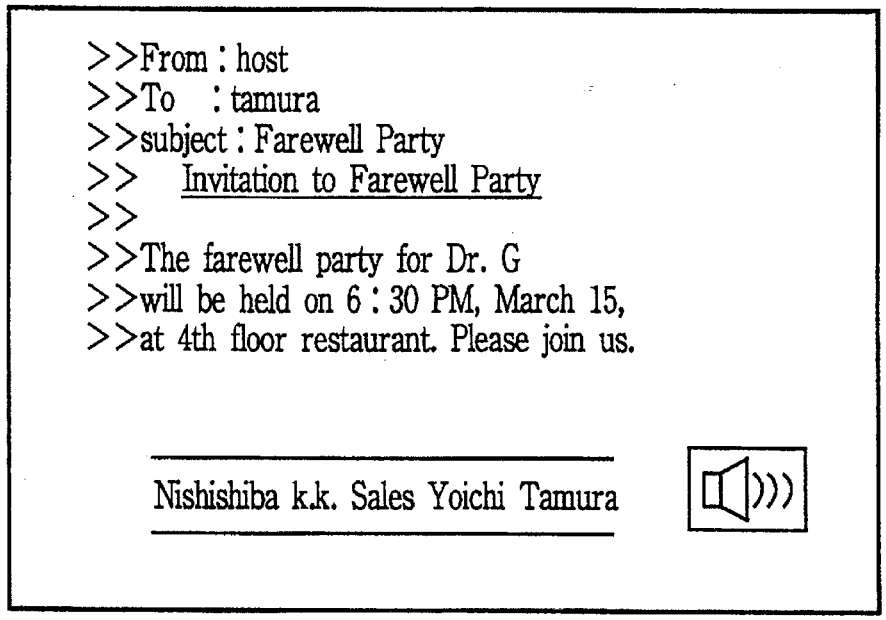
FIG. 71 is an illustration of a reply mail produced in the speech recognition interface system of FIG. 66.

For example, FIG. 71 shows a reply mail produced for the received mail concerning the invitation to a farewell party, in which the first eight lines are copied from the received mail as indicated by the reference symbols (>>) attached in front, which are followed by the sender's signature and the speech data icon button for the recorded reply message.

It is also possible to provide a part or a whole of the recording, reproduction, and editing functions in the speech data edit sub-window of FIG. 70 on the received mail display section and the forwarding mail edit section of the main screen display of the speech mail tool 653 as shown in FIG. 72, so as to make it easier to handle the speech data in the mail.

Also, while it is possible to use the recorded speech data as it is as the speech data in the mail as described above, the recorded speech data often contains unnecessary silent sections such as those caused by the hesitation during the speech input utterance such that the recorded speech data can amounts to an unnecessarily large data amount. In such a case, it is possible to detect the silent section automatically, and shorten the detected silent section to a predetermined length such as one second, for example.

Moreover, there are cases in which the user's movement during the recording of the speech input causes the change of the distance between the user's mouth and the microphone, such that the recording level becomes unstable and the recorded speech data becomes hard to listen to. In such a case, the recorded speech data can be made easier to listen to by checking the speech level over the entire recorded speech data and adjusting the speech level to be uniform throughout the entire recorded speech data. This uniformization of the speech level can be realized by obtaining the speech level in prescribed units such as words or sentences, and adjusting the speech level of each unit to that of the maximum speech level among all the units, for example. In a case the maximum speech level is too high or too low, the speech level of the entire recorded speech data may be further adjusted appropriately, to make it desirably easy to listen to.

Now, in this speech mail tool system of the fifteenth embodiment, it is possible to read out the mail document containing both the text and speech data.

For example, when the mail in the received mail display section of FIG. 69 can be read out as follows.

"Mr. Tamura" (text data converted into the speech data by the speech synthesis)

"Submit the last week's business trip report immediately." (speech data of the "emergency" icon button reproduced as it is)

"Sawada" (text data converted into the speech data by the speech synthesis)

In this manner, by carrying out the appropriate processing according to the data type, such as the speech synthesis for the text data and the speech reproduction for the speech data, in an order to their appearances in the mail, the mail document containing mixed data can be read out. It may also be useful for the user to make it possible to read out only the text data portion or the speech data portion. It is also possible for the mail document to incorporate the other types of data such as the image data for which the appropriate processing such as the image reproduction can be carried out at a time of the read out operation. In addition, the read out of the mail document can include not just the main message portion but also the mail header portion which contains the title, sender, received time, etc.

Here, it is not necessary to employ the identical reading manner to all the mail documents. For example, as shown in FIG. 73, the sender's mail addresses and the synthesized speech attributes specifying the appropriate reading manners for the different senders can be set as the database, such that the mail documents received from different senders can be read out in the different reading manners. In the setting shown in FIG. 73, The mail received from Mr. Tamura is to be read slowly by a male voice, whereas the mail received from Ms. Nakayama is to be read fast by a high pitched female voice, and all the other mails are to be read at a normal speed by a normal pitched male voice.

In addition to this reading manner control according to the sender information, it is also possible to change the speech synthesis according to the information contained in each mail document. For example, the quoted sentences may be read out by the voice of the different sex, pitch, or speed than that of the voice which is reading the other sentences.

Furthermore, in an anticipation of the read out of the mail in the synthesized speech at the receiver side, it is also possible to provide the speech synthesis control codes within the text of the mail document, so as to specify the appropriate reading manner for each mail. An example of the mail document containing the speech synthesis control codes is shown in FIG. 82, where @< . . . > portion is the speech synthesis control code specifying the sex, pitch, speed, and volume of the reading voice to be male, 5, 5, and 9, respectively, for the sentence "make sure not to be late" alone, so that this sentence is read by the louder voice than the remaining portions. In this manner, by facilitating the detailed settings for the speech synthesis within the mail document, it becomes possible to emphasize the important portion in the mail, to change the character of the sentences, to read the quoted portion in the synthesized speech resembling the voice of the quoted person, etc.

The speech mail tool system described above can be speech controlled under the multi-task environment, so that it is convenient in reading the mail by the speech control while carrying out the document production or the program editing by using the keyboard and the mouse.

In addition, by further facilitating the speech control of the other database tools for the information look up such as the various types of dictionary and thesaurus, it becomes possible to look up the various necessary information while producing the document or the mail by using the speech control commands, such that the interruptions during the document production can be reduced for the user's convenience.

Also, when the mail content is confirmed not by the display but by the speech read out function, the setting of the entire mail as the reading target may be inefficient especially when a particular desired mail is to be searched out from a large number of mails. For this reason, it is preferable to facilitate the control command inputs to the speech mail tool 653 during the reading out of the mails, and it is convenient to make these control command inputs by the speech inputs as follows.

First, it is made such that the read out operation can be carried out in any of three different read out modes having three different reading units of a whole text, a paragraph, and a sentence, for reading out the mail. In the screen display shown in FIG. 69, "whole text" indicated on the right of the read out icon button indicates the reading unit of the whole text, such that when the read out icon button is operated, the speech synthesis according to the selected read out mode is going to be carried out. Here, the speech control commands to be used during the read out operation include those enumerated in the table shown in FIG. 74.

The user sets up the read out mode first, and then either operates the read out icon button on the screen display or utters the speech input "read out", in response to which the read out operation is started. During the read out operation, the user can pause and re-start the reading by the speech control commands "stop" and "continue", respectively. The speech control command "once again" causes the reading of the reading unit that had been read out last. When the speech control command "next . . . " or "previous . . . " is uttered, where . . . indicates any one of the three different reading units, the speech mail tool 653 automatically switches the read out mode to that of the specified reading unit. For example, when the speech control command "next sentence" is uttered when the read out mode is the whole text, the read out mode is automatically switched to the sentence read out mode. The speech control commands "next" and "previous" are the abbreviated forms of the speech control commands "next . . . " and "previous . . . ", for which the reading unit of the current read out mode is adopted automatically. The speech control commands "fast" and "slow" control the reading speed, "high" and "low" control the voice pitch of the reading synthesized speech, and "male" and "female" control the sex of the reading synthesized speech.

In this manner, by providing the function to read out the content of the mail by the speech and speech controlling this read out operation, the user's convenience in using the system can be improved compared with a case of using only the mouse and the keyboard for controlling. In particular, under the multi-window environment, the auditory sense and the speech inputs can be used for the controlling of the speech mail tool 653 while the visual sense and the keyboard inputs can be used for the other task such as the text editor, such that it becomes possible for the single user to control a plurality of tasks simultaneously.

In this speech mail tool system of the fifteenth embodiment, the speech synthesis function can be utilized not just for the reading out of the mail as described above but also for the messages to be presented to the user from the speech mail tool 653. For example, the speech mail tool 653 operated under the multi-window environment can outputs the messages in the synthesized speech to the user as follows.

Namely, when the speech mail tool 653 which is iconified on the screen display of the system at a time of its activation receives a new mail, the speech mail tool 653 can notify the user by using the synthesized speech message such as "A new mail has arrived from . . . . There are five unread mails in total.", for example. This message may be the pre-recorded one, but it is more convenient for the programmer of the speech mail tool 653 to utilize the speech synthesis here in view of the ease in changing the message sentence and the possible need to read out of numerical data.

Here, the new mail reception notice message may not necessarily be presented in the same manner. For example, by setting the priority level to each mail, the notice message may not be outputted, or the message sentence may be changed to a different message sentence such as "An emergency mail has arrived from . . . ", or the tone of the synthesized speech may be changed by changing the speech synthesis parameters, according to the priority level of the received mail. It is also possible to output the message concerning the subject of the mail such as "The subject is the conference notice." In this manner, by utilizing the speech synthesis function for the message output to the user, the user can decide whether to read the received mail or not, without directly looking at the speech mail tool 653.

Also, the new mail reception notice message is going to interrupt the other operation carried out by the user on the computer, and whether such an interruption is desirable or not depends on the content of the other operation. For example, during the demonstration of some program, the interruption due to the mail can be undesirable. For this reason, it is preferable to set up the priority level to each operation that can be compared with the priority level of the mail, such that the mail notice message is outputted only when the priority level of the mail is higher than that of the current operation, and the mail notice message is not outputted otherwise. Here, the priority level of the operation can be set up to the entire operation environment, or to each individual program, or to each sub-task within the program.

Figures 75, 76:
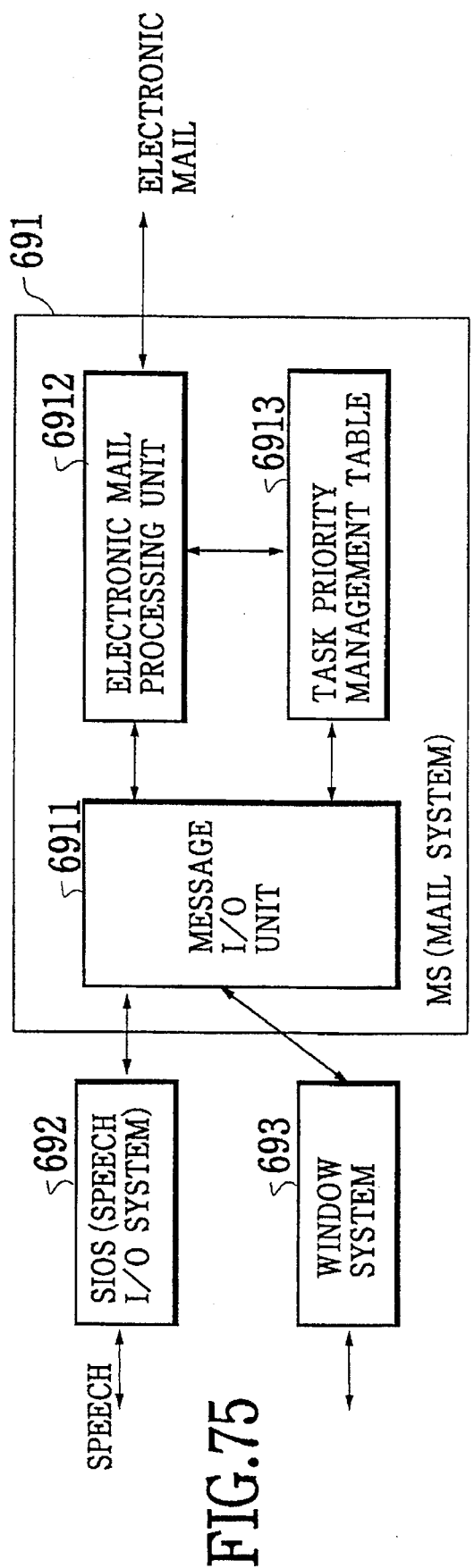
FIG. 75 is a schematic block diagram of a modified configuration for the speech recognition interface system of FIG. 66.
FIG. 76 is a diagrammatic illustration of a program management table in the speech recognition interface system of FIG. 75.

In this case of comparing the priority levels of the operation and the mail to determine the manner of outputting the mail notice message, the overall configuration of the speech mail tool system is modified as shown in FIG. 75, which includes a mail system 691 comprising the message I/O unit 6911 and the electronic mail processing unit 6912 similar to those in the configuration of FIG. 66, and a task priority management table 6913 connected with both of them. In this configuration of FIG. 75, the mail system 691 is connected with the speech I/O system 692 and the window system 693 through the message I/O unit 6911 which distributes the messages transmitted from them according to their contents to the electronic mail processing unit 6912 and the task priority management table 6913.

The electronic mail processing unit 6912 carries out the processing for the received mail such as the transmission and the reception of the electronic mails through the external public transmission line or the LAN connected thereto. The task priority management table 6913 manages the priority levels for the operations of all the application programs connected to the speech I/O system 692, which are received from the speech I/O system 692. The determination of the manner of outputting the mail notice message according to the priority levels of the tasks and the mails is made by the electronic mail processing unit 6912 according to the registered content of the task priority management table 6913.

Here, the program management table in the speech I/O system 692 is extended from that used in the fourteenth embodiment described above, as shown in FIG. 76, to incorporate the entry for the task priority level. In the example of the extended program management table shown in FIG. 76, the task priority level for the shell tool is set to "2", while the task priority level for the DTP system is set to "5".

In addition, in order to set up the setting values or read out the setting values with respect to this program management table of FIG. 76, the messages enumerated in the table shown in FIG. 77 including the task priority set up request M61, the task priority gain request M62, and the task priority change notice M63 are additionally provided. Moreover, in order for the mail system 691 to be able to receive the notice for the task priority change from the speech I/O system 692, the input task of the task priority change mask is newly provided.

The mail system 691 sets up the task priority change mask and the input task change mask as its input masks, such that it can obtain the task priority levels and the presence or absence of the speech focus for all the application programs connected to the speech I/O system 692. This information on the task priority levels and the speech focus can be dynamically reflected in the task priority management table 6913 as shown in FIG. 78. The priority level of the electronic mail can be set up by attaching a header information concerning the priority level such as "preference: 3" to the mail document, or by setting the priority level to each sender.

Figure 79:
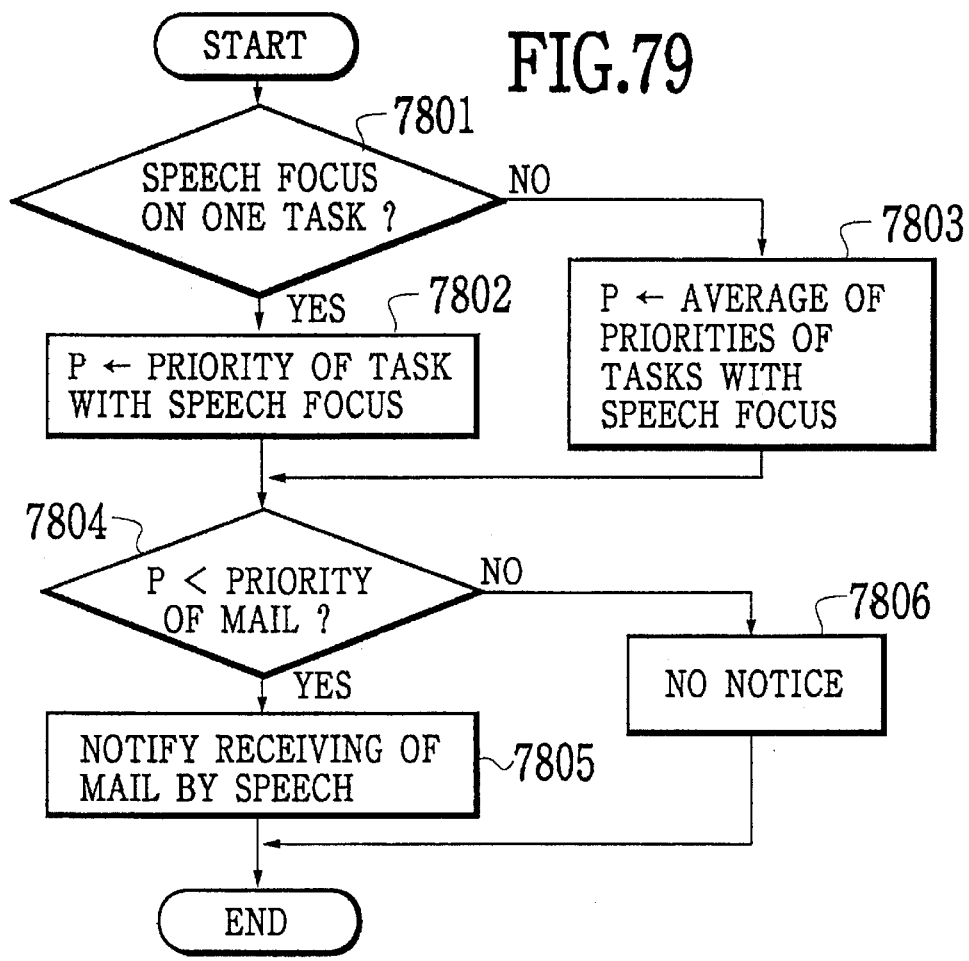
FIG. 79 is a flow chart for the operation of the electronic mail processing unit in the speech recognition interface system of FIG. 75.

Whenever the electronic mail is received, the electronic mail processing unit 6912 carried out the operation according to the flow chart of FIG. 79 as follows.

First, whether the speech focus is focused on only one task or not is judged at the step 7801, and if so the priority level of the speech focused task is set as a task priority P at the step 7802, whereas otherwise the average of the priority levels of all the speech focused tasks is set as the task priority P at the step 7803. Here, at the step 7803, the highest priority level among the priority levels of all the speech focused tasks may be used as the task priority P instead.

Then, whether the task priority P is lower than the priority level of the mail or not is judged at the step 7804, and if so the mail reception notice message is outputted as the speech output at the step 7805, whereas otherwise no mail reception notice message is outputted at the step 7806. Here, at the step 7806, the other manner of notifying the user about the reception of the mail such as the changing of the icon display or the use of the dynamic image may be employed.

Figure 80A:
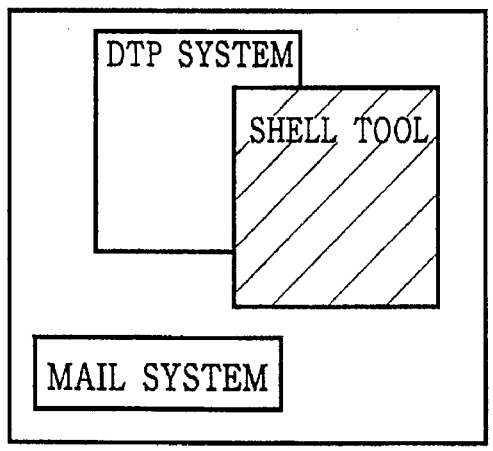
FIGS. 80A and 80B are illustrations of two exemplary screen displays in the speech recognition interface system of FIG. 75.
Figure 80B:
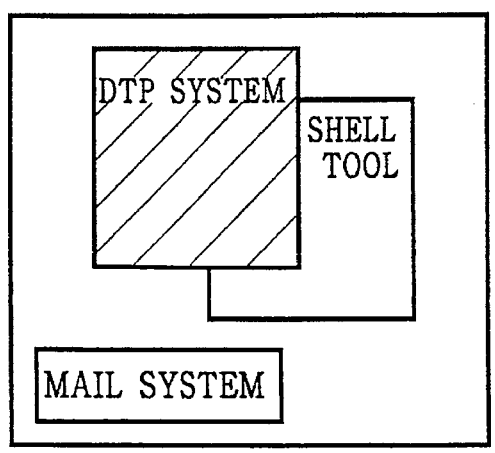

In a case the shell tool and the DTP system are connected with the speech I/O system 692 in addition to the mail system 691, the exemplary screen display appears as shown in FIGS. 80A and 80B, where FIG. 80A shows a case in which the task priority management table 6913 is in the state as shown in FIG. 78. In this state of FIG. 80A, when the mail having the priority level "3" is received, according to the operation of FIG. 79, since the priority level of the speech focused shell tool is higher than the priority level of the received mail (because the priority level is higher for the smaller value), the mail system 691 does not output any mail reception notice message as the speech output. On the other hand, FIG. 80B shows a case in which the task priority management table 6913 is in the state as shown in FIG. 81. In this state of FIG. 80B, when the mail having the priority level of "3" is received, since the priority level of the speech focused DTP system is lower than the priority level of the received mail, the mail system 691 outputs the mail reception notice message as the speech output such as "A new mail has arrived" to the user. At the same time, the mail system 691 can set the speech focus to itself such that the mail system 691 can interrupt the current operation of the user to make it possible for the user to use the mail system 691 at this point.

Thus, in this fifteenth embodiment, by controlling messages such as the mail reception notice message according to the priority levels of the mail and the operation, it becomes possible to provide the flexible speech mail tool system which does not interfere with the user's activities in an undesirable manner.

Figure 83:
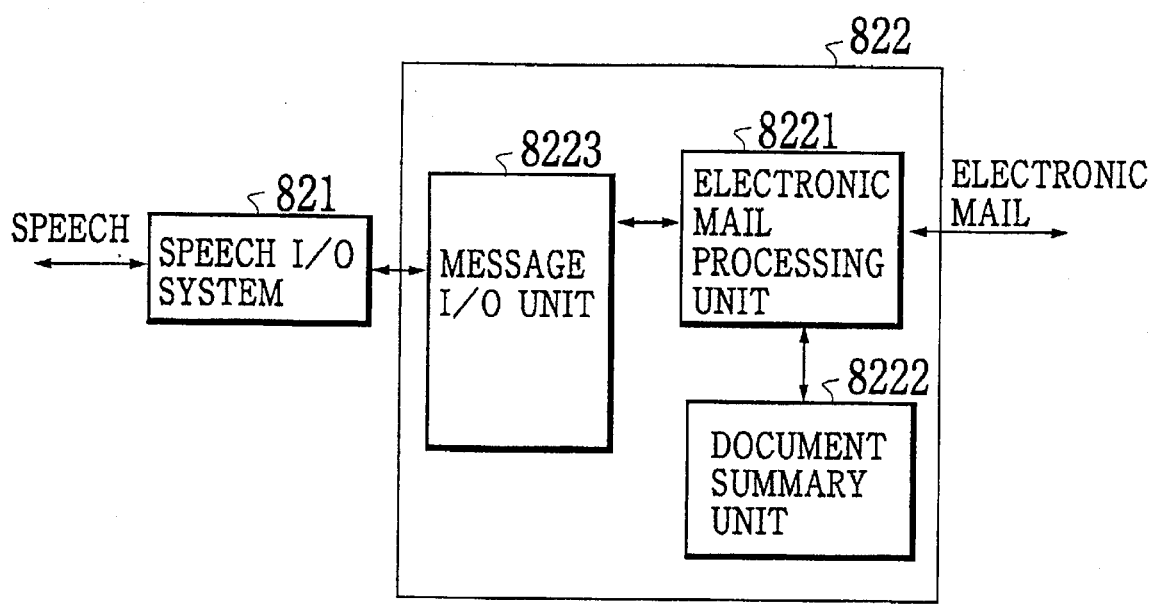
FIG. 83 is a schematic block diagram of one configuration of a sixteenth embodiment of a speech recognition interface system according to the present invention.

Referring now to FIG. 83, the sixteenth embodiment of a speech recognition interface system which defines a speech mail tool system according to the present invention will be described in detail.

The mail document read out function in the fifteenth embodiment described above is that which reads out a part or a whole of the received mail as it is, without making any change to the text of the received mail. This method is sufficient for a case in which the number of mails is small and the size of each mail is also small. However, as the number of mails increases and the size of each mail increases, this method can be inconvenient. In view of this problem, in this sixteenth embodiment, the speech mail tool system incorporating a document summary function will be described.

Figure 84:
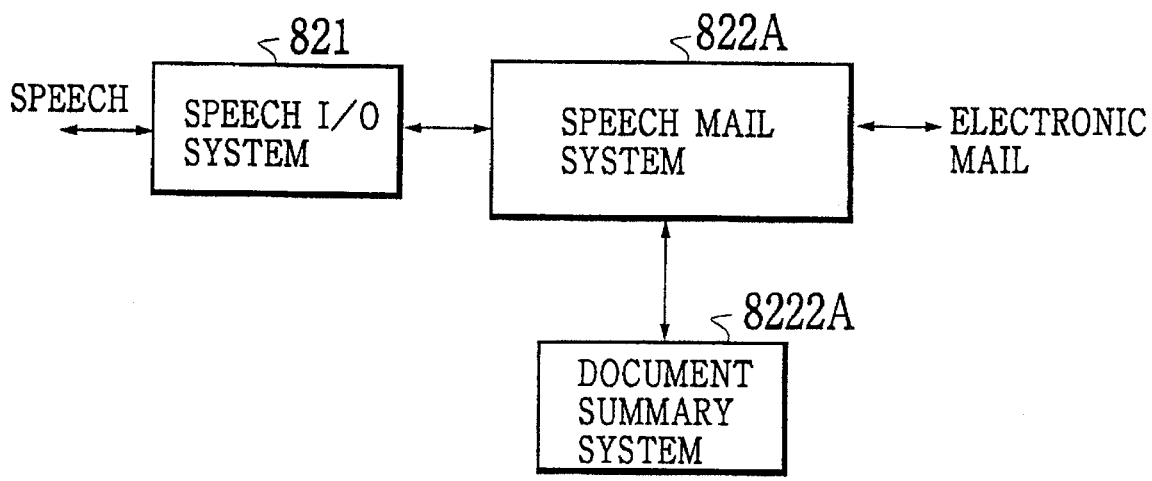
FIG. 84 is a schematic block diagram of another configuration of a sixteenth embodiment of a speech recognition interface system according to the present invention.

In this sixteenth embodiment, the speech mail tool system has an overall configuration as shown in FIG. 83, which comprises a speech I/O system 821 similar to that of the fourteenth embodiment described above and a speech mail system 822 including a message I/O unit 8223 and an electronic mail processing unit 8221 similar to those of the fifteenth embodiment above, and a document summary unit 8222 connected with the electronic mail processing unit 8221. Alternatively, the speech mail tool system may have a configuration as shown in FIG. 84 in which the document summary unit 8222A is provided as an separate element from the speech mail system 822A.

Here, the speech mail system 822 utilizes the speech input and output functions of the speech I/O system 821 through the message I/O unit 8223. The electronic mail processing unit 8221 carries out the processing with respect to the received mail such as the transmission and the reception of the electronic mail documents through the external public transmission line or LAN connected thereto. The document summary unit 8222 summarizes the content of each electronic mail document received by the electronic mail processing unit 8221. Here, the document summary unit 8222 can utilize any known text document summarizing technique such as that disclosed by K. Sumita, et al. in "Document Structure Extraction for Interactive Document Retrieval Systems", Proceedings of Special Interest Group on DOCumentation (SIGDOC) '93, pp. 301–310, 1993, for example.

In this sixteenth embodiment, the electronic mail processing unit 8221 determines whether the summary is to be produced as well as in what manner the summarizing is to be carried out for each received mail document, according to its priority level or the length and the content of the mail document, and transmits the received mail document for which the summary is necessary along with the appropriate summarizing manner information to the document summary unit 8222.

The document summary unit 8222 receiving the original mail document from the electronic mail processing unit 8221 along with the summrization manner information then carries out the summarizing of this mail document in the specified summarizing manner, and returns the summary of this mail document to the electronic mail processing unit 8221.

Figure 85:
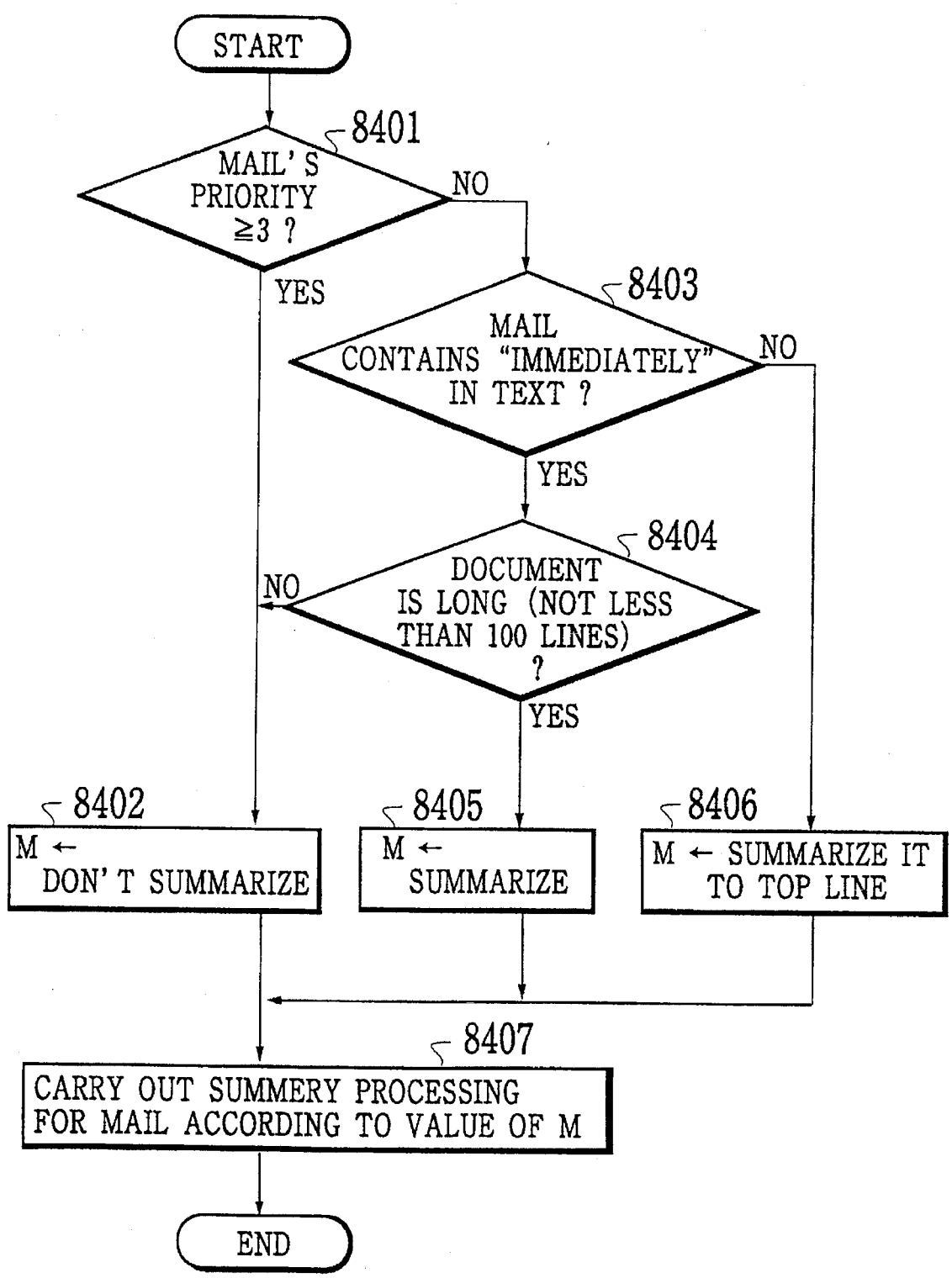
FIG. 85 is a flow chart for the operation to obtain the summary for each received mail document in the speech recognition interface system of FIG. 83.

In this sixteenth embodiment, the operation to obtain the summary for each received mail document can be carried out according to the flow chart of FIG. 85 as follows.

First, whether the priority level of the mail is higher than or equal to "3" or not is judged at the step 8401. If so, a summary flag M is set to "don't summarize" at the step 8402. Otherwise, whether the the mail document contains an expression "immediately" within its text or not is judged at the step 8403. If so, whether the mail document is a long one having more than 100 lines or not is judged at the step 8404. If not, the summary flag M is also set to "don't summarize" at the step 8402. Otherwise, the summary flag M is set to "summarize" at the step 8405. If the mail document has the priority level lower than "3" and no expression "Immediately", then the summary flag M is set to "summarize it to top line" at the step 8406.

Then, at the step 8407, the summarizing processing is carried out by the document summary unit 8222 according to the value of the summary flag M set at any one of the steps: 8402, 8405, and 8406.

In a case of dealing with the document such as the mail, there may be cases in which the content of the mail is not complete, or too short such that it is not suitable for the summarizing. In such cases, for the excessively short mail the summarizing is not going to be made as it is neither necessary nor possible, and for the incomplete mail, the first or last few lines of the mail may be extracted as the summary, for example, such that some kind of the summarizing processing can be applied to all the mails. Here, the summarizing processing can be controlled by the speech control command "summary" uttered by the user, or the summarizing processing is automatically applied to all the received mails or the longer ones of the received mails by the speech mail system 822.

In this manner, according to this sixteenth embodiment, by incorporating the document summary function in the speech mail tool system, the mail document processing can be made more efficiently, such that the system can be convenient to use for the busy user or the user who needs to deal with a large amount of mails.

Referring now to FIG. 86, the seventeenth embodiment of a speech recognition interface system which defines a speech mail tool system according to the present invention will be described in detail.

In the fifteenth and sixteenth embodiments described above, the speech mail tool system in which the data are presented to the user by using the speech outputs along with the GUI, but the various functions of these embodiments are even more effective in the environment in which the GUI is not available, such as a case of the telephone interface. In this seventeenth embodiment, the speech mail tool system utilizing the speech I/O system through the telephone without using the GUI will be described.

In this seventeenth embodiment, the speech mail tool system has an overall configuration as shown in FIG. 86, which comprises a speech I/O system 851 similar to that of any of the fourteenth to sixteenth embodiments described above, a speech mail system 852 similar to that of the fifteenth or sixteenth embodiment described above, and a mail address table 853 connected with the speech mail system 852.

In this configuration of FIG. 86, the speech I/O system 851 is connected with the telephone line by utilizing the known telephone line connection technique, which will not be described in detail here. Also, here, the input from the telephone to the speech mail system 852 can be made by the speech as well as by the push buttons of the telephone.

In this case, because the mail is the private information, it becomes necessary to provide the authentication procedure for accessing the private information before the content of the mail can be confirmed from the telephone. This authentication can be realized either by the verification of the authetication number entered by the push buttons of the telephone, by utilizing the speaker verification technique, or by using the speech recognition for the pass word entered by the speech input from the telephone.

After the user is verified by this authentication procedure, the access to the mail is carried out interactively, by utilizing the speech recognition and speech output functions provided by the speech I/O system 851. Here, al the basic operations of the speech mail system 852 including the checking of the content of a part or a whole or a summary of the received mail as well the mail forwarding can be made by the speech inputs. In the telephone interface, it is quite impractical to input the mail content by using the push buttons, so that the mail content itself is given by the speech data. Here, the production of the mail document by the speech can be realized by utilizing the speech recognition function and the speech recording function together, which is possible in the configuration of FIG. 86.

An example of the mail document production is shown in FIG. 87, for a case of checking the content of the received mail by the speech output, and forwarding the reply to this received mail by the speech input.

First, the user utters the speech command "Recording start" at (1), which is recognized by the speech I/O system 851 and in response to which the speech mail system 852 records the subsequent utterance of "This is . . . to everybody" at (2) as the mail document. Here, "Stop, Stop." at the end of (2) is the speech command to stop the recording. In this speech command, "stop" is repeated twice in order to distinguish it from a general word "stop" that might be used in the mail document. It is also possible to include this "Stop, Stop." in the recognition vocabulary at the speech I/O system 851 in which case the speech mail system 852 is controlled to automatically delete this "Stop, Stop." portion from the recorded data. The user then commands the checking of the content of the mail document just produced by the utterance of the speech command "Content check" at (3), in response to which the speech mail system 852 reads out the recorded mail document through the speech I/O system 851 at (4). Then, the user commands the forwarding of this mail document by the utterance of the speech command "Send" at (5), and confirms the completion of the mail forwarding by the confirmation speech message outputted from the speech mail system 952 through the speech I/O system 851 at (6).

Here, when the mail document is recorded at (2), the speech section detection unit in the speech recognition unit of the speech I/O system 851 can detect the starting edge of the speech data, so as to avoid recording the silent section between the speech command "Recording start" at (1) and the start of the speech input at (2) that might be existing.

Also, instead of using the speech command "Stop, Stop." for stopping the recording, the speech command "Send" can be set as a command for transmitting the speech data recorded up to that command as the mail document automatically. In this manner, the specific speech command for stopping the recording of the mail document can be dispensed, such that the forwarding of the mail can be done more easily. In this case, the checking of the forwarded mail content can also be made without the specific speech command such as "Content check" used above, by controlling the speech mail system 852 to automatically reproduce the recorded mail document in response to the speech command "Send".

It is also possible to set a rule that an end of each speech section can be indicated by a presence of a silent section for more than three seconds, such that the recording after the speech command "Recording start" is made for the speech sections alone, without using the specific speech command for stopping the recording. With such an ample setting for the indication of the end of the speech section, there is no need for the user to make the speech input for the entire mail message without a break, as it is possible to provide a sufficient period of time for the user to take a breath without automatically stopping the recording unintentionally.

Figures 88, 89, 90, 91:
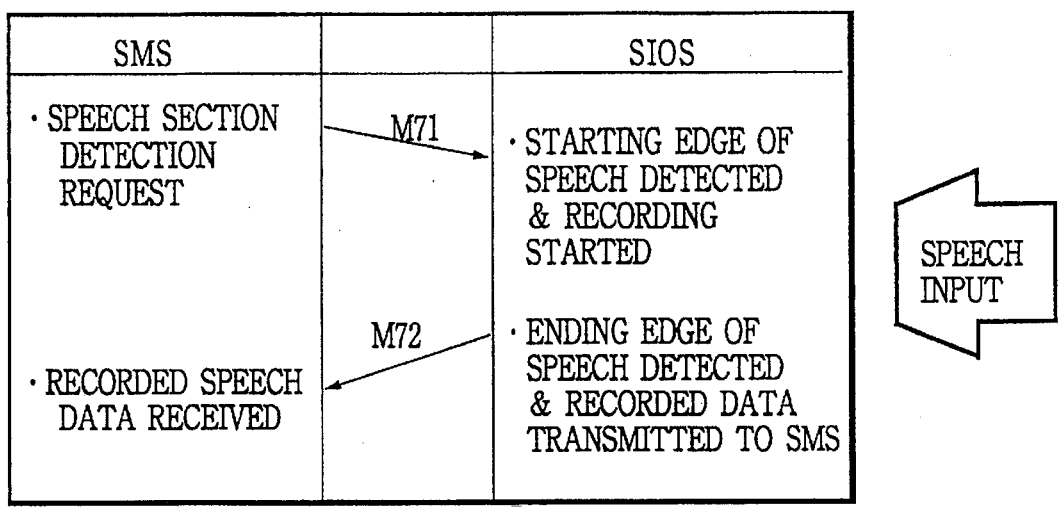
FIG. 88 is a table of messages to be exchanged among elements of the speech recognition interface system of FIG. 86.
FIG. 89 is a chart showing a procedure for obtaining the recorded data for the speech section in the speech recognition interface system of FIG. 86.
FIG. 90 is an illustration of exemplary exchanges between a user and a system for setting a subject of the mail in the speech recognition interface system of FIG. 86.
FIG. 91 is an illustration of an exemplary standard mail document text used in the speech recognition interface system of FIG. 86.

In order to detect the speech section in this manner, the messages to be exchanged from the speech mail system 852 to the speech I/O system 851 include the speech section detection request M71 and the recorded data M72 as shown in FIG. 88. Here, the recorded data for the speech section alone can be obtained by the procedure indicated in FIG. 89, in which the speech mail system 851 transmits the speech section detection request M71 to the speech I/O system 851, in response to which the recording of the input speech is started by the detection of the starting edge, and the recording of the input speech is ended by the detection of the ending edge at the speech I/O system 851. Then, the speech I/O system 851 returns the recorded data M72 obtained from the detected speech section to the speech mail system 852. Here, the speech section detection request can specify the parameters such as a reference time for detecting the ending edge of the speech section (such as three seconds in the above described rule), and a time out reference time for a case of the absence of the input speech, which can be set to 30 seconds for example in a case it is to be regarded that there is no speech input when no speech section is detected after 30 seconds from the request.

As for the subject of the mail, in a case of producing the reply mail to the received mail, it is possible to set the subject of the reply mail to the received mail having "subject: hello" as "subject: re: hello" automatically, using an example of the UNIX mail, but in a case of producing a new mail through the telephone, this manner of setting the subject is not available. For this reason, the speech recognition function can be utilized in such a case as follows.

For example, as shown in FIG. 90, the user can utter the speech command "Subject" that can be recognized by the speech I/O system 851 at (1), in response to which the speech mail system 852 is put into the subject input mode in which the predetermined subject words are set as the recognition vocabulary. The subject words can include any appropriate words such as "hello", "notice", "please contact immediately", "thanks for your trouble", "conference notice", etc. In the example shown in FIG. 90, the subject words "Conference notice" are entered at (2) by uttering these subject words. When these subject words are recognized at the speech I/O system 851, the speech mail system 852 is controlled to enter the text "subject: conference notice" as the subject of the newly producing mail, and outputs the confirmation speech message of "The subject of the mail is a conference notice." through the speech I/O system 851 to the user at (4).

In response to the recognition result obtained in the subject input mode, not only the subject of the mail, but also the standard mail document text may also be entered automatically. For example, for the subject input of "thanks for your trouble", the standard mail document text appear as shown in FIG. 91 in which {receiver} and {sender} alone remains variables to be specified according to the names of the receiver and the sender of the mail. By specifying these variables, it becomes possible for anyone to forward the mail with this standard mail document text. Consequently, it is preferable to provide the database for such a standard mail document text for each subject, such that any desired standard mail document text can be easily called up by the appropriate speech input.

Also, in the fifteenth embodiment described above, the speech data can be added or inserted at any desired position in the mail document. In this regard, in this seventeenth embodiment, it is convenient to make it possible to add the speech data to the subject in the subject input mode, such that the speech output for the subject speech data can be outputted to the user in order to assist the user's comprehension of the mail's sender or the mail content. This subject speech data can be inserted at the same as the subject speech data is recorded.

The speech recognition function can also be utilized for specifying the destination mail address from the telephone, as follows. To this end, the word registration for associating the recognition vocabulary with the mail addresses is carried out in advance by utilizing the vocabulary learning function. For example, a mail address book having an appearance as shown in FIG. 92 is provided in the speech mail system 852, and the mail address and the speech input are associated with each other by using the mail address registration window as shown in FIG. 93 by the following procedure.

(1) The mail address book of FIG. 92 is opened.

(2) The mail address registration window of FIG. 93 is opened, and the new registration of the mail address is started.

(3) The name and the address of the intended receiver are entered through the keyboard.

(4) For as many times as necessary for the learning as indicated in the mail address registration window, the new word to be learned (suzuki in this example) are uttered.

(5) The OK button is pressed to complete the registration.

In this manner, the uttered recognition vocabulary (suzuki) and the entered mail address (suzuki@aaa,bbb,ccc, co.jp) are associated with each other, such that this speech input becomes available from the telephone in future.

For example, the speech input can be used in the procedure shown in FIG. 94 as follows. First, the user utters "Destination" at (1), and when this speech input is recognized, the speech mail system 852 makes the speech output for the response message at (2). Then, the user utters the speech input "Suzuki" at (3) which can be recognized as it has registered beforehand as described above. In response, the mail speech system 852 makes the speech output for the confirmation message at (4) to urge the user's confirmation, while inserting the text "to: suzuki@aaa,bbb,ccc,co.jp" into the mail document. In this confirmation message, the speech input for the recognized word uttered by the user and automatically recorded at the time of the learning can be utilized for this purpose. The confirmation message of (4) is a type of the message in which "suzuki@aaa,bbb,ccc,co.jp" part is read out in terms of alphabets. Finally, the user enters the confirmation speech input at (5) to complete the operation to specify the mail address by speech input.

The above described manner of specifying the mail address by the speech input is limited to only those words which are registered in advance. In this regard, it is also possible to specify a desired one of the already registered mail addresses by the speech input as follows. To this end, the speech mail system 852 is provided with a function to construct the database for the mail addresses automatically according to the mails received by this user in the past.

In a case of the UNIX mail, the mail address is specified in the mail header, so that the database for the mail addresses can be constructed easily by utilizing the mail header of each received mail. For example, the mail address typically has a configuration of <user name@affiliation, organization name, organization classification, country classification>, so that the database in the tree structure can be constructed by reading the parts of each mail address in the backward order, from the country classification toward the user's name.

In the operation to specify the mail address, the speech mail system 852 traces the nodes in the tree structure of the database starting from the country classification, by reading out each option in the synthesized speech, in the procedure indicated in FIG. 95. In this procedure of FIG. 95, the recognition vocabulary should include the commands such as "withdraw" for withdrawing the erroneous selection of the option made and going back to the previous node, and "cancel" for cancelling the current mail address input. It is also possible to associate the desired recognition vocabulary to a desired node such that, for example, when the company name is uttered, the tracing can jump to the mail address node for that company immediately.

In this manner, the mail address can be specified by the speech input as far as those from whom the mail has been received in the past are concerned.

It is also possible to specify the mail address by the speech input for those from whom the mail has not been received in the past by utilizing the speech recognition system based on the phonemic recognition in which the recognition dictionary in word units is unnecessary.

Figure 96:
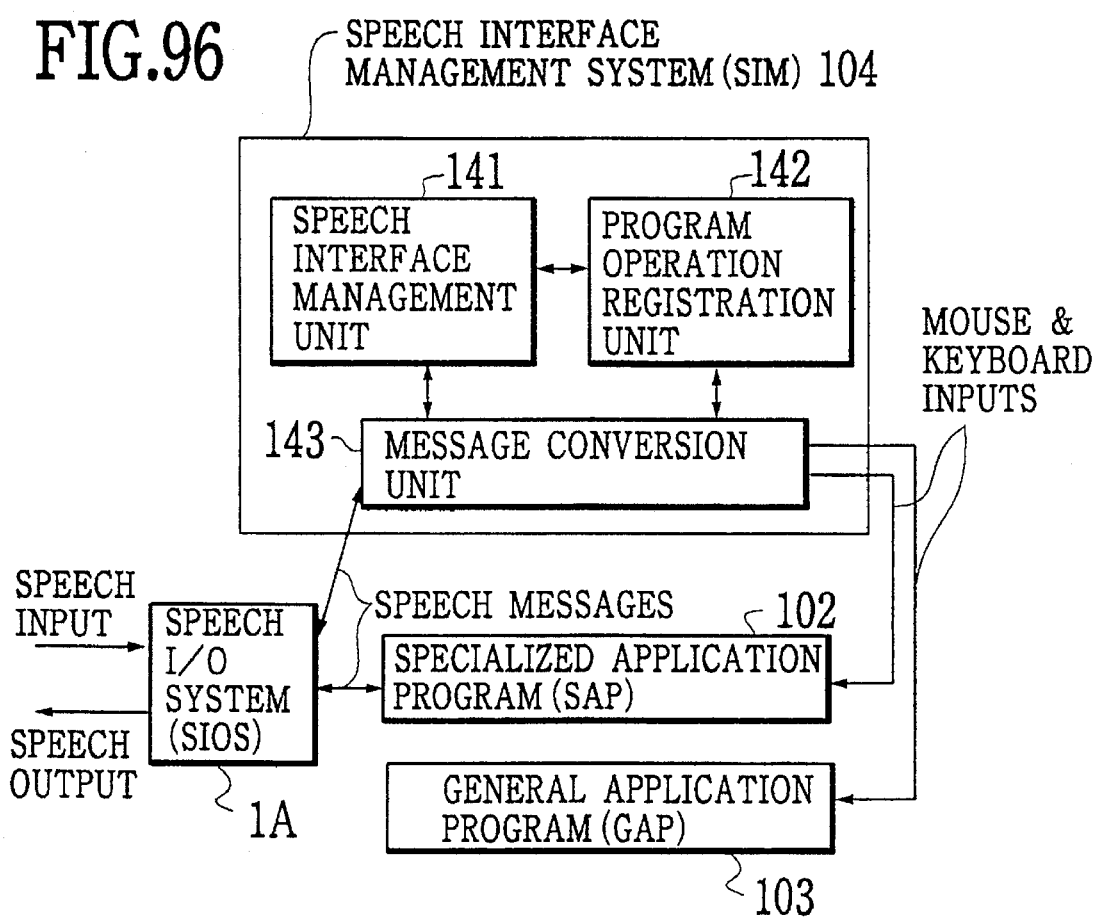
FIG. 96 is a schematic block diagram of an eighteenth embodiment of a speech recognition interface system according to the present invention.

Referring now to FIG. 96, the eighteenth embodiment of a speech recongnition interface system which defines a speech input and output interface system according to the present invention will be described in detail.

The speech recognition interface system and the speech input and output interface system of the various embodiments described above have been those which provide the speech recognition and speech synthesis services for the application programs developed with these systems in mind. In this eighteenth embodiment, the speech recognition interface system capable of speech controlling the general application program which may not necessarily be capable of exchanging messages directly with the speech recognition system or the speech I/O system will be described. By means; of this eighteenth embodiment, the speech recognition interface system or the speech input and output interface system according to the present invention can be applicable to considerably enlarged application fields and available to considerably wider users. In the following, a case of the speech input and output interface system will be described, although this eighteenth embodiment is equally applicable to the speech recognition interface system similarly.

In this eighteenth embodiment, the speech input and output interface system has an overall configuration as shown in FIG. 96, which comprises a speech I/O system 1A similar to that of the fourteenth embodiment described above, a speech interface management system (referred hereafter as SIM) 104 connected with a message processing unit (not shown) of the speech I/O system 1A as one application program, a specialized application program (referred hereafter as SAP) 102 connected with the speech I/O system 1A as one application program programmed for it as well as the SIM 104, and a general application program (referred hereafter as GAP) 103 connected with the SIM 104 which is not capable of directly exchanging messages with the speech I/O system 1A.

The GAP 103 is not directly connected with the speech I/O system 1A so that it can be operated totally independently from the speech I/O system 1A. On the other hand, the SAP 102 is directly connected with the speech I/O system 1A so that it is operated in relation to the speech I/O system 1A. This SAP 102 corresponds to the application programs in the various embodiments described above. In this FIG. 96, only one SAP 102 and only one GAP 103 are shown, although a plurality of them can be provided with respect to the single speech I/O system 1A in general.

The SIM 104 is one of SAP, which intermediate between the speech I/O system 1A and the GAP 103 to make the GAP 103 to be speech controllable. Here, the display of the speech focus is also handled by the SIM 104.

Now, the operation of the SIM 104 with respect to the GAP 103 will be described. As described above, the GAP 103 is not directly connected with the speech I/O system 1A, so that the inputs that can be received by the GAP 103 are limited to those entered through the input means other than the speech input, such as the mouse and the keyboard. In order to make this GAP 103 to be speech controllable, the SIM 104 converts the speech inputs into the form acceptable by the GAP 103 such as that of the mouse inputs or the keyboard inputs.

As shown in FIG. 96, in this eighteenth embodiment, the SIM 104 further comprises a speech interface management unit 141, a program operation registration unit 142, and a message conversion unit 143, which are mutually connected and the message conversion unit 143 is also connected with the speech I/O system 1A, the SAP 102, and the GAP 103.

The speech interface management unit 141 has a table indicating the correspondences between the speech recognition results and the operations for each application program, called the speech interface management table, where the data in this speech interface management table are registered by the program operation registration unit 142. The message conversion unit 143 is directly connected with the message processing unit of the speech I/O system 1A, and has a function to exchange the messages with the speech I/O system 1A. When the recognition result is received from the speech I/O system 1A, this message conversion unit 143 converts the received recognition result into the operation command for the GAP 103 in accordance with the data registered in the speech interface management table, and transmits the converted operation command to the GAP 103.

In order to transmit the operation command from the SIM 104 to the GAP 103, it is necessary for the GAP 103 itself to facilitate the operation from the other application program. In a case the GAP 103 is the application program using the window system, the SIM 104 transmits the messages identical to those generated at the time of the operation command inputs by the usual input devices such as the keyboard and the mouse, to the GAP 103 through the window system. Such an operation command transmission can be easily implemented by utilizing the functions provided in the library of the window system. In the actual window system, there are cases in which the destination of the messages is not the GAP 103 itself but the object such as the window generated by the GAP 103 so that the messages must be addressed to the identifier of that object. Even in such cases, it is easy to determine the identifier of the destination object from the information obtained from the window system and the program operation registration content to be described below.

Figure 97:
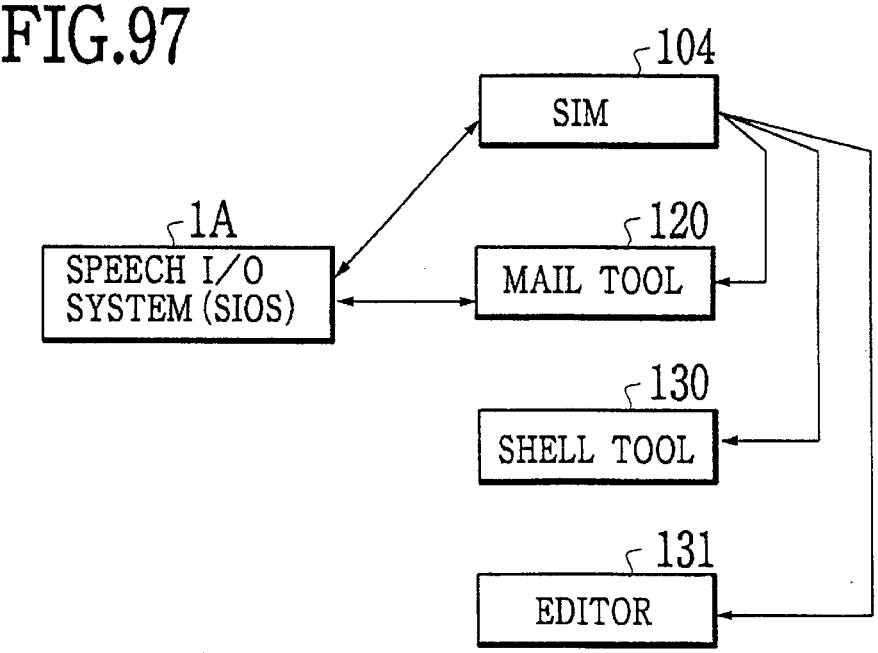
FIG. 97 is a schematic block diagram of a concrete example of the speech recognition interface system of FIG. 96.

Now, the operation in this eighteenth embodiment will be described by using a concrete example shown in FIG. 97, in which the SIM 104 and a mail tool 120 that are directly connected with the speech I/O system 1A are operated in parallel while the shell tool 130 and the editor 131 which cannot be directly connected with the speech I/O system 1A are also operated in parallel. In this exemplary case, the screen display appears as shown in FIG. 98 for example.

Figures 98, 99:
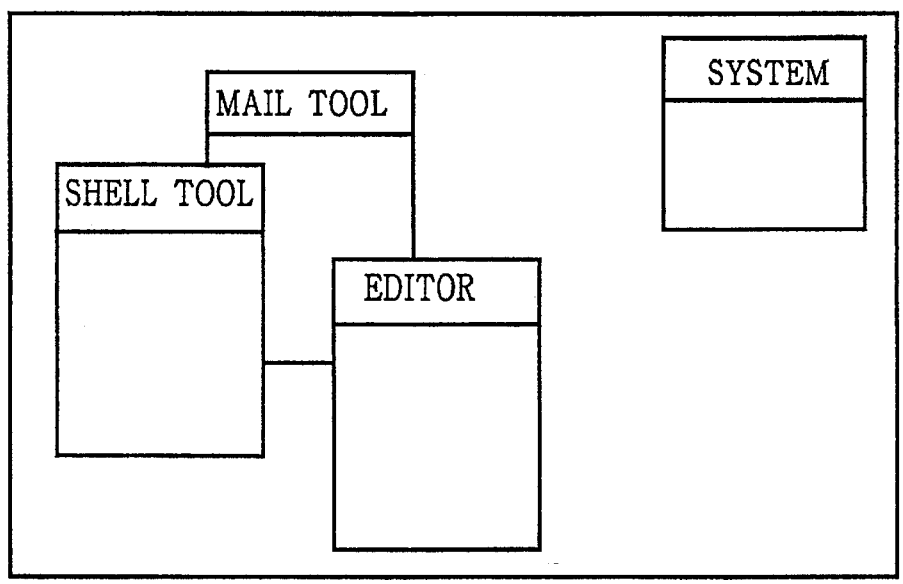
FIG. 98 is an illustration of an exemplary screen display in the speech recognition interface system of FIG. 96.
FIG. 99 is a diagrammatic illustration of a speech interface management table in the speech recognition interface system of FIG. 96.

Here, an example of the speech interface management table in the SIM 104 is shown in FIG. 99. In this FIG. 99, the program names are also the recognition vocabulary, so that when the user utters one of the program names, the dummy speech focus on the application program can be shifted to the application program having the uttered program name. Also, the "application program" here serves as the identifier for the application programs themselves, as well as the transmission target for the commands.

The dummy speech focus is an imaginary speech focus which is set for the application program. Namely, the GAP 103 such as the shell tool 130 and the editor 131 is not directly connected with the speech I/O system 1A, so that the speech I/O system 1A itself actually does not notice the existence of the GAP 103, and therefore the real speech focus cannot be set for the GAP 103. Here, however, when the SIM 104 receives the recognition result of the name of the GAP 103 such as "shell tool" or "editor", the SIM 104 makes the request to set the command names defined for that GAP 103 as the recognition vocabulary to the speech I/O system 1A. For example, in a case the recognition result of "shell tool" is received, the SIM 104 requests the speech I/O system 1A to set the commands of the shell tool 130 such as "LS" and "Process" as the recognition vocabulary.

In this case, the display of the speech focus is made for that GAP 103 by the SIM 104 as if the real speech focus is on that GAP 103. Namely, as indicated in FIG. 100, when the dummy speech focus is set for the GAP 103 such as the shell tool 130 or the editor 131, the real speech focus is actually set for the SIM 104, but the SIM 104 displays the dummy speech focus on the screen display. In other words, the SIM 104 switches the recognition context whenever the program name of the GAP 103 is recognized. Here, as can be seen in a case of the mail tool 120, the dummy speech focus coincides with the real speech focus in a case of the SAP 102.

Here, the attributes of the command names of the SIM 104 and the GAP 103 are local for the SIM 104. In other words, they are going to be the recognition vocabulary when the speech focus is focused on the SIM 104. On the other hand, the attributes of the command names for the SAP 102 are global for the SIM 104 so that the speech focus is not on the SIM 104 whenever the SIM 104 transmits the command to the SAP 102. For example, in FIG. 99, the command name "Finish" for the mail tool 120 has the global attribution just like the program names, as indicated by attribution value (1) attached to this command name "Finish" in the entry for the mail tool 120 in FIG. 99, as oppose to the attribution value (0) attached to the other command names for the other application programs.

In this eighteenth embodiment, the message conversion unit 143 of the SIM 104 operates according to the flow chart of FIG. 101 as follows.

First, at the step 9001, whether the message received from the speech I/O system 1A is the recognition result or not is judged, and if so, next at the step 9002, whether the received recognition result is the program name or not is judged.

In a case the received message is not the recognition result at the step 9001, the operation of the message conversion unit 143 is terminated.

On the other hand, in a case the received message is the recognition result for the program name at the steps 9001 and 9002, the command names for the application program focused by the immediately previous dummy speech focus are removed from the recognition result at the step 9003, the dummy speech focus is set to the application program having the recognized program name at the step 9004, and the command names of the dummy speech focused application program are set or added as the recognition target vocabulary at the step 9005.

In contrast, in a case the received message is the recognition result at the step 9001 but not the program name at the step 9002, the command corresponding to the recognized command name is transmitted to the dummy speech focused application program at the step 9006.

In this manner, the already existing general application programs which themselves do not support the speech inputs can be made to be speech controllable according to this eighteenth embodiment, so that the convenience of the user in using the system can be improved while the range of the users to whom the present invention is available can be enlarged.

Referring now to FIG. 102, the nineteenth embodiment of a speech recognition interface system which defines a speech input and output interface system according to the present invention will be described in detail.

Under the system having the GUI based on the window system, one program can be operated in a plurality of windows. In this nineteenth embodiment, the eighteenth embodiment described above is further extended to enable the speech inputs to the individual window of each application program having a plurality of windows, such that more extensive use of the speech recognition to further improve the maneuverability of the system becomes possible.

In the various embodiments described above, the speech focus has been set in units of the "application program", but in this nineteenth embodiment, this unit for setting the speech focus is changed to the "speech window". Here, each application program can have a plurality of the speech windows, and each speech window has its own speech window name, its own input masks, and its own recognition vocabulary set.

In this nineteenth embodiment, the speech input and output interface system has an overall configuration as shown in FIG. 102, which comprises a speech I/O system 1A similar to that of the eighteenth embodiment described above, and a plurality of application programs 2A each of which has a plurality of speech windows 23. Here, the speech windows 23 are depicted as elements of the application programs 2A intuitively, although the speech windows 23 are actually defined within the program management table 13 of the speech I/O system 1A and do not exist as separate physical elements within the application programs 2A.

Now, the concrete example used in the eighteenth embodiment above in which the SIM 104 and a mail tool 120 that are directly connected with the speech I/O system 1A are operated in parallel while the shell tool 130 and the editor 131 which cannot be directly connected with the speech I/O system 1A are also operated in parallel will be considered in this configuration. Here, the SIM 104 and the mail tool 120 are the SAP, while the shell tool 130 and the editor 131 are the GAP.

Figure 103:
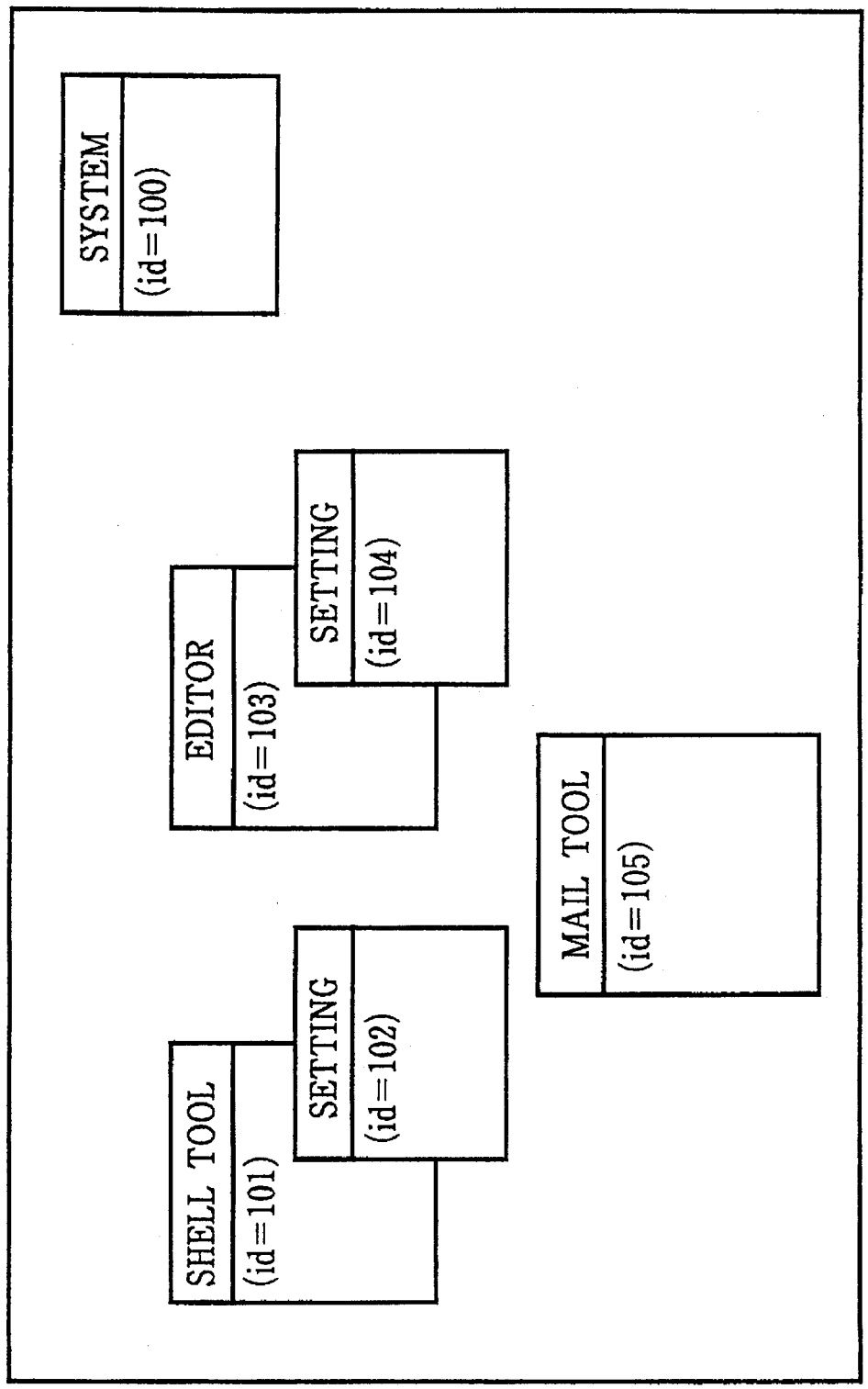
FIG. 103 is an illustration of an exemplary screen display in the speech recognition interface system of FIG. 102.

In addition, it is assumed that each of the shell tool 130 and the editor 131 is formed from two windows, while each of the SIM 104 and the mail tool 120 is formed from one window, as shown in FIG. 103.

Figure 104:
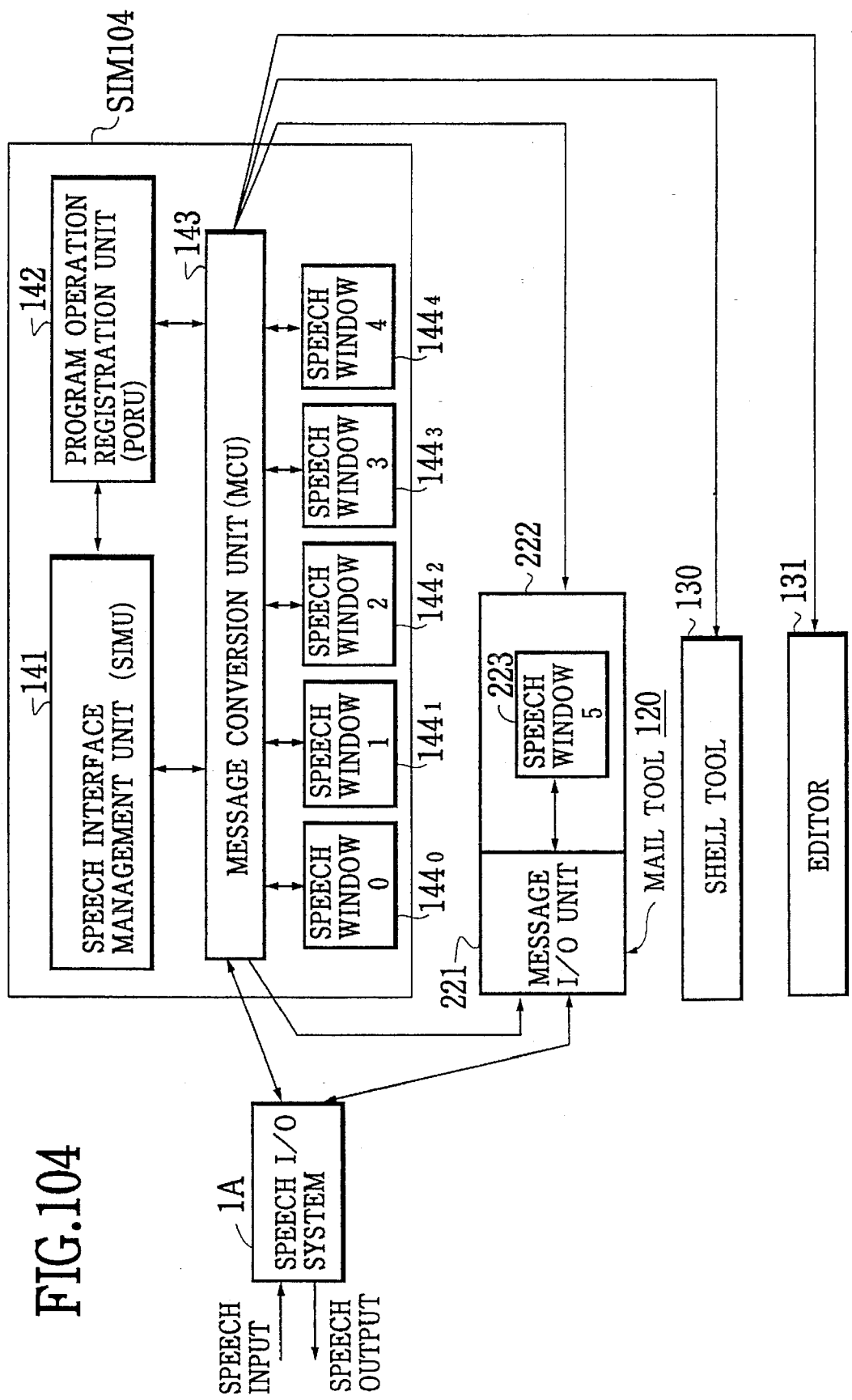
FIG. 104 is a detailed block diagram of a concrete configuration of a speech interface management system in the speech recognition interface system of FIG. 102.

In this case, the speech input and output interface system of this nineteenth embodiment has an overall configuration as shown in FIG. 104. The mail tool 120 which is the SAP has its own speech window 223, while the SIM 104 has its own speech window-0 ($144_0$) as well as speech windows-1 to -4 ($144_1$ to $144_4$) for the GAPs. These speech windows are different from the usual windows in the window system or the OS such as those shown in FIG. 103, and do not possess any visual attribution. The windows in the window system usually have the tree structure, and this tree structure as well as the change of the internal state of the window system can be seen from the internal of each application program. In this configuration, the SIM 104 makes accesses to such window system data and the data of the speech I/O system 1A to operate the usual windows and the speech windows cooperatively, to provide the coordinated user interface function. Here, the association of the usual window and the speech window can be realized by assigning the unique and identical attribution such as the window name to the both, or by the operation of the program operation registration unit 142 interactively.

Each speech window has the attributes of the window name, the recognition vocabulary, and the input masks, and the speech I/O system 1A sets up the speech focus in units of the speech windows. The recognition vocabulary such as the window names and the command names have the attributes of the local or the global and the window. The local recognition vocabulary is that which is set as the recognition vocabulary only when the speech focus is set to the speech window belonging to it, whereas the global recognition vocabulary is that which is always set as the recognition vocabulary regardless of where the speech focus is set. The recognition vocabulary with the window attribute is that which is set as the recognition vocabulary when the speech focus is set to the speech window belonging to the same application program as its speech window even if this speech focused speech window is not its speech window itself.

It is also capable of grouping a plurality of speech windows to form the mixed recognition vocabulary, such that the recognition result can be transmitted to the speech window belonging to the recognition vocabulary containing the recognition result automatically according to the recognition result. For example, when the program management table is in the state shown in FIG. 108, the shell tool and the editor can be grouped together such that the commands "LS", "Process", "Cut", "Copy", and "Paste" of these application programs can be recognized at once, where the recognition result is transmitted to the shell tool in a case "LS" or "Process" is recognized, whereas the recognition result is transmitted to the editor in a case "Cut", "Copy", or "Paste" is recognized.

In this manner, the shift of the speech focus between the shell tool and the editor can be omitted, such that they can be operated more efficiently. In a case the same word belongs to the recognition vocabularies of a plurality of speech windows, the recognition result can be transmitted to all of these speech windows which share that same word, or to only the speech focused speech window at the time of the recognition. Here, the grouping is specified by the attribute of the group window ID provided in the program management table of FIG. 108.

As a method of grouping the speech windows, it is also possible to introduce the parent-child relationships among the speech windows, such that the recognition vocabularies of the parent window and the child window can be recognized together. For example, when the program management table is in the state shown in FIG. 108, the setting window for the shell tool can be designated as the child window for the shell tool window as its parent window, such that when the speech focus is focused on this setting window, the mixed recognition vocabulary of these two speech windows are used in the recognition.

In this manner, when the speech focus is focused on the child window, the speech input to the parent window can be made without shifting the speech focus to the parent window, such that they can be operated more efficiently. Here, in a case the same word belongs to the recognition vocabularies of the parent and child windows have the same word, the priority to transmit the recognition result can be set to the child window.

Now, in the state of FIG. 104, the speech interface management table in the speech interface management unit 141 of the SIM 104 appears as shown in FIG. 105, in which the speech interface management table of FIG. 99 in the eighteenth embodiment described above is expanded such that the window ID and the speech window ID are included while the program name in FIG. 99 is replaced by the window name. The window ID is an identifier of the window in the window system as indicated in FIG. 103. As can be seen in FIG. 105, the window IDs and the speech window IDs have the one-to-one correspondences, so that the SIM 104 can coordinate the window and the speech window according to this speech interface management table of FIG. 105. For example, in this example, when the "shell tool" is recognized, the SIM 104 sets the speech focus to the speech window with the speech window ID=1, and changes the display of the window with the window ID=101 to a state of being speech focused in a manner similar to the speech focus indication in the previous embodiments.

Figure 106:
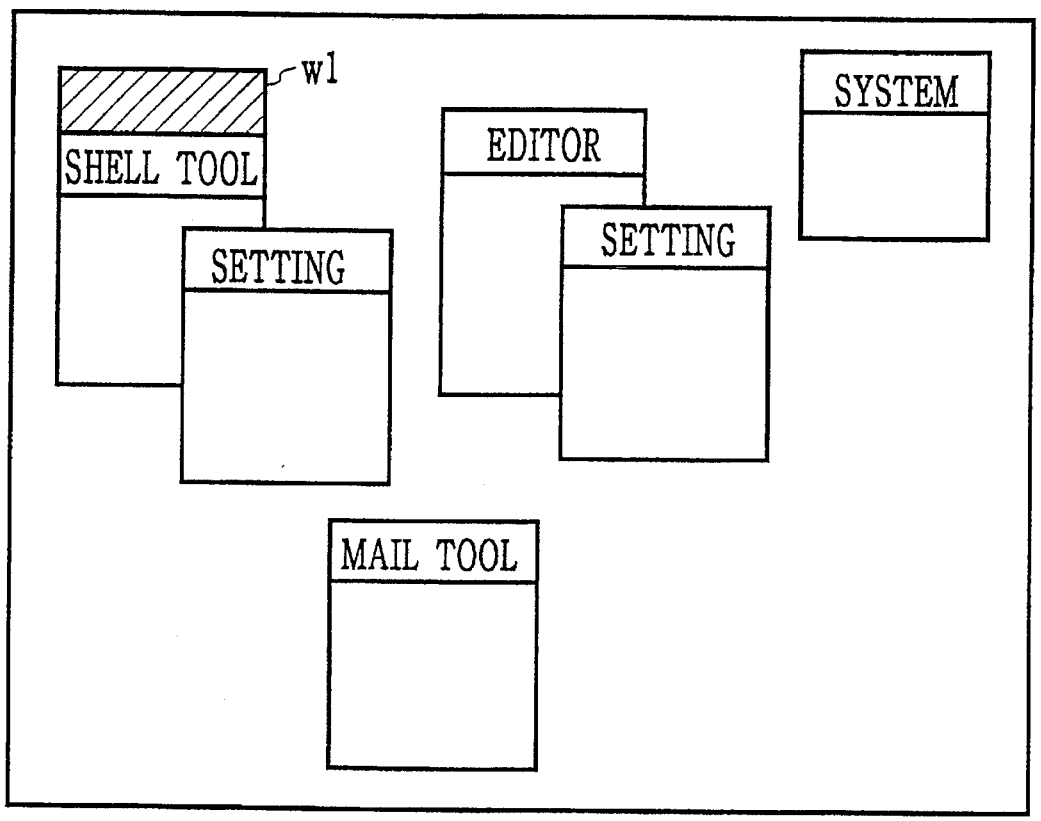
FIG. 106 is an illustration of an exemplary screen display in the speech recognition interface system of FIG. 102.
Figures 107A, 107B, 107C:
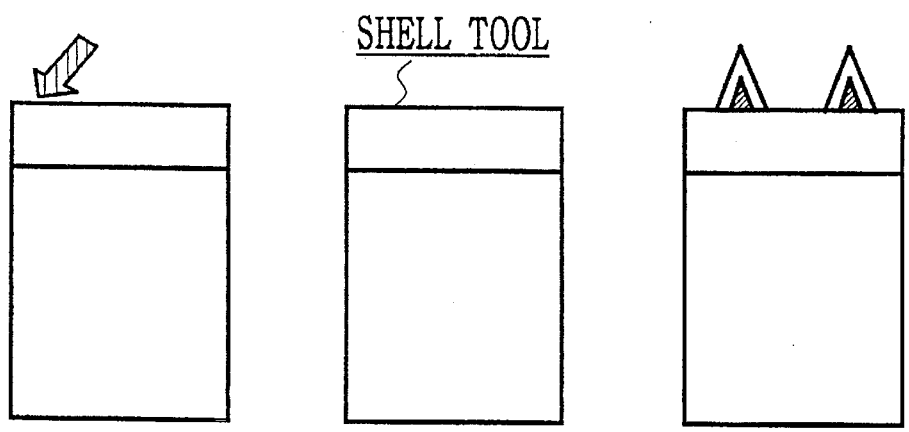
FIGS. 107A, 107B, and 107C are illustration of three exemplary displays for indicating a location of speech focused window in the speech recognition interface system of FIG. 102.

Depending on the window system or the OS used, there are cases in which the display of the other application program window cannot be changed, but in such a case, as shown in FIG. 106, an independent window w1 to indicate the location of the speech focus can be pasted to the speech focused window of the other application program. Here, this independent window w1 can be given in any desired form such as those shown in FIGS. 107A, 107B, and 107C. The position and the number of this independent window is not limited to those shown in these figures, and can be set freely as long as the location of the speech focus can be indicated clearly. Moreover, the dynamic image may be used for this independent window to indicate the location of the speech focus more clearly.

Also, in this example, the program management table 13 of the speech I/O system 1A is expanded into a form shown in FIG. 108, which includes the speech window ID and the window name. Here, the speech window ID is the identifier of the speech focused speech window, and the window name is its name. The attribute or the local or the global and the window is indicated by the number in the parentheses attached to the window name and the recognition vocabulary, where (0) indicates the local, (1) indicates the window, and (2) indicates the global.

In a case of the configuration shown in FIG. 104, the program management table 13 of the speech I/O system 1A is in the state shown in FIG. 108, while the speech interface management table of the SIM 104 is in the state shown in FIG. 105. In this case, it appears to the user as If the speech focus is focused on the "shell tool" (window ID=101) by the dummy speech focus. On the other hand, the actual speech focus is set to the speech window (speech window ID=1) corresponding to this window (window ID=101), and this speech window belongs to the SIM 104. In this state, the recognizable recognition vocabulary includes "LS", "Process", "Shell tool", "Editor", "Mail tool", "Setting", and "System".

Figure 109:
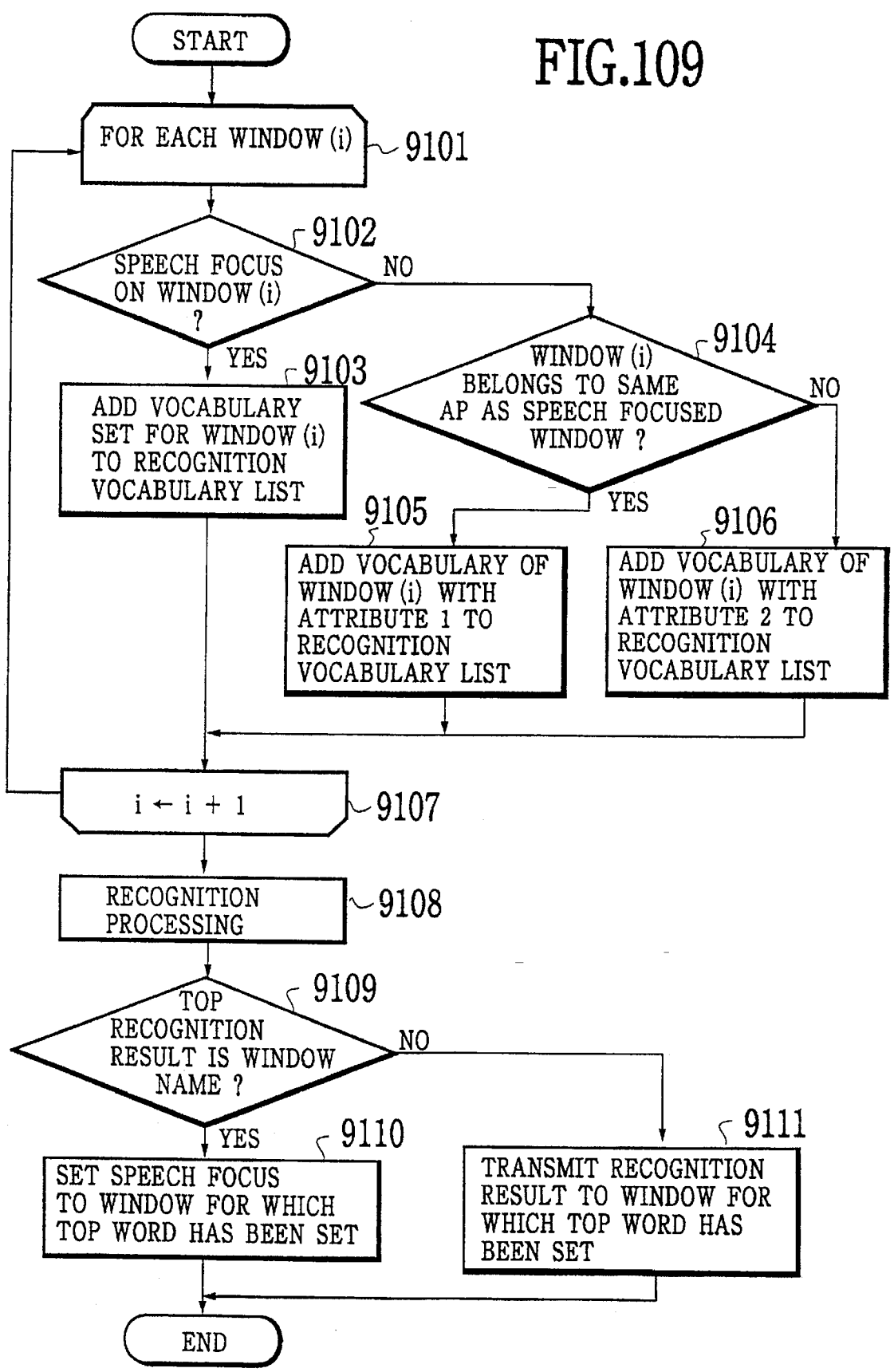
FIG. 109 is a flow chart for the recognition operation in the speech recognition interface system of FIG. 102.

In this configuration, the speech I/O system 1A carries out the recognition processing, and the obtained recognition result is transmitted to the speech window having the recognized word as its recognition vocabulary. This recognition operation can be carried out according to the flow chart of FIG. 109 as follows.

First, between the steps 9101 and 9107, for each window (i), i=0, 1, 2, 3, 4, 5, whether the speech focus is on this window (i) or not is judged at the step 9102. If so, the vocabulary set for this window (i) is added to the current recognition vocabulary list at the step 9103, whereas otherwise whether this window (i) belongs to the same application program as the currently speech focused window or not is judged at the step 9104. If so, the vocabulary of this window (i) with the attribute value (1) (i.e., the window recognition vocabulary) is added to the current recognition vocabulary list at the step 9105, whereas otherwise the vocabulary of this window (i) with the attribute value (2) (i.e., the global recognition vocabulary) is added to the current recognition vocabulary list at the step 9106.

After these steps 9101 to 9107 are completed for all the windows, the recognition processing is carried out at the step 9108 by using the current recognition vocabulary list obtained between the steps 9101 and 9107, and whether the top recognition result obtained by this recognition processing is the window name or not is judged at the step 9108. If so, the speech focus is set to the window for which the top recognized word has been set as its vocabulary at the step 9110, whereas otherwise the recognition result is transmitted to the window for which the top recognized word has been set as its vocabulary at the step 9111.

For example, in FIG. 108, there are two speech windows (speech window ID=2 and 4) for which one of the recognizable words "setting" is set as their vocabularies, but the attribute values for this word is (1) in both of these speech windows, so that the recognition result of "setting" will be transmitted to the speech window ID=2 as it belongs to the same application program as the speech focused window ("shell tool"). Similarly, if the speech focus in on the speech window ID=3 ("editor"), the recognition result of "setting" will be transmitted to the speech window ID=4. Here, when the speech I/O system 1A recognized the window name, the speech I/O system 1A can either transmit the recognition result to the speech window belonging to the recognized window name, or set the speech focus to that speech window without transmitting the recognition result.

In this manner, in this nineteenth embodiment, by providing the window attribute to the recognition vocabulary, it becomes possible to give the same name to a plurality of windows of each application program, and operate them consistently, such that the convenience of the user in using the system can be improved considerably.

Referring now to FIG. 110, the twentieth embodiment of a speech recognition interface system which defines a speech input and output interface system according to the present invention will be described in detail. In this twentieth embodiment, a detail configuration of the program operation registration unit 142 in the eighteenth and nineteenth embodiments described above will be described.

As described above, in order to apply the speech input and output interface system of the present invention to the already existing GAP, there is a need to make the correspondences between the operations in the GAP and the vocabulary to indicate these operations separately from those of the SAP.

To this end, the registration of the program operation includes the registration of the program name or the window name used in shifting the speech focus to the target application program, and the establishment of the correspondences between the recognition vocabulary and the keyboard or mouse input event sequence for carrying out the operations of the already existing GAP. For example, in a case of using two windows in the shell tool, window names "shell 1" and "shell 2" are given, and the word "clear" is assigned and registered for the keyboard input sequence for carrying out the operation of the clear command to delete all the characters on the screen display in the shell tool, for example.

Usually, the GAP does not provide any specific window name for the window used by itself, so that in order to specify the window of the application program by the name, it is necessary to assign a specific window name to it such that this window becomes identifiable by the window name in the speech interface management table. For this reason, the speech interface management table such as that of FIG. 105 in the nineteenth embodiment above has the fields for registering the window name and the window ID which is the identifier of the window in the window system. Using this speech interface management table, when the recognition result of "editor" is received for example, the speech interface management unit 141 can set the dummy speech focus to the window having the window ID=103.

The window ID can be obtained by making access to the data possessed by the window system. For example, this widow ID can be obtained by requesting the data concerning the window structure to the server of the window system, but the window name may not necessarily be obtained in this manner. In this regard, by adopting a scheme to activate the program by specifying the window name, the window ID and the window name can be obtained together, but this scheme is difficult in a case of using the pop-up window in which another window can be newly generated while the program is in operation, since it is difficult to assign the window names to all the windows that can possibly be generated while the program is in operation before the activation of the program. In such a case, the window ID of the window can be obtained by clicking the window with the mouse, and the window name can be assigned by making a correspondence of the window name with the obtained window ID. Here, the window ID of the window clicked by the mouse can be obtained easily by requesting it to the server of the window system.

Now, the procedure for the naming of the window and the registration of the program operation in this twentieth embodiment will be described.

In this twentieth embodiment, the program operation registration unit 142 has a configuration as shown in FIG. 110, which comprises a program operation display and edit unit 151 for carrying out the display of the registration content on the screen display and the input of the registration content from the user, a registration content storage unit 152 for storing the registration content in a registration content file 200, and a window ID gain unit 153 for gaining the window ID from the window system by requesting it to the server of the window system.

The program operation display and edit unit 151 displays the registration screen display as shown in FIG. 111 for example, to carry out the input of the window name, the program operation, and the words, and writes the registration content into the speech interface management table of the speech interface management unit 141. The registration content storage unit 152 stores the registration content.

The registration screen display of FIG. 111 comprises a "registration" button for commanding the writing of the registration content into the speech interface management table, a "cancel" button for commanding the cancellation of the inputted content and restoring the original state before the inputs, a "finish" button for commanding the finishing of the registration, a "window ID gain" button for commanding the gaining of the window ID for the target GAP, an "AP class" window for inputting the application program type, a "window name" window for inputting the window name, and the program operation input window for inputting the vocabulary and the corresponding keyboard or mouse input command sequence representing the program operation.

FIG. 111 shows an exemplary state in which the application program of "shell" and the window name of "shell 1" are selected as indicated by the reversed background color (expressed by shading in FIG. 111), and the keyboard input corresponding to the words "LS" and "clear" as the operations for the "shell 1" are inputted along with the scope of these words as (0) indicating that they are local vocabulary.

Figure 112:
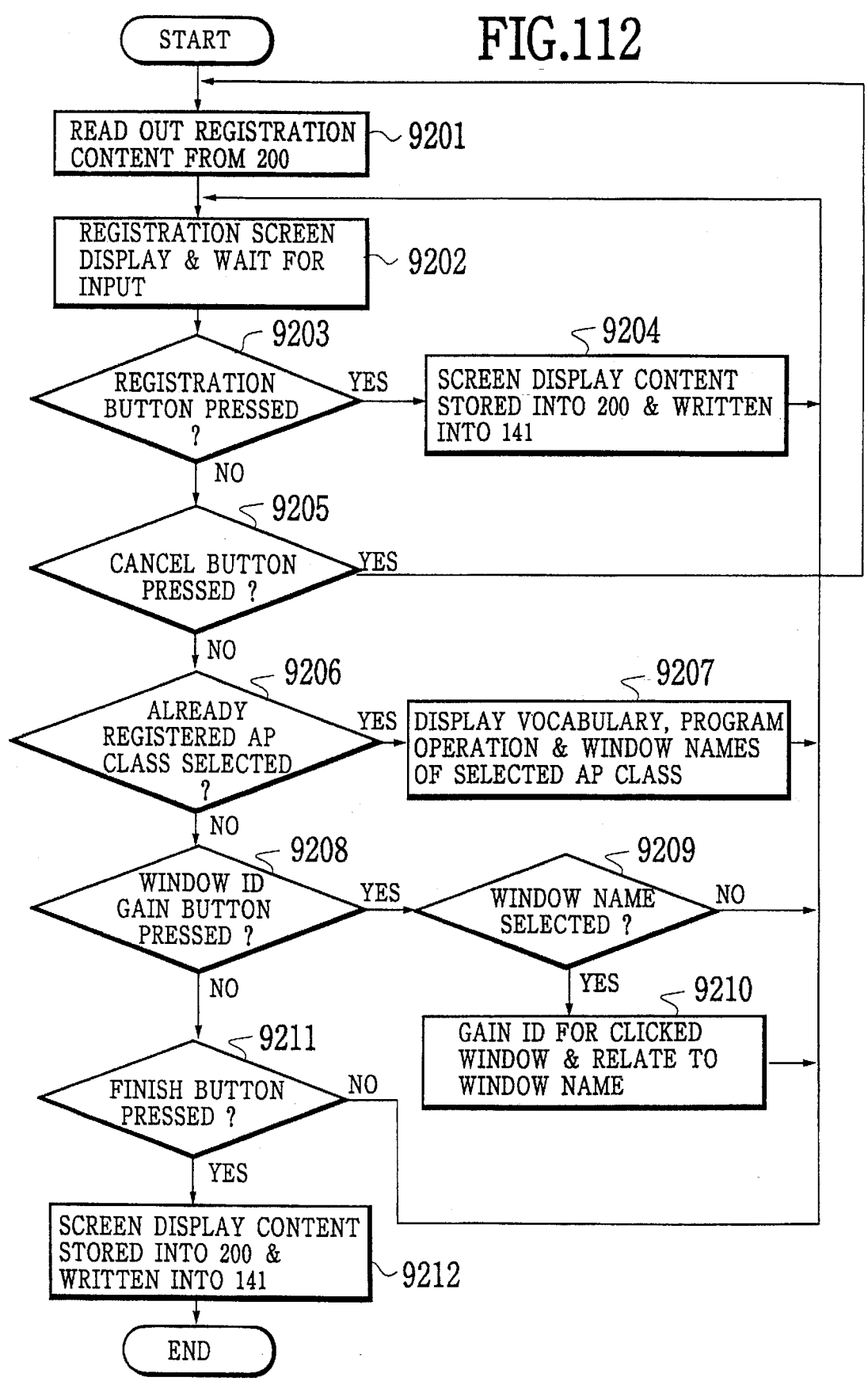
FIG. 112 is a flow chart for the program operation registration operation in the speech recognition interface system of the twentieth embodiment.

Now, this program operation registration can be carried out according to the flow chart of FIG. 112 as follows.

First, when the program operation registration unit 142 is activated by the message conversion unit 143, the program operation registration unit 142 reads out the registration content from the registration content file 200 at the step 9201, and the read out registration content is displayed as the registration screen display and the input from the user is awaited at the step 9202.

At this point, the user makes the inputs of the AP class, the window name, the vocabulary, and the program operation, or the pressing of the "registration" button, the "cancel" button, the "finish" button, and the "window ID gain" button.

In a case it is judged that the "registration" button is pressed at the step 9203, the screen displayed registration content is stored into the registration content file 200 through the registration content storage unit 152 while it is also written into the speech interface management table in the speech interface management unit 141 at the step 9204, such that the registration content can be reflected in the operation of the system, and the procedure returns to the step 9202 to wait for the next input from the user.

In a case it is judged that the "cancel" button is pressed at the step 9205, the procedure returns to the steps 9201 and 9202 such that the registration content is read out from the registration content file 200 again and the input from the user is awaited.

In a case it is judged that the already registered AP class is selected at the step 9206, a list of the window names and the vocabulary and the program operation for the selected AP class are screen displayed at the step 9207, and the procedure returns to the step 9202 to wait for the next input from the user.

In a case it is judged that the "window ID gain" button is pressed at the step 9208, whether the window name is also selected or not is judged at the step 9209. If the widow name is also selected, when the clicking of the window with the mouse is made by the user, the window ID of the clicked window is gained from the window system, and the selected window name and the gained window ID are written into the speech interface management table in correspondence so as to relate the window name and the window ID at the step 9210, and the procedure returns to the step 9202 to wait for the next input from the user, whereas otherwise the procedure returns to the step 9202 directly from the step 9209.

In a case it is judged that the "finish" button is pressed at the step 9211, the screen displayed registration content is stored into the registration content file 200 through the registration content storage unit 152 while it is also written into the speech interface management table in the speech interface management unit 141 at the step 9212, and the registration procedure is finished.

In this program operation registration procedure, by utilizing the registration content of the other application program and changing the selection of the application program type, the same program operation can be specified for different application program automatically, without explicitly inputting it every time, so that the registration can be carried out efficiently.

Also, by gaining the window ID for the mouse clicked window and relating it to the window name, the window can be easily named for the purpose of the speech input, even for the window of the application program which cannot be activated by specifying the window name.

In the above described program operation registration procedure, the correspondence between the program operation command and the recognition vocabulary is set up by utilizing the already generated window ID. However, in general, the ID of the object such as the window is determined at a time of its generation, and the different IDs are assigned for the windows of the different application programs even when these application programs are of the same type. Consequently, at the time of the registration, the window attribute values such as the window hierarchy and the window name which are shared by the same type of the application programs can be obtained from the window system, and added to the registration content, such that the common registration content can be obtained for the same type of the application programs by the matching of these attribute values.

In addition, at the time of the registration, more than actually required number of windows can be registered for one application program of a particular type, such that when another application program of the same type is activated later on, the actually used window name of that one application program can be obtained from the speech I/O system 1A and the unused window name registered for that one application program can be re-assigned to the window of that another newly activated application program of the same type, so as to avoid the occurrence of the conflicting window names among the application programs of the same type efficiently.

Figure 113:
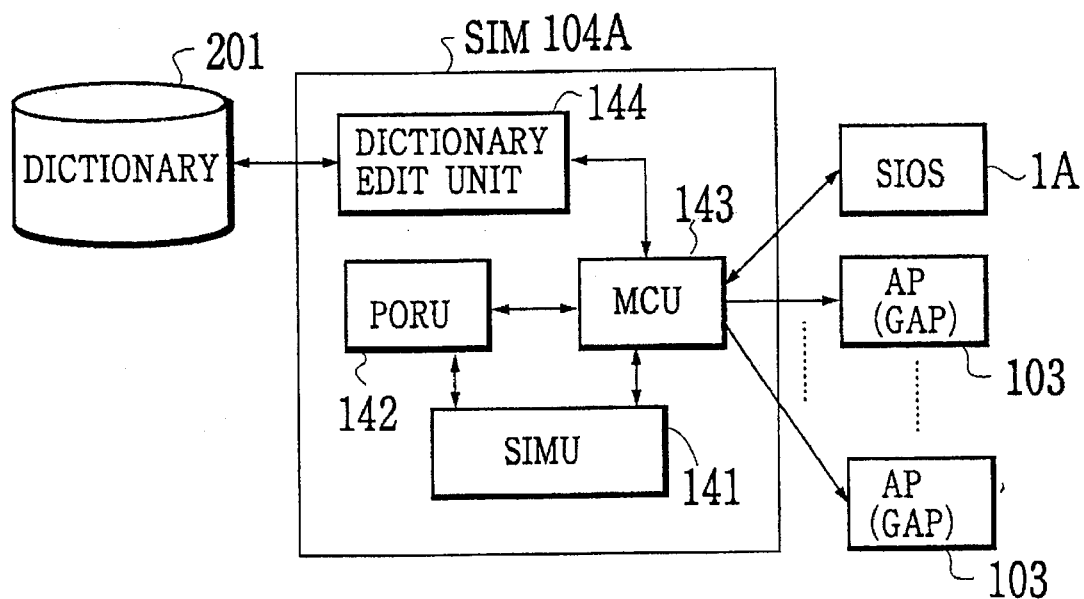
FIG. 113 is a block diagram of a speech interface management system in a twenty-first embodiment of a speech recognition interface system according to the present invention.

Referring now to FIG. 113, the twenty-first embodiment of a speech recognition interface system which defines a speech input and output interface system according to the present invention, and which specifically concerns with the editing function for the recognition dictionary, will be described in detail.

In this twenty-first embodiment, as shown in FIG. 113, the SIM 104A has a dictionary edit unit 144 connected with an external dictionary 201, in addition to the speech interface management unit 141, the program operation registration unit 142, and the message conversion unit 143 similar to the SIM 104 of the eighteenth and nineteenth embodiments described above.

This dictionary edit unit 144 is activated from the message conversion unit 143, and returns the editing finish message to the message conversion unit 143 when the editing operation is finished. In response to this editing finish message, the speech interface management unit 141 can issue the newly edited dictionary load command message to the speech I/O system 1A.

Figure 114:
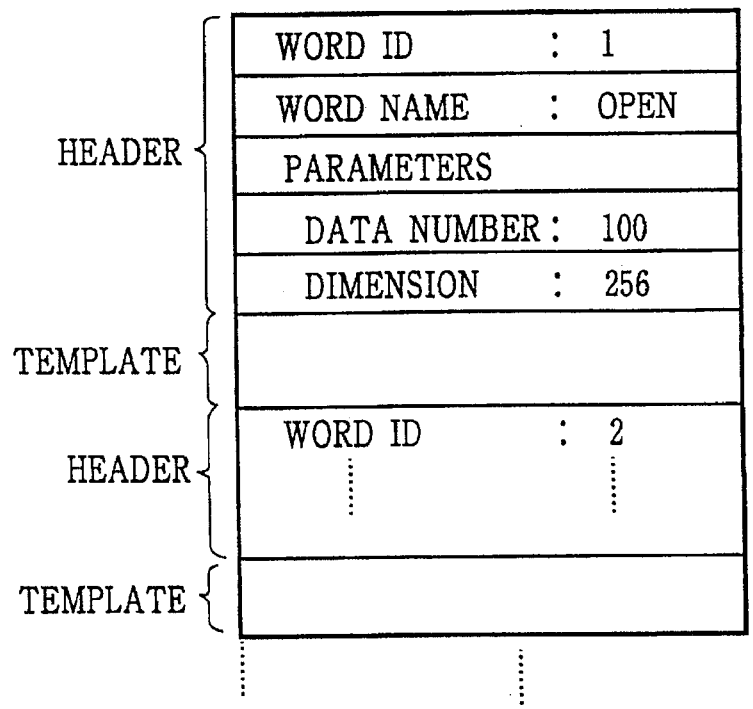
FIG. 114 is a diagrammatic illustration of a dictionary data in the speech recognition interface system of the twenty-first embodiment.

Here, the dictionary data stored in the dictionary 201 has a format as shown in FIG. 114, where the dictionary data entry for each word comprises a header containing the word ID, the word name, and the recognition parameters, and a template for pattern matching. The dictionary edit unit 144 provides a function to display this dictionary data content and allowing the editing of the dictionary data content, such that it becomes possible for the user to carry out the various editing operations such as the deletion of the unused words from the dictionary to reduce the memory amount required at the time of the recognition processing execution, and the change of the word ID and the word name.

Figure 115:
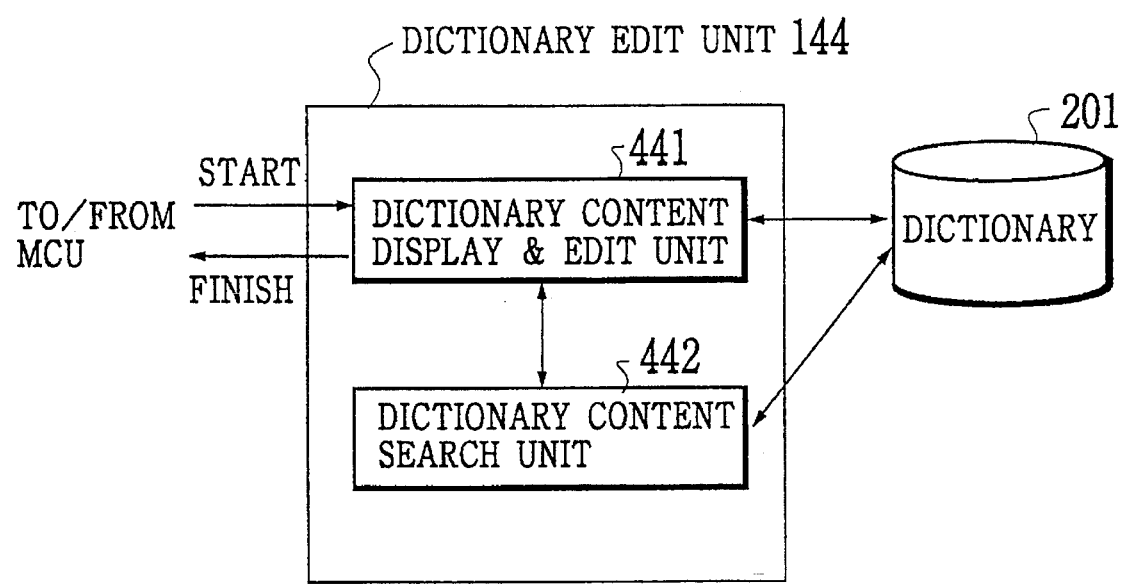
FIG. 115 is a block diagram of a dictionary edit unit in the speech recognition interface system of the twenty-first embodiment.

This dictionary edit unit 144 has a configuration as shown in FIG. 115, which comprises a dictionary content display and edit unit 441 for displaying the dictionary data content and allowing the editing of the dictionary data content by the user, and a dictionary content search unit 442 for carrying out checking and searching of the dictionary data content in the dictionary 201.

Figure 116:
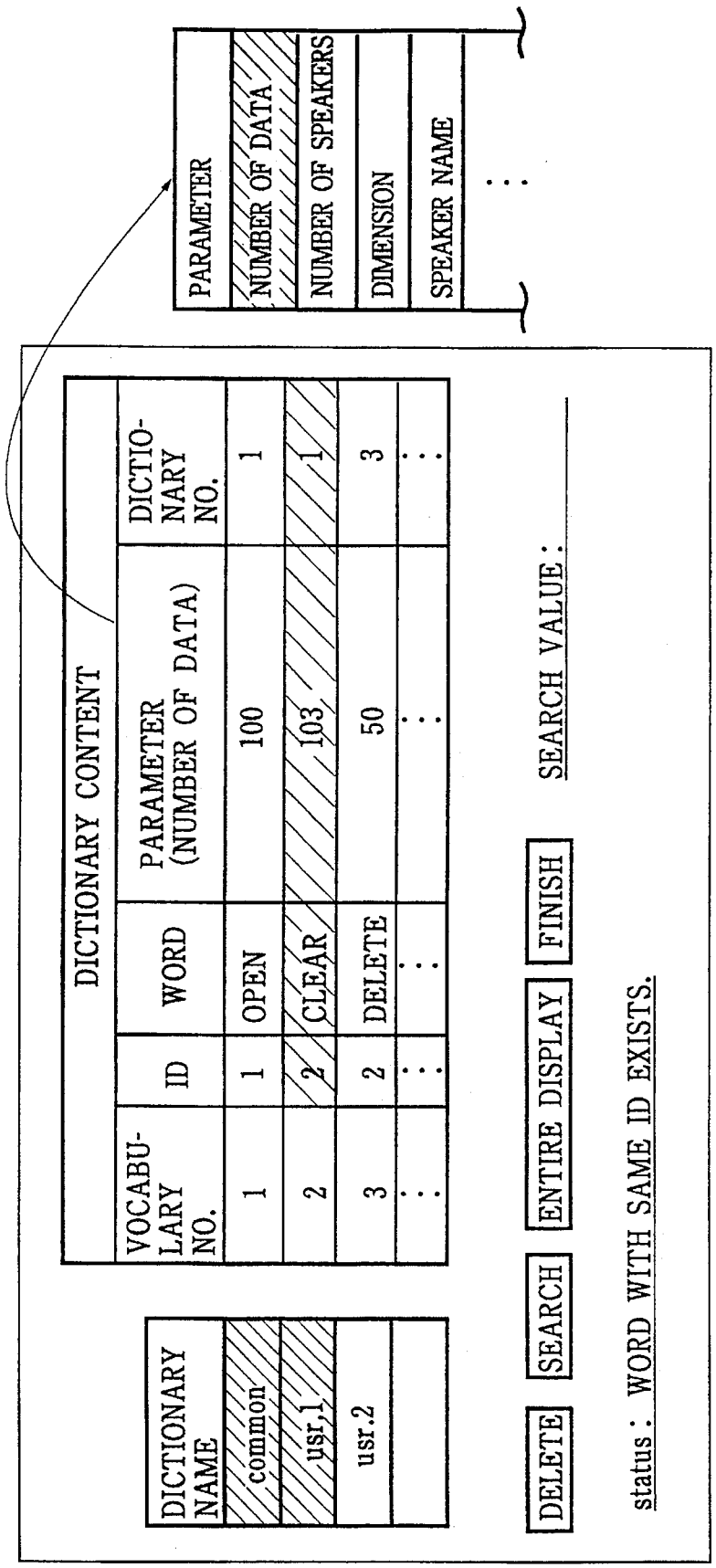
FIG. 116 is an illustration of a dictionary edit screen display in the speech recognition interface system of the twenty-first embodiment.

In this dictionary edit unit 144, the dictionary edit screen display displayed by the dictionary content display and edit unit 441 appears as shown in FIG. 116, which contains the dictionary name window for displaying the available dictionary names, the dictionary content window for displaying the vocabulary number, the word ID, the word, the parameter (number of data), and the dictionary number for each vocabulary of the selected dictionary, a "delete" button for commanding the deletion of the dictionary, a "search" button for commanding the search of the parameter, a "entire display" button for commanding the display of the entire dictionary content, a "finish" button for commanding the finishing of the dictionary editing, a status window for indicating the result of the dictionary content check result, and a search value window for inputting the search value at a time of the search.

Here, the "parameter" box of the dictionary content window has a pop-up menu which can be displayed by clicking this "parameter" box with the mouse, and from which any desired parameter such as a number of data, a number of speakers, a dimension, a speaker name, etc. can be selected.

The dictionary content checking can be carried out automatically when the dictionary name is selected, and checks whether the word with the same ID exists or not, whether the dictionary having the same word exists or not, and whether there is any inconsistency in the recognition parameters or not, etc. The result of the dictionary content checking is indicated in the status window.

FIG. 116 shows an exemplary case in which the dictionaries with the file names "common" and "usr. 1" are selected, such that the dictionary contents of these two dictionaries are merged in the screen display. For example, the vocabulary No. 1 is the word "open" with the ID=1, for which the number of data used in the dictionary production is indicated by the "parameter" as 100. Also, the vocabulary No. 2 is the word "clear" with the ID=2, which is currently selected as indicated by the darkened background (expressed by shading in FIG. 116).

Figure 117:
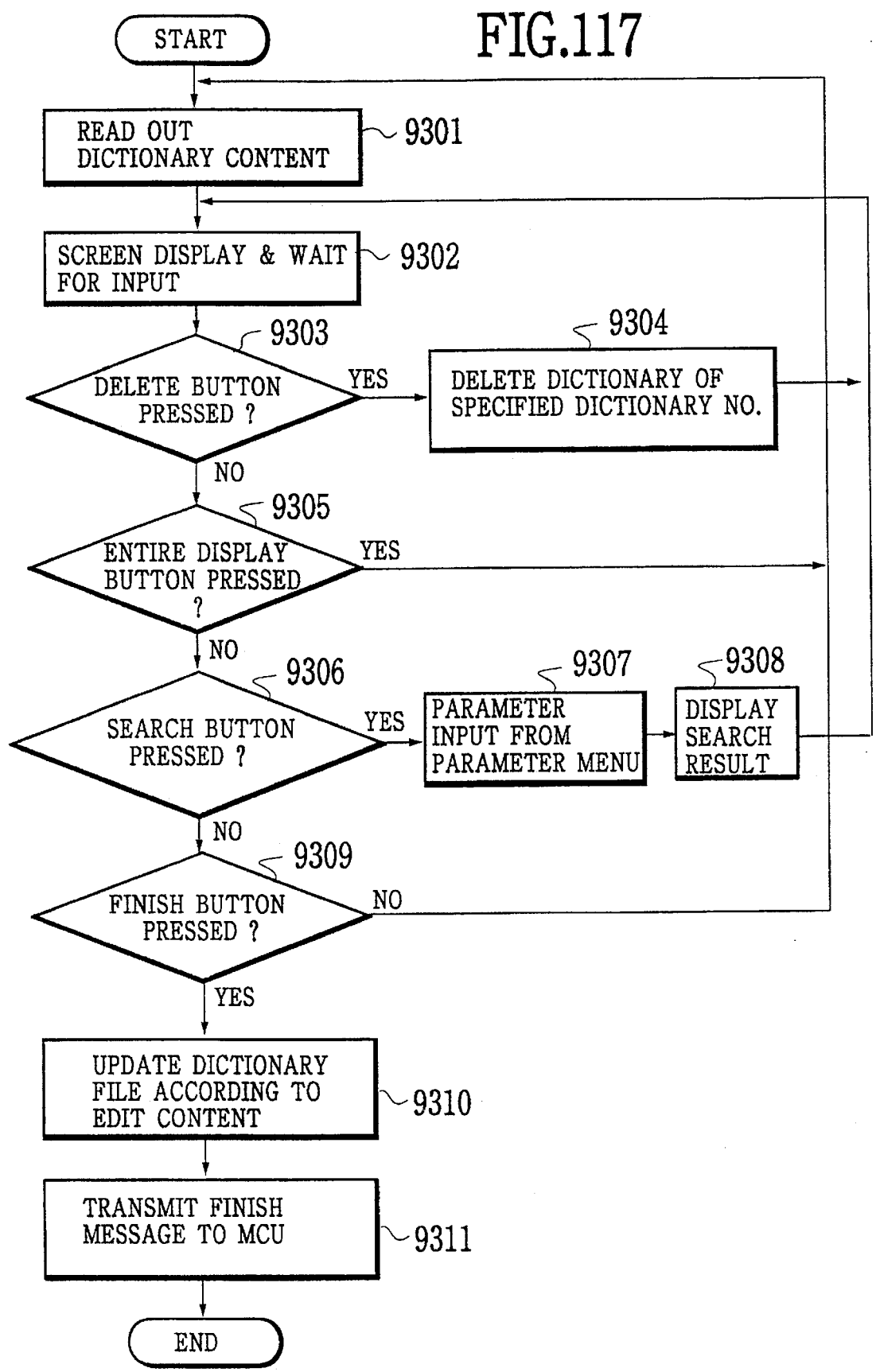
FIG. 117 is a flow chart for the dictionary editing operation in the speech recognition interface system of the twenty-first embodiment.

In this twenty-first embodiment, the dictionary editing operation can be carried out according to the flow chart of FIG. 117 as follows.

When the dictionary edit unit 144 is activated, the dictionary content is read out from the dictionary 201 at the step 9301, and the dictionary edit screen display of FIG. 116 is displayed and the input from the user is awaited at the step 9302.

In a case it is judged that the "delete" button is pressed at the step 9303, the dictionary with the dictionary No. specified by the user is deleted from the dictionary files at the step 9304, and the procedure returns to the step 9302 to wait for the next input from the user.

In a case it is judged that the "entire display" button is pressed at the step 9305, the procedure returns to the step 9301, such that the dictionary content is read out from the dictionary 201 again at the step 9301, and the next input from the user is awaited at the step 9302.

In a case it is judged that the "search" button is pressed at the step 9306, the parameter input from the parameter menu is made by the user at the step 9307, and the dictionary content of the dictionary compatible with the specified parameter and the search value specified at the search value window are displayed as the search result at the step 9308, and the procedure returns to the step 9302 to wait for the next input from the user.

In a case it is judged that the "finish" button is pressed at the step 9309, the dictionary file in the dictionary 201 is updated by the edited dictionary content on the screen display at the step 9310, and the editing finish message is transmitted to the message conversion unit 143 at the step 9311, and the dictionary editing is finished.

In this manner, by means of the dictionary edit unit 144, the various dictionary editing operations such as the deletion of the unnecessary word or dictionary, the confirmation of the dictionary content, the change of the word name, etc. can be carried out easily. In addition, the checking of the words with the same ID, the doubly used word, the recognition parameter inconsistency, etc. can also be carried out easily.

Referring now to FIG. 118, the twenty-second embodiment of a speech recognition interface system which defines a speech input and output interface system according to the present invention will be described in detail.

In the eighteenth and nineteenth embodiments described above, the confirmation of the recognition result obtained from the speech input uttered by the user and the confirmation of the operation in the application program caused by this recognition result have been made by the screen display presented by the application program. For example, the application program notifies the recognition result or the recognition failure to the user as the text data display.

Now, when the program name such as "mail tool" and the command "iconify" for iconifying the speech focused window are uttered by the user, the operation acted on the application program as a result of these speech inputs are fed back to the user as the change of the screen display presented by the application program.

However, depending on the application programs, there are cases in which the screen display hardly changes or does not change at all even after the appropriate operation is acted on the application program, such that the user cannot confirm the action resulting from the speech input by watching the screen display.

Also, when the speech focus and the keyboard focus are separated according to the present invention, there are cases in which the system is operated in a state in which the speech focused window is not at all displayed on the screen display, such that the user also cannot confirm the action resulting from the speech input by watching the screen display.

For these cases, this twenty-second embodiment enables the confirmation of the recognition result and the resulting operation by means of the speech output utilizing the speech synthesis function of the speech I/O system instead of the screen display, so as to improve the convenience of the user in operating the system.

To this end, as shown in FIG. 118, in this twenty-second embodiment, the SIM 104B has a speech response management unit 145 and a speech response registration unit 146 which are connected with the message conversion unit 143 as well as with each other, in addition to the speech interface management unit 141, the program operation registration unit 142, and the message conversion unit 143 similar to the SIM 104 of the eighteenth and nineteenth embodiments described above.

The speech response management unit 145 specifies what speech response is to be returned with respect to what speech input uttered by the user, and the speech response registration unit 146 registers the appropriate speech responses to the speech response management unit 145.

The speech response management unit 145 has a table as shown in FIG. 119, in which each operation inducing the output of the speech response and each response appropriate for the operation are registered in correspondence, along with an applicability flag indicating whether it can be actually used or not for each operation-response pair. Here, the operation may not necessarily be the speech controlled one. Also, the response is described as a command, where "synth( )" is a command to output the synthesized speech with its argument as the text of the speech output, and "play( )" is a command to output the data specified by its argument as the waveform data. Here, $<cat> in the argument of some responses is to be substituted by the recognized vocabulary.

In this case, whenever some operation is carried out, the message conversion unit 143 carries out the procedure to output the appropriate speech response as shown in the flow chart of FIG. 120, according to the data registered in the speech response management unit 145, as follows.

First, whether the message received from the speech I/O system 1A is the recognition result or not is judged at the step 9401, and if so, whether it is the recognition success or not is judged at the step 9402. Otherwise, the procedure directly proceeds to the step 9405 to be described below.

Then, in a case it is the recognition success at the step 9402, the speech response command registered in the speech response management unit 145 for the operation of the recognition success is executed at the step 9403, whereas in a case it is the recognition failure at the step 9402, the speech response command registered in the speech response management unit 145 for the operation of the recognition failure is executed at the step 9404.

In either case, next at the step 9405, the speech response command registered in the speech response management unit 145 for the operation other than the recognition success and the recognition failure, such as those enumerated below the first two lines in FIG. 119, is executed, according to whatever the operation made subsequent to the recognition success or the recognition failure.

According to FIG. 119, in a case of the recognition failure which can be caused by the low similarity to any recognizable vocabulary, or the excessive or insufficient speech input level, the speech response of "huh?" is outputted to ask back the user in a casual human manner. On the other hand, in a case of the recognition success for the application program name such as "mail tool", the speech response of "yes, it is mail tool." is outputted in synthesized speech.

The speech response registration unit 146 registers the data in the speech response management unit 145 by means of the screen display as shown in FIG. 121, on which the user can enter the appropriate response command for each operation, as well as the mark in the box for the applicability flag. The entered registration content can be confirmed by pressing an "OK" button, or cancelled by pressing a "cancel" button.

In this twenty-second embodiment, the response command registered in the speech response management unit 145 is to be executed by the message conversion unit 143, so that it can also be used as the command to be registered in the speech interface management table of the speech interface management unit 141 such as that shown in FIG. 105 for the nineteenth embodiment. By using the response commands such as "synth( )" and "play( )" in the speech interface management table, it also becomes possible to define the speech response output appropriate for the operation in the GAP which cannot directly communicate with the speech I/O system 1A.

Thus, in this twenty-second embodiment, it becomes possible for the user to confirm the operation of the application program resulting from the speech input without watching the screen display to detect any change in the screen display, by utilizing the speech response output function provided in the SIM 104B for returning the meaningful speech response with respect to each operation resulting from the speech input, in a natural conversational manner in which the speech input is responded by the speech response, so that the convenience of the user in operating the system can be improved.

Figure 122:
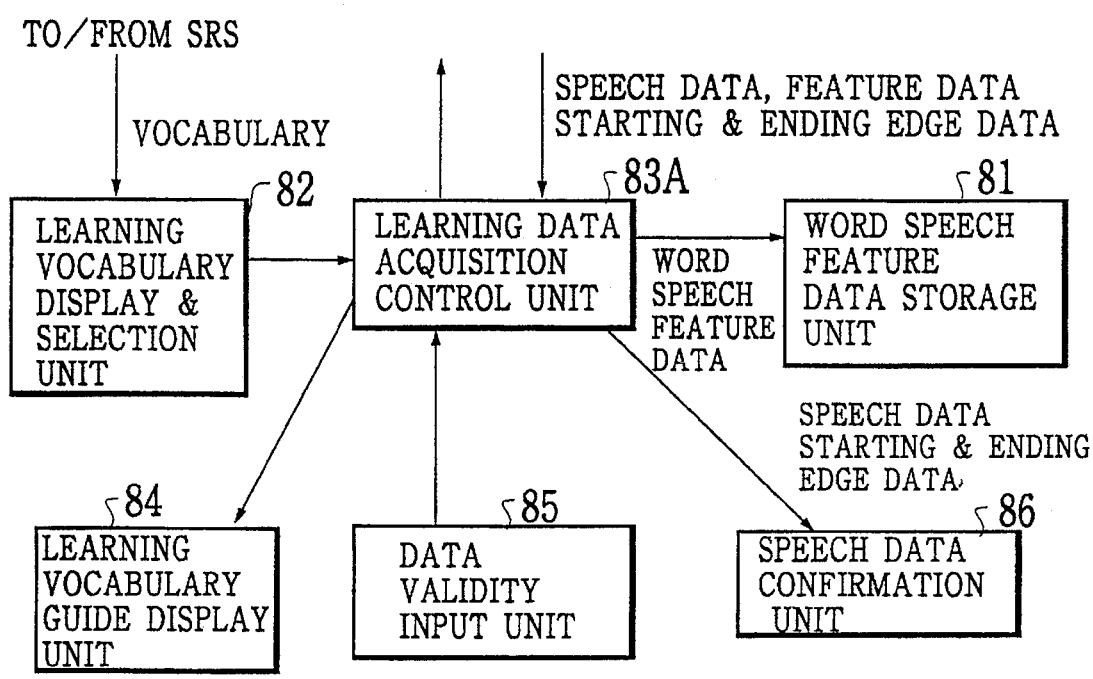

Referring now to FIG. 122, the twenty-third embodiment of a speech recognition interface system which defines a speech input and output interface system according to the present invention will be described in detail.

In the data acquisition procedure for the recognition dictionary production described in the ninth embodiment above, there are cases in which the acquired data contains erroneous data due to the incorrect vocabulary utterance or the speech section detection error. For example, the Japanese word "hiraku" (meaning "open") is sometimes uttered with the last "ku" part in a very weak level, such that there are cases in which only the first "hira" part is detected as the speech section for the speech input of this word. The learning of the recognition dictionary with the erroneous data can lead the significant lowering of the recognition precision, so that it is necessary in the ninth embodiment described above to carry out the confirmation of the acquired data in order to remove the erroneous data.

In view of this situation, in this twenty-third embodiment, this confirmation of the acquired data is made to be easier as well as more accurate, by utilizing the speech output function for the purpose of the data confirmation.

In this twenty-third embodiment, the data acquisition unit 8 of FIG. 35 in the ninth embodiment is modified into a configuration as shown in FIG. 122, which includes a data validity input unit 85 for inputting a indication as to whether each acquired data is valid or invalid, and a speech data confirmation unit 86 for outputting the confirmation speech output for each acquired data, such that the user listening to the confirmation speech output presented by the speech data confirmation unit 86 can decide whether each acquired data is appropriate for use in the dictionary production or not, and the user can accordingly input the valid or invalid indication through the data validity input unit 85.

In addition, in this configuration of FIG. 122, the word speech feature data to be stored in the word speech feature data storage unit 81 is entered through the learning data acquisition control unit 83A, and this learning data acquisition control unit 83A also receives the speech data and the starting and ending edge data for the detected speech section of the speech input from the speech recognition system 1. The data validity input unit 85 and the speech data confirmation unit 86 are connected with the learning data acquisition control unit 83A.

Figure 123:
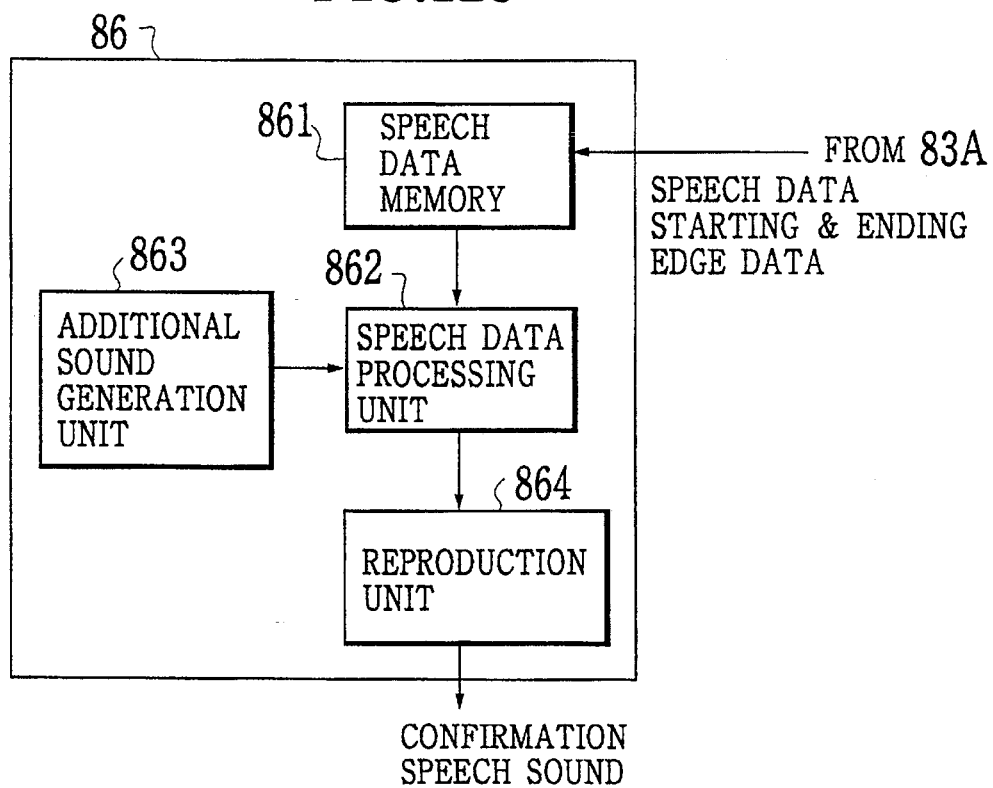

The speech data confirmation unit 86 has a detailed configuration as shown in FIG. 123, which comprises: a speech data memory 861 for temporarily storing the speech data along with the starting and ending edge data supplied from the learning data acquisition control unit 83A; a speech data processing unit 862 for processing the speech data in a manner described below, according to the starting and ending edge data supplied from the learning data acquisition control unit 83A; an additional sound generation unit 863 for generating the additional sound to be used in processing the speech data at the speech data processing unit 862; and a reproduction unit 864 for reproducing the processed speech data obtained by the speech data processing unit 862 to output the confirmation speech output.

Figure 38:
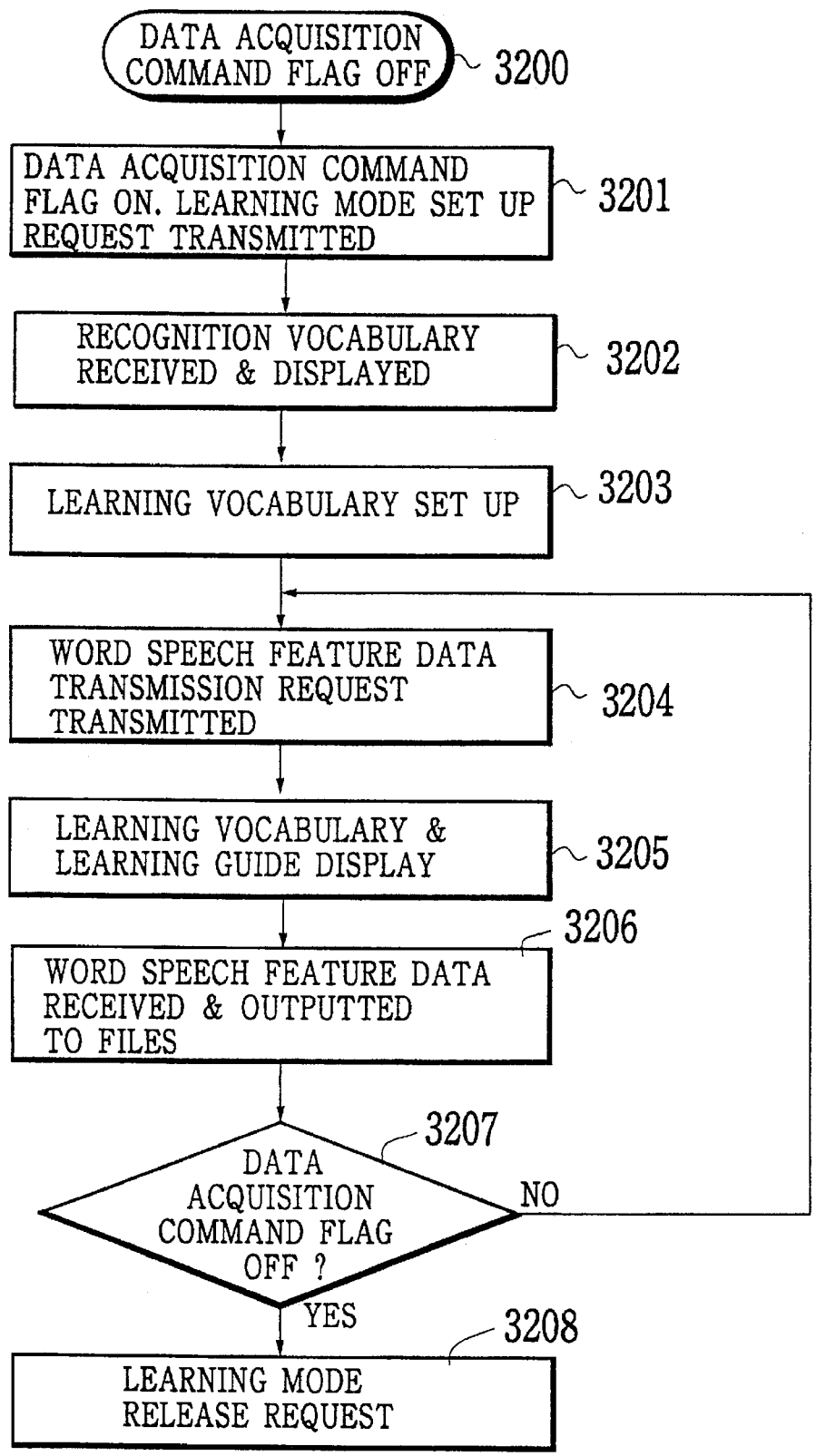
FIG. 38 is a flow chart for an operation of a data acquisition unit of FIG. 35 in the speech recognition interface system of FIG. 34, in the learning data acquisition procedure.
Figure 124:
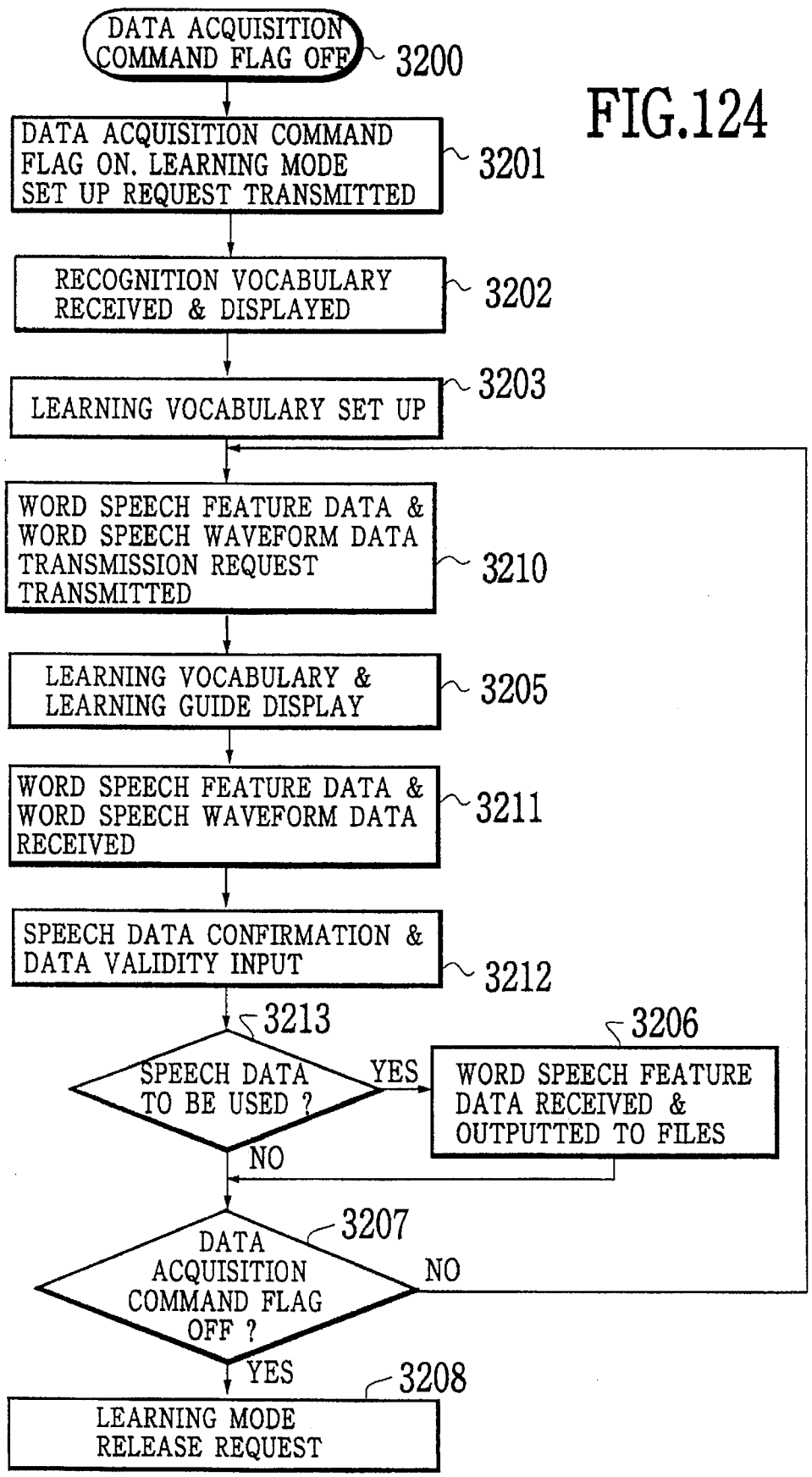

In this twenty-third embodiment, the data acquisition unit of FIG. 122 operates according to the flow chart of FIG. 124, in which those steps which are given the same reference numerals as in the flow chart of FIG. 38 are substantially identical to those in the ninth embodiment described above, as follows.

First, at the step 3200, the data acquisition command flag is set in an OFF state as an initial setting.

When this data acquisition command flag is turned into an ON state by the user, the learning mode set up request is transmitted to the speech recognition system 1 at the step 3201.

Then, the data acquisition unit of FIG. 122 requests the currently set up recognition vocabulary to the speech recognition system 1, and the recognition vocabulary received in response is memorized in the learning vocabulary table 821 in the leaning vocabulary display and selection unit 82, such that the recognition vocabulary list is displayed by the learning vocabulary guide display unit 84 at the step 3202, and the user makes the selection of the desired vocabulary to be learned by using the mouse on the displayed recognition vocabulary list at the step 3203.

Next, the word speech feature data transmission request and the word speech waveform data transmission request are transmitted to the speech recognition system 1 at the step 3210, while the learning guide display is displayed by the leaning vocabulary guide display unit 84 at the step 3205, so as to urge the user to make the learning speech inputs of a selected word for a required number of times as indicated in the learning guide display.

After the learning speech inputs are uttered by the user and the speech recognition system 1 carries out the appropriate speech recognition processing on the learning speech inputs, the speech recognition system 1 transmits the word speech feature data as the feature data and the word speech waveform data as the speech data along with the starting and ending edge data to the learning data acquisition control unit 83A at the step 3211. The learning data acquisition control unit 83A then stores the received word speech feature data in the word speech feature data storage unit 81, and supplies the received speech data and the starting and ending edge data to the speech data memory 861 of the speech data confirmation unit 86.

Then, at the step 3212, the confirmation of the speech data using the confirmation speech output outputted by the speech data confirmation unit 86 is carried out by the user, and the validity of each speech data is inputted by the user at the data validity input unit 85.

Only when the speech data is judged as the data to be used for the dictionary production at the step 3213 according to the validity inputted at the step 3212, the word speech feature data transmitted from the speech recognition system 1 are outputted to the files at the step 3206.

Then, whether the data acquisition command flag in the learning data acquisition control unit 83 is in the OFF state or not is judged at the step 3207.

When the data acquisition command flag is judged as in the OFF state at the step 3207, next at the step 3208, the learning mode release request is transmitted to the speech recognition system 1 so as to finish this learning data acquisition procedure. On the other hand, when the data acquisition command flag is judged as in the ON state at the step 3207, next at the step 3209, the data acquisition command flag is searched, and the procedure returns to the step 3210 to repeat the operations between the step 3210 and the step 3207.

Now, in the confirmation of the acquired data by using the confirmation speech output to reproduce the detected speech data, if the detected speech section alone is reproduced, even when the starting and ending edges of the speech input are erroneously detected, the user may fail to hear the defect in the confirmation speech output, depending on the word uttered as the speech input. For example, in a case of the Japanese word "hiraku" mentioned above, even when the last "ku" part is missing and only the: first "hira" part is reproduced as the confirmation speech output, the user may not notice this defect and believe to have heard "hiraku" correctly.

In order to prevent such an erroneous confirmation by the user at a time of the speech data confirmation, in this twenty-third embodiment, the speech data is processed by the speech data processing unit 862 to make the starting and ending edges in the confirmation speech output to be easily and clearly recognizable, such that the speech data confirmation can be carried out easily and accurately by the user in the learning data acquisition operation and consequently the convenience of the user in operating the system as well as the recognition precision in the system can be improved.

Here, as the manner of processing the speech data to make the starting and ending edges to be easily and clearly recognizable, the following three manners can be considered.

(1) The confirmation speech output can be obtained by adding the known sound such as the white noise or the triangular wave sound before and after the detected speech section in the speech data.

(2) The confirmation speech output can be obtained by adding the click sound at the starting and ending edge positions of the detected speech section in the speech data.

(3) The confirmation speech output can include the reproduction of the entire utterance as recorded containing not only the detected speech section but also non-speech sections before and after the detected speech section, followed by the reproduction of the detected speech section alone.

According to the manner (1), in the example of the Japanese word "hiraku" mentioned above, the known sound which is apparently different from the speech sound follows immediately after the first "hira" part, so that it becomes easier for the user to notice the missing of the last "ku" part.

According to the manner (2), the very distinctive click sound follows immediately after the first "hira" part, so that it becomes easier for the user to notice the missing of the last "ku" part.

According to the manner (3), the user can compare what was heard in the reproduction of the entire utterance with what was heard in the following reproduction of the detected speech section, so that the user can easily notice the difference between the entire utterance and the detected speech section concerning the presence and the absence of the last "ku" part.

Thus, the speech data confirmation unit 86 operates according to the flow chart of one of FIGS. 125A, 125B, and 125C, depending on which one of these manners (1) to (3) is adopted, as follows.

In a case of adopting the manner (1), according to the flow chart of FIG. 125A, the speech data and the starting and ending edge data supplied from the learning data acquisition control unit 83A are stored in the speech data memory at the step 9500. Here, the speech data is the waveform data including margins of a predetermined length such as 240 msec before and after the detected speech section, as shown in FIG. 126D for an exemplary Japanese word "hiraku" in which the speech section is detected erroneously such that only the first "hira" part is contained within the detected speech section while the last "ku" part is contained in the margin after the detected speech section.

Then, the additional sound data for the known sound such as the white noise or the triangular wave sound is generated by the additional sound generation unit 863 at the step 9501.

Next, the speech data processing unit 862 processes the speech data in the speech data memory 861 by adding the additional sound generated at the step 9501, before and after the starting and ending edges of the detected speech section at the steps 9502 and 9503, respectively, according to the starting and ending edge data. As a result, the processed speech data as shown in FIG. 126A can be obtained. Here, the white noise or the triangular wave sound can easily be generated by utilizing the random number generation routine or the triangular function routine. It is also possible to utilize the pre-recorded sound for the additional sound stored in the additional sound generation unit 863 instead of generating the additional sound.

Finally, the processed speech data obtained at the steps 9502 and 9503 is reproduced as the confirmation speech output at the step 9504.

In a case of adopting the manner (2), according to the flow chart of FIG. 125B, the speech data and the starting and ending edge data supplied from the learning data acquisition control unit 83A are stored in the speech data memory at the step 9510, and the additional sound data for the click sound is generated by the additional sound generation unit 863 at the step 9511.

Then, the speech data processing unit 862 processes the speech data in the speech data memory 861 by adding the additional sound of the click sound generated at the step 9511, at the positions of the starting and ending edges of the detected speech section at the steps 9512 and 9513, respectively, according to the starting and ending edge data. As a result, the processed speech data as shown in FIG. 126B can be obtained. Here, the click sound can be generated as the pulse wave or the triangular wave of a short duration in an order of 10 msec.

Finally, the processed speech data obtained at the steps 9512 and 9513 is reproduced as the confirmation speech output at the step 9514.

In a case of adopting the manner (3), according to the flow chart of FIG. 125C, the speech data and the starting and ending edge data supplied from the learning data acquisition control unit 83A are stored in the speech data memory at the step 9520.

Then, the average power for outside of the detected speech section in the speech data is calculated at the step 9521, and whether the average power calculated at the step 9521 is greater than a predetermined threshold or not is judged at the step 9522. Here, the predetermined threshold can be set to the ordinary noise level of +2 dB, for example.

In a case the calculated average power is greater than the predetermined threshold at the step 9522, next at the step 9523, the entire utterance containing both the detection speech section and the margins is reproduced first, and then the detected speech section alone is reproduced. In this case, the successive reproduction of the entire utterance and the detected speech section alone as shown in FIG. 126C is made.

On the other hand, in a case the calculated average power is not greater than the predetermined threshold at the step 9522, next at the step 9524, the detected speech section alone is reproduced.

Here, the noise level is constantly measured at the speech recognition system 1 for the purpose of the speech section detection, so that this measured noise may be utilized as the predetermined threshold.

In the procedure according to the flow chart of FIG. 125C, the successive reproduction of the entire utterance and the detected speech section alone is employed only when the calculated average power is greater than the predetermined threshold, because it is excessively and unnecessarily tedious to carry out the above described manner (3) faithfully for every utterance, and it is not so unreasonable to assume that the erroneous detection of the speech section is likely to occur only when the noise level is relatively high.

As described, according to this twenty-third embodiment, the user can confirm each acquired data by using the confirmation speech output in which it is easier to judge the correctness of the detected speech section, and the validity of each acquired data can be inputted easily, so that the learning data acquisition can be carried out easily and accurately, and consequently the dictionary production using the learning data without the erroneous data can be realized.

It is to be noted here that, although the various embodiments have been described above as a speech recognition interface system for the application programs executed on a computer, the speech interface recognition system of the present invention can be utilized for any data processing system other than the application programs executed on a computer, such as a word processor for example.

It is also to be noted here that, although the various embodiments have been described above as using the isolated word speech recognition scheme, it should be apparent that the speech recognition interface system of the present invention can use any desired speech recognition scheme such as the continuous speech recognition scheme.

It is further to be noted here that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A speech recognition interface system for enabling a speech control of a plurality of application programs executed on a computer, comprising:

speech recognition means for carrying out a speech recognition processing for a speech input made by a user to obtain a recognition result;

program management means for managing program management data indicating a speech recognition interface function required by each application program; and message processing means for exchanging messages with said plurality of application programs in order to specify an appropriate recognition vocabulary to be used in the speech recognition processing of the speech input to the speech recognition means, and to transmit the recognition result for the speech input obtained by the speech recognition means by using the appropriate recognition vocabulary to appropriate ones of said plurality of application programs, according to the program management data managed by the program management means.

2. The system of claim 1, wherein the message processing means also exchanges messages with said plurality of application programs in order to update the program management data in the program management means according to an internal state of each application program.

3. The system of claim 1, wherein the program management data include an ID of each application program, input masks specifying types of the messages to be exchanged by each application program with the message processing means, a speech input flag indicating a presence/absence of a speech focus on each application program, and a recognition vocabulary list specifying the appropriate recognition vocabulary for each application program.

4. The system of claim 1, further comprising a window system connected with said plurality of application programs for providing graphical user interface functions to said plurality of application programs.

5. The system of claim 4, wherein the said plurality of application program include a recognition vocabulary display program for displaying the appropriate recognition vocabulary currently set by the message processing means to the speech recognition means, through the window system.

6. The system of claim 4, wherein the message processing means changes the appropriate recognition vocabulary to be used in the speech recognition processing of the speech input specified to the speech recognition means, according to a currently working position specified on the window system.

7. The system of claim 4, wherein the window system provides manually controllable input means for inputting user inputs, and the message processing means sets a speech focus for the speech input independently from an input focus of the manually controllable input means.

8. The system of claim 7, wherein said plurality of application programs include a task management program for displaying the speech focus currently set by the message processing means, through the window system.

9. The system of claim 8, wherein the task management program also displays the appropriate recognition vocabulary currently set by the message processing means to the speech recognition means.

10. The system of claim 1, wherein the message processing means shifts a speech focus for the speech input to a speech focus shifting target specified by the speech input.

11. The system of claim 10, wherein the program management data specifies a local/global attribute to each recognition vocabulary registered for each application program, such that a local attributed recognition vocabulary is recognizable only when said each application program for which said each recognition vocabulary is registered is speech focused while the global attributed recognition vocabulary including a name of said each application program is always recognizable.

12. The system of claim 1, wherein the message processing means sets a speech focus to more than one of said plurality of application programs simultaneously.

13. The system of claim 1, wherein each application program exchanges the messages with the message processing means, in order to specify expected operations of the speech recognition interface system according to an internal state of said each application program.

14. The system of claim 1, further comprising data acquisition means for acquiring learning data for learning vocabulary, and dictionary production means for producing a recognition dictionary to be used by the speech recognition means according to the learning data acquired by the data acquisition means.

15. The system of claim 14, wherein the data acquisition means displays the candidates for the learning vocabulary according to the appropriate recognition vocabulary currently set by the message processing means to the speech recognition means.

16. The system of claim 14, wherein the data acquisition means displays a leaning guide display for guiding the user to utter appropriate learning vocabulary for as many times as necessary.

17. The system of claim 14, wherein the dictionary production means carries out a dictionary production processing on a background, while the speech recognition interface system is operated to carry out other processing unrelated to the dictionary production processing.

18. The system of claim 14, wherein the dictionary production means carries out a dictionary production processing according to a dictionary production management table registering dictionary production requests in a desired order in which the dictionary production processing is to be carried out by the dictionary production means.

19. The system of claim 14, wherein the dictionary production means provides an indication of at least one of a progress and a speed of a dictionary production processing.

20. The system of claim 14, wherein the data acquisition means includes:
speech data confirmation means for outputting a confirmation speech output for a learning vocabulary speech input uttered by the user, and
data validity input means for allowing the user to input a validity of the learning vocabulary speech input.

21. The system of claim 20, wherein the speech data confirmation means produces the confirmation speech output by adding known additional sounds before and after a detected speech section of the learning vocabulary speech input.

22. The system of claim 20, wherein the speech data confirmation means produces the confirmation speech output by adding click sounds at starting and ending edges of a detected speech section of the learning vocabulary speech input.

23. The system of claim 20, wherein the speech data confirmation means produces the confirmation speech output in a form of a reproduction of an entire learning vocabulary speech input followed by a reproduction of a detected speech section of the learning vocabulary speech input.

24. The system of claim 1, further comprising mode switching means for switching operation modes of the speech recognition interface system among a normal recognition mode for carrying out the speech recognition processing for the speech input by using the appropriate recognition vocabulary set by the message processing means, and an special mode in which only a specific keyword is recognizable by the speech recognition means, where the normal recognition mode is switched to the specific mode when the speech input is not given by the user for a predetermined period of time, and the specific mode is switched to the normal recognition mode when the speech input of the specific keyword is made by the user.

25. The system of claim 1, wherein said plurality of application programs include a speech mail tool.

26. The system of claim 25, wherein the speech mail tool selectively presents received mails of a category specified by the speech input made by the user.

27. The system of claim 1, wherein the speech input made by the user represents a control command for controlling operations of at least one of said plurality of application programs.

28. The system of claim 1, further comprising:
speech synthesis means for outputting speech outputs from said plurality of application programs;
wherein the message processing means also exchanges messages with said plurality of application programs in order to control the speech outputs at the speech synthesis means.

29. The system of claim 28, wherein the speech synthesis means includes:
speech output management means for managing speech output management data indicating a speech output function required by each application program;
waveform synthesis means for synthesizing speech output waveform data for each speech output of each application program; and
waveform superposition means for superposing synthesized speech output waveform data for said plurality of application programs and outputting the speech outputs given by the superposed and synthesized speech output waveform data, according to the speech output management data managed by the speech output management means.

30. The system of claim 28, wherein the speech output management data and the program management data include speech output priority data specifying required priority settings for each speech output of each application program.

31. The system of claim 30, wherein the required priority settings specified by the speech output priority data includes a presence/absence of an output interruption processing for each speech output to interrupt other speech outputs while outputting said each speech output.

32. The system of claim 28, wherein said plurality of application programs includes a speech mail tool.

33. The system of claim 32, wherein the speech input made by the user represents a control command for controlling mail production operations at the speech mail tool.

34. The system of claim 32, wherein the speech input made by the user represents a control command for controlling mail reading operations at the speech mail tool.

35. The system of claim 34, wherein the speech synthesis means outputs the speech outputs resulting from the mail reading operations, by using a controllable speech synthesized reading voice suitably controlled for each mail read by the mail reading operations.

36. The system of claim 35, wherein the controllable speech synthesized reading voice is controlled according to control codes contained within each mail read by the mail reading operations.

37. The system of claim 32, wherein the speech mail tool includes:

task priority management means for managing a task priority level assigned to each operation that can be executed in said plurality of application programs; and mail processing means for notifying a reception of a new mail to the user only when a priority level assigned to the new mail received at the speech mail tool is higher than the task priority level assigned to a currently executed operation, according to the task priority management means.

38. The system of claim 32, wherein the speech mail tool includes mail summary means for producing a summary of each mail received at the speech mail tool, which can be read by mail reading operations at the speech mail tool instead of said each mail itself.

39. The system of claim 32, wherein the speech input is inputted by the user through a telephone, and the speech input made by the user represents a control command for controlling mail production and forwarding operations at the speech mail tool.

40. The system of claim 39, wherein the mail production and forwarding operations include at least one of a recording of a mail speech message, a reproducing of a recorded mail speech message, a specifying of a mail subject, and a specifying of a forwarding mail address.

41. The system of claim 1, wherein said plurality of application programs include a speech interface management system for interfacing the speech recognition interface system and general application programs which are not directly connected with the speech recognition interface system.

42. The system of claim 41, wherein the speech interface management system sets a dummy speech focus indicating an intended input target of the speech input to one of said plurality of application programs and the general application programs Identified by a program name obtained as the recognition result by the speech recognition interface system.

43. The system of claim 42, further comprising a window system connected with said plurality of application programs and the general application programs for providing graphical user interface functions using windows to said plurality of application programs and the general application programs, wherein the program management means also manages the dummy speech focus and recognition vocabulary attributes with respect to each window, and the message processing means specifies the appropriate recognition vocabulary for the speech input and transmits the recognition result for the speech input to appropriate ones of said plurality of application programs and the general application programs, according to the program management data, the dummy speech focus, and the recognition vocabulary attributes.

44. The system of claim 43, wherein the recognition vocabulary attributes include a local attribute, a window attribute, and a global attribute, where a local attributed recognition vocabulary is recognizable only when the window for which said local attributed recognition vocabulary is registered is dummy speech focused, a window attributed recognition vocabulary is recognizable when one of the windows assigned to an identical application program as the window for which said window attributed recognition vocabulary is registered is dummy speech focused, and a global attributed recognition vocabulary is always recognizable.

45. The system of claim 43, wherein the program management means also manages a grouping relationship among the windows, such that the recognition vocabulary registered for any one of grouped windows is recognizable whenever one of grouped windows is dummy speech focused.

46. The system of claim 43, wherein the program management means also manages a parent-child relationship among the windows, such that the recognition vocabulary registered for a child window is recognizable whenever a parent window is dummy speech focused.

47. The system of claim 42, wherein the speech interface management system comprises:

speech interface management means for managing speech interface management data indicating a message conversion function required by each general application program; and message conversion means for converting the recognition result obtained at the speech recognition interface system into the operation command for the general application programs according to the speech interface management data.

48. The system of claim 47, wherein the speech interface management system further comprises:

operation registration means for registering the operation command to be managed in correspondence to each recognition vocabulary of each general application program in the speech interface management means.

49. The system of claim 1, further comprising dictionary editing means for editing a recognition dictionary containing recognition vocabularies of said plurality of application programs.

50. The system of claim 1, further comprising:

speech response management means for managing speech responses of said plurality of application programs, to be outputted in response to the speech input for said plurality of application programs; and speech response registration means for registering the speech responses to be managed in correspondence to operations of said plurality of application programs resulting from an execution of the operation command specified by the speech input in the speech response management means.

51. A method of speech recognition interface for enabling a speech control of a plurality of application programs executed on a computer, comprising the steps of:

(a) managing program management data indicating a speech recognition interface function required by each application programs;

(b) specifying an appropriate recognition vocabulary to be used in a speech recognition processing of a speech input made by a user according to the program management data managed at the step (a);

(c) carrying out the speech recognition processing for the speech input by using the appropriate recognition vocabulary specified at the step (b), to obtain a recognition result; and (d) transmitting the recognition result for the speech input obtained at the step (c) to appropriate ones of said plurality of application programs according to the program management data managed at the step (a).

52. The method of claim 51, wherein the steps (b) and (d) are realized by exchanging messages between said plurality of application programs and a speech recognition interface system handling the steps (a) and (c).

53. The method of claim 51, further comprising the step of:

(e) updating the program management data managed at the step (a) according to a state of each application programs.

54. The method of claim 51, wherein the program management data include an ID of each application program, input masks; specifying types of the messages to be exchanged by each application program with the message processing means, a speech input flag indicating a presence/absence of a speech focus on each application program, and a recognition vocabulary list specifying the appropriate recognition vocabulary for each application program.

55. The method of claim 51, further comprising the step of:

(f) controlling speech outputs from said plurality of application programs.

56. The method of claim 51, wherein said plurality of application programs include a speech mail tool.

* * * * *